(12) United States Patent
Philbrick et al.

(10) Patent No.: US 7,472,156 B2
(45) Date of Patent: Dec. 30, 2008

(54) TRANSFERRING CONTROL OF A TCP CONNECTION BETWEEN DEVICES

(75) Inventors: Clive M. Philbrick, San Jose, CA (US); Peter K. Craft, San Francisco, CA (US); David A. Higgen, Saratoga, CA (US)

(73) Assignee: Alacritech, Inc., San Jose, CA (US)

( * ) Notice: Subject to any disclaimer, the term of this patent is extended or adjusted under 35 U.S.C. 154(b) by 1054 days.

(21) Appl. No.: 10/427,862

(22) Filed: Apr. 30, 2003

(65) Prior Publication Data

US 2004/0158640 A1    Aug. 12, 2004

Related U.S. Application Data

(63) Continuation of application No. 10/367,147, filed on Feb. 12, 2003, now Pat. No. 7,185,266, which is a continuation of application No. 10/277,604, filed on Oct. 18, 2002, which is a continuation of application No. 10/005,536, filed on Nov. 7, 2001, which is a continuation of application No. 09/384,792, filed on Aug. 27, 1999, now Pat. No. 6,434,620, which is a continuation-in-part of application No. 09/067,544, filed on Apr. 27, 1998, now Pat. No. 6,226,680, and a continuation-in-part of application No. 09/141,713, filed on Aug. 28, 1998, now Pat. No. 6,389,479, which is a continuation-in-part of application No. 09/464,283, filed on Dec. 15, 1999, now Pat. No. 6,427,173, which is a continuation-in-part of application No. 09/514,425, filed on Feb. 28, 2000, now Pat. No. 6,427,171.

(60) Provisional application No. 60/098,296, filed on Aug. 27, 1998, provisional application No. 60/061,809, filed on Oct. 14, 1997.

(51) Int. Cl.
*G06F 15/16*    (2006.01)

(52) U.S. Cl. .......................... 709/201; 718/1; 718/105
(58) Field of Classification Search .................. 709/227, 709/228, 250, 226, 230; 710/15; 370/401; 714/2
See application file for complete search history.

(56) References Cited

U.S. PATENT DOCUMENTS 4,366,538 A    12/1982    Johnson et al. ............. 364/200

(Continued)

FOREIGN PATENT DOCUMENTS

WO    WO/99/04343    4/1998

(Continued)

OTHER PUBLICATIONS

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

(Continued)

*Primary Examiner*—Dustin Nguyen
(74) *Attorney, Agent, or Firm*—Silicon Edge Law Group, LLP; Mark Lauer

(57) ABSTRACT

A system and method for network communication, comprising a device coupled between a computer and a network to receive from the computer a Transport Control Protocol (TCP) connection, the device receiving from the network at least one packet associated with the TCP connection and processing a TCP header for the at least one packet, the computer having a memory storing instructions to pass the TCP connection to the device in first and second commands, the first command signaling an intent to transfer of the TCP connection, the second command responsive to an indication from the device that the device is prepared to receive the TCP connection.

38 Claims, 40 Drawing Sheets

U.S. PATENT DOCUMENTS

| | | | |
|---|---|---|---|
| 4,485,455 A | 11/1984 | Boone et al. | 364/900 |
| 4,485,460 A | 11/1984 | Stambaugh | 365/203 |
| 4,589,063 A | 5/1986 | Shah et al. | 710/8 |
| 4,700,185 A | 10/1987 | Balph et al. | 340/825.5 |
| 4,991,133 A | 2/1991 | Davis et al. | 364/900 |
| 5,056,058 A | 10/1991 | Hirata et al. | 364/900 |
| 5,058,110 A | 10/1991 | Beach et al. | 370/85.6 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/200 |
| 5,321,819 A * | 6/1994 | Szczepanek | 709/228 |
| 5,412,782 A | 5/1995 | Hausman et al. | 395/250 |
| 5,418,912 A | 5/1995 | Christenson | 709/234 |
| 5,448,566 A | 9/1995 | Richter et al. | 370/94.1 |
| 5,485,455 A | 1/1996 | Dobbins et al. | 370/255 |
| 5,485,460 A | 1/1996 | Schrier et al. | 703/227 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,524,250 A | 6/1996 | Chesson et al. | 395/775 |
| 5,535,375 A | 7/1996 | Eshel | 703/27 |
| 5,548,730 A | 8/1996 | Young et al. | 395/280 |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | 395/200.15 |
| 5,590,328 A | 12/1996 | Seno et al. | 395/675 |
| 5,592,622 A | 1/1997 | Isfel et al. | 395/200.02 |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,633,780 A | 5/1997 | Cronin | 361/220 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 395/831 |
| 5,682,534 A | 10/1997 | Kapoor et al. | 709/250 |
| 5,692,130 A | 11/1997 | Shobu et al. | 395/200.12 |
| 5,699,317 A | 12/1997 | Sartore et al. | 395/230.06 |
| 5,699,350 A | 12/1997 | Kraslavsky | 370/254 |
| 5,701,434 A | 12/1997 | Nakagawa | 395/484 |
| 5,701,516 A | 12/1997 | Cheng et al. | 395/842 |
| 5,717,691 A * | 2/1998 | Dighe et al. | 370/401 |
| 5,727,142 A | 3/1998 | Chen | 395/181 |
| 5,727,149 A * | 3/1998 | Hirata et al. | 709/250 |
| 5,742,765 A | 4/1998 | Wong et al. | 709/230 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,768,618 A | 6/1998 | Erickson et al. | 395/829 |
| 5,771,349 A | 6/1998 | Picazo, Jr. et al. | 395/188.01 |
| 5,774,660 A * | 6/1998 | Brendel et al. | 709/201 |
| 5,778,013 A | 7/1998 | Jedwab | 714/807 |
| 5,778,419 A | 7/1998 | Hansen et al. | 711/112 |
| 5,790,804 A | 8/1998 | Osborne | 395/200.75 |
| 5,794,061 A | 8/1998 | Hansen et al. | 395/800.01 |
| 5,802,258 A | 9/1998 | Chen | 395/182.08 |
| 5,802,580 A | 9/1998 | McAlpice | 711/149 |
| 5,809,328 A | 9/1998 | Nogales et al. | 395/825 |
| 5,809,527 A | 9/1998 | Cooper et al. | 711/133 |
| 5,812,775 A | 9/1998 | Van Seters et al. | 395/200.43 |
| 5,815,646 A | 9/1998 | Purcell et al. | 395/163 |
| 5,828,835 A | 10/1998 | Isfeld et al. | 395/200.3 |
| 5,848,293 A | 12/1998 | Gentry | 710/5 |
| 5,872,919 A | 2/1999 | Wakeland | 709/230 |
| 5,878,225 A | 3/1999 | Bilansky et al. | 395/200.57 |
| 5,892,903 A | 4/1999 | Klaus | 709/227 |
| 5,898,713 A | 4/1999 | Melzer et al. | 371/53 |
| 5,909,546 A | 6/1999 | Osborne | 395/200.75 |
| 5,913,028 A | 6/1999 | Wang et al. | 395/200.33 |
| 5,920,566 A | 7/1999 | Hendel et al. | 370/401 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A * | 8/1999 | Connery et al. | 709/250 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry et al. | 709/303 |
| 6,021,507 A * | 2/2000 | Chen | 714/2 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,323 A * | 4/2000 | Krause | 709/227 |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,564 A | 6/2000 | Lakshman et al. | 370/235 |
| 6,078,733 A | 6/2000 | Osborne | 709/250 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 359/123 |
| 6,115,615 A | 9/2000 | Ota et al. | 455/422.1 |
| 6,122,670 A | 9/2000 | Bennett et al. | |
| 6,141,701 A | 10/2000 | Whitney | 710/5 |
| 6,141,705 A * | 10/2000 | Anand et al. | 710/15 |
| 6,145,017 A | 11/2000 | Ghaffari | 710/5 |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | 709/238 |
| 6,181,705 B1 | 1/2001 | Branstad et al. | 370/392 |
| 6,202,105 B1 | 3/2001 | Gates et al. | 710/20 |
| 6,226,680 B1 | 5/2001 | Boucher et al. | 709/230 |
| 6,233,242 B1 | 5/2001 | Mayer et al. | 370/392 |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Wills et al. | 709/217 |
| 6,389,468 B1 | 5/2002 | Muller et al. | 709/226 |
| 6,389,479 B1 | 5/2002 | Boucher | 709/243 |
| 6,393,487 B2 | 5/2002 | Boucher et al. | 709/238 |
| 6,421,742 B1 | 7/2002 | Tillier | 710/1 |

| | | | |
|---|---|---|---|
| 6,421,753 B1 | 7/2002 | Hoese et al. | 710/129 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,470,415 B1 | 10/2002 | Starr et al. | 711/104 |
| 6,473,425 B1 | 10/2002 | Bellaton et al. | 370/392 |
| 6,480,489 B1 | 11/2002 | Muller et al. | 370/389 |
| 6,487,202 B1 | 11/2002 | Klausmeier et al. | 370/395 |
| 6,487,654 B2 | 11/2002 | Dowling | |
| 6,490,631 B1 * | 12/2002 | Teich et al. | 709/250 |
| 6,502,144 B1 | 12/2002 | Accarie | 710/8 |
| 6,523,119 B2 | 2/2003 | Pavlin et al. | 713/192 |
| 6,526,446 B1 | 2/2003 | Yang et al. | 709/230 |
| 6,570,884 B1 | 5/2003 | Connery et al. | 370/419 |
| 6,591,302 B2 | 7/2003 | Boucher et al. | 709/230 |
| 6,591,310 B1 | 7/2003 | Johnson | 710/3 |
| 6,648,611 B2 | 11/2003 | Morse et al. | 417/310 |
| 6,650,640 B1 | 11/2003 | Muller et al. | 370/392 |
| 6,657,757 B1 | 12/2003 | Chang et al. | 359/124 |
| 6,658,480 B2 | 12/2003 | Boucher et al. | 709/239 |
| 6,678,283 B1 | 1/2004 | Teplitsky | 370/463 |
| 6,681,364 B1 | 1/2004 | Calvignac et al. | |
| 6,687,758 B2 | 2/2004 | Craft et al. | 709/250 |
| 6,697,868 B2 | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,765,901 B1 | 7/2004 | Johnson et al. | 370/352 |
| 6,807,581 B1 | 10/2004 | Starr et al. | 709/250 |
| 6,842,896 B1 | 1/2005 | Redding et al. | 717/172 |
| 6,912,522 B2 | 6/2005 | Edgar | |
| 6,938,092 B2 | 8/2005 | Burns | 709/230 |
| 6,941,386 B2 | 9/2005 | Craft et al. | 709/250 |
| 6,965,941 B2 | 11/2005 | Boucher et al. | 709/230 |
| 6,996,070 B2 | 2/2006 | Starr et al. | 370/252 |
| 7,042,898 B2 | 5/2006 | Blightman et al. | 370/463 |
| 7,076,568 B2 | 7/2006 | Philbrick et al. | 709/250 |
| 7,089,326 B2 | 8/2006 | Boucher et al. | 709/242 |
| 7,093,099 B2 | 8/2006 | Bodas et al. | 711/206 |
| 7,124,205 B2 | 10/2006 | Craft et al. | 709/250 |
| 7,133,940 B2 | 11/2006 | Blightman et al. | 710/22 |
| 7,167,926 B1 | 1/2007 | Boucher et al. | 709/250 |
| 7,167,927 B2 | 1/2007 | Philbrick et al. | 709/250 |
| 7,174,393 B2 | 2/2007 | Boucher et al. | 709/250 |
| 7,185,266 B2 | 2/2007 | Blightman et al. | 714/776 |
| 7,191,241 B2 | 3/2007 | Boucher et al. | 709/230 |
| 7,191,318 B2 | 3/2007 | Tripathy et al. | 712/225 |
| 7,237,036 B2 | 6/2007 | Boucher et al. | 709/245 |
| 7,254,696 B2 | 8/2007 | Mittal et al. | 712/210 |
| 7,284,070 B2 | 10/2007 | Boucher et al. | 709/250 |
| 2001/0004354 A1 | 6/2001 | Jolitz | |
| 2001/0013059 A1 | 8/2001 | Dawson et al. | 709/217 |
| 2001/0014892 A1 | 8/2001 | Gaither et al. | 707/200 |
| 2001/0014954 A1 | 8/2001 | Purcell et al. | 714/4 |
| 2001/0025315 A1 | 9/2001 | Jolitz | |
| 2001/0048681 A1 | 12/2001 | Bilic et al. | 370/389 |
| 2001/0053148 A1 | 12/2001 | Bilic et al. | 370/389 |
| 2002/0073223 A1 | 6/2002 | Darnell et al. | 709/232 |
| 2002/0112175 A1 | 8/2002 | Makofka et al. | 713/200 |
| 2003/0066011 A1 | 4/2003 | Oren | 714/758 |
| 2003/0110344 A1 | 6/2003 | Szezepanek et al. | 711/100 |
| 2003/0165160 A1 | 9/2003 | Minami et al. | 370/466 |
| 2004/0054814 A1 | 3/2004 | McDaniel | |
| 2004/0059926 A1 | 3/2004 | Angelo et al. | 713/168 |
| 2004/0153578 A1 | 8/2004 | Elzur | |
| 2004/0213290 A1 | 10/2004 | Johnson et al. | 370/469 |
| 2004/0246974 A1 | 12/2004 | Gyugyi et al. | 370/395.31 |

FOREIGN PATENT DOCUMENTS

| | | |
|---|---|---|
| WO | WO/98/19412 | 5/1998 |
| WO | PCT/US98/24943 | 11/1998 |
| WO | WO/98/50852 | 11/1998 |
| WO | WO 99/65219 | 6/1999 |
| WO | WO 01/04770 A2 | 1/2001 |
| WO | WO 01/05107 A1 | 1/2001 |
| WO | WO 01/05116 A2 | 1/2001 |
| WO | WO 01/05123 A1 | 1/2001 |
| WO | WO 01/40960 A1 | 7/2001 |
| WO | WO 01/59966 | 8/2001 |
| WO | WO 01/86430 | 11/2001 |

OTHER PUBLICATIONS

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Syposium Record entitled, "The Protocol Engine Chipset", from Hot Chips III, 16 pages, pp. Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Form 10-K for Exelan, Inc., for the fiscal year ending Dec. 31, 1988 (10 pages).

Thia, Y.H. Publication entitled "High-Speed OSI Protocol Bypass Algorithm with Window Flow Control", *Protocols for High Speed Networks*, pp. 53-68, 1993, month unknown.

Gigabit Ethernet Technical Brief, Achieving End-to-End Performance. Alteon Networks, Inc., First Edition, Sep. 1996, 15 pages.

iSCSI HBA article entitled "iSCSI and 2Gigabit fibre Channel Host Bus Adapters from Emulex, QLogic, Adaptec, JNI", 8 pages, printed Oct. 1, 2001.

U.S. Appl. No. 60/283,896, Titled: CRC Calculations for Out of Order PUDs, filed Apr. 12, 2003, Inventor: Amit Oren, Assignee: Siliquent Technologies Ltd.

WindRiver article entitled "Tornado: For Intelligent Network Acceleration", copyright Wind River Systems, 2001, 2 pages, month unknown.

WindRiver White Paper entitled "Complete TCP/IP Offload for High-Speed Ethernet Networks", Copyright Wind River Systems, 2002, 7 pages, month unknown.

Intel article entitled "Solving Server Bottlenecks with Intel Server Adapters", Copyright Intel Corporation, 1999, 8 pages, month unknown.

Thia, Y.H. Publication entitled "A Reduced Operational Protocol Engine (ROPE) for a multiple-layer bypass architecture", *Protocols for High Speed Networks*, pp. 224-239, 1995, month unknown.

U.S. Appl. No. 60/053,240, by Jolitz et al, filed Jul. 18, 1997.

Zilog Product Brief entitled "Z85C30 CMOS SCC Serial Communication Controller", Zilog Inc., 3 pages (1997), month unknown.

Internet web pages from "Adaptec.com" website directed to the Adaptec, AEA-7110C iSCSI Host Bus Adapter and about Adaptec's IP storage activities, 11 pages, downloaded and printed Oct. 1, 2001.

Internet web pages from "iSCSIhba.com" website directed to JNI iSCSI HBAs including the "FCE-3210/6410", 6 pages, downloaded and printed Oct. 1, 2001.

Internet web pages from the "iSCSI Storage.com" website that mention an Emulex HBA, 2 pages, downloaded and printed Oct. 1, 2001.

Internet web pages from the "iSCSIhba.com" website that mentions QLogic HBAs including the "SANblade 2300 Series", 8 pages, downloaded and printed Oct. 1, 2001.

Internet pages from IReady News Archives entitled "iReady Rounding Out management team with two key executives," 2 pages, (printed Nov. 28, 1998).

Toshiba, "Toshiba Delivers First Chips to Make Consumer Devices Internet-Ready Based on iReady's Design", 3 pages, Press release Oct. 14, 1998, downloaded Nov. 28, 1998.

Internet pages entitled "iReady Products" from website http://www.ireadyco.com/products.html, 2 pages, printed Nov. 25, 1998.

Iready News Archives. Toshiba, iReady shipping Internet Chip, 1 page, printed Nov. 28, 1998.

Internet site www.interprophet.com, 17 pages, printed Mar. 1, 2000.

The I-1000 Internet Tuner Features, iReady Corporation, 2 pages, date unknown.

Internet pages entitled: Northridge/Southbridge vs. Intel Hub Architecture, 4 pages, printed Feb. 19, 2001.

Richard Stevens, "TCP/IP Illustrated, vol. 1, The Protocols", pp. 325-326 (1994), month unknown.

VT8501 Apollo MVP4 Documentation, VIA Technologies, Inc., pp. i-iv, 1-11, cover and copyright page, 21 pages, revision 1.3 (Feb. 1, 2000).

Internet pages entitled: Technical White Paper-Xpoint's Disk to LAN Acceleration Solution for Windows NT Server, 14 pages, printed Jun. 5, 1997.

Jato Technologies Internet pages entitled: Network Accelerator Chip Architecture, twelve-slice presentation, 13 pages, printed Aug. 19, 1998.

EETIMES article entitled: Enterprise System Uses Flexible spec, dated Aug. 10, 1998, 3 pages, printed Nov. 25, 1998.

Internet pages entitled: Smart Ethernet Network Interface Cards which Berend Ozceri is developing, 2 pages, printed Nov. 25, 1998.

Internet pages of Xaqti corporation entitled: Giga Power Protocol Processor Product review, 4 pages, printed Nov. 25, 1999.

Internet pages from website http://www.ireadyco.com/about.html, 3 pages, downloaded Nov. 2, 1998.

IReady News Archives, "Revolutionary Approach to Consumer Electronics Internet Connectivity Funded", San Jose, CA. 2 pages, Nov. 20, 1997, downloaded and printed Nov. 2, 1998.

IReady News Archives, "Seiko Instruments Inc. (SII) Introduces World's First Internet-Ready Intelligent LCD Modules Based on IReady Technology", 2 pages Oct. 26, 1998, downloaded and printed Nov. 2, 1998.

NEWSwatch—IReady Internet Tuner to Web Enable Devices, Nov. 5, 1996. 2 pages, printed Nov. 2, 1998.

David Lammers, EETimes, Jun. 13, 1997, "Tuner for Toshiba, Toshiba taps iReady for Internet tuner," 2 pages, printed Nov. 2, 1998.

Internet pages entitled: Comparison of Novell Netware and TCP/IP Protocol Architectures, by Janique S. Carbone, 19 pages, Jul. 16, 1995, downloaded and printed Apr. 10, 1998.

Internet pages entitled : Hardware Assisted Protocol Processing, which Eugene Feinberg is working on, 1 page, printed Nov. 25, 1998.

Internet pages of Xpoint Technologies www.xpoint.com web site, 5 pages, printed Dec. 19, 1997.

Internet pages entitled: Asante and 100BASE-T Fast Ethernet, 7 pages, printed May 27, 1997.

Internet pages entitled: A Guide to the Paragon XP/S-A7 Supercomputer at Indiana University, 13 pages, printed Dec. 21, 1998.

Internet pages directed to: Technical Brief on Alteon Ethernet Gigabit NIC Technology, www.alteon.com, 14 pages, printed Mar. 15, 1997.

Internet pages entitled: DART: Fast Application level Networking via Data-copy Avoidance, by Robert J. Walsh, 25 pages, printed Jun. 3, 1999.

Internet pages of InterProphet entitled: Frequently Asked Questions, by Lynne Jolitz, 4 pages, printed Jun. 14, 1999.

Intenet pages entitled iREADY About Us and iREADY Products, 7 pages, printed Nov. 25, 1998.

Andrew S. Tanenbaum, Computer Networks, Third Edition, 1996, ISBN 0-13-349945-6, month unknown.

U.S. Appl. No. 08/964,304, filed Nov. 4, 1997, Napolitano et al.

"Two-Way TCP Traffic over Rate Controlled Channels: Effects and Analysis," by Lampros Kalampoukas, Anujan Varma and K.K. Ramakrishnan, IEEE Transactions on Networking, vol. 6, No. 6, 17 pages, Dec. 1998.

"Toshiba Delivers First Chips to Make Consumer Devices Internet-Ready Based on iReady Design," IReady News Archives, 3 pages, downloaded Nov. 2, 1998.

"File System Design for an NFS File Server Appliance," by Dave Hitz, James Lau and Michael Malcolm, 12 pages, Copyright 1996, month unknown.

Adaptec press release, "Adaptec Announces EtherStorage Technology", 2 pages, Jun. 14, 2000.

Adaptec article entitled, "EtherStorage Frequently Asked Questions," 5 pages, Jul. 19, 2000.

Adaptec article entitled, "EtherStorage White Paper," 7 pages, Jul. 19, 2000.

Article entitled, "Computers; Storage," by James Berlino and Ananda Baruah, CIBC World Markets Equity Research, 9 pages, Aug. 7, 2000.

Merrill Lynch article entitled, "Storage Futures," by Steven Milunovich, 22 pages, May 10, 2000.

Market Watch—News Articles, "Montreal start-up battles data storage bottleneck," by Susan Taylor, 2 pages, Mar. 5, 2000.

Internet-Draft "SCSI/TCP (SCSI over TCP)," by J.Satran et al., 38 pages, Feb. 2000.

Article entitled "LRP: A New Network Subsystem Architecture for Server Systems", by P. Druschel and G. Banga, Rice University, Oct. 1996, 15 pages.

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

Form 10-K for Exelan, Inc., for the fiscal year ending Dec. 31, 1987 (10 pages).

Form 10-K for Exelan, Inc., for the fiscal year ending Dec. 31, 1988 (10 pages).

* cited by examiner

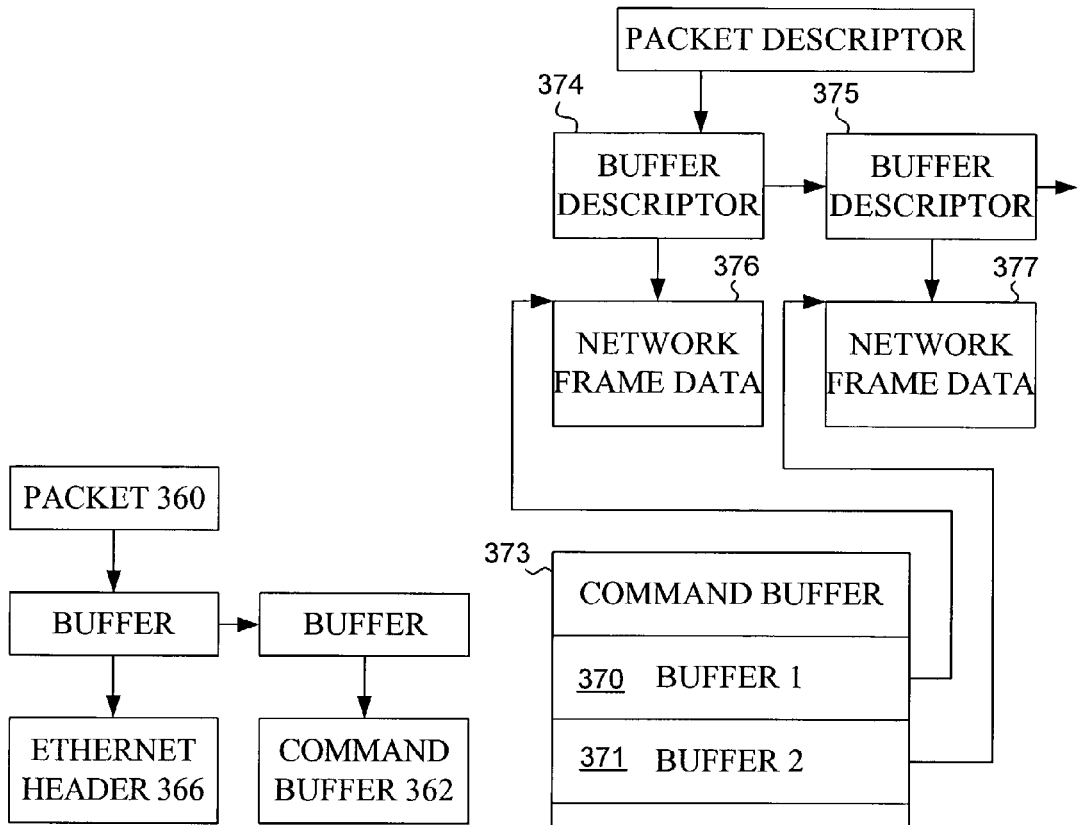
FIG. 15
FIG. 16
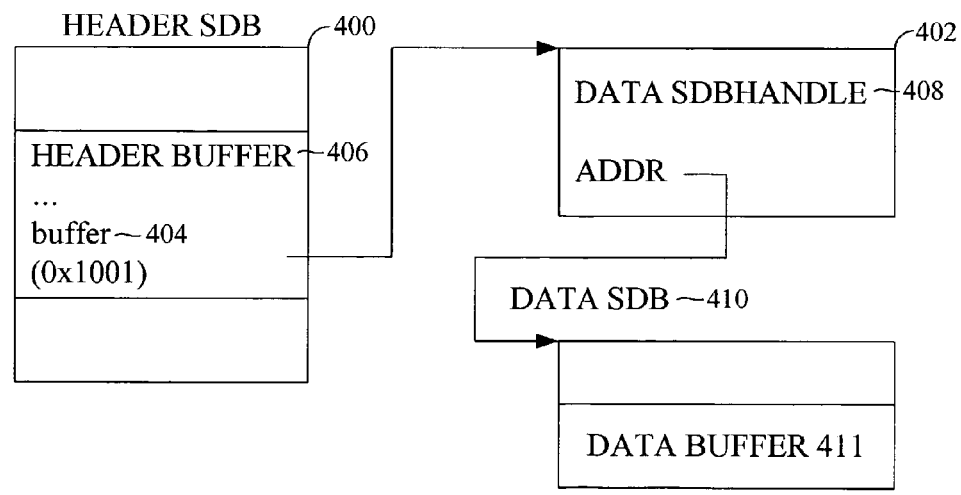
FIG. 17

TRANSFERRING CONTROL OF A TCP CONNECTION BETWEEN DEVICES

CROSS REFERENCE TO RELATED APPLICATIONS

This application claims the benefit under 35 U.S.C. §120 (is a continuation of) of U.S. patent application Ser. No. 10/367,147, filed Feb. 12, 2003, now U.S. Pat. No. 7,185,266 which in turn claims the benefit under 35 U.S.C. §120 of (is a continuation of) U.S. patent application Ser. No. 10/277,604, filed Oct. 18, 2002, which in turn claims the benefit under 35 U.S.C. §120 of (is a continuation of) U.S. patent application Ser. No. 10/005,536, filed Nov. 7, 2001, which in turn claims the benefit under 35 U.S.C. §120 of (is a continuation of) U.S. patent application Ser. No. 09/384,792, filed Aug. 27, 1999, now U.S. Pat. No. 6,434,620, which in turn: 1) claims the benefit under 35 U.S.C. §119 of provisional patent application Ser. No. 60/098,296, filed Aug. 27, 1998, 2) claims the benefit under 35 U.S.C. §120 of (is a continuation-in-part of) U.S. patent application Ser. No. 09/067,544, filed Apr. 27, 1998, now U.S. Pat. No. 6,226,680, and 3) claims the benefit under 35 U.S.C. §120 of (is a continuation-in-part of) U.S. patent application Ser. No. 09/141,713, filed Aug. 28, 1998, now U.S. Pat. No. 6,389,479. U.S. Pat. No. 6,226,680 in turn claims the benefit under 35 U.S.C. §119 of provisional patent application Ser. No. 60/061,809 filed Oct. 14, 1997. The present application also claims the benefit under 35 U.S.C. §120 of (is a continuation-in-part of) U.S. patent application Ser. No. 09/464,283, filed Dec. 15, 1999, now U.S. Pat. No. 6,427,173, and claims the benefit under 35 U.S.C. §120 of (is a continuation-in-part of) U.S. patent application Ser. No. 09/514,425, filed Feb. 28, 2000, now U.S. Pat. No. 6,427,171. All of the above-listed applications are incorporated by reference herein.

CROSS REFERENCE TO COMPACT DISC APPENDIX

The Compact Disc, which is a part of the present disclosure, includes a recordable Compact Disc (CD-R) containing information (including CD Appendices A, B, C and D) that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND OF THE INVENTION

Network processing as it exists today is a costly and inefficient use of system resources. A 200 MHz Pentium-Pro is typically consumed simply processing network data from a 100 Mb/second-network connection. The reasons that this processing is so costly are described in the next few pages.

When network packet arrives at a typical network interface card (NIC), the NIC moves the data into pre-allocated network buffers in system main memory. From there the data is read into the CPU cache so that it can be checksummed (assuming of course that the protocol in use requires checksums. Some, like IPX, do not.). Once the data has been fully processed by the protocol stack, it can then be moved into its final destination in memory. Since the CPU is moving the data, and must read the destination cache line in before it can fill it and write it back out, this involves at a minimum 2 more trips across the system memory bus. In short, the best one can hope for is that the data will get moved across the system memory bus 4 times before it arrives in its final destination. It can, and does, get worse. If the data happens to get invalidated from system cache after it has been checksummed, then it must get pulled back across the memory bus before it can be moved to its final destination. Finally, on some systems, including Windows NT 4.0, the data gets copied yet another time while being moved up the protocol stack. In NT 4.0, this occurs between the miniport driver interface and the protocol driver interface. This can add up to a whopping 8 trips across the system memory bus (the 4 trips described above, plus the move to replenish the cache, plus 3 more to copy from the miniport to the protocol driver). That's enough to bring even today's advanced memory busses to their knees.

In all but the original move from the NIC to system memory, the system CPU is responsible for moving the data. This is particularly expensive because while the CPU is moving this data it can do nothing else. While moving the data the CPU is typically stalled waiting for the relatively slow memory to satisfy its read and write requests. A CPU, which can execute an instruction every 5 nanoseconds, must now wait as long as several hundred nanoseconds for the memory controller to respond before it can begin its next instruction. Even today's advanced pipelining technology doesn't help in these situations because that relies on the CPU being able to do useful work while it waits for the memory controller to respond. If the only thing the CPU has to look forward to for the next several hundred instructions is more data moves, then the CPU ultimately gets reduced to the speed of the memory controller.

Moving all this data with the CPU slows the system down even after the data has been moved. Since both the source and destination cache lines must be pulled into the CPU cache when the data is moved, more than 3 k of instructions and or data resident in the CPU cache must be flushed or invalidated for every 1500 byte frame. This is of course assuming a combined instruction and data second level cache, as is the case with the Pentium processors. After the data has been moved, the former resident of the cache will likely need to be pulled back in, stalling the CPU even when we are not performing network processing. Ideally a system would never have to bring network frames into the CPU cache, instead reserving that precious commodity for instructions and data that are referenced repeatedly and frequently.

But the data movement is not the only drain on the CPU. There is also a fair amount of processing that must be done by the protocol stack software. The most obvious expense is calculating the checksum for each TCP segment (or UDP datagram). Beyond this, however, there is other processing to be done as well. The TCP connection object must be located when a given TCP segment arrives, IP header checksums must be calculated, there are buffer and memory management issues, and finally there is also the significant expense of interrupt processing, discussed below.

A 64 k server message block (SMB) request (write or read-reply) is typically made up of 44 TCP segments when running over Ethernet, which has a 1500 byte maximum transmission unit (MTU). Each of these segments may result in an interrupt to the CPU. Furthermore, since TCP must acknowledge (ACK) all of this incoming data, it's possible to get another 44 transmit-complete interrupts as a result of sending out the TCP acknowledgements. While this is possible, it is not terribly likely. Delayed ACK timers allow us to acknowledge more than one segment at a time. And delays in interrupt processing may mean that we are able to process more than one incoming network frame per interrupt. Nevertheless, even if we assume 4 incoming frames per input, and an acknowledgement for every 2 segments (as is typical per the ACK-every-other-segment property of TCP), we are still left with 33 interrupts per 64 k SMB request.

Interrupts tend to be very costly to the system. Often when a system is interrupted, important information must be flushed or invalidated from the system cache so that the interrupt routine instructions, and needed data can be pulled into the cache. Since the CPU will return to its prior location after the interrupt, it is likely that the information flushed from the cache will immediately need to be pulled back into the cache. What's more, interrupts force a pipeline flush in today's advanced processors. While the processor pipeline is an extremely efficient way of improving CPU performance, it can be expensive to get going after it has been flushed. Finally, each of these interrupts results in expensive register accesses across the peripheral bus (PCI).

We noted earlier that when the CPU has to access system memory, it may be stalled for several hundred nanoseconds. When it has to read from PCI, it may be stalled for many microseconds. This happens every time the CPU takes an interrupt from a standard NIC. The first thing the CPU must do when it receives one of these interrupts is to read the NIC Interrupt Status Register (ISR) from PCI to determine the cause of the interrupt. The most troubling thing about this is that since interrupt lines are shared on PC-based systems, we may have to perform this expensive PCI read even when the interrupt is not meant for us.

Other peripheral bus inefficiencies also exist. Typical NICs operate using descriptor rings. When a frame arrives, the NIC reads a receive descriptor from system memory to determine where to place the data. Once the data has been moved to main memory, the descriptor is then written back out to system memory with status about the received frame. Transmit operates in a similar fashion. The CPU must notify that NIC that it has a new transmit. The NIC will read the descriptor to locate the data, read the data itself, and then write the descriptor back with status about the send. Typically on transmits the NIC will then read the next expected descriptor to see if any more data needs to be sent. In short, each receive or transmit frame results in 3 or 4 separate PCI reads or writes, not counting the status register read.

SUMMARY OF THE INVENTION

The present invention offloads network processing tasks from a CPU to a cost-effective intelligent network interface card (INIC). An advantage of this approach is that a vast majority of network message data is moved directly from the INIC into its final destination. Another advantage of this approach is that the data may be moved in a single trip across the system memory bus. The offloading allows the CPU to avoid header processing, data copying, and checksumming. Since network message data does not need to be placed in a CPU cache, the CPU cache may be free for storage of other important instructions or data. Interrupts may be reduced to four interrupts per 64 k SMB read and two interrupts per 64 k SMB write. Other advantages include a reduction of CPU reads over the PCI bus and fewer PCI operations per receive or transmit transaction.

BRIEF DESCRIPTION OF THE DRAWINGS

FIG. 15 shows sending a packet containing an ATCP command buffer.

FIG. 16 shows mapping the command buffer of FIG. 15 and giving the address of that buffer to the INIC.

FIG. 17 shows an example of a receive header and data buffer that have been created by the INIC.

DETAILED DESCRIPTION OF THE PREFERRED EMBODIMENT

Figure 1:
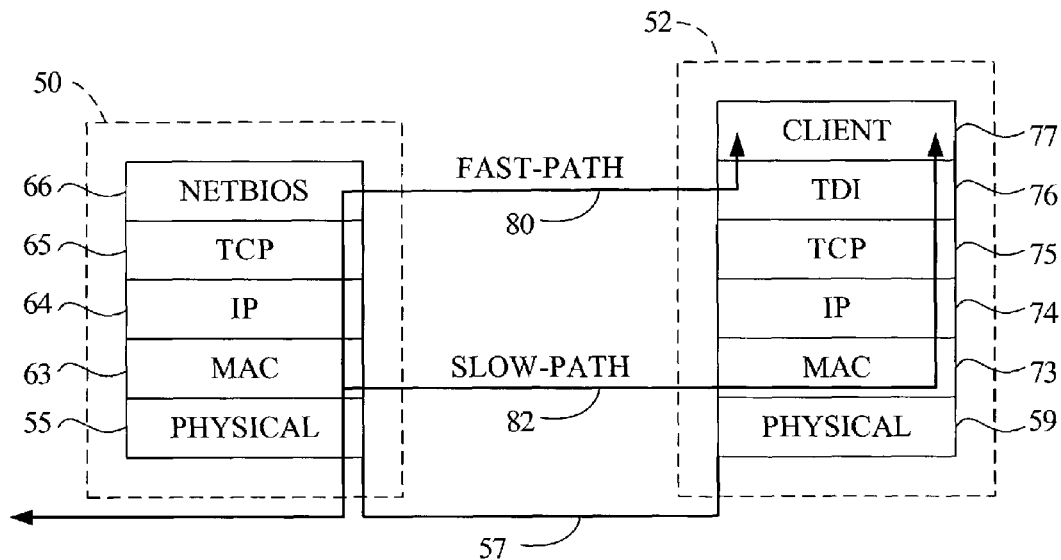
FIG. 1 is a diagram of fast-path and slow-path modes of communication processing.

In order to keep the system CPU from having to process the packet headers or checksum the packet, this task is performed on the INIC, which presents a challenge. There are more than 20,000 lines of C code that make up the FreeBSD TCP/IP protocol stack, for example. This is more code than could be efficiently handled by a competitively priced network card. Further, as noted above, the TCP/IP protocol stack is complicated enough to consume a 200 MHz Pentium-Pro. In order to perform this function on an inexpensive card, special network processing hardware has been developed instead of simply using a general purpose CPU.

In order to operate this specialized network processing hardware in conjunction with the CPU, we create and maintain what is termed a context. The context keeps track of information that spans many, possibly discontiguous, pieces of information. When processing TCP/IP data, there are actually two contexts that must be maintained. The first context is required to reassemble IP fragments. It holds information about the status of the IP reassembly as well as any checksum information being calculated across the IP datagram (UDP or TCP). This context is identified by the IP_ID of the datagram as well as the source and destination IP addresses. The second context is required to handle the sliding window protocol of TCP. It holds information about which segments have been sent or received, and which segments have been acknowledged, and is identified by the IP source and destination addresses and TCP source and destination ports.

If we were to choose to handle both contexts in hardware, we would have to potentially keep track of many pieces of information. One such example is a case in which a single 64 k SMB write is broken down into 44 1500 byte TCP segments, which are in turn broken down into 131 576 byte IP fragments, all of which can come in any order (though the maximum window size is likely to restrict the number of outstanding segments considerably).

Fortunately, TCP performs a Maximum Segment Size negotiation at connection establishment time, which should prevent IP fragmentation in nearly all TCP connections. The only time that we should end up with fragmented TCP connections is when there is a router in the middle of a connection which must fragment the segments to support a smaller MTU. The only networks that use a smaller MTU than Ethernet are serial line interfaces such as SLIP and PPP. At the moment, the fastest of these connections only run at 128 k (ISDN) so even if we had 256 of these connections, we would still only need to support 34 Mb/sec, or a little over three 10bT connections worth of data. This is not enough to justify any performance enhancements that the INIC offers. If this becomes an issue at some point, we may decide to implement the MTU discovery algorithm, which should prevent TCP fragmentation on all connections (unless an ICMP redirect changes the connection route while the connection is established). With this in mind, it seems a worthy sacrifice to not attempt to handle fragmented TCP segments on the INIC.

SPX follows a similar framework as TCP, and so the expansion of the INIC to handle IPX/SPX messages is straightforward. UDP, on the other hand, does not support the notion of a Maximum Segment Size, so it is the responsibility of IP to break down a UDP datagram into MTU sized packets. Thus, fragmented UDP datagrams are very common. The most common UDP application running today is NFSV2 over UDP. While this is also the most common version of NFS running today, the current version of Solaris being sold by Sun Microsystems runs NFSV3 over TCP by default. A first embodiment described in detail in this document offers network processing assistance to non-fragmented TCP connections on the INIC, while extension of this design to process other message protocols, such as SPX/IPX is straightforward.

As noted above, fragmented TCP segments are not fully processed by the initial INIC configuration. We have also opted to not have the INIC handle TCP connection and break-down. Other TCP "exceptions" which we have elected to not handle on the INIC include: 1) Retransmission Timeout—Occurs when we do not get an acknowledgement for previously sent data within the expected time period; 2) Out of order segments—Occurs when we receive a segment with a sequence number other than the next expected sequence number; 3) FIN segment—Signals the close of the connection.

Since we have now eliminated support for so many different code paths, it might seem hardly worth the trouble to provide any assistance by the INIC at all. This is not the case. According to W. Richard Stevens and Gary Write in Volume 2 of their book "TCP/IP Illustrated", which along with Volume 1 is incorporated by reference herein, TCP operates without experiencing any exceptions between 97 and 100 percent of the time in local area networks. As network, router, and switch reliability improve this number is likely to only improve with time.

As shown in FIG. 1, different modes of operation are employed depending upon whether a given network packet fits our criteria for processing by an INIC 50 or a host 52. The INIC 50 has a physical layer 55 connected by a PCI bus 57 to a physical layer 59 of the host 52. The INIC 50 has media access (MAC) 63, IP 64, TCP 65 and netbios 66 hardware processing layers, while the host 52 has media access (MAC) 73, IP 74, TCP 75, and TDI 76 hardware processing layers, which operate on behalf of a client 77. In a first mode, termed fast-path 80, network frames are processed on the INIC 50 through TCP. In a second mode, termed slow-path 82, the network frames are processed through the card and the card operates like a conventional NIC. In the slow-path case, network frames are handed to the system at the MAC layer and passed up through the host protocol stack like any other network frame. In the fast-path case, network data is given to the host after the headers have been processed and stripped.

The transmit case works in much the same fashion. In slow-path mode the packets are given to the INIC with all of the headers attached. The INIC simply sends these packets out as if it were a dumb NIC. In fast-path mode, the host gives raw data to the INIC which it must carve into MSS sized segments, add headers to the data, perform checksums on the segment, and then send it out on the wire.

Occasionally situations arise for which a TCP connection being handled by the INIC needs to be returned to the host for processing. To accomplish this transfer of responsibility for handling a connection we create a communication control block (CCB). A CCB is a structure that contains the entire context associated with a connection. This includes the source and destination IP addresses and source and destination TCP ports that define the connection. It also contains information about the connection itself such as the current send and receive sequence numbers, and the first-hop MAC address, etc. The complete set of CCBs exists in host memory, but a subset of these may be "owned" by the card at any given time. This subset is the CCB cache. The INIC can own (cache) up to 256 CCBs at any given time.

CCBs are initialized by the host during TCP connection setup. Once the connection has achieved a "steady-state" of operation, its associated CCB can then be turned over to the INIC, putting the connection into fast-path mode. From this point on, the INIC owns the connection until either a FIN arrives signaling that the connection is being closed, or until an exception occurs which the INIC is not designed to handle (such as an out of order segment). When any of these conditions occur, the INIC will then flush the CCB back to host memory, and issue a message to the host telling it that it has relinquished control of the connection, thus putting the connection back into slow-path mode. From this point on, the INIC simply hands incoming segments that are destined for this CCB off to the host with all of the headers intact.

Note that when a connection is owned by the INIC, the host is not allowed to reference the corresponding CCB in host memory as it will contain invalid information about the state of the connection.

When a frame is received by the INIC, it must verify it completely before it even determines whether it belongs to one of its CCBs or not. This includes all header validation (is it IP, IPV4 or V6, is the IP header checksum correct, is the TCP checksum correct, etc). Once this is done it must compare the source and destination IP address and the source and destination TCP port with those in each of its CCBs to determine if it is associated with one of its CCBs. This is an expensive process. To expedite this, we have added several features in hardware to assist us. The header is fully parsed by hardware and its type is summarized in a single status word. The checksum is also verified automatically in hardware, and a hash key is created out of the IP addresses and TCP ports to expedite CCB lookup. For full details on these and other hardware optimizations, refer to the INIC hardware specification sections below.

With the aid of these and other hardware features, much of the work associated with TCP is done essentially for free. Since the card will automatically calculate the checksum for TCP segments, we can pass this on to the host, even when the segment is for a CCB that the INIC does not own.

By moving TCP processing down to the INIC we have offloaded the host of a large amount of work. The host no longer has to pull the data into its cache to calculate the TCP checksum. It does not have to process the packet headers, and it does not have to generate TCP ACKs. We have achieved most of the goals outlined above, but we are not done yet.

The following paragraphs define the INIC's relation to the host's transport layer interface, called TDI or Transport Driver Interface in Windows NT, which is described in detail further below with regard to the Alacritech TCP (ATCP) driver.

Simply implementing TCP on the INIC does not allow us to achieve our goal of landing the data in its final destination. Somehow the host has to tell the INIC where to put the data. This is a problem in that the host can not do this without knowing what the data actually is. Fortunately, NT has provided a mechanism by which a transport driver can "indicate" a small amount of data to a client above it while telling it that it has more data to come. The client, having then received enough of the data to know what it is, is then responsible for allocating a block of memory and passing the memory address or addresses back down to the transport driver, which is in turn responsible for moving the data into the provided location.

We will make use of this feature by providing a small amount of any received data to the host, with a notification that we have more data pending. When this small amount of data is passed up to the client, and it returns with the address in which to put the remainder of the data, our host transport driver will pass that address to the INIC which will send the remainder of the data into its final destination via direct memory access (DMA).

Clearly there are circumstances in which this does not make sense. When a small amount of data (500 bytes for example), with a push flag set indicating that the data must be delivered to the client immediately, it does not make sense to deliver some of the data directly while waiting for the list of addresses to DMA the rest. Under these circumstances, it makes more sense to deliver the 500 bytes directly to the host, and allow the host to copy it into its final destination. While various ranges are feasible, it is currently preferred that anything less than a segment's (1500 bytes) worth of data will be delivered directly to the host, while anything more will be delivered as a small piece (which may be 128 bytes), while waiting until receiving the destination memory address before moving the rest.

The trick then is knowing when the data should be delivered to the client or not. As we've noted, a push flag indicates that the data should be delivered to the client immediately, but this alone is not sufficient. Fortunately, in the case of NetBIOS transactions (such as SMB), we are explicitly told the length of the session message in the NetBIOS header itself. With this we can simply indicate a small amount of data to the host immediately upon receiving the first segment. The client will then allocate enough memory for the entire NetBIOS transaction, which we can then use to DMA the remainder of the data into as it arrives. In the case of a large (56 k for example) NetBIOS session message, all but the first couple hundred bytes will be DMA'd to their final destination in memory.

But what about applications that do not reside above NetBIOS? In this case we can not rely on a session level protocol to tell us the length of the transaction. Under these circumstances we will buffer the data as it arrives until, 1) we have received some predetermined number of bytes such as 8 k, or 2) some predetermined period of time passes between segments, or 3) we get a push flag. If after any of these conditions occur we will then indicate some or all of the data to the host depending on the amount of data buffered. If the data buffered is greater than about 1500 bytes we must then also wait for the memory address to be returned from the host so that we may then DMA the remainder of the data.

The transmit case is much simpler. In this case the client (NetBIOS for example) issues a TDI Send with a list of memory addresses which contain data that it wishes to send along with the length. The host can then pass this list of addresses and length off to the INIC. The INIC will then pull the data from its source location in host memory, as it needs it, until the complete TDI request is satisfied.

Note that when we receive a large SMB transaction, for example, that there are two interactions between the INIC and the host. The first in which the INIC indicates a small amount of the transaction to the host, and the second in which the host provides the memory location(s) in which the INIC places the remainder of the data. This results in only two interrupts from the INIC. The first when it indicates the small amount of data and the second after it has finished filling in the host memory given to it. Note the drastic reduction from the interrupts generated by a conventional 33/64 k SMB request that was mentioned in the background. On transmit, we actually only receive a single interrupt when the send command that has been given to the INIC completes.

Having now established our interaction with Microsoft's TDI interface, we have achieved our goal of landing most of our data directly into its final destination in host memory. We have also managed to transmit all data from its original location on host memory. And finally, we have reduced our interrupts to two per 64 k SMB read and one per 64 k SMB write. The only thing that remains in our list of objectives is to design an efficient host (PCI) interface.

One of our primary objectives in designing the host interface of the INIC was to eliminate PCI reads in either direction. PCI reads are particularly inefficient in that they completely stall the reader until the transaction completes. As we noted above, this could hold a CPU up for several microseconds, a thousand times the time typically required to execute a single instruction. PCI writes on the other hand, are usually buffered by the memory-bus⇔PCI-bridge, allowing the writer to continue on with other instructions. This technique is known as "posting".

The only PCI read that is required by many conventional NICs is the read of the interrupt status register. This register gives the host CPU information about what event has caused an interrupt (if any). In the design of our INIC we have elected to place this necessary status register into host memory. Thus, when an event occurs on the INIC, it writes the status register to an agreed upon location in host memory. The corresponding driver on the host reads this local register to determine the cause of the interrupt. The interrupt lines are held high until the host clears the interrupt by writing to the INIC's Interrupt Clear Register. Shadow registers are maintained on the INIC to ensure that events are not lost.

Since it is imperative that our INIC operate as efficiently as possible, we must also avoid PCI reads from the INIC. We do this by pushing our receive buffer addresses to the INIC. As mentioned at the beginning of this section, most NICs work on a descriptor queue algorithm in which the NIC reads a descriptor from main memory in order to determine where to place the next frame. We will instead write receive buffer addresses to the INIC as receive buffers are filled. In order to avoid having to write to the INIC for every receive frame, we instead allow the host to pass off a pages worth (4 k) of buffers in a single write.

In order to reduce further the number of writes to the INIC, and to reduce the amount of memory being used by the host, we support two different buffer sizes. A small buffer contains roughly 200 bytes of data payload, as well as extra fields containing status about the received data bringing the total size to 256 bytes. We can therefore pass 16 of these small buffers at a time to the INIC. Large buffers are 2 k in size. They are used to contain any fast or slow-path data that does not fit in a small buffer. Note that when we have a large fast-path receive, a small buffer will be used to indicate a small piece of the data, while the remainder of the data will be DMA'd directly into memory. Large buffers are never passed to the host by themselves, instead they are always accompanied by a small buffer which contains status about the receive along with the large buffer address. By operating in this manner, the driver must only maintain and process the small buffer queue. Large buffers are returned to the host by virtue of being attached to small buffers. Since large buffers are 2 k in size they are passed to the INIC two buffers at a time.

In addition to needing a manner by which the INIC can pass incoming data to us, we also need a manner by which we can instruct the INIC to send data. Plus, when the INIC indicates a small amount of data in a large fast-path receive, we need a method of passing back the address or addresses in which to put the remainder of the data. We accomplish both of these with the use of a command buffer. Sadly, the command buffer is the only place in which we must violate our rule of only pushing data across PCI. For the command buffer, we write the address of command buffer to the INIC. The INIC then reads the contents of the command buffer into its memory so that it can execute the desired command. Since a command may take a relatively long time to complete, it is unlikely that command buffers will complete in order. For this reason we also maintain a response buffer queue. Like the small and large receive buffers, a page worth of response buffers is passed to the INIC at a time. Response buffers are only 32 bytes, so we have to replenish the INIC's supply of them relatively infrequently. The response buffers only purpose is to indicate the completion of the designated command buffer, and to pass status about the completion.

The following examples describe some of the differing data flows that we might see on the INIC. For the first example of a fast-path receive, assume a 56 k NetBIOS session message is received on the INIC. The first segment will contain the NetBIOS header, which contains the total NetBIOS length. A small chunk of this first segment is provided to the host by filling in a small receive buffer, modifying the interrupt status register on the host, and raising the appropriate interrupt line. Upon receiving the interrupt, the host will read the ISR, clear it by writing back to the INIC's Interrupt Clear Register, and will then process its small receive buffer queue looking for receive buffers to be processed. Upon finding the small buffer, it will indicate the small amount of data up to the client to be processed by NetBIOS. It will also, if necessary, replenish the receive buffer pool on the INIC by passing off a page worth of small buffers. Meanwhile, the NetBIOS client will allocate a memory pool large enough to hold the entire NetBIOS message, and will pass this address or set of addresses down to the transport driver. The transport driver will allocate an INIC command buffer, fill it in with the list of addresses, set the command type to tell the INIC that this is where to put the receive data, and then pass the command off to the INIC by writing to the command register. When the INIC receives the command buffer, it will DMA the remainder of the NetBIOS data, as it is received, into the memory address or addresses designated by the host. Once the entire NetBIOS transaction is complete, the INIC will complete the command by writing to the response buffer with the appropriate status and command buffer identifier.

In this example, we have two interrupts, and all but a couple hundred bytes are DMA'd directly to their final destination. On PCI we have two interrupt status register writes, two interrupt clear register writes, a command register write, a command read, and a response buffer write. In contrast, a host having a conventional NIC would experience an estimated 30 interrupts, 30 interrupt register reads, 30 interrupt clear writes, and 58 descriptor reads and writes. Moreover, the data may be moved anywhere from four to eight times across the system memory bus.

For the second example, a slow-path receive, assume the INIC receives a frame that does not contain a TCP segment for one of its CCBs. In this case the INIC simply passes the frame to the host as if it were a dumb NIC, according to the slow-path. If the frame fits into a small buffer (~200 bytes or less), then it simply fills in the small buffer with the data and notifies the host. Otherwise it places the data in a large buffer, writes the address of the large buffer into a small buffer, and again notifies the host. The host, having received the interrupt and found the completed small buffer, checks to see if the data is contained in the small buffer, and if not, locates the large buffer. Having found the data, the host will then pass the frame upstream to be processed by the standard protocol stack. It must also replenish the INIC's small and large receive buffer pool if necessary.

With the INIC, this slow-path results in one interrupt, one interrupt status register write and one interrupt clear register write as well as a possible small and or large receive buffer register write. The data will go through the normal path, although if it is TCP data then the host will not have to perform the checksum. A conventional NIC handling this frame will cause a single interrupt, an interrupt status register read, an interrupt clear register write, and a descriptor read and write. The data will get processed as it would by the INIC, except for a possible extra checksum. Thus the slow-path receive mode is much like conventional, except for hardware assists with items such as check sums.

For the third example, a fast-path send, assume that the client has a small amount of data to send. It will issue the TDI Send to the transport driver which will allocate a command buffer, fill it in with the address of the 400 byte send, and set the command to indicate that it is a transmit. It will then pass the command off to the INIC by writing to the command register. The INIC will then DMA the 400 bytes into its own memory, prepare a frame with the appropriate checksums and headers, and send the frame out on the wire. After it has received the acknowledgement it will then notify the host of the completion by writing to a response buffer.

With the INIC, this will result in one interrupt, one interrupt status register write, one interrupt clear register write, a command buffer register write a command buffer read, and a response buffer write. The data is DMA'd directly from the system memory.

In contrast, a standard NIC would instead generate an interrupt, an interrupt status register read, an interrupt clear register write, and a descriptor read and write. The data would get moved across the system bus a minimum of four times. The resulting TCP ACK of the data, however, would add yet another interrupt, another interrupt status register read, interrupt clear register write, a descriptor read and write, and yet more processing by the host protocol stack. These examples illustrate the dramatic differences between fast-path network message processing and conventional.

Achievements of the Alacritech INIC include not only processing network data through TCP, but also providing zero-copy support for the SMP upper-layer protocol. It accomplishes this in part by supporting two paths for sending and receiving data, a fast-path and a slow-path. The fast-path data flow corresponds to connections that are maintained on the INIC, while slow-path traffic corresponds to network data for which the INIC does not have a connection. The fast-path flow includes passing a header to the host and subsequently holding further data for that connection on the card until the host responds via an INIC command with a set of buffers into which to place the accumulated data. In the slow-path data flow, the INIC will be operating as a "dumb" NIC, so that these packets are simply dumped into frame buffers on the host as they arrive.

In order to support both fast and slow paths, a novel host interface strategy is employed. Note that with the INIC we have some challenges that are not found with conventional NIC designs. A typical NIC has a transmit and a receive ring of buffer descriptors. When the NIC receives a frame, it grabs a descriptor off of the receive queue, if one is available, locates a buffer address specified within the receive descriptor, and moves the receive frame to that address. After the data has been moved, the descriptor is updated with status indicating that a frame has been received, and the driver is notified via a write to interrupt status register followed by an interrupt. In this environment, the driver will typically replace the now filled-in buffer on the receive queue, with a new free buffer.

Similarly, in a typical NIC, when the driver wishes to send a frame, it fills in a descriptor on the transmit queue with the address and length of data to be transmitted and writes to a register on the NIC telling it that there is at least one pending transmit. The NIC de-queues the now valid transmit descriptor, locates the data address and length, and sends the frame out on the wire. Upon completion it will notify the driver (via an ISR/interrupt) that the frame has been sent, at which point the driver can free the memory containing the send frame.

Our first challenge comes from the fact that in our design, transmits can complete out of order. For example, since our card offloads TCP processing from the host CPU, it is capable of transmitting a 64 k SMB write in a single command. On the INIC itself, this 64 k transmit is broken down into many ethernet frames in accordance with the TCP maximum segment size (MSS). Because the TCP window size is typically about 8 k, we can not send the 64 k in a single block of frames. Instead the INIC will have to go through many TCP send/acknowledgment phases before the entire 64 k has been sent. While this is going on, the host may also issue a command to send 256 bytes. This, of course, will complete much sooner than the 64 k send request. These out-of-order send completions will not work with the typical transmit queue design because there is no way for the driver to know which resources it can free when it gets a transmit completion interrupt. To resolve this we introduce a command/response handshake between the driver and the INIC. The driver maintains a queue of response buffers. When it wishes to send data it fills in a command (like a transmit descriptor) and writes the physical address of the command to the INIC. It also sends a handle to the INIC. When the INIC completes the request, it writes the handle back to the response queue of the driver. The driver uses this handle to locate the original command buffer so it can free the send resources.

For receiving messages we have abandoned the conventional receive descriptor queue for performance reasons.

Small transactions on PCI can severely limit PCI bus throughput. In the typical receive descriptor environment a NIC must first read a descriptor (typically 16-32 bytes) across PCI to get the buffer information. It then moves the data across PCI into the buffer, and then writes status back into the receive descriptor. One objective of our receive design was to eliminate the first descriptor read. Thus we needed an efficient way in which to pass receive buffer addresses to the INIC. We accomplished this by passing a block of receive buffers to the INIC at one time. In the driver we allocate a block of contiguous memory (typically a page, which is typically 4 k). We write the address of that block to the INIC with the bottom bits of the address specifying the number of buffers in the block. In order to receive 1514 byte frames (maximum ether frame size), however, we can only fit two buffers in a 4 k page, which is not a substantial savings. Fortunately, network frames tend to be either large (~1500 bytes), or small (<256 bytes).

We take advantage of this fact by allocating large and small receive buffers. If a received frame fits in a small buffer, the INIC will use a small buffer. Otherwise it will use a large buffer. A problem with that system then is preserving receive order. If we were to maintain a small and a large buffer queue, there would be no way to know in which order two frames, one small and one large, were received. A solution is to maintain a single receive queue of small buffers. The host passes the small buffers in blocks of 16 at a time to the INIC, and they are guaranteed to be returned to us in the order in which they were given to the INIC. The small buffer contains status about the receive as well as small frames. If a received frame does not fit in the small buffer, then we allocate a large buffer and place a pointer to that large buffer in the small buffer. Thus, large buffers are only returned to the driver when attached to small buffers.

Figure 2:
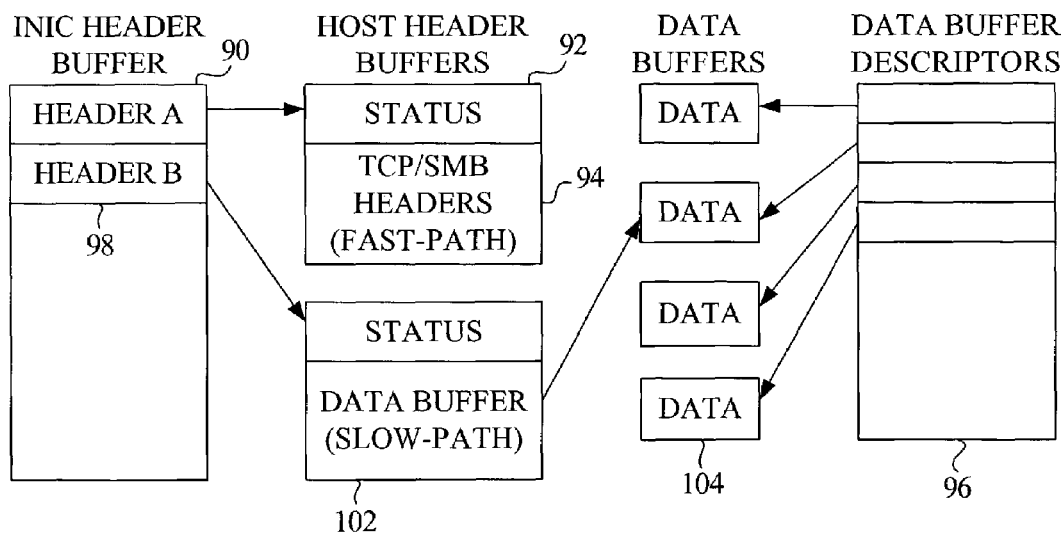
FIG. 2 is a diagram of different buffers employed for the fast-path and slow-path modes of processing received messages.

As shown in FIG. 2, the fast-path flow puts a header such as HEADER A 90 into a header buffer that is then forwarded to the host. HEADER A contains status 92 that has been generated by the INIC and TCP/SMB headers 94 that can be used by the host to determine what further data is following and allocate the necessary host buffers, which are then passed back to the INIC as data buffer descriptors 96 via a command to the INIC. The INIC then fills these buffers from data it was accumulating on the card and notifies the host by sending a response to the command. Alternatively, the fast-path may receive a header and data that is a complete request, but that is also too large for a header buffer. This results in a header and data buffer being passed to the host. This latter flow is similar to the slow-path flow of HEADER B 98, which also puts all the data into the header buffer or, if the header buffer is too small, uses a large (2K) host buffer for all the data. This means that on the unsolicited receive path, the host will only see either a header buffer or a header and at most, one data buffer. Note that data is never split between a header and a data buffer.

The order in which data is written is important. Data buffers are moved by DMA into the host before the header buffer, since the header buffer contains the status word designating that the data has arrived. Header buffers in host memory are 256 bytes long, and are aligned on 256 byte boundaries. There will be a field in the header buffer indicating it has valid data. This field will initially be reset by the host before passing the buffer descriptor to the INIC. A set of header buffers are passed from the host to the INIC by the host writing to the Header Buffer Address Register on the INIC. This register is defined as follows:

Bits 31-8 Physical address in host memory of the first of a set of contiguous header buffers.

Bits 7-0 Number of header buffers passed.

In this way the host can, say, allocate 16 buffers in a 4K page, and pass all 16 buffers to the INIC with one register write. For each interface, the INIC will maintain a queue of these header descriptors in the SmallHType queue in its own local memory, adding to the end of the queue every time the host writes to one of the Header Buffer Address Registers. Note that the single entry is added to the queue; the eventual dequeuer will use the count after extracting that entry.

The header buffers will be used and returned to the host in the same order that they were given to the INIC. The valid field will be set by the INIC before returning the buffer to the host. In this way a PCI interrupt, with a single bit in the interrupt register, may be generated to indicate that there is a header buffer for the host to process. When servicing this interrupt, the host will look at its queue of header buffers, reading the valid field to determine how many header buffers are to be processed.

Receive data buffers are allocated in blocks of two, 2 k bytes each (4 k page). In order to pass receive data buffers to the INIC, the host must write two values to the INIC. The first value to be written is the Data Buffer Handle. The buffer handle is not significant to the INIC, but will be copied back to the host to return the buffer to the host. The second value written is the Data Buffer Address. This is the physical address of the data buffer. When both values have been written, the INIC will add these values to FreeType queue of data buffer descriptors. The INIC will extract two entries each time when dequeuing.

Data buffers will be allocated and used by the INIC as needed. For each data buffer used, the data buffer handle will be copied into a header buffer. Then the header buffer will be returned to the host.

Figure 3:
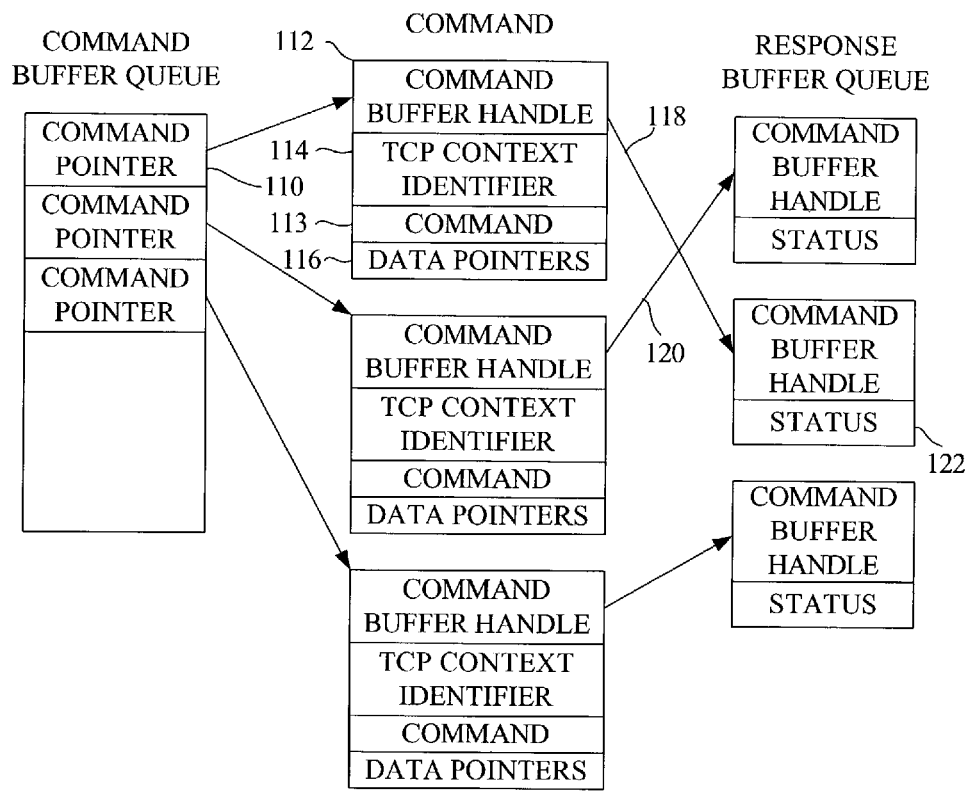
FIG. 3 is a diagram of buffers employed for the fast-path and slow-path modes of transmitting messages.

A transmit interface is shown in FIG. 3. The transmit interface, like the receive interface, has been designed to minimize the amount of PCI bandwidth and latencies. In order to transmit data, the host transfers a command pointer 110 to the INIC. This command pointer includes a command buffer handle 112, a command field 113, possibly a TCP context identification 114, and a list of physical data pointers 116. The command buffer handle is defined to be the first word of the command buffer and is used by the host to identify the command. This word is passed back to the host in a response buffer queue, since commands may complete out of order as depicted by crossed arrows 118 and 120, and the host needs to know which command is complete. Commands can be used for many reasons, but primarily cause the INIC to transmit data, or to pass a set of buffers to the INIC for input data on the fast-path as previously discussed.

Response buffers are physical buffers in host memory and contain status 122 regarding the command as well as the command buffer handle. They are used by the INIC in the same order as they were given to the INIC by the host. This enables the host to know which response buffer(s) to next look at when the INIC signals a command completion.

Command buffers in host memory are a multiple of 32 bytes, up to a maximum of 1K bytes, and are aligned on 32 byte boundaries. A command buffer is passed to the INIC by writing to the Command Buffer Address Register for a given interface. This register is defined as follows:

Bits 31-5 Physical address in host memory of the command buffer.

Bits 4-0 Length of command buffer in bytes/32 (i.e. number of multiples of 32 bytes)

This is the physical address of the command buffer. For each interface we have a transmit command register and a receive command register. When one of these registers has been written, the INIC will add the contents of the register to it's own internal queue of command buffer descriptors. The first word of all command buffers is defined to be the command buffer handle. It is the job of the utility processor to extract a command from its local queue, DMA the command into a small INIC buffer (from the FreeSType queue), and queue that buffer into the Xmit#Type queue, where # is 0-3 depending on the interface, or the appropriate RCV queue. The receiving processor will service the queues to perform the commands. When that processor has completed a command, it extracts the command buffer handle and passes it back to the host via a response buffer.

Response buffers in host memory are 32 bytes long and aligned on 32 byte boundaries. They are handled in a very similar fashion to header buffers. There is a field in the response buffer indicating it has valid data. This field is initially reset by the host before passing the buffer descriptor to the INIC. A set of response buffers are passed from the host to the INIC by the host writing to the Response Buffer Address Register on the INIC. This register is defined as follows:

Bits 31-8 Physical address in host memory of the first of a set of contiguous response buffers Bits 7-0 Number of response buffers passed.

In this way the host can, say, allocate 128 buffers in a 4K page, and pass all 128 buffers to the INIC with one register write. The INIC maintains a queue of these header descriptors in its ResponseType queue for each interface, adding to the end of the queue every time the host writes to the Response Buffer Address Register. The INIC writes the extracted contents including the count, to the queue in exactly the same manner as for the header buffers.

The response buffers are used and returned to the host in the same order that they were given to the INIC. The valid field is set by the INIC before returning the buffer to the host. In this way a PCI interrupt, with a single bit in the interrupt register, may be generated to indicate that there is a response buffer for the host to process. When servicing this interrupt, the host will look at its queue of response buffers, reading the valid field to determine how many response buffers are to be processed.

Figure 4:
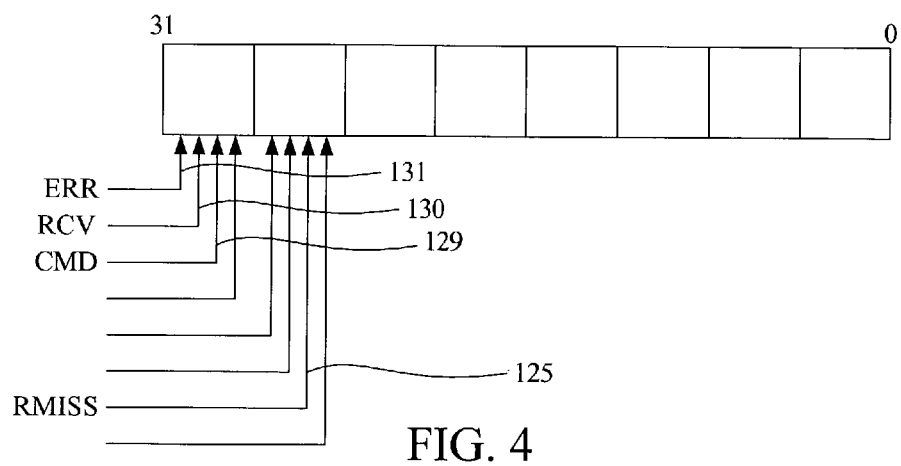
FIG. 4 shows an initial format of an interrupt status register (ISR) of the present invention.

FIG. 4 shows an initial format of a thirty-two bit interrupt status register (IS R) of the present invention. Bit thirty-one (ERR-131) is for setting error bits, bit thirty (RCV-130) denotes whether a receive has occurred, bit twenty-nine (CMD-129) denotes whether a command has occurred, while bit twenty-five (RMISS-125) denotes whether a receive has occurred It is designed that the setting of any bits in the ISR will cause an interrupt, provided the corresponding bit in an Interrupt Mask Register is set. The default setting for the IMR is 0.

It is also designed that the host should never need to directly read the ISR from the INIC. To support this, it is important for the host/INIC to arrange a buffer area in host memory into which the ISR is dumped. To accomplish this, the driver will write the location of the memory-based ISR to the Interrupt Status Pointer Register on the INIC.

For the host to never have to actually read the register from the INIC itself, it is important for the INIC to update this host copy of the register whenever anything in it changes. The host will Ack (or deassert) events in the register by writing to the register with 0's in appropriate bit fields. So that the host does not miss events, the following scheme is employed:

The INIC keeps a local copy of the register whenever the INIC DMAs it to the host after some event(s). This is termed COPYA. Then the INIC starts accumulating any new events not reflected in the host copy in a separate word. This is called NEWA. As the host clears bits by writing the register back with those bits set to zero, the INIC clears these bits in COPYA (or the host write-back goes directly to COPYA). If there are new events in NEWA, it ORs them with COPYA, and DMAs this new ISR to the host. This new ISR then replaces COPYA, NEWA is cleared and the cycle then repeats.

Table 1 lists the INIC register addresses. For the sake of simplicity, the registers are in 4-byte increments from whatever the TBD base address is.

TABLE 1

| | | |
|---|---|---|
| ISP | 0x0 | Interrupt Status Pointer (0-3) |
| ISR | 0x10 | Interrupt Status Response (0-3) |
| IMR | 0x20 | Interrupt Mask (0-3) |
| HBAR | 0x30 | Header Buffer Address (0-3) |
| DBAR | 0x40 | Data Buffer Address (and Handle)(0-3) |
| CBAR | 0x50 | Command Buffer Address XMT (0-3) |
| RBAR | 0x60 | Response Buffer Address (0-3) |
| RCBAR | 0x70 | Receive_Command Buffer Address |

In order to coordinate operation of the INIC with a host computer, we have designed an Alacritech TCP (ATCP) transport driver. The ATCP driver runs on the host and consists of three main components. The bulk of the protocol stack is based on the FreeBSD TCP/IP protocol stack. This code performs the Ethernet, ARP, IP, ICMP, and (slow path) TCP processing for the driver. At the top of the protocol stack we introduce an NT filter driver used to intercept TDI requests destined for the Microsoft TCP driver. At the bottom of the protocol stack we include an NDIS protocol-driver interface which allows us to communicate with the INIC miniport NDIS driver beneath the ATCP driver.

In order to ensure that our ATCP driver is written in a consistent manner, we have adopted a set of coding guidelines. These proposed guidelines were introduced with the philosophy that we should write code in a Microsoft style since we are introducing an NT-based product. The guidelines below apply to all code that we introduced into our driver. Since a very large portion of our ATCP driver is based on FreeBSD, and since we were somewhat time-constrained in our driver development, the ported FreeBSD code is exempt from these guidelines.

Guidelines

Global symbols—All function names and global variables in the Atcp driver begin with the "ATK" prefix (ATKSend( ) for instance).

We use the #define ALACRITECH to identify those sections of code which must be conditionally compiled (or not compiled) in the ATCP as opposed to BSD environment.

Variable names—Microsoft seems to use capital letters to separate multi-word variable names instead of underscores (VariableName instead of variable_name). We adhere to this style.

Structure pointers—Microsoft typedefs all of their structures. The structure types are always capitals and they typedef a pointer to the structure as "P"<name> as follows:

```
typedef struct _FOO {
    INT bar;
} FOO, *PFOO;
```

We adhere to this style.

Function calls—Microsoft separates function call arguments on separate lines:

```
X = foobar(
    argument1,
    argument2,
);
```

We adhere to this style.

Comments—While Microsoft seems to alternatively use // and /* */ comment notation, we exclusively use the /* */ notation.

Function comments—Microsoft includes comments with each function that describe the function, its arguments, and its return value. We also include these comments, but move them from within the function itself to just prior to the function for better readability.

Function arguments—Microsoft includes the keywords IN and OUT when defining function arguments. These keywords denote whether the function argument is used as an input parameter, or alternatively as a placeholder for an output parameter. We include these keywords.

Function prototypes—as far as possible we collect all new function prototypes in a single file: atcp_prototypes.h. The practice of proliferating a header file for every ".c" file is avoided. Prototypes of existing BSD functions are left in their current header files, however, to minimize differences between our code and the BSD base.

Indentation—Microsoft code fairly consistently uses a tab-stop of 4. We adhere to this style.

Header file #ifndef—each header file should contain a #ifndef/#define/#endif which is used to prevent recursive header file includes. For example, foo.h would include:
  #ifndef_FOO_H_
  #define_FOO_H_
  foo.h contents . . . >
  #endif /* _FOO_H_ */
Note the _NAME_H_ format.

Each file must contain a comment at the beginning which includes the $Id$ as follows:
  /*
  * $Id$
  */

CVS (RCS) will expand this keyword to denote RCS revision, timestamps, author, etc.

The next few paragraphs describe a configuration designed to make the ATCP driver SMP safe. The basic rule for SMP kernel code is that any access to a memory variable must be protected by a lock, which prevents a competing access by code running on another processor. Spinlocks are the normal locking method for code paths that do not take a long time to execute (and which do not sleep.)

In general each instance of a structure includes a spinlock, which must be acquired before members of that structure are accessed, and held while a function is accessing that instance of the structure. Structures which are logically grouped together may be protected by a single spinlock: for example, the 'in_pcb' structure, 'tcpcb' structure, and 'socket' structure which together constitute the administrative information for a TCP connection will be collectively managed by a single spinlock in the corresponding connection object.

In addition, every global data structure such as a list or hash table also has a protecting spinlock which must be held while the structure is being accessed or modified. The NT DDK in fact provides a number of convenient primitives for SMP-safe list manipulation, and these are used for any new lists. Existing list manipulations in the FreeBSD code will be left as-is to minimize code disturbance, except of course that the necessary spinlock acquisition and release must be added around them.

Spinlocks should not be held for long periods of time, and most especially, must not be held during a sleep, since this will lead to deadlocks. There is a significant deficiency in the NT kernel support for SMP systems: it does not provide an operation, which allows a spinlock to be exchanged atomically for a sleep lock. This would be a serious problem in a UNIX environment where much of the processing occurs in the context of the user process, which initiated the operation. (The spinlock would have to be explicitly released, followed by a separate acquisition of the sleep lock: creating an unsafe window.)

The NT approach is more asynchronous, however: IRPs are simply marked as 'PENDING' when an operation cannot be completed immediately. The calling thread does NOT sleep at that point: it returns, and may go on with other processing. Pending IRPs are later completed, not by waking up the thread which initiated them, but by an 'IoCompleteRequest' call which typically runs at DISPATCH level in an arbitrary context.

Thus we that have not in fact used sleep locks anywhere in the design of the ATCP driver, so hopefully the above issue will not arise.

As described above, the ATCP driver supports two paths for sending and receiving data, the fast-path and the slow-path. The fast-path data flow corresponds to connections that are maintained on the INIC, while slow-path traffic corresponds to network data for which the INIC does not have a connection. Note that in fast-path, all of the data that flows between host and INIC is "pure payload": all protocol processing is done on the INIC. In slow-path, however, the INIC is operating as a conventional "dumb NIC", and the packets passing between ATCP driver and INIC contain all the header info from MAC layer on up.

For a first implementation, we divide network communication into NETBIOS traffic, which is identifiable by port number, and everything else.

For NETBIOS input, as soon as the INIC has received a segment containing a NETBIOS header, it will forward it up to the TCP driver, along with the NETBIOS length from the header. Alternatively the host can acquire this information from the header itself, but since the INIC has already done the decode, it seem reasonable to just pass it.

From the TDI spec, the amount of data in the buffer actually sent must be at least 128 bytes. In fact, we have room for 192 bytes in our "small" buffers; and experiments show that, to make the NETBT code respond correctly, it is necessary to pass more than 128 bytes. So for a full segment which starts with a NETBIOS header, we pass a "header" of 192 bytes, together with the actual NETBIOS length, which will be indicated up as the "available" length. For segments less than a full 1460 byte payload, all of the received segment will be forwarded; it will be absorbed directly by the TDI client without any further memory descriptor list (MDL) exchange. Experiments tracing the TDI data flow show that the NETBT client directly absorbs up to 1460 bytes: the amount of payload data in a single Ethernet frame.

Once the INIC has passed to the host an indication with an NETBIOS length greater than the amount of data in the packet it passed, it goes into a state where it is expecting an MDL from the host; in this state, any further incoming data is accumulated in DRAM on the INIC. Overflow of INIC DRAM buffers will be avoided by using a receive window of (currently) 8760 bytes on the INIC.

On receiving the indicated packet, the ATCP driver calls the receive handler registered by the TDI client for the connection, passing the actual size of the data in the packet from the INIC as "bytes indicated" and the NETBIOS length as "bytes available."

In the "large data input" case, where "bytes available" exceeds the packet length, the TDI client then provides an MDL, associated with an IRP, which must be completed when this MDL is filled. (This IRP/MDL may come back either in the response to ATCP's call of the receive handler, or as an explicit TDI_RECEIVE request.)

The ATCP driver builds a "receive request" from the MDL information, and passes this to the INIC. This request contains the TCP context identifier, size and offset information, a scatter/gather list of physical addresses corresponding to the MDL pages, a context field to allow the ATCP driver to identify the request on completion, and a piggybacked window update information (this will be discussed below).

Note: the ATCP driver must copy any remaining data (not taken by the receive handler) from the header indicated by the INIC to the start of the MDL, and must adjust the size & offset information in the request passed to the INIC to account for this.

Once the INIC has been given the MDL, it will fill the given page(s) with incoming data up to the requested amount, and respond to the ATCP driver when this is done. Note that the INIC maintains its advertised receive window as the maximum (currently 8760 bytes) while filling the MDL, to maximize throughput from the client.

On receiving the "receive request" response from the INIC, the ATCP driver completes the IRP associated with this MDL, to tell the TDI client that the data is available.

At this point the cycle of events is complete, and the ATCP driver is now waiting for the next header indication.

In the general case we do not have a higher-level protocol header to enable us to predict that more data is coming. The original idea was to accumulate segments until a given amount (e.g. 8K) was available, and then send a header to the host to cause it to provide an MDL in which to place the data.

A problem with this approach is that the INIC would be required to close its advertised receive window as segments were accumulated, which would stall output from the sending client. To avoid this, we resorted (after some experimentation) to a subterfuge. On receiving an initial full segment, the INIC sends a header of 192 bytes: but also passes a fictitious "available length" of (currently) 8760 bytes.

As in the NETBIOS case, if "bytes available" exceeds "bytes indicated", the TDI client will provide an IRP with an MDL. The ATCP driver will pass the MDL to the INIC to be filled, as before. The INIC moves succeeding incoming segments into the MDL: and since the granting of the MDL may be regarded as a "promise" by the TDI client to accept the data, the INIC does not have to close its advertised receive window while filling the MDL. The INIC will reply to the ATCP driver when it has filled the MDL; the ATCP driver in turn completes the IRP to the TDI client.

Of course, since there is no higher-level protocol to tell us what the actual data length is, it is possible (for protocols such as FTP and HTTP) to receive a FIN before the MDL is filled. In that case, we do a "short completion", which causes the 'information' field of the IRP corresponding to the MDL to be set to the actual length received: less than the MDL size. Fortunately, WINSOCK clients (and the AFD driver through which they communicate with the TCP driver) appear to handle this correctly.

If the INIC "owns" an MDL provided by the TDI client (sent by the ATCP as a receive request), it will treat data placed in this as being "accepted by the client." It may therefore ACK incoming data as it is filling the pages, and will keep its advertised receive window fully open.

However, for small requests, there is no MDL returned by the TDI client: it absorbs all of the data directly in the receive callback function. In this case we need to update the INIC's view of data which has been accepted, so that it can update its receive window. In order to be able to do this, the ATCP driver accumulates a count of data which has been accepted by the TDI client receive callback function for a connection.

From the INIC's point of view, though, segments sent up to the ATCP driver are just "thrown over the wall"; there is no explicit reply path. We therefore piggyback the update on requests sent out to the INIC. Whenever the ATCP driver has outgoing data for that connection, it places this count in a field in the send request (and then clears the counter.) Receive requests (passing a receive MDL to the INIC) also are used to transport window update information in the same way.

Note that there is also a message path whereby the ATCP driver explicitly sends an update of this "bytes consumed" information when it exceeds a preset threshold, to allow for scenarios in which the data stream is entirely one-way.

The fast-path transmit or output data flow is considerably simpler. In this case the TDI client provides a MDL to the ATCP driver along with an IRP to be completed when the data is sent. The ATCP driver then gives a request (corresponding to the MDL) to the INIC. This request contains the TCP context identifier, size and offset information, a scatter/gather list of physical addresses corresponding to the MDL pages, a context field to allow the ATCP driver to identify the request on completion, and piggybacked window update information.

The INIC will copy the data from the given physical location(s) as it sends the corresponding network frames onto the network. When all of the data is sent, the INIC will notify the host of the completion, and the ATCP driver will complete the IRP.

Note that there may be multiple output requests pending at any given time. SMB allows multiple SMB requests to be simultaneously outstanding, and other protocols (e.g. FTP) often use double-buffering.

For data for which there is no connection context being maintained on the INIC, the host performs the TCP, IP, and Ethernet processing (slow-path). To accomplish this, ATCP ports the FreeBSD protocol stack. In this mode, the INIC is operating as a "dumb NIC"; the packets which pass over the NDIS interface contain MAC-layer frames.

The memory buffers (MBUFs) in the incoming direction are in fact managing NDIS-allocated packets. In the outgoing direction, we have protocol-allocated MBUFs in which to assemble the data and headers. The MFREE macro is cognizant of the various types of MBUFs, and is able to handle each type.

ATCP retains a modified socket structure for each connection, containing the socket buffer fields expected by the FreeBSD code. The TCP calls that operate on socket buffers (adding/removing MBUFs to & from queues, indicating acknowledged & received data, etc.) remain (as far as possible) unchanged in name and parameters from the FreeBSD base, though most of the actual code needed to implement them is rewritten. These are functions in kern/uipc_socket2.c; the corresponding ATCP code is mostly in atksocket.c.

The upper socket layer (kern/uipc_socket.c), where the overlying OS moves data in and out of socket buffers, must be entirely re-implemented to work in TDI terms. Thus, instead of sosend( ), there is a function that maps the MDL provided in a TDI_SEND call with a MBUF and queues it on to the socket 'send' buffer. Instead of soreceive( ), there is a handler that calls the TDI client receive callback function, and also copies data from socket receive buffer MBUFs into any MDL provided by the TDI client (either explicitly with the callback response or as a separate TDI_RECEIVE call.) Most of the functions in this category are in the ATCP file atktdi.c.

Note that there is a semantic difference between TDI_SEND and a write( ) on a BSD socket. The latter may complete back to its caller as soon as the data has been copied into the socket buffer. The completion of a TDI_SEND, however, implies that the data has actually been sent on the connection. Thus we need to keep the TDI_SEND IRPs (and associated MDLs) in a queue on the socket until the TCP code indicates that the data from them has been ACK'd.

To pass a context from the ATCP to the INIC for processing via the fast-path, a synchronization problem must be addressed. The ATCP driver makes the decision when a given connection should be passed to the INIC. The criterion is basically that the connection is on an interesting protocol port, and is currently quiescent: i.e. there is no currently outstanding input or output data which would cause the TCP sequence fields to change as it is processed.

To initiate a handout to the INIC, the ATCP driver builds and sends a command identifying this connection to the INIC. Once this is sent, ATCP pends and queues any new TDI_SEND requests; they will be acted on once fast-path processing is fully established.

The problem arises with incoming slow-path data. If we attempt to do the context-pass in a single command handshake, there is a window during which the ATCP driver has sent the context command, but the INIC has not yet acquired or has not yet completed setting up the context. During this time, slow-path input data frames could arrive and be fed into the slow-path ATCP processing code. Should that happen, the context information which the ATCP driver passed to the INIC would no longer be correct. We could simply abort the outward pass of the context in this event, but it turns out that this scenario is quite common. So it seems better to have a reliable handshake, which is accomplished with a two-exchange handshake.

The initial command from ATCP to INIC expresses an "intention" to hand out the context. It carries a context number; context numbers are allocated by the ATCP driver, which keeps a per-INIC table of free and in-use context numbers. It also includes the source and destination IP addresses and ports, which will allow the INIC to establish a "provisional" context. Once it has this "provisional" context in place, the INIC will not send any more slow-path input frames to the host for that src/dest IP/port combination, instead queuing them, if any are received.

Receipt of the response to this initial command does not suffice to provide a reliable interlock, however. Command responses and data frames follow entirely different paths from INIC to the ATCP driver. It is possible that when the response to the initial command is received, there are still slow-path frames in a queue waiting to be delivered. Therefore, once the INIC has established its provisional context (and is now blocking and queuing any further input), it sends a "NULL" interlock frame on the regular frame input path. This frame identifies the CCB context and signals that no further slow-path frames will follow for that context. Since this frame travels on the same pathway as data frames, we know when we receive it that it signifies the end of any possible slow-path data.

Once the "NULL" frame has been seen (and any preceding slow-path data has been fully processed), we know that the CCB for the connection is in a stable and quiescent state. At that point, the ATCP driver issues the second, "commit", command to cause the INIC to fully activate its CCB context and begin normal fast-path processing.

Note that there are situations in which the ATCP driver decides, after having sent the original "intention" command, that the context is not to be passed after all. (For example, the TDI client may issue a TDI_DISCONNECT, or a slow-path frame arriving before the NULL interlock frame might contain a FIN.) So we must allow for the possibility that the second command may be a "flush", which should cause the INIC to deallocate and clear up its "provisional" context.

The ATCP driver must place some restrictions on exactly when a "flush" command may be sent, to avoid unnecessary complexity in the INIC state machine. Specifically, it must not send a "flush" command when there is an outstanding first- or second-half migration command. If a flush situation arises while a migration command is outstanding, the condition is noted in host connection flags, and the actual flush command is sent only when the NULL frame is received (in the first-half case) or the command response is received (in the second-half case.)

The converse situation of passing the context from the INIC to the ATCP may be initiated either by the ATCP driver or by the INIC. The machinery for flushing the context from the INIC to the ATCP is similar regardless of which system initiated the transfer. If the ATCP driver wishes to cause context to be flushed from INIC to host, it sends a "flush" message to the INIC specifying the context number to be flushed. Once the INIC receives this, it proceeds with the same steps as for the case where the flush is initiated by the INIC itself.

The INIC sends an error response to any current outstanding receive request it is working on (corresponding to an MDL into which data is being placed.) Along with this response, it sends a "resid" field to reflect the amount of data that has not been placed in the MDL buffers at the time of the flush. Likewise the INIC sends an error response for any outstanding send requests. For each of these, it will send a "resid" field to indicate how much of the request's data has not been ACK'd. The INIC also DMAs the CCB for the context back to the host. Note that part of the information provided with a context is the address of the CCB in the host. The INIC sends a "flush" indication to the host, via the regular input path as a special type of frame, identifying the context which is being flushed. Sending this indication via the regular input path ensures that it will arrive before any following slow-path frames.

At this point, the INIC is no longer doing fast-path processing. It discards its CCB context for this connection, and any further incoming frames for the connection will simply be sent to the host as raw frames for the slow input path.

As soon as the ATCP driver detects that a flush is in progress on a connection, it sets a state flag on its connection context to indicate this fact. The ATCP driver may become alerted about a flush in several ways: it might be an explicit host-initiated flush, or it may see either the flush frame or an error on a send or receive request. The order in which these are received may vary because, as we noted earlier, the receive frame and command response paths are unrelated.

The ATCP driver will not be abled to complete the cleanup operations needed to resume normal slow path processing until all the necessary pieces of information are received: the "flush frame" indicating that the INIC has DMA'd back the CCB, and the error completions of all outstanding send and receive requests.

Slow-path frames could arrive during this time: this is why the driver must set the "flushing" state flag on the connection.

The effect of this is to change the behavior of tcp_input( ). This runs as a function call in the context of ip_input( ), and normally returns only when incoming frames have been processed as far as possible (queued on the socket receive buffer or out-of-sequence reassembly queue.) However, if there is a flush pending and we have not yet completed resynchronization, we cannot do TCP processing and must instead queue input frames for TCP on a "holding queue" for the connection, to be picked up later when context flush is complete and normal slow path processing resumes. (This is why we want to send the "flush" indication via the normal input path: so that we can ensure it is seen before any following frames of slow-path input.)

When the ATCP driver has received the "flush frame" plus error responses for all outstanding requests, it has all the information needed to complete its cleanup. This involves completing any IRPs corresponding to requests which have entirely completed, adjusting fields in partially-completed requests so that send and receive of slow path data will resume at the right point in the byte streams and propagating any timer expiration states from the INIC to the BSD code.

Once all this cleanup is complete, the ATCP driver will loop pulling any "pended" TCP input frames off the "pending queue" mentioned above and feeding them into the normal TCP input processing. After all input frames on this queue have been cleared off, the "flushing" flag can be cleared for the connection, and the host is back to normal slow-path processing.

A portion of the ATCP driver is either derived or directly taken from the FreeBSD TCP/IP protocol stack. The following paragraphs discuss the issues associated with porting this code, the FreeBSD code itself, and the modifications required for it to suit our needs. Note, however, that details of the higher, TCP-level part of the port are postponed until later, since this needs some groundwork from the discussion of the NT TDI interface.

FreeBSD TCP/IP (current version referred to as Net/3) is a general purpose TCP/IP driver. It contains code to handle a variety of interface types and many different kinds of protocols. To meet this requirement the code is often written in a sometimes confusing, convoluted manner. General-purpose structures are overlaid with other interface-specific structures so that different interface types can coexist using the same general-purpose code. For our purposes much of this complexity is unnecessary since we are initially only supporting several specific protocols. It is therefore tempting to modify the code and data structures in an effort to make it more readable, and perhaps a bit more efficient. There are, however, some problems with doing this.

For this reason we have initially kept the data structures and code at close to the original FreeBSD implementation as possible. The code has, however, been modified for several reasons. First, as required for NT interaction—we can't expect to simply "drop-in" the FreeBSD code as is. The interface of this code to the NT system requires some significant code modifications. This mostly occurs at the topmost and bottommost portions of the protocol stack, as well as the "ioctl" sections of the code. Modifications for SMP are also necessary. Further, unnecessary code has been removed.

The FreeBSD TCP/IP protocol stack makes use of many Unix system services. These include bcopy to copy memory, malloc to allocate memory, timestamp functions, etc. These will not be itemized in detail since the conversion to the corresponding NT calls is a fairly trivial and mechanical operation.

Under FreeBSD, network buffers are mapped using mbufs. Under NT network buffers are mapped using a combination of packet descriptors and buffer descriptors (the buffer descriptors are really MDLs). There are a couple of problems with the NT method. First it does not provide the necessary fields which allow us to easily strip off protocol headers. Second, converting all of the FreeBSD protocol code to speak in terms of buffer descriptors is an unnecessary amount of overhead. Instead, in our port we allocate our own mbuf structures and remap the NT packets as shown in FIG. 5.

Figure 5:
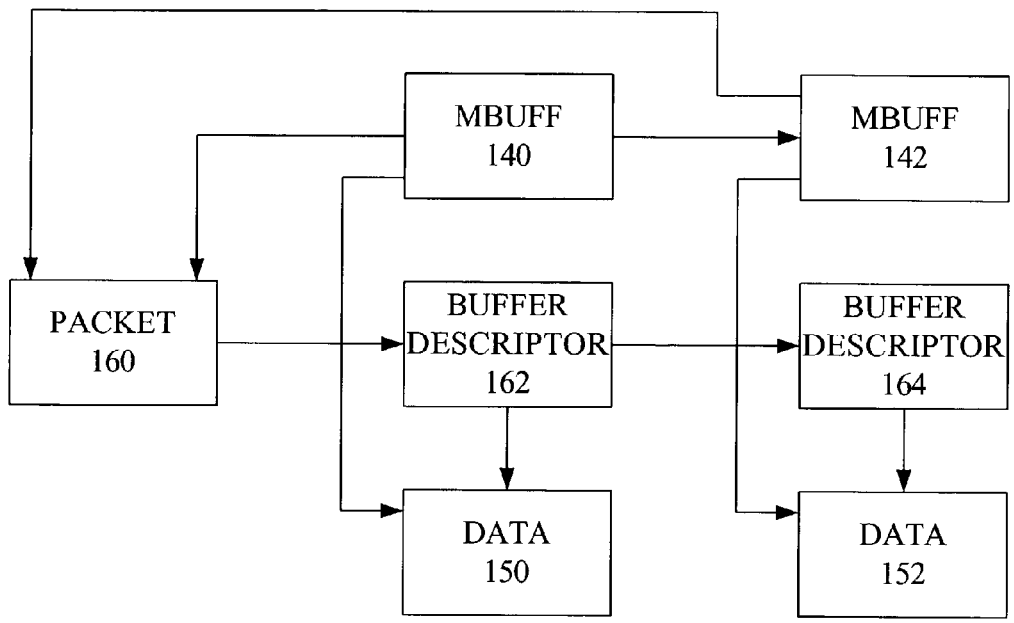
FIG. 5 shows mapping of network packets according to the present invention with mbufs and buffer descriptors.

FIG. 5 shows FreeBSD mbufs 140 and 142 including data pointers 150 and 152, which point to the current location of the data, data length fields and flags. In addition each mbuf 155 and 157 will point to a packet descriptor 160 which is associated with the data being mapped. Once an NT packet is mapped, our transport driver should never have to refer to the packet or buffer descriptors 162 and 164 for any information except when we are finished and are preparing to return the packet.

There are a couple of things to note here. The INIC has been designed such that a packet header should never be split across multiple buffers. Thus, we should never require the equivalent of the "m_pullup" routine included in Unix. Also note that there are circumstances in which we will be accepting data that will also be accepted by the Microsoft TCP/IP. One such example of this is ARP frames. We also build our own ARP cache by looking at ARP replies as they come off the network. Under these circumstances, it is important that we do not modify the data, or the packet and buffer descriptors. We will discuss this further below.

Also note that we allocate a pool of mbuf headers at ATCP initialization time. It is important to remember that unlike other NICs, we do not simply drop data if we run out of the system resources required to manage/map the data. The reason for this is that we will be receiving data from the card that has already been acknowledged by TCP. Because of this it is important that we never run out of mbuf headers. To solve this problem we statically allocate mbuf headers for the maximum number of buffers that we will ever allow to be outstanding. By doing so, the card will run out of buffers in which to put the data before we will run out of mbufs, and as a result, the card will be forced to drop data at the link layer instead of us dropping it at the transport layer.

We also use a pool of actual mbufs (not just headers). These mbufs are needed in order to build output packets for the slow-path data path, as well as other miscellaneous purposes such as for building ARP requests. We allocate a pool of these at initialization time and add to this pool dynamically as needed. Unlike the mbuf headers described above, which are used to map acknowledged TCP data coming from the card, the full mbufs contain data that can be dropped if we cannot get an mbuf.

The following paragraphs describe the lower-level sections of the FreeBSD TCP/IP port, up to and including the IP level. These sections include Interface Initialization, ARP, Route, IP, and ICMP. Discussions of modifications to the TCP layer are postponed, since they need some grounding in the NT TDI interface described below.

There are a variety of structures, which represent a single interface in FreeBSD. These structures include ifnet, arpcom, ifaddr, in_ifaddr, sockaddr, sockaddr_in, and sockaddr_dl.

Figure 6:
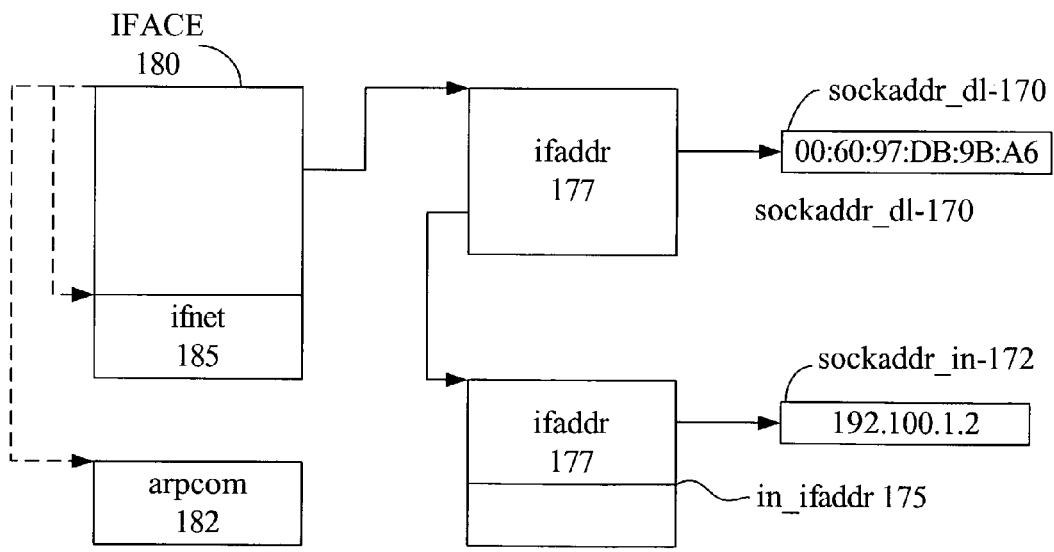
FIG. 6 shows some control information structures used to represent network addresses and protocols according to the present invention.

FIG. 6 shows the relationship between some of these structures. In this example we show a single interface with a MAC address (sockaddr_dl-170) of 00:60:97:DB:9B:A6 configured with an IP address (sockaddr_in-172) of 192.100.1.2. As illustrated above, the in_ifaddr 175 is actually an ifaddr 177 structure with some extra fields tacked on to the end. Thus the ifaddr structure is used to represent both a MAC address and an IP address. Similarly the sockaddr structure is recast as a sockaddr_dl or a sockaddr_in depending on its address type. An interface can be configured to multiple IP addresses by simply chaining in_ifaddr structures after the in_ifaddr structure shown above. As mentioned in the porting philosophy section, many of the above structures could likely be collapsed into fewer structures. In order to avoid making unnecessary modifications to FreeBSD, for the time being we have these structures mostly unchanged. We have, however, eliminated the fields from the structure that will never be used. These structure modifications are discussed below.

We also show in FIG. 6 a structure called IFACE 180. This is a structure that we define, in proto.h. It contains the arpcom 182 structure, which in turn contains the ifnet 185 structure. It also contains fields that enable us to blend our FreeBSD implementation with NT NDIS requirements. One such example is the NDIS binding handle used to call down to NDIS with requests (such as send).

FreeBSD initializes the above structures in two phases. First when a network interface is found, the ifnet, arpcom, and first ifaddr structures are initialized first by the network layer driver, and then via a call to the if_attach routine. The subsequent in_ifaddr structure(s) are initialized when a user dynamically configures the interface. This occurs in the in_ioctl and the in_ifinit routines.

Interface initialization in the ATCP driver changes considerably from BSD, because in NT, many parameters are obtained from the registry, rather than being set by IOCTL( ) calls. Initialization still occurs in two phases, but the details are different:

ATKIfInit is called from the DriverEntry function when the ATCP driver is loaded. It scans the registry, looking for all interfaces bound to TCP/IP. For each one, it allocates an IFACE structure, and does further registry scanning to obtain parameters for this interface. Once these are obtained, it calls if_attach( ), which allocates the ifaddr structure for the interface, and links it on to the BSD interface list. Then, for each IP address specified in the registry for this interface (there may be more than one), it builds an ifaliasreq structure containing the address and its netmask, and calls in_control with the SIOCAIFADDR command to allocate and initialize the in_ifaddr and sockaddr_in structures; this has the side effect of creating the routes for the interface. (Note however that if the interface is specified in the registry to use DHCP there are no IP addresses at this point; in that case a flag is set in the IFACE to indicate that DHCP is to be used.) Finally, if a default gateway is specified for the interface, a call is made to ATKAddDefRoute (in file atkroute.c) to add this to the route tables.

Note that so far, everything has been done from information in the registry; we do not yet have any contact with physical hardware. That occurs in the second phase, when NDIS calls our ATKBindAdaptor function to set up the connection to the actual NDIS-level adaptor:

ATKBindAdaptor locates the IFACE for the given adaptor name, and does a query request to NDIS to obtain the MAC address for the interface; this is saved in the arpcom struct. It then does a number of other queries for characteristics of the interface and stores the results in the IFACE. Next, it passes down all current IP addresses using an Alacritech-specific OID: this is needed because the INIC driver at the lower level needs to know about IP addresses in order to direct packets correctly to either the ATCP driver or the regular NT TCP/IP driver (see section 9.2.1.) Finally it marks the interface up, and broadcasts a gratuitous ARP request to notify others of our Mac/IP address and to detect duplicate IP addresses on the net.

Microsoft NT TCP/IP code supports the Dynamic Host Configuration Protocol (DHCP), whereby one can arrange for an interface to not be assigned a static IP address, but rather, to search for a DHCP server to assign one for it to use. In this case ATKIfInit does not find an address in the registry for the interface: it will arrive later in a DEVICE_IO_CONTROL on the IP device object. Our filter driver attaches to and monitors the IP device object as well as the TCP one.

We catch the completion of the IOCTL_SET_DHCPADDR request in the ATKDHCPDone function (in file atkdhcp.c); there, we decode the parameters and locate the interface. Then we call the BSD in_control function to set the IP address and netmask, and replicate the later part of the ATKBindAdaptor processing (which can't be done there in the case of a DHCP interface since we don't yet have an IP address) to complete the process of making the interface active.

The DHCP protocol provides a time-limited "lease" of an IP address: this implies that DHCP IP addresses can go away, as well as arrive. If we detect that the DHCP IO_CONTROL is a deletion, we must mark the interface down, and delete any routes using it. Additionally, we need to flush any fast-path connections using this interface back to the host; this is done by the ATKIfRouteFlush( ) function (in atkfastpath.c.)

We port the FreeBSD ARP code to NT mostly as-is. For some reason, the FreeBSD ARP code is located in a file called if_ether.c. While we do not change the functionality of this file, we rename it to a more logical arp.c. The main structures used by ARP are the llinfo_arp structure and the rtentry structure (actually part of route). These structures do not require major modifications. The functions that require modification are defined here.

An in_arpinput function is called to process an incoming ARP frame. An ARP frame can either be an ARP request or an ARP reply. ARP requests are broadcast, so we will see every ARP request on the network, while ARP replies are directed so we should only see ARP replies that are sent to us. This introduces several scenarios for an incoming ARP frame.

First, an ARP request may be trying to resolve our IP address. Under conventional circumstances, ARP would reply to this ARP request with an ARP reply containing our MAC address. Since ARP requests will also be passed up to the Microsoft TCP/IP driver, we need not reply. Note however, that FreeBSD also creates or updates an ARP cache entry with the information derived from the ARP request. It does this in anticipation of the fact that any host that wishes to know our MAC address is likely to wish to talk to us soon. Since we need to know his MAC address in order to talk back, we add the ARP information now rather than issuing our own ARP request later.

Second, an ARP request may be trying to resolve someone else's IP address. As mentioned above, since ARP requests are broadcast, we see every one on the network. When we receive an ARP request of this type, we simply check to see if we have an entry for the host that sent the request in our ARP cache. If we do, we check to see if we still have the correct MAC address associated with that host. If it is incorrect, we update our ARP cache entry. Note that we do not create a new ARP cache entry in this case.

Third, in the case of an ARP reply, we add the new ARP entry to our ARP cache. Having resolved the address, we check to see if there is any transmit requests pending for the resolve IP address, and if so, transmit them.

Given the above three possibilities, the only major change to the in_arpinput code is that we remove the code which generates an ARP reply for ARP requests that are meant for our interface.

Arpintr is the FreeBSD code that delivers an incoming ARP frame to in_arpinput. We call in_arpinput directly from our ProtocolReceiveDPC routine (discussed in the NDIS section below) so this function is not needed.

Arpwhohas is a single line function that serves only as a wrapper around arprequest. We remove it and replace all calls to it with direct calls to arprequest.

Arprequest simply allocates a mbuf, fills it in with an ARP header, and then passes it down to the ethernet output routine to be transmitted. For us, the code remains essentially the same except for the obvious changes related to how we allocate a network buffer, and how we send the filled in request.

Arp_ifinit is called when an interface is initialized to broadcast a gratuitous ARP request (described in the interface initialization section) and to set some ARP related fields in the ifaddr structure for the interface. We simply move this functionality into the interface initialization code and remove this function.

Arptimer is a timer-based function that is called every 5 minutes to walk through the ARP table looking for entries that have timed out. Although the time-out period for FreeBSD is 20 minutes, RFC 826 does not specify any timer requirements with regard to ARP so we can modify this value or delete the timer altogether to suit our needs. Either way the function doesn't require any major changes.

Other functions in if_ether.c do not require any major changes.

On first thought, it might seem that we have no need for routing support since our ATCP driver will only receive IP datagrams whose destination IP address matches that of one of our own interfaces. Therefore, we do not "route" from one interface to another. Instead, the MICROSOFT TCP/IP driver provides that service. We do, however, need to maintain an up-to-date routing table so that we know a) whether an outgoing connection belongs to one of our interfaces, b) to which interface it belongs, and c) what the first-hop IP address (gateway) is if the destination is not on the local network.

We discuss four aspects on the subject of routing in this section. They are as follows: 1) The mechanics of how routing information is stored, 2) The manner in which routes are added or deleted from the route table, 3) When and how route information is retrieved from the route table, 4) Notification of route table changes to interested parties.

In FreeBSD, the route table is maintained using an algorithm known as PATRICIA (Practical Algorithm To Retrieve Information Coded in Alphanumeric). This is a complicated algorithm that is a bit costly to set up, but is very efficient to reference. Since the routing table should contain the same information for both NT and FreeBSD, and since the key used to search for an entry in the routing table will be the same for each (the destination IP address), we port the routing table software to NT without any major changes.

The software which implements the route table (via the PATRICIA algorithm) is located in the FreeBSD file, radix.c. This file is ported directly to the ATCP driver with insignificant changes.

Routes can be added or deleted in a number of different ways. The kernel adds or deletes routes when the state of an interface changes or when an ICMP redirect is received. User space programs such as the RIP daemon, or the route command also modify the route table.

For kernel-based route changes, the changes can be made by a direct call to the routing software. The FreeBSD software that is responsible for the modification of route table entries is found in route.c. The primary routine for all route table changes is called rtrequest( ). It takes as its arguments the request type (ADD, RESOLVE, DELETE), the destination IP address for the route, the gateway for the route, the netmask for the route, the flags for the route, and a pointer to the route structure (struct rtentry) in which we place the added or resolved route. Other routines in the route.c file include rtinit( ), which is called during interface initialization time to add a static route to the network, rtredirect, which is called by ICMP when we receive a ICMP redirect, and an assortment of support routines used for the modification of route table entries. All of these routines found in route.c are ported with no major modifications.

For user-space-based changes, we will have to be a bit more clever. In FreeBSD, route changes are sent down to the kernel from user-space applications via a special route socket. This code is found in the FreeBSD file, rtsock.c. Obviously this will not work for our ATCP driver. Instead the filter driver portion of our driver will intercept route changes destined for the Microsoft TCP driver and will apply those modifications to our own route table via the rtrequest routine described above. In order to do this, it will have to do some format translation to put the data into the format (sockaddr_in) expected by the rtrequest routine. Obviously, none of the code from rtsock.c will be ported to the ATCP driver. This same procedure will be used to intercept and process explicit ARP cache modifications.

The functions which perform these updates are ATKSetRouteCompletion( ) and ATKSetArpCompletion( ), in the file atkinfo.c In FreeBSD, a route table is consulted in ip_output when an IP datagram is being sent. In order to avoid a complete route table search for every outgoing datagram, the route is stored into the in_pcb for the connection. For subsequent calls to ip_output, the route entry is then simply checked to ensure validity. While we will keep this basic operation as is, we require a slight modification to allow us to coexist with the Microsoft TCP driver. When an active connection is being set up, our filter driver has to determine whether the connection is going to be handled by one of the INIC interfaces. To do this, we consult the route table from the filter driver portion of our driver. This is done via a call to the rtalloc1 function (found in route.c). If a valid route table entry is found, then we take control of the connection and set a pointer to the rtentry structure returned by rtalloc1 in our in_pcb structure.

When a route table entry changes, there may be connections that have pointers to a stale route table entry. These connections need to be notified of the new route. FreeBSD solves this by checking the validity of a route entry during every call to ip_output. If the entry is no longer valid, its reference to the stale route table entry is removed, and an attempt is made to allocate a new route to the destination. For the slow-path, this works fine. Unfortunately, since our IP processing is handled by the INIC for the fast-path, this sanity check method will not be sufficient. Instead, we will need to perform a review of all of our fast path connections during every route table modification. If the route table change affects our connection, we flush the connection off the INIC, so that we revert to slow-path processing using the BSD TCP protocol code. This picks up the new route, and uses this to build a new template when the connection is later handed out to the INIC again. The function which performs this scan-and-flush is ATKRouteFlush( ), in file atkfastpath.c.

Like the ARP code above, we need to process certain types of incoming ICMP frames. Of the 10 possible ICMP message types, there are only three that we need to support. These include ICMP_REDIRECT, ICMP_UNREACH, and ICMP_SOURCEQUENCH. Any FreeBSD code to deal with other types of ICMP traffic will be removed. Instead, we simply return NDIS_STATUS_NOT_ACCEPTED for all but the above ICMP frame types. The following paragraphs describe how we handle these ICMP frames.

Under FreeBSD, an ICMP_REDIRECT causes two things to occur. First, it causes the route table to be updated with the route given in the redirect. Second, it results in a call back to TCP to cause TCP to flush the route entry attached to its associated in_pcb structures. By doing this, it forces ip_output to search for a new route. As mentioned in the Route section above, we also require a call to a routine which reviews all of the TCP fast-path connections, and flushes any using the affected route.

In both FreeBSD and Microsoft TCP, the ICMP_UNREACH results in no more than a simple statistic update. We do the same.

A source quench is sent to cause a TCP sender to close its congestion window to a single segment, thereby putting the sender into slow-start mode. We keep the FreeBSD code as-is for slow-path connections. For fast path connections we must flush the context back to the host, since we are not, at least at the moment, handling congestion and slow-start on the INIC.

The FreeBSD IP code requires few modifications when porting to the ATCP driver, which are described in the paragraphs below.

During initialization time, ip_init is called to initialize the array of protosw structures. These structures contain all the information needed by IP to be able to pass incoming data to the correct protocol above it. We strip the protosw array to exclude unnecessary protocols.

Changes made to IP input (function ip_intr( )) are listed below.

First, since we only handle datagrams for which we are the final destination, we are never required to forward an IP datagram. All references to IP forwarding, and the ip_forward function itself, are removed. IP options supported by FreeBSD at this time include record route, strict and loose source and record route, and timestamp. For the timestamp option, FreeBSD only logs the current time into the IP header before it is forwarded. Since we will not be forwarding IP datagrams, this seems to be of little use to us. While FreeBSD supports the remaining options, NT essentially does nothing useful with them.

There is a small problem with the FreeBSD IP reassembly code. The reassembly code reuses the IP header portion of the IP datagram to contain IP reassembly queue information. It can do this because it no longer requires the original IP header. This is an absolute no-no with the NDIS 4.0 method of handling network packets. The NT DDK explicitly states that we must not modify packets given to us by NDIS. This is not the only place in which the FreeBSD code modifies the contents of a network buffer. It also does this when performing endian conversions. At the moment we leave this code as is and violate the DDK rules. We can do this because we ensure that no other transport driver looks at these frames. If this changes, we can modify this code substantially by moving the IP reassembly fields into the mbuf header.

Regarding IP output, only two modifications are made. The first is that since, for the moment, we are not dealing with IP options, there is no need for the code that inserts the IP options into the IP header. Second, we may discover that it is impossible for us to ever receive an output request that requires fragmentation. Since TCP performs Maximum Segment Size negotiation, we should theoretically never attempt to send a TCP segment larger than the MTU.

An NDIS Protocol Driver portion of the ATCP driver is defined by the set of routines registered with NDIS via a call to NdisRegisterProtocol. These routines are limited to those that are called (indirectly) by the INIC miniport driver beneath us. For example, we register a ProtocolReceivePacket routine so that when the INIC driver calls NdisMIndicateReceivePacket it will result in a call from NDIS to our driver.

The NDIS protocol driver initialization occurs in two phases. The first phase occurs when the ATCP DriverEntry routine calls ATKProtoSetup. The ATKProtoSetup routine allocates resources, registers protocol and locates and initializes bound NICs. We attempt to allocate many of the required resources as soon as possible so that we are more likely to get the memory we want. This mostly applies to allocating and initializing our mbuf and mbuf header pools. We call NdisRegisterProtocol to register our set of protocol driver routines. The location and initializion of bound NICs is done by ATKIfInit, as described above.

After the underlying INIC devices have completed their initialization, NDIS calls our driver's ATKBindAdapter function for each underlying device. This completes the interface initialization.

Figure 7:
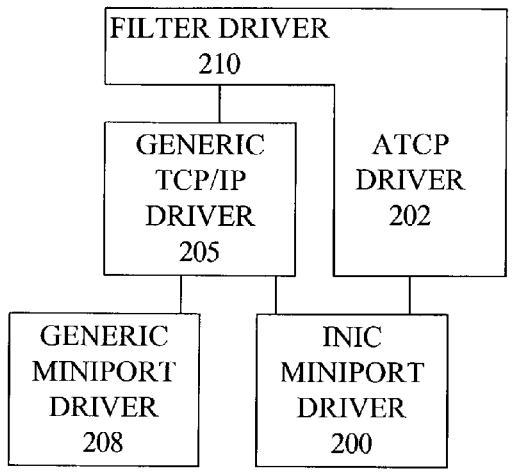
FIG. 7 shows a host interface structure combining plural protocol stacks and drivers for working with an add-on INIC.

Receive is handled by the protocol driver routine ATKReceivePacket. Before we describe this routine, consider each possible receive type and how it will be handled. As shown in FIG. 7, the INIC miniport driver 200 is bound to the ATCP transport driver 202 as well as the generic Microsoft TCP driver 205, and optionally others. The ATCP driver 202 is bound exclusively to INIC devices, while the generic TCP driver 205 is bound to the INIC as well as other conventional NICs, as indicated by its connection to a generic miniport driver 208 as well as the INIC miniport driver 200.

By binding the drivers in this fashion, we can choose to direct incoming network data to our own ATCP transport driver, the Microsoft TCP driver, or both. We do this by playing with the ethernet "type" field as follows. To NDIS and the transport drivers above it, the INIC is registered as a normal ethernet card. When the generic TCP/IP transport driver receives a packet from the INIC driver, it will expect the data to start with an ethernet header, and consequently, expects the protocol type field to be in byte offset 12. If Microsoft TCP finds that the protocol type field is not equal to either IP, or ARP, it will not accept the packet. So, to deliver an incoming packet to our driver, we simply map the data such that byte 12 contains a non-recognized ethernet type field. Note that we choose a value that is greater than 1500 bytes so that the transport drivers do not confuse it with an 802.3 frame. We also choose a value that will not be accepted by other transport driver such as Appletalk or IPX. Similarly, if we want to direct the data to Microsoft TCP, we can then simply leave the ethernet type field set to IP (or ARP). Note that since we will also see these frames we can choose to accept or not-accept them as necessary.

Incoming packets delivered to ATCP only (not accepted by MSTCP) include TCP, TTCP or SPX packets destined for one of our IP addresses. This includes both slow-path frames and fast-path frames. In the slow-path case, the TCP frames are given in their entirety (headers included). In the fast-path case, the ATKReceivePacket is given a header buffer that contains status information and data with no headers (except those above TCP).

Incoming packets delivered to Microsoft TCP only (not accepted by ATCP) are packets according to protocol not suitable for the fast-path (non-TCP, TTCP or SPX packets) or packets that are not destined for one of our interfaces (packets that will be routed). If in the above example, there is an IP address 144.48.252.4 associated with a 3com interface, and we receive a TCP connect with a destination IP address of 144.48.252.4, we will actually want to send that request up to the ATCP driver so that we create a fast-path connection for it.

This means that we need to know every IP address in the system and filter frames based on the destination IP address in a given TCP datagram. This is done in the INIC miniport driver. Since the ATCP driver learns of dynamic IP address changes in the system, we notify the INIC miniport of all the IP addresses in the system.

Incoming packets delivered to both ATCP and Microsoft TCP include ARP frames and ICMP frames There are several circumstances in which the INIC will need to indicate extra information about a receive packet to the ATCP driver. One such example is a fast path receive in which the ATCP driver needs to be notified of how much data the card has buffered. To accomplish this, the first (and sometimes only) buffer in a received packet will actually be a INIC header buffer. The header buffer contains status information about the receive packet, and may or may not contain network data as well. The ATCP driver recognizes a header buffer by mapping it to an ethernet frame and inspecting the type field found in byte 12. We indicate all TCP frames destined for us in this fashion, while frames that are destined for both our driver and the Microsoft TCP driver (ARP, ICMP) are indicated without a header buffer.

Figure 8A:
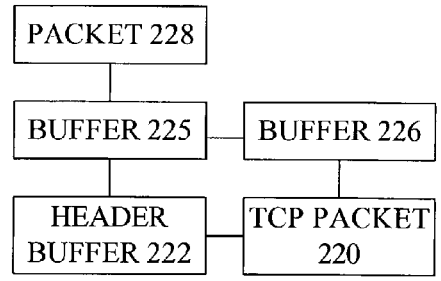
FIG. 8A shows a received TCP packet after processing by the INIC.
Figure 8B:
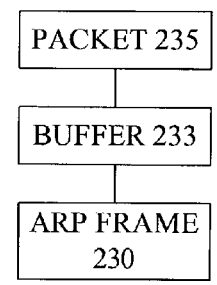
FIG. 8B shows a received ARP frame after processing by the INIC.

FIG. 8A shows an example of an incoming TCP packet, whereas FIG. 8B shows an example of an incoming ARP frame, after processing by the INIC.

NDIS has been designed such that all packets indicated via NdisMIndicateReceivePacket by an underlying miniport are delivered to the ProtocolReceivePacket routine for all protocol drivers bound to it. These protocol drivers can choose to accept or not accept the data. They can either accept the data by copying the data out of the packet indicated to it, or alternatively they can keep the packet and return it later via a call to NdisReturnPackets. By implementing it in this fashion, NDIS allows more than one protocol driver to accept a given packet. For this reason, when a packet is delivered to a protocol driver, the contents of the packet descriptor, buffer descriptors and data must all be treated as read-only. At the moment, we violate this rule. We choose to violate this because much of the FreeBSD code modifies the packet headers as it examines them (mostly for endian conversion purposes). Rather than modify all of the FreeBSD code, we will instead ensure that no other transport driver accepts the data by making sure that the ethernet type field is unique to us (no one else will want it). Obviously this only works with data that is only delivered to our ATCP driver. For ARP and ICMP frames we instead copy the data out of the packet into our own buffer and return the packet to NDIS directly. While this is less efficient than keeping the data and returning it later, ARP and ICMP traffic should be small enough, and infrequent enough, that it doesn't matter.

The DDK specifies that when a protocol driver chooses to keep a packet, it should return a value of 1 (or more) to NDIS in its ProtocolReceivePacket routine. The packet is then later returned to NDIS via the call to NdisReturnPackets. This can only happen after the ProtocolReceivePacket has returned control to NDIS. This requires that the call to NdisReturnPackets must occur in a different execution context. We accomplish this by scheduling a DPC, or alternatively scheduling a system thread, or scheduling a kernel thread of our own. A DPC requires a queue of pending receive buffers on which to place and fetch receive packets.

After a receive packet is dequeued by the DPC it is then either passed to TCP directly for fast-path processing, or it is sent through the FreeBSD path for slow-path processing. Note that in the case of slow-path processing, we may be working on data that needs to be returned to NDIS (for example TCP data) or we may be working on our own copy of the data (ARP and ICMP). When we finish with the data we will need to figure out whether or not to return the data to NDIS or not. This will be done via fields in the mbuf header used to map the data. When the mfreem routine is called to free a chain of mbufs, the fields in the mbuf will be checked and, if required, the packet descriptor pointed to by the mbuf is returned to NDIS.

As noted in the section on mbufs above, we map incoming data to mbufs so that our FreeBSD port requires fewer modifications. Depending on the type of data received, this mapping will appear differently.

Figure 9A:
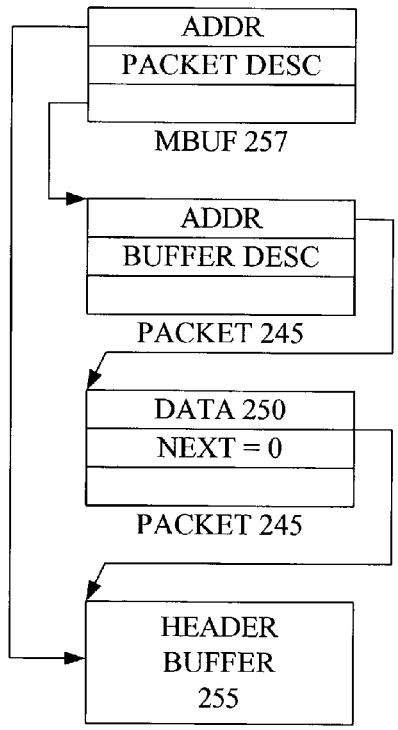
FIG. 9A shows a received data packet for a TCP fast-path connection.

FIG. 9A shows incoming data packet 245 for a TCP fast-path connection. In this example, the TCP data 250 is fully contained in a header buffer 255. The header buffer is mapped by the mbuf 257 and sent upstream for fast-path TCP processing. In this case it is required that the header buffer be mapped and sent upstream because the fast-path TCP code needs information contained in the header buffer in order to perform the processing. When the mbuf in this example is freed, the mfreem routine will determine that the mbuf maps a packet that is owned by NDIS and will then free the mbuf header only and call NdisReturnPackets to free the data.

Figure 9C:
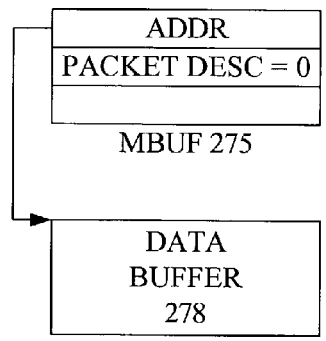
FIG. 9C shows a received ARP frame.
Figure 9B:
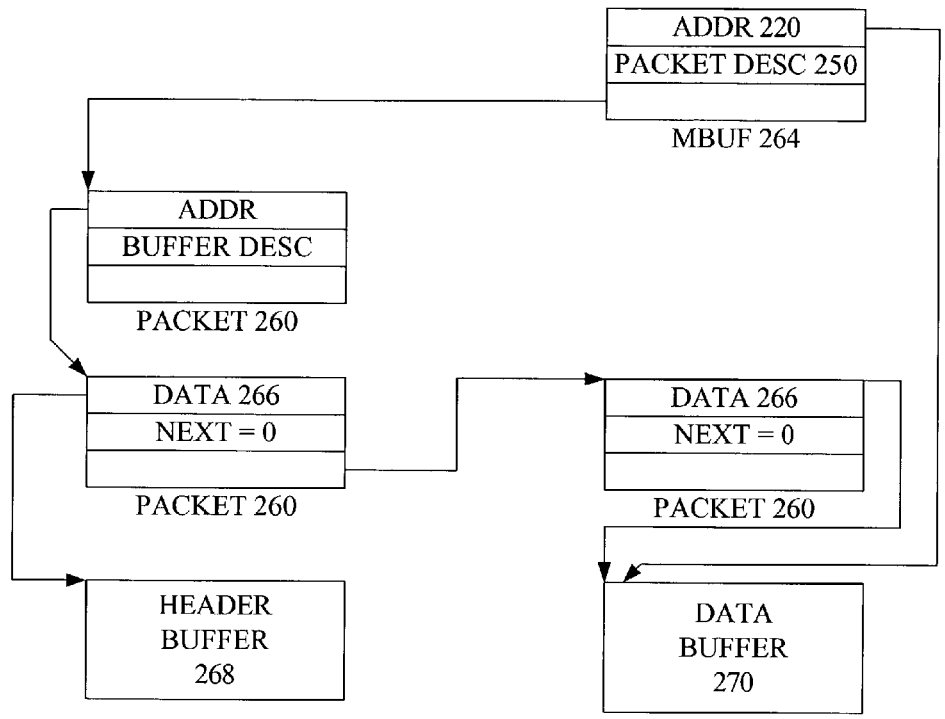
FIG. 9B shows a received data packet for a TCP slow-path connection.

In FIG. 9B, we show incoming data packet 260 for a TCP slow-path connection. In this example the mbuf 264 points to the start of the TCP data 266 directly instead of to a header buffer 268. Since a data buffer 270 will be sent up for slow-path FreeBSD processing, we cannot have the mbuf pointing to the header buffer (FreeBSD would get awfully confused). Again, when mfreem is called to free the mbuf, it will discover the mapped packet, free the mbuf header, and call NDIS to free the packet and return the underlying buffers. Note that even though we do not directly map the header buffer with the mbuf we do not lose it because of the link from the packet descriptor. Note also that we could alternatively have the INIC miniport driver only pass us the TCP data buffer when it receives a slow-path receive. This would work fine except that we have determined that even in the case of slow-path connections we are going to attempt to offer some assistance to the host TCP driver (most likely by checksum processing only). In this case there may be some special fields that we need to pass up to the ATCP driver from the INIC driver. Leaving the header buffer connected seems the most logical way to do this.

In FIG. 9C shows a received ARP frame. Recall that for incoming ARP and ICMP frames we can copy the incoming data out of the packet and return it directly to NDIS. In this case the mbuf 275 simply points to our data 278, with no corresponding packet descriptor. When we free this mbuf, mfreem will discover this and free not only the mbuf header, but the data as well.

This receive mechanism may also be used for other purposes besides the reception of network data. For instance, the receive mechanism may be used for communication between the ATCP driver and the INIC. One such example is a TCP context flush from the INIC. When the INIC determines, for whatever reason, that it can no longer manage a TCP connection, it must flush that connection to the ATCP driver. It does this by filling in a header buffer with appropriate status and delivering it to the INIC driver. The INIC driver in turn delivers it to the protocol driver which will treat it essentially like a fast-path TCP connection by mapping the header buffer with an mbuf header and delivering it to TCP for fast-path processing. There are two advantages to communicating in this manner. First, it is already an established path, so no extra coding or testing is required. Second, since a context flush comes in, in the same manner as received frames, it will prevent us from getting a slow-path frame before the context has been flushed.

Having covered the various types of receive data at least for the TCP example, following are the steps that must be taken by the ATKProtocolReceivePacket routine. Incoming data is mapped to an ethernet frame and the type field is checked. If the type field contains our custom INIC type (TCP for example), and if the header buffer specifies a fast-path connection, allocate one or more mbufs headers to map the header and possibly data buffers. Set the packet descriptor field of the mbuf to point to the packet descriptor, set the mbuf flags appropriately, queue the mbuf, and return 1. If the header buffer specifies a slow-path connection, allocate a single mbuf header to map the network data, set the mbuf fields to map the packet, queue the mbuf and return 1. Note that we design the INIC such that we will never get a TCP segment split across more than one buffer.

If the type field of the frame instead indicates ARP or ICMP, a mbuf with a data buffer is allocated, the contents of the packet are copied into the mbuf, the mbuf is queued, and return 0 (not accepted). If the type field is not INIC, ARP or ICMP type, ATCP does not process the packet, and so return 0.

The receive processing will continue when the mbufs are dequeued. At the moment we will assume this is done by a routine called ATKProtocolReceiveDPC. It will dequeue a mbuf from the queue and inspect the mbuf flags. If the mbuf is meant for fast-path TCP, it will call the fast-path routine directly. Otherwise it will call the ethernet input routine for slow-path processing.

The ATCP transmit path is discussed in the following paragraphs, beginning with the NDIS 4 send operation. When a transport/protocol driver wishes to send one or more packets down to an NDIS 4 miniport driver, it calls NdisSendPackets with an array of packet descriptors to send. As soon as this routine is called, the transport/protocol driver relinquishes ownership of the packets until they are returned, one by one in any order, via a NDIS call to the ProtocolSendComplete routine. Since this routine is called asynchronously, our ATCP driver must save any required context into the packet descriptor header so that the appropriate resources can be freed. This is discussed further below.

Like the Receive path described above, the Transmit path is used not only to send network data, but is also used as a communication mechanism between the host and the INIC. Some examples of the types of sends performed by the ATCP driver follow.

Figure 10:
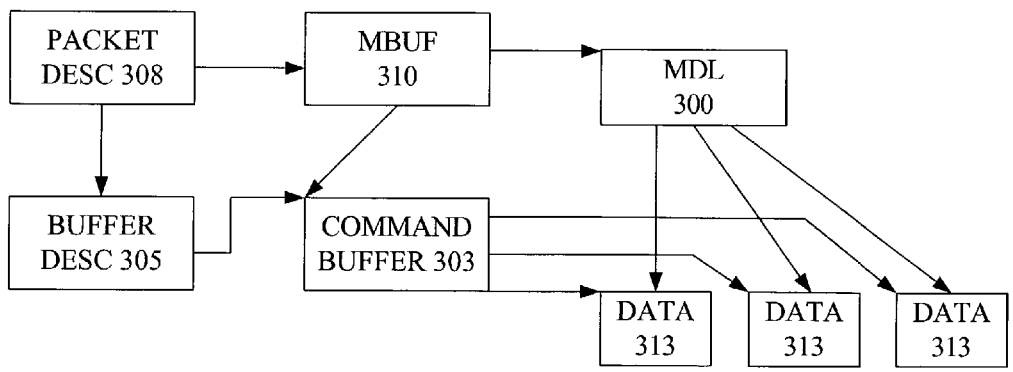
FIG. 10 shows sending a fast-path data packet.

FIG. 10 illustrates a fast-path send. When the ATCP driver receives a transmit request with an associated MDL 300 from a client such as a host application, it packages up the MDL physical addresses into a command buffer 303, maps the command buffer with a buffer descriptor 305 and a packet descriptor 308, and calls NdisSendPackets with the corresponding packet. The underlying INIC driver will issue the command buffer to the INIC. When the corresponding response buffer is given back to the host, the INIC miniport calls NdisMSendComplete which will result in a call to the ATCP ProtocolSendComplete (ATKSendComplete) routine, at which point the resources (data 313) associated with the send can be freed. We allocate and use a mbuf 310 to hold the command buffer. By doing this we can store the context necessary in order to clean up after the send completes. This context includes a pointer to the MDL as well as other connection context. The other advantage to using a mbuf to hold the command buffer is that it eliminates having another special set of code to allocate and return command buffer. We store a pointer to the mbuf in the reserved section of the packet descriptor so we can locate it when the send is complete.

As described above, the receive process typically occurs in two phases. First the INIC fills in a host receive buffer with a relatively small amount of data, but notifies the host of a large amount of pending data (either through a large amount of buffered data on the card, or through a large amount of expected NetBios data). This small amount of data is delivered to the client through the TDI interface. The client then responds with a MDL in which the data should be placed. Like the Fast-path TCP send process, the receive portion of the ATCP driver will then fill in a command buffer with the MDL information from the client, map the buffer with packet and buffer descriptors and send it to the INIC via a call to NdisSendPackets. Again, when the response buffer is returned to the INIC miniport, the ATKSendComplete routine will be called and the receive will complete. This relationship between the MDL, command buffer and buffer and packet descriptors are the same as shown in the Fast-path send section above.

Figure 11:
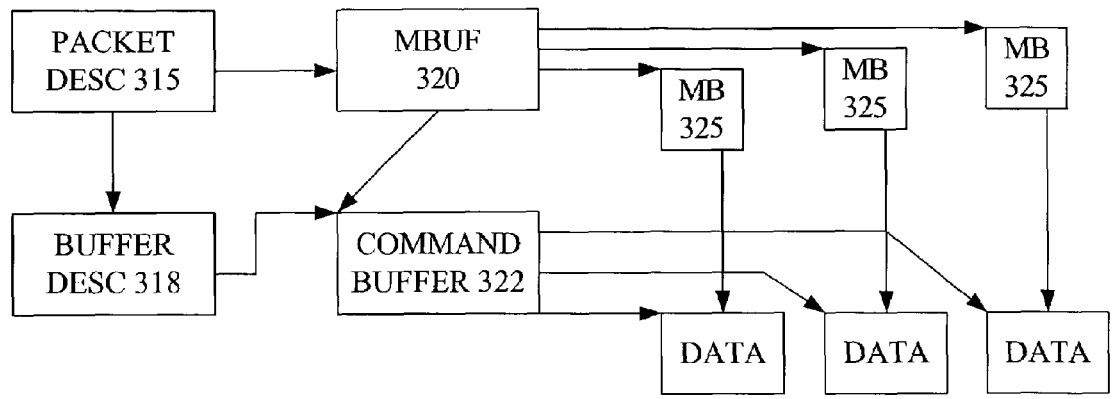
FIG. 11 shows sending a slow-path data packet.

FIG. 11 illustrates a slow-path send. Slow-path sends pass through the FreeBSD stack until the ethernet header is prepended in ether output and the packet is ready to be sent. At this point a command buffer will be filled with pointers to the ethernet frame, the command buffer will be mapped with a packet descriptor 315 and a buffer descriptor 318 and NdisSendPackets will be called to hand the packet off to the miniport. FIG. 11 shows the relationship between the mbufs, command buffer, and buffer and packet descriptors. Since we will use a mbuf 320 to map the command buffer 322, we can simply link the data mbufs 325 directly off of the command buffer mbuf. This will make the freeing of resources much simpler.

Figure 12:
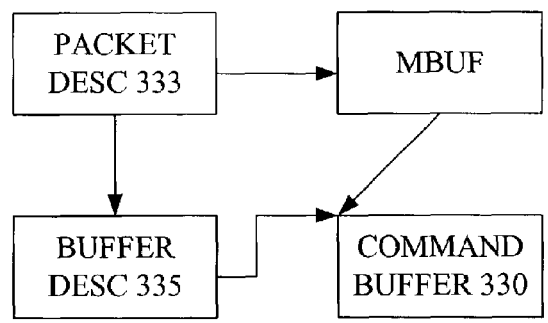
FIG. 12 shows sending a non-data command to the INIC.

As shown in FIG. 12, the transmit path may also be used to send non-data commands to the INIC. For example, the ATCP driver gives a context to the INIC by filling in a command buffer 330, mapping it with a packet 333 and buffer descriptor, and calling NdisSendPackets.

Given the above different types of sends, the ATKProtocolSendComplete routine will perform various types of actions when it is called from NDIS. First it examines the reserved area of the packet descriptor to determine what type of request has completed. In the case of a slow-path completion, it can simply free the mbufs, command buffer, and descriptors and return. In the case of a fast-path completion, it notifies the TCP fast-path routines of the completion so TCP can in turn complete the client's IRP. Similarly, when a non-data command buffer completes, TCP will again be notified that the command sent to the INIC has completed.

The only query operation currently done by the ATCP driver is a query to obtain stats. This is done by the function ATKUpdateInicStats( ) in file atkinfo.c. Currently, the ATCP driver recognizes four status indications from the lower INIC driver. These are handled by the function ATKStatus( ), in proto.c. An NDIS_STATUS_MEDIA_DISCONNECT status indication is received if the INIC driver detects that the link status on an interface is down. We simply mark our corresponding IFACE structure as "down". An NDIS_STATUS_MEDIA_CONNECT status indication is received when a previously down link status changes back to "up". We mark the corresponding IFACE as "up", and also do a gratuitous ARP to advertise it. An NDIS_STATUS_RESET_START status indication is received when the INIC driver has decided to issue a reset to the INIC. This reset will destroy any TCP or other contexts on the affected interface (we have no way to recover a context from a dead INIC): so we call the function ATKResetFlush( ), in file atkfastpath.c, to abort any connections on the indicated interface. The interface is also marked down. An NDIS_STATUS_RESET_END status indication is received when the INIC driver has reloaded and restarted an INIC after a reset. We mark the corresponding IFACE as "up."

We may not initiate INIC resets from the ATCP driver. Instead, as noted in above, we may respond to reset status indications from the INIC driver below the ATCP driver. Similarly, we do not initiate any HALT operations from the ATCP driver.

In a first embodiment, the INIC handles only simple-case in-sequence data transfer operations on a TCP connection. These of course constitute the large majority of CPU cycles consumed by TCP processing in a conventional driver. There are other complexities of the TCP protocol that are still in this embodiment handled by host driver software: connection setup and breakdown; out-of-order data, nonstandard flags etc. The NT OS contains a fully functional TCP/IP driver, and a better solution is to enhance this so that it is able to detect our INIC and take advantage of it by "handing off" data-path processing where appropriate. Unfortunately, we do not have access or permission to modify NT source. Thus the optimal solution above, while straightforward, is not implemented immediately. We thus provide our own custom driver software on the host for those parts of TCP processing which are not handled by the INIC.

This presented a challenge: The NT network driver framework does make provision for multiple types of protocol driver; but it does not easily allow for multiple instances of drivers handling the same protocol. For example, there are no "hooks" into the Microsoft TCP/IP driver which would allow for routing of IP packets between our driver (handling our INICs) and the Microsoft driver (handling other NICs). Our solution to this was to retain the Microsoft driver for all non-TCP network processing (even for traffic on our INICs), but to invisibly "steal" TCP traffic on our connections and handle it via our own (BSD-derived) driver. The Microsoft TCP/IP driver is unaware of TCP connections on interfaces we handle.

The network "bottom end" of this plural path processing was described earlier in the document. In this section we will discuss the "top end"—the TDI interface to higher-level NT network client software. We make use of an NT facility called a filter driver (see FIG. 7). NT allows a special type of driver ("filter driver") to attach itself "on top" of another driver in the system. The NT I/O manager then arranges that all requests directed to the attached driver are sent instead to the filter driver; this diversion is invisible to the rest of the system. The filter driver may then either handle these requests itself, or pass them down to the underlying driver that the filter driver is attached to. Provided the filter driver completely replicates the (externally visible) behavior of the underlying driver when it handles requests itself, the existence of the filter driver is invisible to higher-level software.

Our filter driver attaches on top of the Microsoft TCP/IP driver. This gives us the basic mechanism whereby we can intercept requests for TCP operations and handle them in our driver instead of the Microsoft driver. The functions which actually receive the request IRPs from higher levels are the various dispatch routines in the file atcpinit.c (this also contains the initialization code).

However, while the filter driver concept gives us a framework for what we wanted to achieve, there were some significant technical problems that were solved. The basic issue is that setting up a TCP connection involves a sequence of several requests from higher-level software, and it is not always possible to tell, for requests early in this sequence, whether the connection should be handled by our driver or the Microsoft driver.

In a nutshell, this means that for many requests we store information about the request in case we need it later, but also allow the request to be passed down to the Microsoft TCP/IP driver in case the connection ultimately turns out to be one for which that driver should handle.

Let us look at this in more detail, which will involve some examination of the TDI interface. The TDI interface is the NT interface into the top end of NT network protocol drivers. Higher-level TDI client software which requires services from a protocol driver proceeds by creating various types of NT FILE_OBJECTs, and then making various DEVICE_IO_CONTROL requests on these FILE_OBJECTs.

There are two types of FILE_OBJECT of interest here. Local IP address/port combinations are represented by ADDRESS objects, and TCP connections are represented by CONNECTION objects. The steps involved in setting up a TCP connection (from the "active", client, side) are: 1) Create an ADDRESS object, 2) Create a CONNECTION object, 3) Issue a TDI_ASSOCIATE_ADDRESS IO-control to associate the CONNECTION object with the ADDRESS object, 4) Issue a TDI_CONNECT IO-control on the CONNECTION object, specifying the remote address and port for the connection.

Initial thoughts were that handling this would be straightforward: we would tell, on the basis of the address given when creating the ADDRESS object, whether the connection is for one of our interfaces or not. After which, it would be easy to arrange for handling entirely by our code, or entirely by the Microsoft code: we would simply examine the ADDRESS object to see if it was "one of ours" or not. There were two main difficulties, however.

First, when the CONNECTION object is created, no address is specified: it acquires a local address only later when the TDI_ASSOCIATE_ADDRESS is done. Also, when a CONNECTION object is created, the caller supplies an opaque "context cookie" which will be needed for later communications with that caller. Storage of this cookie is the responsibility of the protocol driver: it is not directly derivable just by examination of the CONNECTION object itself. If we simply passed the "create" call down to the Microsoft TCP/IP driver, we would have no way of obtaining this cookie later, if it turns out that we need to handle the connection.

Therefore, for every CONNECTION object which is created, we must allocate a structure to keep track of information about it, and store this structure in a hash table keyed by the address of the CONNECTION object itself, so that we can locate it if we later need to process requests on this object. We refer to this as a "shadow" object: it replicates information about the object stored in the Microsoft driver. We also pass the create request down to the Microsoft driver too, to allow it to set up its own administrative information about the object.

A second major difficulty arises with ADDRESS objects. These are often created with the TCP/IP "wildcard" address (all zeros); the actual local address is assigned only later during connection setup (by the protocol driver itself.) A "wildcard" address does not allow us to determine whether connections that will be associated with this ADDRESS object should be handled by our driver or the Microsoft one. Also, as with CONNECTION objects, there is "opaque" data associated with ADDRESS objects that cannot be derived just from examination of the object itself. (In this case addresses of callback functions set on the object by TDI_SET_EVENT IO-controls.)

Thus, as in the CONNECTION object case, we create a "shadow" object for each ADDRESS object that is created with a wildcard address. In this we store information (principally addresses of callback functions) which we will need if we are handling connections on CONNECTION objects associated with this ADDRESS object. We store similar information, for any ADDRESS object that is explicitly for one of our interface addresses, as it is convenient to use the same structure for both cases. With this concept of "shadow" objects in place, let us revisit the steps involved in setting up a connection, and look at the processing performed in the ATCP driver.

For an outgoing or "active" connection setup, the TDI client first makes a call to create the ADDRESS object. Assuming that this is a "wildcard" address, we create a "shadow" object before passing the call down to the Microsoft driver.

The next step (omitted in the earlier list for brevity) is normally that the client makes a number of TDI_SET_EVENT IO-control calls to associate various callback functions with the ADDRESS object. These are functions that should be called to notify the TDI client when certain events (such as arrival of data, disconnection requests, etc.) occur. We store these callback function pointers in our "shadow" address object, before passing the call down to the Microsoft driver.

Next, the TDI client makes a call to create a CONNECTION object. Again, we create our "shadow" of this object.

Next, the client issues the TDI_ASSOCIATE_ADDRESS IO-control to bind the CONNECTION object to the ADDRESS object. We note the association in our "shadow" objects, and also pass the call down to the Microsoft driver.

Finally the TDI client issues a TDI_CONNECT IO-control on the CONNECTION object, specifying the remote IP address (and port) for the desired connection. At this point, we examine our routing tables to determine if this connection should be handled by one of our interfaces, or by some other NIC. If it is ours, we mark the CONNECTION object as "one of ours" for future reference (using an opaque field that NT FILE_OBJECTS provide for driver use.) We then proceed with connection setup and handling in our driver, using information stored in our "shadow" objects.

The Microsoft driver does not see the connection request or any subsequent traffic on the connection.

If the connection request is NOT for one of our interfaces, we pass it down to the Microsoft driver. Note, however, that we can not simply discard our "shadow" objects at this point. The TDI interface allows re-use of CONNECTION objects: on termination of a connection, it is legal for the TDI client to dissociate the CONNECTION object from its current ADDRESS object, re-associate it with another, and use it for another connection. Thus our "shadow" objects must be retained for the lifetime of the NT FILE_OBJECTS: a subsequent connection could turn out to be via one of our interfaces.

For an incoming or "passive" connection setup, NT allows at least two ways of doing things. There are explicit TDI_LISTEN and TDI_ACCEPT calls defined in the TDI spec. There is also a callback mechanism whereby a TDI client can arrange to be called when an incoming connection request for a given port/address is seen.

In point of fact, no existing TDI clients appear to use the explicit TDI_LISTEN and TDI_ACCEPT calls, and we are not handling them in the ATCP driver. All incoming connections are made via the callback mechanism.

Initial steps are similar to active connection handling. The TDI client creates an ADDRESS object, then creates one or more CONNECTION objects and associates them with it. It also makes TDI_SET_EVENT calls on the address object to set up handlers for data input, disconnection, errors, etc., and in this case, it also registers one more handler for connection requests. All of these creations and associations are "shadowed" in the ATCP driver, as in the active connection case.

Next, recall that the INIC driver knows about the IP addresses of our interfaces, and filters incoming IP packets based on this information. So any connection requests which we see in the ATCP driver are known to be for our interfaces.

Now we process analogously to the Microsoft TCP driver: for an incoming connection request (TCP SYN), we look for a "best match" address object. All our shadow ADDRESS objects are kept in a table hashed by port for this purpose. An address object matches if its port number matches the destination port in the packet; a match of both port and IP address takes precedence over a match of port only.

Assuming a suitable ADDRESS object is found, we call the connection handler function which the TDI client registered in that object with information about the connection request (most importantly, the remote address and port.) If the TDI client which created that ADDRESS object is prepared to handle this connection request, it responds with a TDI_CONNECT IRP, plus a "connection cookie" which should correspond to the "context cookie" of one of the CONNECTION objects associated with this ADDRESS object. We locate this CONNECTION object, mark it as "one of ours", and proceed with BSD code TCP protocol processing to establish the connection.

As in the active connection case, all activity on this connection is handled by the ATCP driver; the Microsoft TCP driver knows nothing about it. Conversely, incoming connection requests for interface addresses other than INIC addresses are filtered out at the INIC level; the ATCP driver never sees such connections or any traffic on them.

In some cases when an ADDRESS object is created, an explicit port number is specified by the TDI client. This is typically the case for services (such as NETBIOS or FTP) which are preparing to respond to requests on well-known, assigned ports.

In other cases, however, a port number of zero is given. In that case, the TCP protocol driver is required to assign a port number. Once again we run into the issue that, at the time an ADDRESS object is created, we don't know if that address object is going to be used for connections on our interfaces or others. In particular, there are problems in the case of an ADDRESS object created with both port and address as wildcards. If we assigned an arbitrary ephemeral port for the ATCP "shadow" object, we would run into fatal problems with WINSOCK applications such as WINS which create an ADDRESS object with no specified port, and then query the address object to find what port was assigned by the protocol driver. We would not know, in the case of a wildcard ADDRESS object, which port number to return for the query: ours, or the one assigned by the Microsoft driver.

Thus, we have to ensure that there is a single, consistent, port-number space. To do so, we must always allow the Microsoft driver to create its ADDRESS object (and hence assign its port), and then catch the completion of the Microsoft create operation. At that point, we issue a TDI_QUERY_INFORMATION request on the object to obtain the port number that was assigned by the Microsoft driver, and plug it into our "shadow" ADDRESS object.

A consequence of this is that, even in the case of an ADDRESS object which is explicitly for one of our interfaces, we still allow the Microsoft driver to create a corresponding ADDRESS object if no port number was specified, in order to ensure a single consistent port-number space.

The structures used for ATCP ADDRESS and CONNECTION objects are defined in the file obmgr.h.

Most of the code for dealing with our shadow objects is in the file obmgr.c; this contains functions which handle object creation, cleanup and close, as well as the TDI_ASSOCIATE_ADDRESS, TDI_DISSOCIATE_ADDRESS and TDI_SET_EVENT_HANDLER IO-controls.

Note that we catch the completion of most of the requests of interest, and in fact much of our processing is done in our completion handlers. In general, we want to proceed with our processing only after we know that the Microsoft driver has successfully completed.

Adapting the BSD TCP code to NT has been accomplished first by fairly straightforward resolution of clashes between BSD and Microsoft definitions, winnowing down the BSD system header files to a minimum, and converting requests for various common OS resources (memory allocation, copying, etc.) from BSD to NT services.

Areas where substantial redesign was needed to change from the socket paradigm to the TDI interface are discussed in more detail below.

For BSD Data Structures we have, as noted earlier, attempted to keep the code as close to the BSD base as is possible. Thus for each connection, we have a socket structure, an in_pcb structure, and a tcpcb structure. These are defined in the usual BSD headers: socketvar.h, in_pcb.h, and tcp_var.h respectively (though tcp_var.h has moved to a common include directory, since it is also used by INIC code.)

Each connection also has an ATCP connection object (AT-CONN, defined in obmgr.h.) This means there are a total of four linked data structures for each connection: this is unpleasantly unwieldy, and would certainly not have been the approach had we been designing from scratch.

The BSD structures have changed somewhat from their original forms. The inpcb structure has changed to use the Microsoft LIST_ENTRY definitions for queueing; and now contains link fields for a new list of connections which are being handled by the ATCP driver as opposed to the INIC. The tcpcb fields have been substantially rearranged because a portion of the tcpcb structure is shared directly with the INIC (DMA'd in and out when connections are migrated), and some fields have been reduced from 4 to 2 bytes to conserve memory on the INIC. And the socket structure has acquired many new fields, mostly concerned with fastpath processing; it has also lost a number of fields concerned with LISTENing socket queues since the TDI passive connection mechanism is radically different.

Note that the socket structure exists primarily for compatibility with function calls made by BSD TCP code. It has also become a repository for a number of new ATCP per-connection fields, but their location here is rather arbitrary, as they could equally well have been placed in the inpcb or tcpcb structures. Its use differs considerably from a BSD socket. In the ATCP driver, a socket structure is allocated only when a connection is set up and has no existence apart from TCP connections. Also unlike BSD, there is no correspondence between this kernel-level socket structure and any user-level socket. The "sockets" provided by the Microsoft WINSOCK library are an entirely separate abstraction, which mimic the user-level behavior of BSD sockets by creating and manipulating ADDRESS and CONNECTION file objects in a library layer above the TDI interface.

The mbuf structure has also changed quite considerably from BSD. It is now defined in atkmbuf.h. There are no "small" (128 byte) mbufs in the ATCP driver. ATCP mbufs are purely headers, whose m_data fields point to actual data blocks (of various kinds) elsewhere. In fact, ATCP mbufs fall into 4 categories: 1) T_NDIS mbufs, which map NDIS buffers from the lower-level INIC driver, 2) MT_HEADER mbufs, which point to 2K host buffers, similar to BSD's "cluster" mbufs, 3) MT_HOSTMDL mbufs which map MDLs from a TDI_SEND, 4) MT_HCMD mbufs which map outgoing NDIS command buffers.

The m_hdr and pkthdr components of the mbuf struct have been retained (though all mbufs now contain a pkthdr), but many new fields have also been added, on a somewhat ad-hoc basis as they were needed.

For Operation Completion, the BSD TCP code uses a traditional UNIX approach. All processing occurs in the (kernel) context of the process owning the socket for the connection. Each request (for connection, data output, etc.) executes in the process context until it reaches a point where it is necessary to wait for resources or activity. At that point the process sleeps. When it is later woken (by an interrupt, timer, etc.), processing resumes, still in the process context.

As we have noted elsewhere, the NT paradigm is more asynchronous. A request is initiated by receipt of an IRP, but once processing has been started and the IRP is placed into a pending state, the initiating thread is free to go about other business. At the point where we want to complete the IRP, we no longer have any reference to the originating thread, and indeed, that thread may not even be explicitly waiting for the particular completion. The question arises, therefore: in what context will IRP completions run in the ATCP driver?

The solution we have chosen is a DPC. This is an NT kernel facility that allows a call to a function to be scheduled (to run in an arbitrary thread context) as soon as the processor on which the DPC request was made becomes free. When we create our CONNECTION objects, each one has a DPC object initialized in it. Then, the BSD "wakeup" functions (sorwakeup, sowwakeup, soisconnected, etc.) are reimplemented as code which schedules a DPC on that connection (and also sets flag bits to indicate which event has occurred.)

The actual function which is run by the connection DPC is ATKConnDpc( ); the code for this is in atksocket.c. This DPC function is central to the operation of the ATCP driver: most IRP completions, as well as slow-path data indications and delivery, run in this DPC context.

In a BSD system, Active Connection Setup starts with creating a socket. In NT, however, it starts with creating ADDRESS and CONNECTION objects, as described in section 10.2.

The final step is a TDI_CONNECT IO-control on the connection object. This results in a call to the function ATKConnect( ), in the file atktdi.c. After some initial checks, this calls the function ATKSoCreate (in file atksocket.c) which allocates socket, inpcb and tcpcb structures for the connection and links them together in the ways expected by the BSD code (and also links this assemblage to the connection object.)

At this point, we now have data structures in a form which is usable by the BSD TCP code. We simply call tcp_usrreq( ) with PRU_CONNECT to cause the connection to be initiated, and pend the TDI_CONNECT IRP, saving a pointer to it in the connection object. The BSD code then proceeds essentially as it would in a BSD system, and once the connection is established, it calls soisconnected( ). In the ATCP world, this translates to a function which schedules a DPC on the connection; when the ATKConnDpc( ) function runs, it completes the TDI_CONNECT IRP.

For Passive Connection Setup, there are no "listening" sockets in the NT world. Large sections of tcp_input( ) concerned with listening sockets are #ifdef'd out.

Instead, when we detect an incoming SYN segment in tcp_input( ), we call ATKPassiveConnect( ), which is located in the file atktdi.c. This function implements the callup described above to locate a connection object to use for the connection. Assuming one is found, we call ATKSoCreate( ), which as in the active connection case allocates socket, inpcb and tcpcb structures for the connection and links them up as required by the BSD code. We then save the returned TDI_CONNECT IRP in our connection object, and return to tcp_input( ). Processing then continues as if the newly-created socket were one of the "spawned" sockets from a BSD "listening" socket, and once the connection is established, the BSD code calls soisconnected( ).which schedules a DPC which completes the IRP.

Disconnection in the NT world is not signaled by a 'close' on a descriptor, instead there is an explicit TDI_DISCONNECT IO-control.

The TDI_DISCONNECT call results in a call to ATKDisConnect (in file atktdi.c.) Handling is somewhat similar to that of active connection setup: we pend the IRP, save a pointer to it in our connection object, and call tcp_usrreq( ) to initiate the disconnection handshake.

Note that if the context is currently on the INIC (i.e. we are in fastpath state), we must flush the context from the INIC before proceeding with disconnection. In that case we note the disconnection in socket flags and issue a flush but do not call the BSD code here. The disconnection will be done when the flush completes.

Once the BSD code has completed the disconnection handshake, it calls soisdisconnected( ). In the ATCP driver this translates to a scheduling of the connection DPC; the DPC function completes any pended TDI_DISCONNECT IRP.

A further NT wrinkle here is that TDI clients register a disconnection handler function for connections, and we normally need to call this, as well as completing any TDI_DISCONNECT IRP, when closing a connection. We also need to call the disconnection notify function when the close originates from the other side: in that case the tcp_input code calls socantrcvmore( ) which again translates to a scheduling of the connection DPC with appropriate flags.

The notification is done by ATKNotifyDisConnection (in file atksocket.c); the determination of whether, and with what flags, we should call the disconnection notify function, is made by a series of tests at the start of this function.

The next few paragraphs describe slow-path output. Data output on a connection is initiated by a TDI_SEND request on the CONNECTION object; the request IRP points to an MDL describing the data to be sent. The request results in a call to ATKSend (in file atktdi.c.) This locks the connection, and after some initial checks calls ATKMapMdlToMbuf, located in the file atkmbuf.c. The latter allocates an ATCP mbuf to map the request; a pointer to the IRP is saved in a field in the mbuf. Note that, unlike BSD, we do NOT copy data from the request; we simply map the request MDL with an mbuf header. Also, there is no notion in ATCP of a "watermark": any TDI_SEND request is always accepted and queued. The TDI rule is that the TDI_SEND IRP is not completed until the data from it is actually acknowledged by the peer, so throttling of send requests is accomplished in NT by deferring their completion, rather than blocking the sender as in BSD.

The mbuf is then queued on to the socket send buffer, and we call tcp_usrreq( ) with PRU_SEND to cause the BSD TCP code to actually send the data (this in fact results in a call to tcp_output.) The connection is then unlocked.

The usual checks are made in tcp_output to determine whether a frame can be sent. If possible, we build a buffer containing MAC, IP and TCP headers, followed by the data. Details of this differ somewhat from regular BSD. The mbuf we use for output is an MT_HEADER mbuf, which points to a 2K buffer in host memory. This is always enough to contain all the protocol headers plus a maximum-sized amount of payload, so we construct the entire packet in a single mbuf. We allow space at the front of the buffer for the protocol headers, and then call m_copymdldata( ), located in atkmbuf.c, to copy data from the TDI_SEND MDLs mapped by mbufs queued on the socket send buffer into the packet we are constructing. The mbuf containing the output packet is then passed down to ip_output( ) as usual.

Later, when data has been ACK'd by the peer, there is a call from tcp_input( ) to sbdrop( ) on the socket send buffer. The sbdrop code (in atksocket.c) performs processing essentially similar to vanilla BSD code (though it has been somewhat simplified): it adjusts m_data and m_len fields in the mbufs chain it is operating on, and if any mbufs are entirely consumed, it calls m_free( ) to release them.

The m_free( ) function (in file atkmbuf.c) has been modified to recognize the new ATCP mbuf types: when it detects that the mbuf is one which maps a TDI_SEND MDL, it schedules a DPC to cause the associated TDI_SEND IRP (which we saved in the mbuf before queueing it on the socket send buffer) to be completed.

The next few paragraphs describe slow-path input. Processing is largely unchanged from BSD up to the point where the tcp_input( ) code queues the mbuf on to the socket receive buffer with sbappend( ), and calls sorwakeup( ).

At that point things become very different. In NT there is no process sleeping on the socket receive buffer to be woken up and copy out the data. Instead, the sorwakeup( ) call translates in ATCP terms into a scheduling of the connection DPC; when this runs, it calls ATKPresentData (in file atktdi.c) to deal with the data which has been appended on to the socket.

The basic approach is that if we currently have an MDL we copy the data into it and complete it if possible. If we don't have an MDL, or have data left over after copying into the one we completed, we will indicate data, unless we're in a state where we have already indicated and are expecting an MDL from a TDI_RECEIVE shortly. The ATKPresentData( ) function is also cognizant of fastpath, and will call ATKDataRequest (in file atkfastpath.c) to hand out MDLs to the INIC when appropriate.

Data which has been consumed, either by copying into an MDL or by being taken by an indication, is dropped from the socket receive buffer with sbdrop( ). This calls m_free( ) once an mbuf has been completely consumed. The m_free function has been enhanced to know about the ATCP flavors of mbufs; it detects that this receive mbuf is actually one mapping NDIS buffers, and returns them to NDIS.

The fast-path data pathways and connection handout and flush were discussed conceptually earlier, so we will now simply identify the actual code which implements these functions, adding a few notes as we go. Most of the fastpath code is in file atkfastpath.c; all functions mentioned in this section are in this source file unless noted otherwise or earlier identified.

Fast-path input frames are identified as such in ATKReceiveDpc (file proto.c), and handed to ATKFastInput( ). There, if it is a data frame or header, we simply queue it on the socket receive buffer and call ATKPresentData( ); as noted in the previous subsection, this knows about fastpath and is prepared to hand out MDLs to the INIC if appropriate. The completion of fastpath receive MDLs is handled by ATKFastReceiveDone( ).

Fast-path output originates in ATKSend( ); there, if the connection is in fastpath state we do not do the slow-path processing described in section 11.6. Instead we map the MDL with a data request structure (ATKDR, defined in socketvar.h), save the IRP in that request, queue the request on the socket, and call ATKFastSendStartIo (file atkfastpath.c.) If there are currently less than the maximum allowed outstanding send requests active on the INIC, this calls ATKDataRequest( ) to hand the send MDL out to the INIC. Completion of fastpath send requests is handled in ATKFastSendDone( ).

The decision to hand a connection out to the INIC is made in the ubiquitous DPC function ATKConnDpc( ), either immediately when a connection is set up, or later when the connection is determined to be in a suitably quiescent state. This is a natural place to control the handout, since the DPC function is centrally involved in almost any data activity or state transition which affects the connection. The initial handout message is sent by ATKStartMigration( ). When the NULL interlock frame arrives it is handled by ATKHasProvisionalContext( ); this does some checks to ensure that migration should still proceed, and if so, calls ATKCompleteMigration( ) to send the second-half handout command. Completion of this is handled by ATKCompleteMigrationDone( ), which does a few more checks and then sets the fastpath state of the connection to "established". There is an ordered set of fastpath states, rather analogous to the TCP finite-state machine states, defined in socketvar.h: SO_FPNONE to SO_PFCLEANUP.

Origination of a flush from the host side is done by the function ATKFlushContext( ) which simply sends a flush command identifying the context to flush. The final cleanup is done in ATKFastPathCleanup( ); this may be called from ATKFastInput( ) on receiving a "flush" frame, or from either of ATKFastReceiveDone( ) or ATKFastSendDone( ) on receiving an error completion. (Recall from above that the cleanup must have seen completions of all outstanding data requests, plus the flush frame, before it can proceed.

The BSD code contains many IOCTL handlers for obtaining statistics. However, these have no direct correspondence to the NT statistics queries, and additionally, we must deal with the fact that there are two parallel protocol stacks. In many cases, the overall statistics being requested are made up of components from both stacks. Therefore, we do not use any of the BSD IOCTL handler code.

Instead we arrange to catch completion of the various NT statistics queries, which are IOCTL_TCP_QUERY_INFORMATION_EX requests on CONTROL FILE_OBJECTS, so that we can merge information from our driver with that returned from the Microsoft driver.

The functions for doing this are in atkinfo.c. Note that for certain statistics, only the INIC has the exact values, since it consumes protocol headers internally for fastpath connections. Therefore in order to obtain the ATCP information to merge with the information from the Microsoft driver, we need to query the INIC. An Alacritech-specific OID_INIC_GET_STATS is defined for this purpose, and used in ATKUpdateInicStats( ). We notice from tracing that NT is astoundingly profligate and inefficient in its use of stats queries (a netstat invocation, for example, may result in literally thousands of repeated queries!), so we keep a timestamp of last query and repeat the INIC query only after a reasonable time has elapsed since the previous one.

In most places where a structure needs to be allocated on the ATCP driver for memory allocation, we are just calling the basic NT ExAllocatePool( ) function. We don't at this point have a good feel for how efficient (or otherwise) the NT kernel memory allocation code is: if profiling later shows that it is worth while, we could adopt the approach of keeping our own (hopefully more efficient) freelists of our commonly-used structures.

This might be particularly relevant if connection setup overhead proves to be an issue, since three separate structures (socket, inpcb and tcpcb) need to be allocated for each connection. Rather than doing three separate allocations, we could keep a free pool of groups of these, already linked appropriately.

We have taken the pragmatic approach of implementing only the functionality that we have actually observed to be used, in tracing and extensive testing. However, there are a number of other features which may be derived from the TDI spec or inferred from the Microsoft TCP code which have never been observed to be used, and we have omitted them for simplicity. These include: Out-of-band data, TDI_LISTEN and TDI_ACCEPT calls, IOCTLs for setting interfaces up and down, IOCTLs for setting security information (although registry keys for security features are implemented on a separate pathway), and a number of "hidden" registry parameter keys.

As with conventional networking cards, the Alacritech INIC employs an associated device driver. This document describes the device driver used with the Microsoft Windows NT, and 9x operating systems.

Network device drivers used in Microsoft operating systems conform to the Network Driver Interface Specification (NDIS) defined by Microsoft. NDIS provides a set of standard entry points used for initialization, query and set functions (IOCTLS), sending and receiving data, and reset and shutdown. NDIS also provides a set of library functions used to interact with the operating system. These functions include routines used to allocate memory, access PCI IO space, allocate and manage buffer and packet descriptors, and many other functions. An NDIS driver must be implemented exclusively within the bounds of NDIS and not make any calls to NT or 9x operating system routines directly.

An NDIS NIC driver is used as a means of communication between upper level protocol drivers (TCP/IP, Appletalk, IPX) and a specific networking device. For example, when the TCP/IP protocol driver, wishes to send an ethernet packet, the packet is passed to the NIC driver via the standard NDIS transmit interface. The NIC driver is responsible for interacting with its associated hardware to ensure that the packet is transmitted on the network.

Figure 13:
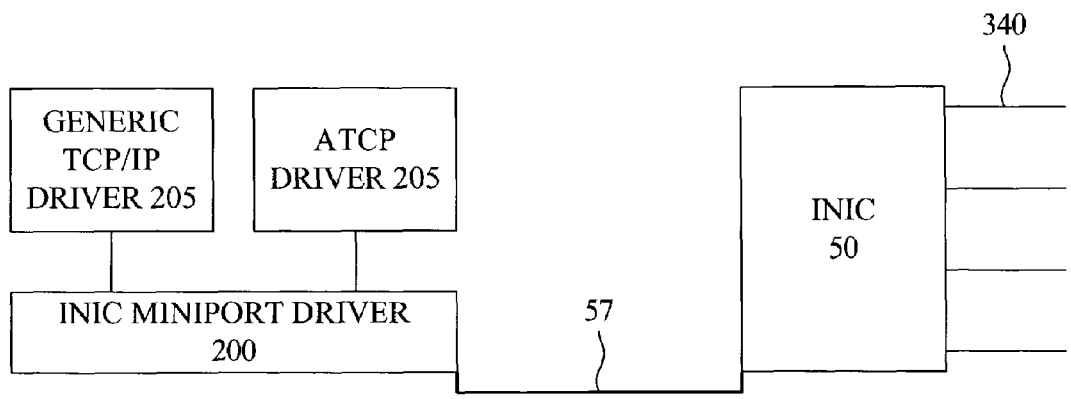
FIG. 13 is a diagram of the INIC connected to the INIC miniport driver over the PCI bus.

As shown in FIG. 13, the INIC miniport driver 200 is implemented as a standard miniport driver is connected to the INIC 50 over the PCI bus 57. The INIC has four network connections 340 in this embodiment.

As mentioned above, we can reduce the number of interactions between the INIC device driver and the INIC 50 (nicknamed Simba) by passing multiple buffers to the INIC in a single write, and allocating a physically contiguous chunk of memory and dividing it into several buffers. We also define four types of buffers. Header buffers, which contain information about received data as well as possibly the data itself (if the data is small) data buffers, which are always accompanied by a header buffer, which contain large chunks of received data, command buffers, which contain information about data that is to be sent, and response buffers, which contain information about command buffers that have just been completed.

Header buffers are 256 bytes, data buffers are 2 k, command buffers are 512 bytes, and response buffers are 32 bytes. Thus, in a contiguous 4 k page, we can allocate 16 header buffers, 2 data buffers, 8 command buffers, or 128 response buffers. Thus in a single write we can pass 16 header buffers, or 2 data buffers, or 128 response buffers off to the INIC. We choose a 4 k buffer size because that is the page size for NT. Theoretically, NT should allow us to allocate larger blocks of contiguous memory, but likelihood of the allocation failing increases past the page size. We call this 4 k page a Simba Data Buffer (SDB).

Let's say that we pass 16 header buffers off to the INIC. These header buffers will be returned to us as data arrives, and are likely to be passed upstream to the ATCP driver. They will then be returned to us, out of order, at a later time at which point we can mark them as free. Before we can re-use the SDB, however, all of the buffers (header, or data, etc) within that SDB must have been returned to us. Since ATCP can return them in any order we need a way of keeping track of which buffers within an SDB are free and which are still in use. We do this by maintaining a 16-bit bitmask. Bits are cleared when the corresponding buffers are handed to the INIC (all 16 for header buffers, just 2 for data buffers), and then reset when the buffer is freed. When the bitmask is full, the SDB can be re-used.

Note that 16 bits is not enough to manage the 128 response buffers. It is not necessary to keep track of the response buffers since they are never passed upstream. For response buffers, we just maintain a circular queue of two SDBs. When the INIC uses all of the buffers in one response SDB, we pass it back to the INIC and jump to the other. Note also that while the INIC driver also uses SDBs for command buffers, command buffers are only passed to the INIC one at a time. Furthermore, as discussed elsewhere, the ATCP driver allocates and manages its own separate set of command buffers.

As we've noted, we must maintain a bitmask for SDB. We need to maintain other information about an SDB as well. This information includes the virtual and physical address of the SDB, linked list pointers, the type of SDB (header, data, etc), the current offset within an SDB (next expected header/response buffer), etc. We keep all of this information in a structure that we call SDBHANDLE.

We have a unique challenge in the INIC driver. Unlike other NIC drivers, the INIC driver may be receiving data that has already been acknowledged by the INIC network adapter. This means that once data has been received by the driver, it cannot be dropped. This in turn requires that all resources needed to receive a packet are allocated before a header and/or data buffer is passed off to the INIC. Included in these resources are NDIS buffer and packet descriptors. NDIS buffer and packet descriptors are used to map a network buffer when being passed via NDIS. The packet descriptors represent a received frame, and can be made up of multiple physical buffers, each represented by a NDIS buffer descriptor. Note that as pointed out above, every received frame is given to us via a header buffer, and there may or may not be an associated data buffer with it. This means that for every header buffer given to the INIC we must pre-allocate a packet descriptor and a buffer descriptor (since the header buffer may be sent upstream), while for every data buffer we must only pre-allocate a buffer descriptor. Since these resources are pre-allocated, we need a place to store them until the header and/or data buffers are returned to us. Again, we maintain a structure called the SDBDESC (SDB Descriptor) structure for every header and data buffer given to the card. We include 16 of these structures in the SDBHANDLE structure, one for each header buffer in an SDB (14 are not used for data buffers).

We maintain several queues of SDBs for each adapter in the system. These queues are named and described as follows:

AllSDBs is a linked list of all SDBs allocated for the adapter. Used to locate and free SDBs when the driver is halted.

FreeSDBs is a linked list of SDBs which are free for use (bitmask is 0xFFFF).

HdrQueue is a linked list of header SDBs. Used by the SimbaReceiveDpc routine described below to locate newly received frames.

CmdQueue is a list of free command buffers which can be sent, when needed, to the INIC.

RspQueue is a circular queue of SDBs that contain response buffers used by the INIC. Note that we do not maintain a queue of data buffer SDBs. Data buffer SDBs are allocated from the free queue and given directly to the INIC. They are returned to us attached to header buffers so we do not need to keep track of them ourselves. This is described further below.

Figure 14:
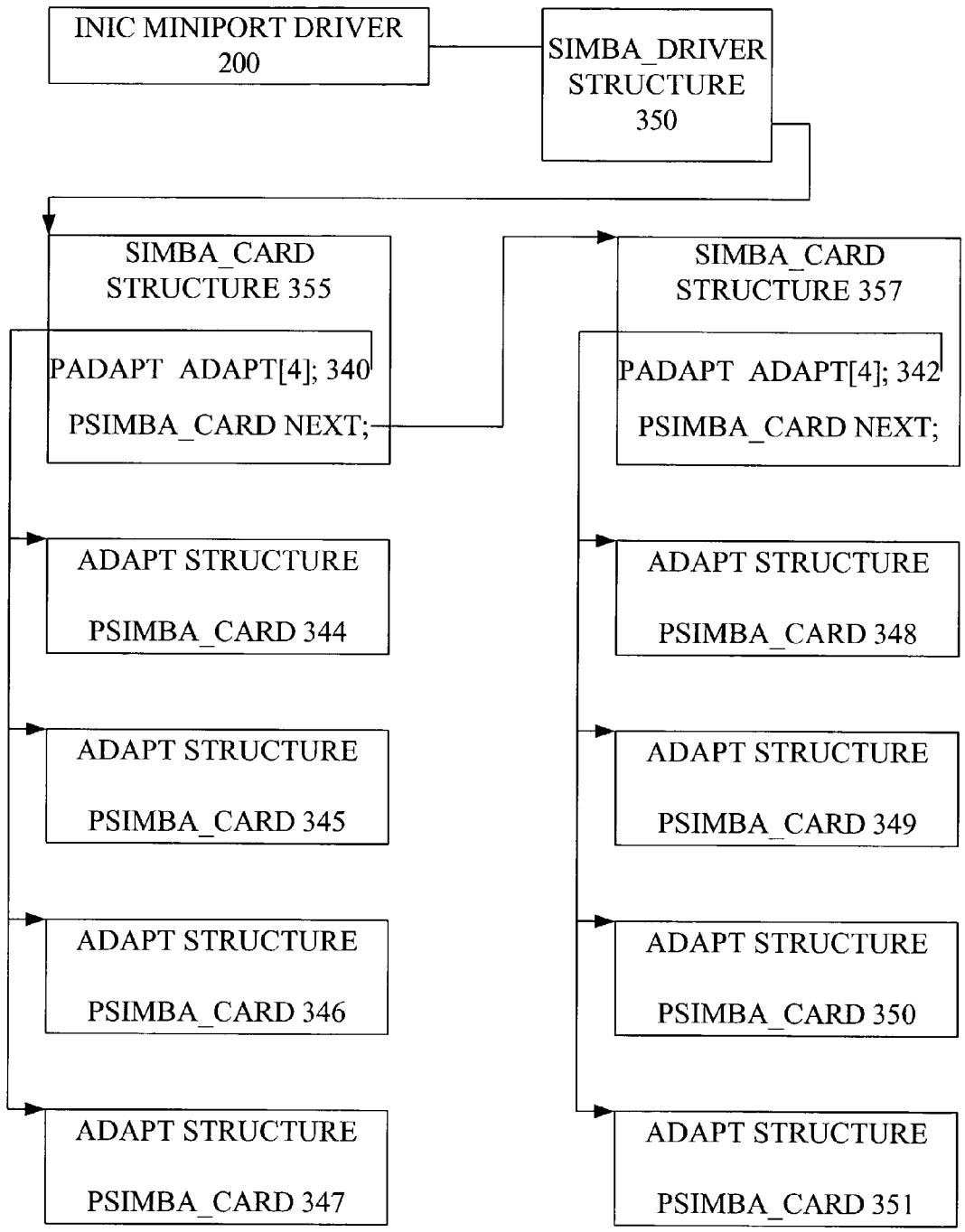
FIG. 14 is a diagram of an INIC driver connected to plural INIC cards each having plural network connections.

As shown in FIG. 14, in a given system, we maintain a single INIC driver 200. Associated with that INIC driver may be a number of INIC cards, each of which may contain, for example, four adapters. To keep track of this the driver maintains a structure that represents the driver called the SIMBA_DRIVER structure 350. The SIMBA_DRIVER structure is pointed to by the global variable SimbaDriver. Among the fields in the SIMBA_DRIVER structure is a pointer to a linked list of SIMBA_CARD structures (355, 357), each one representing an INIC PCI card. The SIMBA_CARD contains information about a particular card. This includes the state of the card (UP, DOWN, FAIL), the PCI slot number, the number of adapters on the card, the number of adapters initialized on the card, the number of adapters halted on the card, and other information. It also contains a 4-entry array of ADAPT structure pointers (340, 342). For each adapter on the card (there may be less than 4), an entry in this array is filled in with a pointer to the ADAPT structure which is used to represent that particular adapter. The ADAPT structure is the primary structure in the INIC driver and contains, among other things, the NDIS handle associated with the interface, a back pointer to the card structure, the index of the adapter on the card, a pointer to the base PCI address of the INIC registers, resources associated with the interface, etc. FIG. 14 shows an implementation having four adapters (344-351) on each of two INIC cards.

Every NT driver has a DriverEntry routine. For NDIS drivers, the main purpose of the DriverEntry routine is to register all of the expected driver entry points with NDIS. These entry points include MiniportInitialize (called during interface initialization), MiniportSend (called when a protocol driver wishes to send a frame), MiniportISR (called when an interrupt occurs), MiniportHalt (called when the driver is halted), and others.

We define SimbaInitialize as the MiniportInitialize routine for the INIC driver. The SimbaInitialize routine is called once for every INIC adapter in the system. Recall that an INIC adapter is an interface found on an INIC card. Thus SimbaInitialize can be called up to four times per card. The purpose of the SimbaInitialize function is to allocate and initialize the ADAPT and optionally the SIMBA_CARD structure, allocate resources needed by the interface, and perform any hardware initialization required to make the interface operational, as described in more detail below.

The oemsetup installation script, described below, stores a number of parameters into the registry for each INIC adapter installed in the system. These parameters include the following query registry parameters:

CardBase—This parameter serves as a unique identifier for the INIC card. This is set to the PCI slot number with the PCI bus number OR'd into the top bits.

CardIndex—Index of the adapter on the card (0-3 for the four port INIC).

CardSize—Number of adapters on the card.

BusNumber—Bus number on which the card resides.

SlotNumber—PCI slot number of the card

FunctionNumber—PCI function number of the adapter (0-3 for the four port INIC).

NetworkAddress—An optional, administrator defined, network address.

As noted above, the SimbaInitialize routine will be called four times per four-port INIC. For each time that it is called, we must allocate an ADAPT structure. On the other hand, we must only allocate a single SIMBA_CARD structure to represent the entire card. This is why we read the registry parameters before allocating the ADAPT and SIMBA_CARD structures. Having read the registry parameters, we search through the list of already-allocated SIMBA_CARD structures looking for one that has the same CardBase value as the adapter that we are initializing. If we find one, we simply link our new ADAPT structure into the Adapt array field of the SIMBA_CARD structure using the CardIndex parameter. If we do not find an associated SIMBA_CARD structure, then we allocate a new one, link in our ADAPT structure, and add the new SIMBA_CARD structure to the Cards field of the SIMBA_DRIVER structure.

Before the ATCP driver can talk to the INIC card it must configure the PCI configuration space registers. This involves calling the necessary NDIS functions to read the device and function ID's (used to verify that the information obtained from the registry is correct), read the memory base register, read the IRQ, and write the command register.

Note that that there is a PCI configuration space for every adapter on a INIC card (four for a four-port card). Thus we go through PCI configuration every time our initialization routine is called. There is one catch to this. While there is a configuration space header for every adapter, the bus master bit in the command register is only enabled for multifunction device 0. This can pose a problem. Assume that we have a four-port INIC, but the administrator has removed device 0. When we initialize PCI configuration space for devices 1, 2, and 3, bus mastering will not be enabled and none of the adapters will work. We solve this by enabling bus mastering for device 0 every time any of the interfaces is initialized.

The next step in the INIC initialization is to allocate all the resources necessary for a single interface. This includes mapping the memory space obtained from the PCI configuration space so that we can access the INIC registers, allocating map registers used to obtain physical buffer addresses, allocating non-cached shared memory for the ISR and other data, allocating pools of buffer and packet descriptors, allocating spinlocks, and registering the interrupt (IRQ) obtained from the PCI configuration space.

Note that we do not allocate SDBs at this time. SDBs are allocated on an as-needed basis and consequently are not allocated until the card is initialized and we are prepared to pass buffers off to it.

At this point in the initialization process the INIC hardware is initialized. When we begin interface initialization we check the state of the card (contained in the SIMBA_CARD structure). If the state is down (probably because we are the first interface on the card to be initialized), then we must perform INIC card initialization.

The first step in initializing the card is to reset and download the card. The reset is performed by writing to the reset register. This is a reliable hardware register, as opposed to one serviced by firmware. After reset the firmware on the card is running out of ROM. The ROM based firmware provides very little functionality besides assisting in the write-able control store download.

The firmware that is to be downloaded to the INIC is compiled into the driver as a set of static character arrays. These static arrays are found in the file simbadownload.c, which is created by the objtoc utility. Objtoc is an Alacritech utility used to convert metastep assembly code output to static arrays, each array representing a single contiguous block of firmware.

The download is performed by a series of three writes to the WCS register on the INIC. The first write is the address to be loaded, the second write is the bottom four bytes of the instruction, and the third write is the top four bytes of the instruction. We simply walk through each static array downloading the data contained in the array.

Note that the top bits of the address written in the first write to the WCS carry special meaning. Bit 30 tells the firmware to compare the instruction contained in the next two writes to the instruction already contained in the specified address. This is used to ensure that the download completed correctly. We first download all of the code, and then we download it all again with the bit 30 set in the address words. If the firmware discovers an error, it will place the address of the bad instruction into location zero of SRAM. After each "compare" sequence, the driver checks the location to determine if there was an error. If so, the driver fails the initialization. Bit 31 of the address word tells the firmware to jump to the specified address. We set this bit after the firmware has been successfully downloaded to start the normal INIC operation.

The INIC contains a single structure representing the configuration of the card. This structure typically resides in EEPROM or FLASH. The structure contains, among other things, the DRAM size of the INIC, the SRAM size of the INIC, and the MAC addresses of the adapters contained on the INIC.

This information is fetched from the INIC by issuing a Utility Processor Request (UPR) to the INIC firmware (UPRs are described below). The data returned by this UPR is contained within a shared memory structure pointed to by the SIMBA_CARD structure.

Once the INIC has been initialized, we can initialize a particular adapter on the card. This is done as follows:

At initialization time we queue the INIC with a set of header, data and response SDBs. We also pre-allocate a set of command SDB's and another set of free SDB's to avoid experiencing delays when we need to acquire more SDB's.

In order to configure a particular MAC interface on the INIC, we must first obtain information about the state of the PHY. We do this by issuing a Read Link Status Register (RLSR) UPR to the INIC firmware. This command completes asynchronously. When it completes, we save the information returned to us into the ADAPT structure. This information includes the link speed (10/100 mb), the "duplexivity" of the link (half/full), and the state of the link (up/down). With this information, we can configure the MAC configuration register, the MAC receive configuration register, and the MAC transmit configuration register. We also configure the MAC address registers with either the information returned from the INIC Configuration UPR described above, or, if the administrator has specified another MAC address, we use the specified address instead.

For a Device Reset, the NDIS defines two miniport driver entry points used to identify and reset a dead adapter. The MiniportCheckForHang routine is called periodically to check on the health of the adapter. If the adapter is sick, the CheckForHang routine returns true. Returning true causes NDIS to send a reset status indication to the bound protocol drivers, and to also call the driver's MiniportReset routine. The MiniportReset routine is responsible for restoring the adapter to an operational state. If the MiniportReset routine returns good status, the adapter is assumed to be back online, and NDIS will send a reset-complete status indication upstream.

SimbaCheckForHang is the MiniportCheckForHang routine for the INIC driver. SimbaReset is the MiniportReset routine for the INIC driver.

Some unique challenges are associated with a card reset for the present invention. First, as far as is known, we are the only multifunction network device in existence. There are other four-port cards, of course, but they are typically four individual devices behind a PCI-PCI bridge. Because our four adapters are all associated with a single device, we cannot reset a single adapter. Yet, since the CheckForHang and Reset functions get called for each of the four adapters on the card, if we determine that the card needs to be reset then each of the four driver instances must recognize that a reset has taken place and perform initialization. This poses a synchronization problem. The card, of course, must only be reset once. After reset, the card must be initialized once and all four adapters must be initialized individually. To ensure that all four instances of the driver recognize that a reset has occurred, and to perform re-initialization, we set the adapter state in the ADAPT structure to ADAPT_RESET for each interface on the card. When the CheckForHang function is called for each interface, it will check the adapter state to see if a reset has occurred. If the adapter state is set to ADAPT_RESET, it returns true.

A second challenge is core dumps. Most NICs have little or no software or firmware running on the card. We have a substantial amount of firmware, and like any other code, it is subject to bugs. When the card becomes non-operational, there is a good chance that it is the result of a firmware bug. We have interactive debuggers that can be used internally to diagnose the cause of a INIC crash, but there may be times when it is essential that we be able to dump the state of the card after it has crashed.

In this situation, the contents of the INIC registers, SRAM, DRAM, and possibly some queues will be dumped from the card. Since this amounts to many megabytes worth of data, we will need to move the data in blocks from the INIC to a file. NT allows a driver to create and write to a file from the kernel, but it must be done at passive level. Both the CheckForHang and the Reset routines run at dispatch level.

To get around this problem, we have introduced a "dump thread". The dump thread is a kernel thread that is started whenever a card structure is allocated (i.e. one thread per card). In the INIC driver, it is actually the dump thread, not that CheckForHang routine that monitors the state of the card. We have the dump thread do this because we want to be able to dump the contents of the card before a reset is initiated. The dump thread, upon finding a card dead, will attempt to perform the dump, and then it will set the card state to CARD_DOWN and set each adapter state to ADAPT_RESET. When the CheckForHang routine for each adapter finds the adapter state set to ADAPT_RESET, it will return true as described above, to begin the re-initialization process.

The MiniportShutdown routine for the INIC driver is defined SimbaShutdown. It is called at system shutdown time so that we can put the INIC into a known state. We simply issue a reset to the INIC when the shutdown routine is called.

SimbaHalt is the miniport halt routine for the INIC driver. It is called with the driver halted. It is responsible for freeing all of the resources associated with the particular adapter that is being halted. A trick with this routine is to keep track of which adapters on a particular INIC card have been halted. The last adapter to be halted must also free resources allocated for the INIC card (the SIMBA_CARD structure and the shared memory used to contain the INIC configuration). We keep track of which cards have been halted in the SIMBA_CARD structure.

SimbaQueryInformation is the MiniportQueryInformation routine for the INIC driver. SimbaSetInformation is the MiniportSetInformation routine for the INIC driver.

At present we support all of the required OIDs in the INIC driver. We have also added the following custom OIDs:

OID_SIMBA_ADD_IPADDR—Sent down from the ATCP driver to register an IP address with the INIC driver. The INIC driver uses these addresses by determine which way to direct incoming traffic. This is discussed further below.

OID_SIMBA_REMOVE_ILPADDR—Used to remove an IP address added with OID_SIMBA_ADD_IPADDR.

OID_SIMBA_GET_STATS—A query from the ATCP driver to obtain statistics maintained on the INIC adapter. This is discussed further below.

OID_SIMBA_ATK_GLOBALS—Sent down from the ATCP driver to pass shared memory information. This is primarily used for tracing. This too is discussed further below.

For message transmission, we label the MiniportSendPackets routine for the INIC driver SimbaSendPackets. It is called with an array of NDIS packet descriptors, which have been passed down to us by an upper level protocol driver (ATCP, MS TCP, IPX, etc).

For each packet contained in the array of packet descriptors we perform the steps described below.

First, we check for errors. There are a number of reasons why we may fail to send a packet. The reasons that we may fail to send a packet are as follows:

Microcode diagnostics are enabled—We provide a set of diagnostics that allow us to exercise the INIC microcode in a controlled loop-back environment. If these diagnostics are enabled, then we do not allow any of the standard protocol routines to send data. We fail immediately by setting the packet status to NDIS_STATUS_FAILURE.

Link or Adapter State is not up—If the Link State or the Adapter State is down, we cannot send any packets. We fail immediately by setting the packet status to NDIS_STATUS_FAILURE.

Zero-length packet—Strictly speaking, this is not an error. If we encounter a zero length packet we complete it successfully immediately.

Insufficient map registers—We need a map register for every NDIS buffer in the packet. If we do not have enough map registers, then we can not send the packet. We fail immediately by setting the packet status to NDIS_STATUS_RESOURCES.

No command buffer—If we need a command buffer and cannot allocate one we fail immediately by setting the packet status to NDIS_STATUS_RESOURCES.

The code that interacts with the INIC hardware is separated from the code that interacts with NDIS. The code that interacts with the INIC hardware is contained in the SimbaTransmitPacket routine as a call SimbaTransmitPacket. We separate it in this manner so that the microcode diagnostics (which run outside the context of NDIS), can share the same transmit code as the normal path.

Command buffers contain many different types of information. For slow-path frames, for example, command buffers contain information about the address and length of the frame to be sent. Command buffers may also be used to hand a context from the ATCP driver out to the INIC, or to force a flush of a context from the INIC. For these and other purposes, the ATCP driver needs to be able to set the command buffer up itself. Thus, command buffers may be allocated in two areas. Any calls to SimbaSendPackets from the ATCP driver contain an ATCP allocated command buffer. Any calls from other drivers, such as MS TCP, just contain raw data (a network frame). For the calls that already contain a command buffer, we must simply pass the command buffer off to the INIC. For other calls, we must allocate our own command buffer and configure it appropriately.

It is thus important to identify whether or not a packet is a normal frame or, as shown in FIG. 15, the packet 360 contains an ATCP command buffer 362. Our solution to this is in the ATCP driver we prepend an ethernet header 366 to the command buffer. This ethernet header is located in a separate chunk of memory (with a separate NDIS buffer descriptor) and contains an ethernet type field of 0x666. This value was chosen not only because of its spooky nature, but also because it is too large to be an 802.3 length, and too small to be a valid ethernet type field. It is a value that we never expect to see handed to us in a frame from MS TCP, IPX, Appletalk, or any other protocol driver.

Sending command buffers that have been given to the INIC driver by the ATCP driver is relatively simple. The INIC driver maps the command buffer to obtain the command buffer's physical address, flushes the command buffer and hands it to the appropriate transmit queue on the INIC.

Several types of commands may be sent to the receive processor of the INIC instead of the transmit processor. These commands include the release context command (IHCMD_RLS_CTXT) and the receive MDL command (IHCMD_RCV_MDL). The INIC driver examines the command buffer and if the command is one of these types, hands the command buffer to the receive processor.

Note that the INIC driver does not reference any fields in the command buffer after it has been flushed.

As illustrated in FIG. 16, normal frames can contain any number of buffers with many different types of data such as buffer 1 370 and buffer 2 371. When the INIC driver receives a normal frame it first allocates and initializes a command buffer 373 of its own. The INIC driver obtains this from the CmdQueue in the ADAPT structure. It then maps every buffer descriptor attached to the packet to obtain the physical address of the buffer, and then fills in the command buffer with these physical addresses, e.g. buffer descriptors 374 and 375 for frames 376 and 377.

The INIC driver also flushes each buffer associated with the packet to maintain cache coherency. After we have filled the command buffer in with the complete list of buffers, we must then map and flush the command buffer itself and hand the physical address of the command buffer off to the INIC.

After we have sent all of the packets in the packet array, we check to see if we have exhausted any of the command SDBs. If so we attempt to allocate replacement SDBs and requeue them to the CmdSDB queue.

After a command issued to the INIC has completed, the resources held by the command must be freed and the corresponding send, which initiated the command, must be completed. This is performed in the SimbaXmtDpc routine.

As described above, commands are completed by the INIC by filling in a response buffer. The reason that we do this instead of simply setting a completion flag in the command buffer is because commands can be completed out of order. Some commands, like one to transmit 64 k of SMB data, will take much longer than a command to transmit 100 bytes of data.

The command buffer contains a "HostHandle" field, which is filled in with the virtual address of the command buffer. When a command completes, the INIC firmware puts this address into the response buffer.

Response buffers are returned to us in order, so the first thing that the SimbaXmtDpc routine does is to locate the next expected response buffer. If the status indicates that it has been filled in by the INIC, we locate the completed command buffer from the HostHandle field.

At the end of the command buffer, we keep a bunch of information that is not passed to the INIC. Among this information is the list of map registers used to obtain physical buffer addresses. We use this list to free the map registers.

In the Transmit description above two types of sends are mentioned, one in which the ATCP driver allocates a command buffer, and another in which the INIC driver allocates a command buffer. Clearly, if the INIC driver allocated the command buffer, the INIC driver must also free it, yet if the ATCP driver allocated it, the INIC driver must not. We determine this by saving a pointer to the SDBHANDLE at the end of the command buffer. If it is an ATCP driver allocated command buffer, there will be no SDBHANDLE set in the psdbh field of the command buffer.

NDIS defines two routines used in interrupt handling. The first is the MiniportISR routine. It is called at interrupt level and its purpose is to determine if the interrupt is associated with its device and if so, mask the interrupt and tell NDIS to schedule the MiniportHandleInterrupt routine. The MiniportHandleInterrupt routine runs at DPC level and performs the bulk of the interrupt processing.

SimbaISR is the MiniportISR routine for the INIC driver. SimbaHandleInterrupt is the MiniportHandleInterrupt routine for the INIC driver.

Note that most PCI devices maintain an interrupt status register on the card. When an interrupt occurs, the driver must read the value of the ISR from PCI. Since reading data from the PCI bus is an expensive operation, we sought to optimize this by putting interrupt status in a host-memory based interrupt status "register". This memory-based ISR is contained in the non-cached shared memory region allocated per interface.

There are some concerns however when using a memory-based ISR. Race conditions can occur when the host driver is clearing status, while the INIC card is writing status. To keep this from happening, we have introduced a strict protocol. The INIC is not allowed to write to status to the memory-based ISR until the driver has responded to previously written status.

The SimbaISR routine first checks its memory-based ISR to see if any events are set. If not it tells NDIS that it does not own the interrupt. Otherwise, it sets the contents of the memory-based ISR aside, zeros the memory-based ISR and masks interrupts from the INIC. Note that even though we have masked interrupts, our ISR routine may get called again as the result of an interrupt being generated by another device that shares the same interrupt line. For this reason, we zero the memory-based ISR to prevent us from getting confused.

The SimbaHandleInterrupt routine checks every possible bit of the interrupt status that we set aside in SimbaISR, and responds appropriately. This includes calling the SimbaRcvDpc routine in the case of a receive event, SimbaXmtDpc in the case of a command completion event, etc.

After all of the events have been processed, we clear the events on the INIC by writing to the interrupt status response register. This will clear the way for the INIC to send us new status. We then also unmask the interrupts. Note that we must not unmask the interrupts until we write to the interrupt status response register. Otherwise, the INIC will give us an interrupt for the events that it has already sent to us.

Receive data is passed from the INIC to the host by filling in a header buffer. The header buffer contains information about the data, such as the length. If the data is small enough, the header buffer also contains the data itself. Otherwise, the data is contained in a corresponding data buffer. If the data resides in a data buffer, the header buffer will contain a pointer to the SDBHANDLE structure associated with the data buffer. Furthermore, the offset of the buffer within the SDB is placed in the bottom bits of the pointer to the SDBHANDLE structure.

FIG. 17 shows an example of a receive header 400 and data buffer 402. In this example, the buffer field 404 of the header buffer 406 contains the address of the data SDBHANDLE 408 structure (0x1000) with the bottom bit set to indicate that the data buffer is at offset 1 within the two part data SDB.

After the INIC fills in the header, and possibly data buffer 411, it notifies the host by setting the ISR_RCV bit in the memory based ISR and raises an interrupt. The SimbaHandleInterrupt routine in the driver calls the SimbaRcvDpc routine to process the received frames.

The INIC driver maintains a queue of header SDBs, each of which contain 16 header buffers. The head of the HdrQueue is the current SDB being worked on, and the SDBHANDLE structure for that SDB contains the offset of the next expected header buffer within the SDB (header buffers are returned to the driver in the order that they were presented to the INIC). Each valid header buffer found by the INIC driver is dequeued and processed. A buffer is dequeued by bumping the offset within the SDBHANDLE structure. Once all of the header buffers within an SDB are exhausted, we dequeue the SDB from the HdrQueue and start over again at the top of the next SDB. A header buffer is determined to be valid by checking the status field. The status field is cleared when the header buffers are passed to the INIC. The INIC sets valid bit of the status field when a buffer is returned to the INIC driver.

If an error exists in the frame, the INIC sets the IRHDDR_ERR bit in the status word, and forwards the receive frame status words to the host. These status words are generated by the INIC hardware and placed in front of the receive frame. For more details regarding these status words, refer to the sections regarding the INIC hardware specification.

In the event of an error, the SimbaRcvDpc routine increments the appropriate statistics field in the ADAPT structure, and then drops the received frame.

If the INIC driver receives a normal network frame, it needs to ensure that it is configured to receive the frame. We do this by calling the SimbaMacFilter routine. If we are running in promiscuous mode, then this routine always returns true. If the destination MAC address equals our MAC address and we are configured for directed mode, then we also return true. Or, if the destination MAC address is a broadcast address and we are configured to receive broadcast packet, then we return true as well.

Multicast frames are a bit trickier. When the INIC driver receives a OID_802_3_MULTICAST OID in the SimbaSetInformation routine, it downloads a 6-bit hash of the multicast address to the INIC firmware. This 6-bit hash is generated by computing the 8-bit CRC polynomial generated by the MAC core and masking off the top two bits. When the firmware hands a multicast frame to us, we must ensure that we are configured to receive the multicast frame by checking for a perfect match against our list of multicast frames. If a match occurs, and we are configured to receive multicast frames, then the SimbaMacFilter routine returns true.

There are three types of received frames that we must handle in the SimbaRcvDpc routine: 1) fast path frames (or messages), 2) slow path TCP frames, and 3) other frames.

Fast path frames are identified by the IRHDDR_TVALID bit in the status word. It means that the header buffer (and possibly data buffer as well), contains a frame or message associated with a fast path connection on the INIC. Under these circumstances we must send the received frame strictly to the ATCP driver.

If the IRHDDR_TVALID bit is not set, then the header buffer, or associated data buffer, contains a normal network frame. If the network frame is a TCP frame for one of the network interfaces in our system, then the INIC driver needs to send the frame up to the ATCP driver. This is a slow path TCP frame. Otherwise the INIC driver needs to send it up to the Microsoft TCP driver. Note that we only send the frame up to the ATCP driver if it is a TCP frame that is destined for one of our interfaces. We must check the destination IP address because if is not destined for one of our interfaces, then the frame needs to be routed. Frames that need to be routed are done so via the normal Microsoft TCP stack. Note also that we forward the frame up to the ATCP driver if the frame is destined for any interface in our system, not just the INIC interfaces. This is because if the frame came in on our interface, it is likely to go out on our interface. Under these circumstances, we must handle it in the ATCP driver.

Frames that are sent from the INIC driver to the ATCP driver are done so by calling SimbaIndicateHeader. Frames that are sent up to the normal TCP driver are done so by calling SimbaIndicateData.

When we wish to send a frame up to the ATCP driver via a SimbaIndicateHeader, we do so by sending up the entire header buffer. We do this because the header buffer may contain information that is important to the ATCP driver. In order to send the header buffer exclusively to the ATCP driver we have to do two things.

First, in order to prevent the normal TCP driver (or any other driver) from attempting to parse the frame, we must make the frame look like something that it doesn't want to touch. Remember that the drivers above an ethernet miniport driver expect an indicated frame to begin with an ethernet header, and thus expect an ethernet type field to be at a twelve byte offset within the frame. We trick the other protocol drivers by setting this "type" field to 0x666 (the same value used to identify an ATCP command buffer in the transmit path).

The second thing that we must do is to get the frame past the NDIS filtering. NDIS performs ethernet frame filtering for us. If we send up a frame that does not have the destination MAC address field set to our interface's MAC address, NDIS will drop it. There are two ways to deal with this. The first is to set the NDIS filtering to promiscuous mode. This way all frames are received by the protocol driver. This is undesirable because NDIS will then forward all outgoing frames back up to the ATCP driver. The other way is to set the first 6 bytes of the header buffer (the destination MAC address) to our interfaces MAC address. While this does require a 6-byte copy for every frame received, this was determined to be the best approach.

Figure 18:
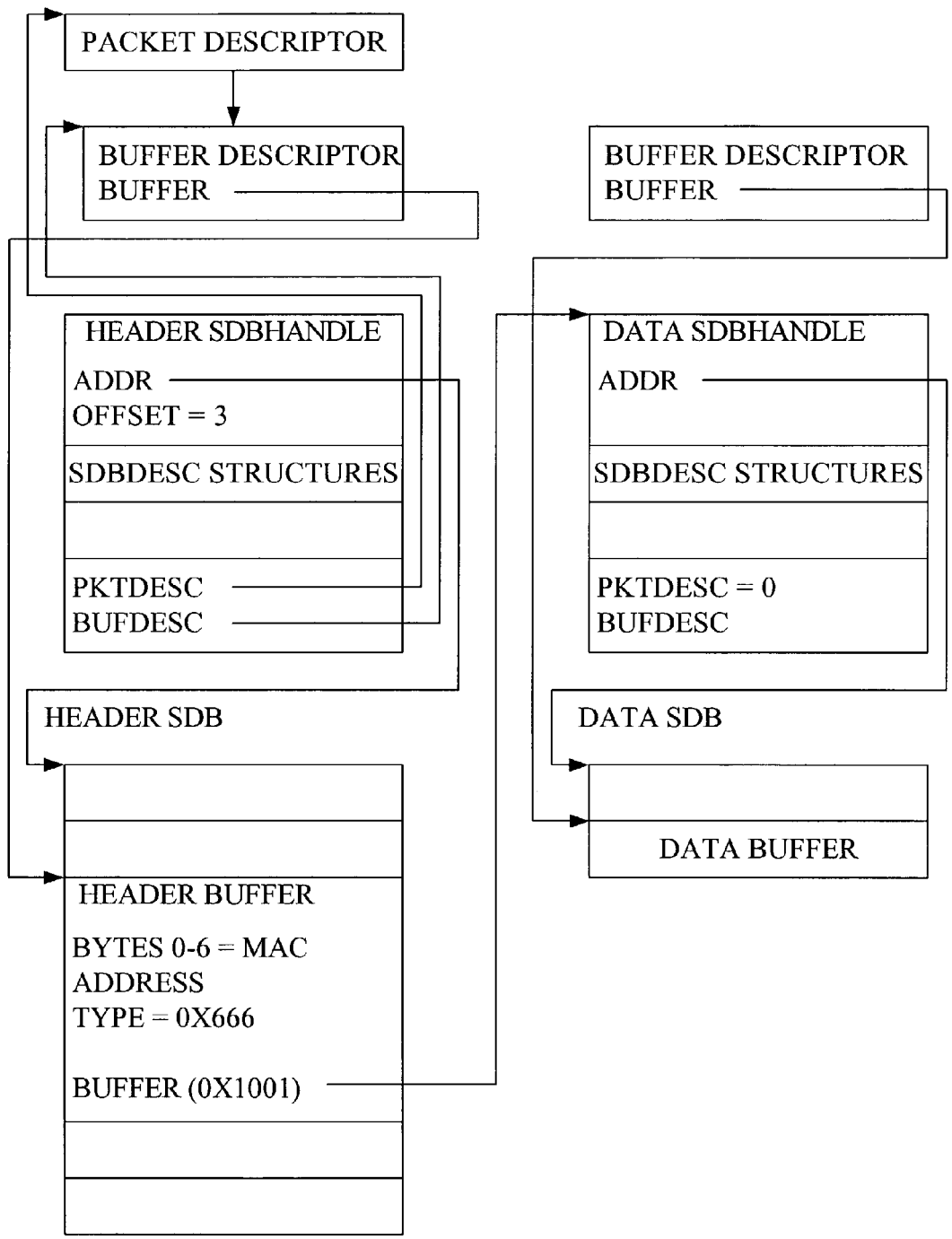
FIG. 18 shows the mapping of header buffer and data buffer descriptors for a received packet.

In order to indicate the header buffer, and possibly data buffer, upstream, we first map the buffers using NDIS buffer and packet descriptors. Recall that for each header buffer we pre-allocate an NDIS buffer and packet descriptor, while for each data buffer we pre-allocate just a buffer descriptor. We use these pre-allocated buffer and packet descriptors here to map the buffer(s) and send them upstream. FIG. 18 illustrates the relationship between all of these structures.

When indicating data we only want to send up the data portion of the frame alone. Recall that data can either reside in the header buffer itself, if it is small enough, or in an associated data buffer. If the data resides in the header buffer, then we adjust the buffer descriptor such that it points to the data portion of the header buffer (beneath the status word, etc). Conversely, if the data resides in the data buffer, we use the buffer descriptor associated with the data buffer to point to the data buffer, and we use the packet descriptor associated with the header buffer to point to the data buffer descriptor. After setting everything up we then free the header buffer, and the buffer descriptor associated with it.

Once we have completed processing incoming data, we replace any completed header and data SDBs by issuing new SDBs to the INIC. Note that we do this immediately, rather than waiting for the ATCP or other protocol driver to return the buffers to us.

In NDIS version 4, there are two ways in which a miniport driver can indicate data to a protocol driver above it. The first method is performed by calling NdisMEthIndicateReceive. With this method, the data passed up is copied immediately into memory allocated by the protocol driver. Thus, when the call is complete, the memory used to contain the data can be freed. While this is simple from a resource management perspective, it is horribly inefficient. The second method is performed by calling NdisMIndicateReceivePacket. With this method, the packet passed up is held by the protocol driver until it has completed processing the entire data. With this method, we need a way of returning the completed packets back to the miniport driver so the miniport driver can free the memory. This is done via a call to NdisReturnPackets, which results in a call to the MiniportReturnPacket handler.

SimbaReturnPacket is the MiniportReturnPacket handler for the INIC driver. Note that the packet being returned to us contains a header and/or a data buffer. As we described above, in order to free a header buffer or data buffer, we must have a pointer to the SDBHANDLE structure, and we must also know the buffer offset within the SDB. Both of these values are saved in the ProtocolReserved field of the packet descriptor. The ProtocolReserved field is a section of memory within the packet descriptor that is reserved for use by the miniport driver.

To send and receive frames (and commands) from the INIC we use the mechanism described above regarding the host interface strategy for the Alacritech INIC. Beyond this, however, we also need a mechanism to receive other miscellaneous types of information from the INIC. This information includes statistics, link status (discussed above), and INIC configuration information. To perform this function, we use a set of commands called Utility Processor Requests (UPRs).

UPRs are handled exclusively by the utility processor on the INIC. Each UPR command is initiated by writing to the corresponding register on the INIC. The address written to the register tells the INIC where to place the data. For example, if we wish to fetch the INIC configuration from the INIC, we write the address of the INIC configuration shared memory space to the RCONFIG register of the INIC.

UPRs complete asynchronously by setting a bit in the ISR, and setting an interrupt. Because there is no identification as to which UPR has completed, we only keep one UPR outstanding per interface at any given time. If a UPR is already in progress, then a subsequent UPR will be queued behind it. When the pending UPR completes, the queued UPR will be issued.

NT requires that an NDIS driver provide the following statistics: successful transmits, successful receives, transmit errors, receive errors, dropped receives (no buffer), and transmit collisions.

The majority of these statistics are maintained on the INIC. When the INIC driver receives a QueryInformation call for one of these statistics, we issue a stats UPR command to the INIC and return pending. When the UPR completes we in turn complete the pending QueryInformation call with the requested information.

The Microsoft stack maintains a number of statistics about each interface such as multicast receives, broadcast receives, unicast receives, multicast transmits, etc. It also maintains TCP level statistics such as the number of segments sent and received, and the number of TCP bytes sent and received. Since the INIC offloads the TCP stack from the NT system, we can not maintain these statistics in the ATCP driver. Instead, we maintain most of these statistics on the INIC itself. When the ATCP driver requires these statistics, it issues an OID_SIMBA_GET_STATS OID to the INIC driver. The INIC driver again fetches these statistics by issuing a UPR to the INIC and returns the statistics back to the ATCP driver.

The INIC keeps track of received TCP segments and bytes by simply looking at the protocol field of the IP header. It does not, however, examine the destination IP address. It is possible that one of the received TCP frames may need to be forwarded back out another interface. In this case, the frame never reaches the TCP layer, and thus, it should not be reflected in the TCP statistics. We adjust for this in the INIC driver when we discover that a frame is not associated with any of the interfaces in our system.

There are a number of other statistics that we maintain in the ADAPT structure explicitly for the purpose of debugging. These include counters of just about any error condition, or error frame encountered in the INIC driver. It also includes various other counters, such as interrupt and event counters, that we may use later to tune and optimize the driver.

Two families of diagnostics are specified, hardware diagnostics, and firmware diagnostics. The hardware diagnostics are split into several applications, engineering hardware diagnostics, manufacturing diagnostics, and customer diagnostics.

Each of the firmware and hardware diagnostic applications requires a way to communicate directly with the INIC. To do this we provide a set of standard device driver entry points in our INIC NDIS driver. We accomplish this by saving the NDIS entry points that are found in our DriverObject structure, and replacing them with our own open, close, write, read, and ioctl routines. When one of these routines is called, we check the device extension of the device object that is associated with the call. If the extension is not associated with our diagnostic device, then we pass the call off to the saved corresponding NDIS routine. Otherwise we intercept and handle the call directly.

The firmware diagnostics provide a mechanism to exercise and verify some level of INIC microcode functionality. By putting the INIC into loopback mode, we can send and receive slow-path frames. To ensure that we are exercising as much of the final product as possible with these diagnostics, we also use the majority of the INIC driver transmit and receive code.

To send data passed down from the diagnostic application, we allocate a chunk of memory used to contain the users data, and another chunk of memory, which we will use as a command buffer. We copy in the user's frame our allocated memory and initialize the command buffer. We then map the command buffer and a statically allocated ethernet header with NDIS buffer and packet descriptors and call the SimbaTransmitPacket routine to send the data.

Note that in allocating our own command buffer and prepending it with a separate ethernet header (containing a type of 0x666), we are pretending to the SimbaTransmitPacket routine to be the ATCP driver sending down a command buffer (see the ATCP Command Buffer description above).

The SFWDiagSend routine will return success to the user immediately, rather than waiting for the INIC to respond to the command buffer. This allows the diagnostic application to get many transmit commands operating in parallel.

When we receive a command completion event from the INIC, the SimbaHandleInterrupt routine calls the SimbaXmtDpc routine. If the SimbaXmtDpc routine finds that diagnostics are currently running, it will pass the completion off to the SFWDiagSendComplete routine. The SFWDiagSendComplete will simply free the resources allocated by SFWDiagSend.

When we are running in diagnostic mode, the SimbaRcvDpc routine calls the SFWDiagIndicateData routine instead of NdisIndicateReceivePacket when a packet has arrived. The SFWDiagIndicateData routine places the received packet on a queue and issues an event to wake up any thread that might be waiting in SFWDiagRecv.

The SFWDiagRecv routine is called by the diagnostic application to receive an expected frame. It waits for a received frame to be indicated by the SFWDiagIndicateData routine and then dequeues the frame from the diagnostic receive queue. The data contained in the packet is copied out to the user, and the packet is then returned by calling SimbaReturnPacket.

Hardware diagnostics are used to verify the functionality of the INIC hardware. To do so requires that we run special diagnostic microcode on the INIC. When hardware diagnostics are initiated, the INIC driver resets the INIC card and downloads the diagnostic microcode. After the user exits hardware diagnostics, the INIC is put back into operational mode by downloading the standard microcode and re-initializing the card and interfaces.

Nearly every function entry and exit in the INIC driver can be traced using the SIMBA_TRACE tracing facility. Furthermore, every notable event, such as an error, is traced as an important or critical trace event. The SIMBA_TRACE facility keeps a circular log of trace events in system memory. It can be disabled with a compile time option so that in the production driver there is no performance impact.

The SIMBA_TRACE facility is set up so that a common buffer is used to track events from both the ATCP and INIC driver. This is achieved by passing the common buffer address using the OID_SIMBA_ATK_GLOBALS set OID.

For installation, the INIC driver searches for newly installed cards by calling the GetPCIInformation utility with the vendor and device ID of the INIC device. For each four-port INIC, GetPCIInformation should return four separate devices, each with a unique function number (0-3). For each device returned by GetPCIInformation we must check to see if it is already installed before proceeding with the installation. Typically this would be as simple as calling the IsNetCardAlreadyInstalled utility, but Microsoft apparently thought that no one would ever write a multifunction networking card, so they didn't put multifunction support in the utility. We have then combined the functionality of the IsNetCardAlreadyInstalled utility and support for multifunction devices to our own version of the utility.

Having determined that we have not already installed the device, we set the CardBase to the slot number of the card, with the high order bits set to the bus number. This is somewhat more confusing then setting it to the base network number, as is done in the VPCI phase, but it is more permanent in the event that an administrator starts installing and de-installing adapters. We also save the bus number, slot number and function number separately, along with the size of the card and the index of the adapter within the card.

The bulk of the source code for the INIC driver is located in the driver/simba directory in the source tree. Other miscellaneous header files are scattered about in other directories as specified below.

The following files are found in the Simba source directory:

simba.c—Contains the DriverEntry routine for the INIC driver, simba.h—The main header file for the INIC driver, this contains the SIMBA_DRIVER, SIMBA_CARD and ADAPT structures, as well as many other structures and definitions, simbamini.c—The miniport entry points and related functions, simbamisc.c—Miscellaneous support routines for the INIC driver. Contains most of the initialization and buffer management code, endian.h—Endian swapping definitions used when parsing network frame headers, simbadownload.c—The microcode download for the INIC. This is a two-dimensional statically defined character array generated by the objtoc utility, simbaproto.c—The protocol driver routines for an initial (VINIC) phase of the driver, this is not included in an intermediate (VPCI) or FINAL phase of the driver, vpci.c—The entry points for VPCI requests, vpci_driver.h—Definitions used to create and parse VPCI network requests ne2000.c—The DriverEntry and miniport routines for the ne2000 portion of the INIC VPCI driver, ne2000sw.h—The main software definitions for the ne2000 portion of the INIC VPCI driver, ne2000hw.h—The hardware definitions for the ne2000 NIC card.c-Low-level ne2000 network card routines, interrupt.c—Interrupt, transmit and receive routines for the ne2000 portion of the INIC VPCI driver, diag.c—Hardware and firmware diagnostic routines, diag.h—Definitions used by the diagnostic routines, diagdownload.c—The diagnostic microcode download for the INIC. Also a two dimensional array generated by the objtoc utility, oemsetup.*—installation scripts for the VINIC, VPCI, and FINAL phase of the INIC driver, precomp.h—Precompilation header file containing all of the included header files, sources.*—compilation directives for the VINIC, VPCI and FINAL phase of the driver, update.bat—A quick and dirty batch file used to update drivers on a test machine, buildit.bat—A quick and dirty batch file used to build and install the INIC driver, config.bat—A quick and dirty batch file used to configure the INIC driver for the VINIC, VPCI, or FINAL phase.

Other relevant files include:

driver/include/simbahw.h—Contains definitions about the INIC hardware and firmware, driver/include/pci h—Contains general PCI configuration space definitions, driver/include/simbamisc.h—Contains miscellaneous software definitions shared between the INIC and ATCP driver, tools/diag/include/diagctl.h—Contains definitions shared between diagnostic applications and the diagnostic portion of the INIC driver, tools/include/vpci.h—Contains definitions about VPCI commands. Shared by other VPCI users such as the AGDB utility.

The next several pages describe the design of the microcode that executes on the microprocessors of the INIC. The overall philosophy of the INIC is discussed above, while the detailed configuration is described below, leaving this section to discuss the INIC microcode in detail.

The following acronyms are defined for the INIC microcode:

ACK=Transport layer acknowledgement;
BC=Broadcast frame;
CCB=Communications Control Block; a block of control information passed between the host and the INIC to control a connection;
FSM=Finite state machine; a state/event matrix giving action and next state;
ISR=Interrupt Status Register;
LRU=Least Recently Used; used in the SRAM CCB buffer cache;
MC=Multicast frame;
MSS=Maximum segment size;
PST=Persist timer;
RTR=Retransmission timer.

As specified in below, the INIC has a set of 3 custom processors (CPUs) that provide considerable hardware-assist to the microcode running thereon. The following paragraphs list the main hardware-assist features.

The INIC has 32 hardware queues whose sizes are user-definable; they can be used in any manner by the CPUs (and the hardware) for passing 32-bit pointers/events around without interlock issues when adding or removing entries from the queues (e.g., DRAM free-buffer queues, receive-frame queues etc.).

The INIC also has a Receive hardware sequencer that completely validates an input header as the frame is being received by the MAC, validates TCP and IP checksums, generates a frame status and a context lookup hash, moves the frame into a DRAM buffer and queues the frame address and status for processing by the Receive CPU into one of the hardware queues mentioned above.

A set of Transmit sequencers work from the above-mentioned queues to transmit frames. Like the Receive sequencers, there is one Transmit sequencer per interface.

The INIC also has a custom 32-bit protocol processor that is effectively 3 CPUs using shared hardware in a 3-level pipelined architecture. The protocol processor provides separate instruction and data paths to eliminate memory contention.

Multiple register contexts or process slots are provided with register access controlled by simply setting a process register. The protocol processor provides 512 SRAM-based registers to be shared among the 3 CPUs in any way desired. The current implementation uses 16 processes of 16 registers each, leaving 256 scratch registers to be shared. This includes a set of CPU-specific registers that are the same local-cpu register number, but for which the real register is determined by an offset based on the CPU number; this allows multiple CPUs to execute the same code at the same time without register clashes or interlocks. These registers are a part of the above-mentioned scratch pool.

A specialized instruction set is provided to the CPUs to assist network processing: endian-swap instructions, a hash instruction to generate hash indexes, embedded interlocks and instructions to set them, and a hardware-implemented LRU mechanism.

Seven separate DMA engines are built into the INIC hardware. The one to be used at any time is defined by the source and destination e.g., from SRAM to PCI, from DRAM to SRAM; the DMA works off 32 descriptors in SRAM, and at present, the code allocates one descriptor permanently to each process. Completed DMAs are determined by simply inspecting the Channel Events register.

The following design choices were made in the current implementation. RECEIVE processing is run on one CPU, TRANSMIT processing on another and the third CPU is used as a UTILITY and DEBUG processor. Splitting receive and transmit was chosen as opposed to letting 2 CPUs both run receive and transmit. Initially one of the main reasons for this was that the planned header-processing hardware could not be shared and interlocks would be needed to do this. However, the receive hardware CPU now runs completely independently, and passes frames to the Receive CPU via a hardware queue described above, rendering the above issue moot. A good reason now for separating the processor functions is that parts of the code depend on the exclusive use of some shared resources by a particular CPU and interlocks would be needed on them. It is expected that the cost of all these interlocks would be fairly high, but perhaps not prohibitive. Another reason is that the CPU scratch registers have been carefully divided between the 3 CPUs. If multiple CPUs executed receive processing for example, then they would be using each other's scratch registers.

The INIC supports up to 256 TCP communication control blocks (CCBs). A CCB is associated with an input frame when the frame's source and destination IP addresses and source and destination ports match that of the CCB. For speed of access, there is a CCB index in hash order in SRAM. The index can be searched based on the hardware-generated hash to find a CCB entry that matches the frame. Once a match has been found, the CCB is cached in SRAM. There are up to 16 cached CCBs in SRAM. These cache locations are shared between both CPUs so that the CPU with the heavier load will be able to use more cache buffers. There are 8 header buffers for receive and 8 command buffers for transmit to be shared among the processes on the CPUs. Note that each header/command buffer is not statically linked to a specific CCB buffer. Instead the link is dynamic on a per-frame or per-command basis. The use for this dynamic linking will be explained in later sections.

Two basic processor implementations were considered: a single-stack and a process model. The process model was chosen here because the custom processor design is providing near zero-cost overhead for process switching through the use of a process base register, and because there will be more than enough process slots available for the peak load. It is also expected that all "local" variables will be held permanently in registers whilst an event is being processed. The features that provide this are:

256 of the 512 SRAM-based registers are used for the register process slots. This is divided into 16 process slots of 16 registers each. Then 8 of these are reserved for receive and 8 for transmit. A Little's Law analysis has shown that in order to support 512 byte frames at maximum arrival rate of 4*100 Mbits, requires more than 8 jobs to be in process in the NIC. Each job requires an SRAM buffer for a CCB context and at present, there are only 16 of these, 8 per CPU, due to SRAM limitations. So more process slots (eg 32*8 regs each) do not seem worthwhile.

A process context switch simply involves reloading the process base register based on the process to be restarted, and jumping to the appropriate address for resumption. To better support the process model chosen, the code locks an active CCB into an SRAM buffer while either CPU is operating on it. This implies there is no swapping to and from DRAM of a CCB once it is in SRAM and an operation is started on it. More specifically, the CCB will not be swapped after requesting that a DMA be performed for it. Instead, the system switches to another active process. Once the DMA is complete, it will resume the former process at the point directly after where the DMA was requested. This constitutes a zero-cost switch as mentioned above.

Receive and transmit processing on an individual CCB are each controlled by separate state machines; the state machines are run from within a process.

The initial INIC has 16 MB of DRAM. Utility initialization microcode divides a large portion of this into 2K buffers that will be queued to the Q_FREEL hardware queue. These queues are also used to control small host buffers, large host buffers, command buffers and command response buffers, events from one CPU to the other, etc.

Each CPU handles its own timers independently of the others; there are 2 timer bits in the General Events register which are both set to 1 every 2 milliseconds and can be cleared independently; so Receive and Transmit CPU's effectively each have their own timer bit. As described above, contexts (CCBs) are passed to the INIC through the Transmit command and response buffers. INIC-initiated CCB releases are handled through the Receive small buffers. Host-initiated releases use the Command buffers. There is strict handling of the acquisition and release of CCBs to avoid windows where for example, a frame is received on a context just after the context was passed to the INIC, but before the INIC has "accepted" it, as described in detail above.

The initial implementation of the INIC may not handle T/TCP connections, since they are typically used for the HTTP protocol and the client for that protocol typically connects, sends a request and disconnects in one segment. The server sends the connect confirm, reply and disconnect in his first segment. Then the client confirms the disconnect. This is a total of 3 segments for the life of a context. Typical data lengths are on the order of 300 bytes from the client and 3K from the server. The INIC will provide as good an assist as seems necessary here by checksumming and validating the frame. The latter is only likely when data is forwarded with a request such as when a filled-in form is sent by the client. Note however that the INIC will support HTTP over a normal TCP connection in fast-path mode. Also note that later implementations handle T/TCP, SPX and UDP.

Table 2 summarizes SRAM requirements for the Receive, Transmit and Utility CPUs:

TABLE 2

| Hardware use (DRAM FIFOs etc) | | 5120 |
|---|---|---|
| CCB buffers | 256 bytes * 16 | 4096 |
| CCB headers | 16 bytes * 256 | 4096 |
| Header buffers | 128 bytes * 8 | 1024 |
| Command buffers | 128 bytes * 8 | 1024 |
| Debugger/Stats etc | | 1024 |
| | | 16K bytes |

As described above, the host determines when a TCP connection is able to be handed to the INIC, setup the CCB and pass it to the card via a command in the Transmit queue. CCBs that the INIC owns can be handed back to the host via a request from the Receive or Transmit CPUs or from the host itself at any time.

When the INIC receives a frame, one of its immediate tasks is to determine if the frame is for a CCB that it controls. If not, the frame is passed to the host on what is termed the slow-path. On transmit, the transmit request will specify a CCB number if the request is on an INIC-controlled CCB. Thus the initial state for the INIC will be transparent mode in which all received frames are directly passed through and all transmit requests will be simply thrown on the appropriate wire. This state is maintained until the host passes CCBs to the INIC to control. Note that frames received for which the INIC has no CCB (or it is with the host) will still have the TCP and IP checksums verified if TCP/IP. Similarly the host can request that the INIC calculate and insert the checksums on a transmit request for which the INIC has no CCB.

There are 512 registers available in the INIC. The first 256 are used for process slots. The remaining 256 are split between the 3 CPUs. Table 3 lists the register usage.

TABLE 3

| Register Usage | |
|---|---|
| 0-255: | 16 processes, 16 registers each; |
| 256-287: | 32 for RCV general processing; |
| 288-319: | 32 for XMT general processing; |
| 320-367: | 48 for UTL (CPU 3); |
| 368-383: | 16 for RCV/XMT processing; |
| 384-415: | 32 CPU-specific for RCV; |
| 416-447: | 32 CPU-specific for XMT; |
| 448-479: | 32 CPU-specific for UTL; |
| 448-511: | 64 for UTL scratch. |

The following sources of events exist in the INIC:
1) A Receive input queue—Hardware will automatically DMA arriving frames into frame buffers and queue an event into the Q_RECV hardware queue.
2) A General Event register for Timer events—Expiration of the 2 millisecond timer will set 2 bits in this register, one for each processor.
3) Transmit request queues—There is one queue allocated per interface for requests from the host processor. These requests come via the Utility CPU, which initially DMAs the request into a small DRAM buffer and then queues a pointer to that buffer to the appropriate Transmit request queue.
4) Receive and Transmit CCB events queues—these queues are used to pass events to be processed against a CCB state machine. The events may initiate in any of the CPUs.
5) Receive and Transmit System queues: these queues are used for system events i.e. those not directed at a specific CCB.
6) The Channel Events register: this register contains the DMA-completed bits for all 32 DMA descriptors; there will be one descriptor allocated for each of the 16 processes, so that when the relevant bit is set in the Channel Events register, the DMA that that process fired off is complete.

As mentioned earlier, there are 16 process slots in which to execute. The first 8 are allocated to the Receive CPU, the next 8 to the Transmit CPU.

The microcode is split into 6 sections based on functionality. These sections are:
The Mainloop;
Receive frame processing;
Receive event processing for CCB events;

Receive command processing;
Transmit command processing;
Transmit event processing for CCB events.

Within each of these divisions exist subdivisions. For example, receive-frame processing has code for non-CCB frames ("slow-path"), and for CCB frames ("fast-path"). These sections will be discussed in the following few pages.

Receive and Transmit share the same Main Loop code. This is made possible because of the CPU-specific registers defined by the hardware e.g., 384-415, 416-447. Also the functions that the mainloops need to perform are identical. The major functions are:
  to check if any DMAs have completed,
  to determine if any process are now restartable,
  to see if a timer tick has occurred,
  scan all the hardware queues for new events for this CPU.
The following is a C-like summary of the main loop:

```
forever {
    while(dma_events & OUR_CPU_MASK) {
        clear dma_event bit;
        restart waiting process process;
    }
    while any processes are runable {
        run them by jumping to the start/resume address;
    }
    if (timer_tick) {
        reset timer_tick bit;
        jump to this_cpu_timer_rtne;
    }
    if (available process entries) {
        while(q_out_rdy & OUR_QUEUES_MASK) {
            call appropriate event handler to service the event;
            this will setup a new process to be run (get free process entry,
            header buffer, CCB buffer, set the process up).
        }
    }
}
```

Receive-frame processing can be broken down into the following stages:

First, Receive Dequeue and Header Validation, which includes considerable hardware assist. Much header validation is implemented in hardware in conjunction with MAC processing by scanning the data as it flies by. The Receive hardware sequencer performs a number of tests to generate status from the various headers.

For the MAC header the Receive hardware sequencer determines if Ethernet/802.3, if MC/BC, if it matches our MAC address A or B, determines the network protocol, and flags if not a MAC status of "good packet."

For the Network header the Receive hardware sequencer determines if header checksum is valid, header length is valid (e.g. IP>=5), network length>header length, what the transport protocol is, if there is any fragmentation or network options, and whether the destination network address is ours.

For the Transport header the Receive hardware sequencer determines if the checksum is valid (incl. pseudo-header if relevant), header length is valid (e.g. TCP>=5), length is valid, what is the session layer protocol (e.g. SMB, HTTP or FTP data), are there any transport flags set (e.g. FIN/SYN/URG/RST bits), and any options present.

As frames are received by the INIC from a network, they are placed into 2K-byte DRAM buffers by the Receive hardware sequencer, along with 16 bytes of the above frame status. A pointer to the last byte +1 of this buffer is queued into the Q_RECV queue. The pointer contains a bit (bit 29) that informs the microcode if this frame is definitely not a fast-path candidate (e.g., not TCPIP, or has an error of some sort). Receive frame processing involves extracting this pointer from the Receive hardware queue, and setting up a DMA into an SRAM header buffer of the first X bytes from the DRAM frame buffer. The size of the DMA is determined by whether bit 29 is set or not. If it is set (this frame is not a fast-path candidate), then only the status bytes are needed by the microcode, so the size would be 16 bytes. Otherwise up to 92 bytes are DMA'd—sufficient to get all useful headers. When this DMA is complete, the status bytes are used by the microcode to determine whether to jump to fast-path or slow-path processing.

If bit 29 is set, this frame is going slow-path. Effectively this means that the frame will not be processed against an on-INIC CCB. It will be passed directly to the host, although if the frame is TCP/IP, then its checksums have already been validated by the hardware. Also, all other header validations have been performed.

If bit 29 is not set, then there may be an onboard CCB for this frame. The Receive sequencer has already generated a hash based on the network and transport addresses, e.g., IP source and destination addresses and TCP ports. This hash is used to index directly into a hash table on the INIC that points to entries in a CCB header table. The header table entries are chained on the hash table entry. The microcode uses the hash to determine if a CCB exists on the INIC for this frame. It does this by following this chain from the hash table entry, and for each chained header table entry, comparing its source and destination addresses and ports with those of the frame. If a match is found, then the frame will be processed against the CCB by the INIC. If not, then the frame is sent for slow-path processing.

In the first product, the fast-path has been implemented as a finite state machine (FSM) that covers 3 layers of the protocol stack, i.e., IP, TCP and Session. The state transitions for the Receive FSM and the events that cause them are discussed below.

The following summarizes the steps involved in normal fast-path frame processing:

1) Get control of the associated CCB; this involves locking the CCB to stop other processing (e.g. Transmit) from altering it while this receive processing is taking place.
2) Get the CCB into an SRAM CCB buffer; there are 16 of these buffers in SRAM and they are not flushed to DRAM until the buffer space is needed by other CCBs. Acquisition and flushing of these CCB buffers is controlled by a hardware LRU mechanism. Thus getting the CCB into a buffer may involve flushing another CCB from its SRAM buffer.
3) Examine the frame header to generate an event from it. The Receive events that can be generated on a given context from a frame are:
   receive a valid and complete Session layer packet;
   receive a valid and incomplete Session layer packet;
   receive a pure ACK;
   receive an "invalid" frame, i.e., one that causes the CCB to be flushed to the host;
   receive a window probe;
   receive a partial/split NetBios header.
4) Process the event against the CCBs FSM using that frame.

Each event and state intersection provides an action to be executed and a new state. The following is an example of a state/event transition, the action to be executed and the new state: Assume the state is IDLE (SR_NI), and the event is VALID INCOMPLETE RECEIVE FROM THE RCV QUEUE (ER_VRIR). The action from this state/event intersection is AR_RPHH and the next state is WAIT MDL, CCB Q EXISTS (SR_WMTQ). To summarize, the first of an incomplete Session layer packet has been received. For example, if the Session layer is NetBIOS, then this frame contains the NetBIOS header, but it does not contain all the Session layer data. The action performs the following steps:

1) DMA a small amount of the payload (192 bytes) into a small host header buffer;
2) Process the amount sent to the host through TCP—it has been delivered;
3) Queue the frame to the internal CCB frame queue in the CCB SRAM buffer;
4) DMA appropriate receive status into the header buffer, including setting the COMPLETE bit;
5) Post ISR status to the Utility CPU via the Q_EVENT2 queue, so that it will generate a host interrupt with it;
6) Generate an event to the Transmit CPU via the Q_EVENT1 queue to check if output is now possible; and
7) Exit from Receive FSM processing.

The following steps summarize slow-path Receive processing by the INIC:

1) Examine frame status bytes to determine if frame is in-error; if so, only these status bytes will be sent to the host;
2) Move the frame into either a small or a large host buffer via DMA. It is not split across these buffers;
3) Set frame status and address details and DMA status to the host;
4) Send event to the Utility processor to post Receive status in the ISR.

Once the INIC is handling CCBs, i.e. fast-path processing, there are numerous other events that need to be processed apart from received frames for that CCB. The following are the relevant events:

lock a new context (from Xmit);
unlock a new context (from Xmit);
receive frame (complete or incomplete) from the CCB queue;
receive window update from the CCB queue;
receive a partial/split NetB header from the CCB queue;
end of the CCB queue of frames;
flush context request from host;
flush context request from Xmit;
context release/flush complete from Xmit.

The following summarizes Receive Event processing:

1) Get control of the associated CCB; this involves locking the CCB to stop other processing (e.g. Transmit) from altering it while this processing is taking place;
2) Get the CCB into an SRAM CCB buffer;
3) If the event is "Check CCB queue", check the internal queue in the CCB; if there are frames queued, dequeue the next one, get its header into an SRAM header buffer and examine it to generate a specific event; if no frames are queued, exit;
4) Either way, process the event against the CCB's FSM.

Figure 19:
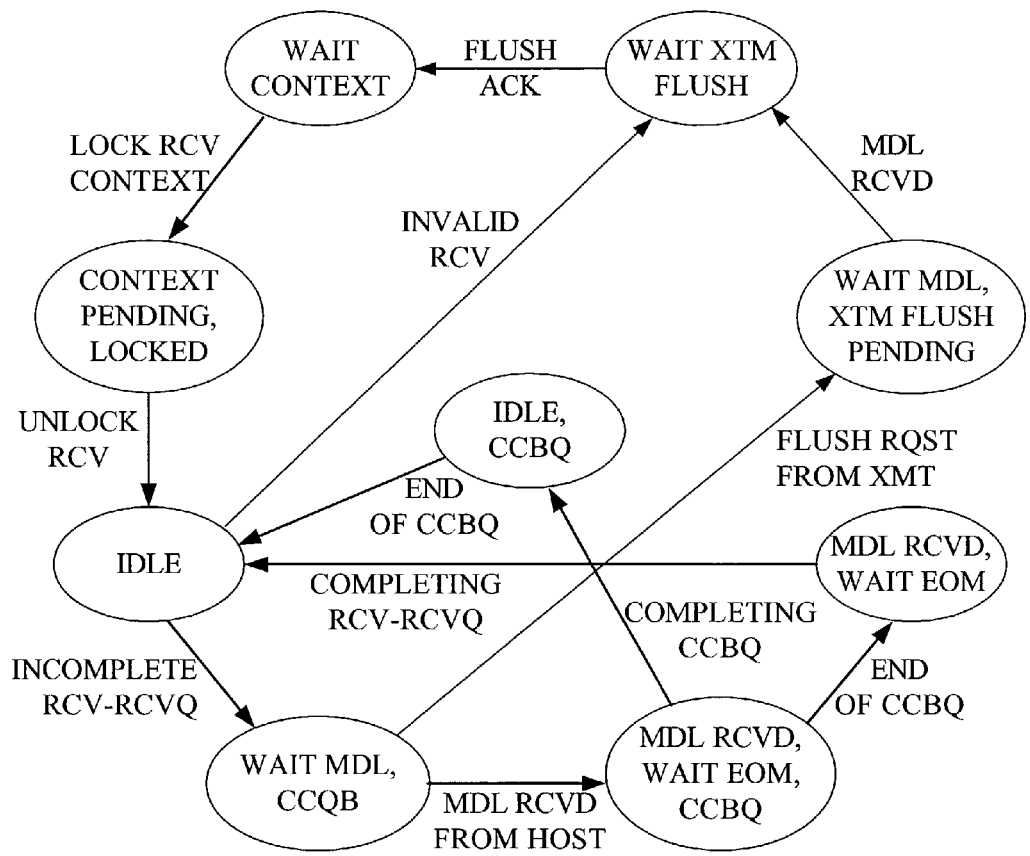
FIG. 19 is a state diagram summary of a receive finite state machine showing the main events and transitions.

FIG. 19 provides a state diagram summary of the Receive FSM states and the main events and transitions. Processing Receive Commands by the INIC occurs when the host posts a receive MDL to the INIC by filling in a command buffer with appropriate data pointers, etc., and posting it to the INIC via the Receive Command Buffer Address register. Note that there is only one host receive MDL register. The INIC Utility CPU will DMA the command in and place a pointer to it in the Q_RCMD queue which the Receive CPU will work on.

There are two possible commands sent to the INIC from the host and both apply only to fast-path processing. The commands are:

Receive MDL for remaining session-layer data;
Abort/flush a context.

The following summarizes Receive Command processing:

1) Get an SRAM command buffer and get the first 32 bytes of the command into it;
2) Determine the CCB involved and get control of it; this involves locking the CCB to stop other processing (e.g. Transmit) from altering it while this processing is taking place;
3) Get the CCB into an SRAM CCB buffer;
4) Generate an event based on the command type;
5) Process the event against the CCB's FSM.

As mentioned above, the fast-path has been implemented as a finite state machine (FSM) that covers at least 3 layers of the protocol stack, i.e., IP, TCP and Session. There are actually separate FSMs for Receive and Transmit. The state involved is the state of the CCB connection (Receive or Transmit) and encompasses those 3 layers. Events are generated from the sources of events detailed earlier, and they are applied against the FSM giving an action to execute and a new state.

Several Receive details should be noted. First, regarding window updates from the host, the host application has to tell the INIC when that application has accepted the received data that has been queued. This is so that the INIC can update the TCP receive window. This is achieved by piggybacking these on transmit or receive MDLs on the same CCB. Second, for an INIC-controlled CCB, the INIC does not maintain a keepalive timer. This leaves the host with the job of determining that the CCB is still active. Third, a Timestamp option is supported in the fast path because it leads to better round-trip estimations (RTT) for TCP. However this is optional depending upon SRAM size limitations on the on-INIC CCB. Fourth, the INIC maintains an Idle timer for CCBs under its control.

Transmit Command Processing begins when the host posts a transmit request to the INIC by filling in a command buffer with appropriate data pointers, etc., and posting it to the INIC via the Command Buffer Address registers. Note that there is one of these registers per interface. The INIC Utility CPU will DMA the command in and place it in the appropriate Q_XMIT queue which the Transmit CPU will work on. There is also one of these queues per interface so that transmit processing can round-robin service these queues to keep all interfaces busy, and not let a highly-active interface lock out the others (which would happen with a single queue).

There are 4 possible commands sent to the INIC from the host. The commands are:

1) Null command—essentially just a window update; fast-path only;
2) New context pending; fast-path only;
3) New context confirm; fast-path only;
4) Transmit command; fast- and slow-path.

The following summarizes Transmit Command processing:

1) Get an SRAM command buffer and get the first 32 bytes of the command into it;
2) Determine if there is a CCB involved and if so, get control of the it; this involves locking the CCB to stop other processing (e.g. Transmit) from altering it while this processing is taking place;
3) If a CCB is involved, get the CCB into an SRAM CCB buffer, and generate an event based on the command type; then process that event against the CCB's FSM;

4) Otherwise perform slow-path transmit command processing.

For Transmit Slow-Path Processing, the queued request will already have been provided by the host stack with the appropriate MAC and TCP/IP (or whatever) headers in the frame to be output. Also the request is guaranteed not to be greater than MSS-sized in length. So the processing is fairly simple. A large buffer is acquired and the frame is moved by DMA into it, at which time the checksum is also calculated. If the frame is TCP/IP, the checksum will be appropriately adjusted if necessary (pseudo-header etc) and placed in the TCP header. The frame is then queued to the appropriate MAC transmit interface. Then the command is immediately responded to with appropriate status through the Host Response queue.

The following summarizes the steps performed:

1) Get the remainder of the command if larger than 32 bytes, into the SRAM command buffer. This implies that a slow-path command cannot be larger than the size of the SRAM command buffer (128 bytes);
2) Examine command to determine if output TCP/IP checksumming is required;
3) When output checksumming is required:

The host sets the length of the MAC through TCP headers into the command for the INIC. This is so that the Receive CPU may DMA the header into an SRAM buffer to calculate and set the IP/TCP checksums. Use half of the command buffer as a header buffer for this purpose. This avoids using an SRAM CCB buffer that would cause an unnecessary flush to DRAM of a CCB buffer. Doing this may result in unused command fields being moved down over those fields that have already been loaded into CPU registers, so as to gain space in the SRAM buffer. Even with this trick, there is a maximum header size that the host can send for a frame for which checksumming is requested (82 bytes).

DMA the header from host memory to the header buffer, then DMA the remainder of the frame from the host to the appropriate offset in a large DRAM buffer, leaving room for the frame headers. Note that the command is derived from an MDL on the host and may contain scatter/gather lists that need to be processed. This latter DMA will provide the TCP checksum of the payload. Manually calculate and insert the IP checksum in the SRAM header buffer. Then calculate the checksum of the TCP header and pseudo-header in the SRAM header buffer and add in the payload checksum. Insert the TCP checksum into the frame header. Then DMA the entire header to the front of the DRAM buffer and queue the buffer to the appropriate Xmit hardware queue based on the requested interface in the command. Post new ISR status to the Utility processor to be passed to the host.

4) When no checksumming is required:

DMA the entire frame from host memory into a large DRAM buffer and queue the buffer to the appropriate Xmit hardware queue based on the requested interface in the command. Note that the command is derived from an MDL on the host and may contain scatter/gather lists that need to be processed. Post new ISR status to the Utility processor to be passed to the host.

The following is an overview of the Transmit fast-path flow once a command has been posted. The transmit request may be a segment that is less than the MSS, or it may be as much as a full 64K Session layer packet. The former request will go out as one segment, the latter as a number of MSS-sized segments. The transmitting CCB must hold on to the request until all data in it has been transmitted and acked. Appropriate pointers to do this are kept in the CCB. To create an output TCP/IP segment, a large DRAM buffer is acquired from the Q_FREEL queue. Then data is DMAd from host memory into the DRAM buffer to create an MSS-sized segment. This DMA also checksums the data. The TCP/IP header is created in SRAM and DMAd to the front of the payload data. It is quicker and simpler to keep a basic frame header permanently in the CCB and DMA this directly from the SRAM CCB buffer into the DRAM buffer each time. Thus the payload checksum is adjusted for the pseudo-header and placed into the TCP header prior to DMAing the header from SRAM. Then the DRAM buffer is queued to the appropriate Q_UXMT transmit queue. The final step is to update various window fields etc in the CCB. Eventually either the entire request will have been sent and acked, or a retransmission timer will expire in which case the context is flushed to the host. In either case, the INIC will place a command response in the Response queue containing the command buffer handle from the original transmit command and appropriate status.

The above discussion has dealt with how an actual transmit occurs. However the real challenge in the transmit processor is to determine whether it is appropriate to transmit at the time a transmit request arrives, and then to continue to transmit for as long as the transport protocol permits. There are many reasons not to transmit: the receiver's window size is <=0, the Persist timer has expired, the amount to send is less than a full segment and an ACK is expected/outstanding, the receiver's window is not half-open etc. Much of transmit processing will be in determining these conditions.

The fast-path has been implemented as a finite state machine (FSM) that covers at least 3 layers of the protocol stack, i.e., IP, TCP and Session. The state transitions for the Transmit FSM and the events that cause them are discussed below.

The following summarizes the steps involved in normal fast-path transmit command processing:

1) Get control of the associated CCB (gotten from the command); this involves locking the CCB to stop other processing (e.g. Receive) from altering it while this transmit processing is taking place;
2) Get the CCB into an SRAM CCB buffer; there are 16 of these buffers in SRAM and they are not flushed to DRAM until the buffer space is needed by other CCBs. Acquisition and flushing of these CCB buffers is controlled by a hardware LRU mechanism. Thus getting the CCB into a buffer may involve flushing another CCB from its SRAM buffer;
3) Process the SEND COMMAND (EX_SCMD) event against the CCB's FSM.

Each event and state intersection provides an action to be executed and a new state. The following is an example of the state/event transition, the action to be executed and the new state for the SEND command while in transmit state IDLE (SX_IDLE):

The action from this state/event intersection is AX_NUCMD and the next state is XMIT COMMAND ACTIVE (SX_XMIT). To summarize, a command to transmit data has been received while Transmit is currently idle. The action performs the following steps:

1) Store details of the command into the CCB;
2) Check that it is OK to transmit now e.g. send window is not zero;
3) If output is not possible, send the Check Output event to Q_EVENT1 queue for the Transmit CCB's FSM and exit;
4) Get a DRAM 2K-byte buffer from the Q_FREEL queue into which to move the payload data;

5) DMA payload data from the addresses in the scatter/gather lists in the command into an offset in the DRAM buffer that leaves space for the frame header; these DMAs will provide the checksum of the payload data;
6) Concurrently with the above DMA, fill out variable details in the frame header template in the CCB; also get the IP and TCP header checksums while doing this; note that base IP and TCP header checksums are kept in the CCB, and these are simply updated for fields that vary per frame, viz. IP Id, IP length, IP checksum, TCP sequence and ack numbers, TCP window size, TCP flags and TCP checksum.
7) When the payload DMA is complete, DMA the frame header from the CCB to the front of the DRAM buffer;
8) Queue the DRAM buffer to the appropriate Q_UXMT queue for the interface for this CCB;
9) Determine if there is more payload in the command; if so, save the current command transfer address details in the CCB and send a CHECK OUTPUT event via the Q_EVENT1 queue to the Transmit CCB; if not, send the ALL COMMAND DATA SENT (EX_ACDS) event to the Transmit CCB;
10) Exit from Transmit FSM processing.

Once the INIC is handling CCBs, i.e. fast-path processing, there are numerous other events that need to be processed apart from transmit commands from the host for that CCB. The following are the relevant events:
1) New context pending (from the new context pending command);
2) New context confirm (from that command also);
3) Flush context request from Receive;
4) Send data (after Check Output determines this can be done);
5) Send an ACK (from Receive);
6) All command data sent;
7) Received ACK for all outstanding on a command;
8) Persist conditions detected (WIN=0, no RTR, no PST);
9) Context flush event detected (e.g. RTR expired);
10) Send a window update;
11) Persist timer expired;
12) Check for RTR expiry;
13) Check for PST expiry;
14) Maybe send an ACK;
15) Maybe update the IDLE timer;
16) Context termination sync event received.

The following summarizes Transmit Event processing:
1) Get control of the associated CCB; this involves locking the CCB to stop other processing (e.g. Receive) from altering it while this processing is taking place.
2) Get the CCB into an SRAM CCB buffer;
3) If the event is "Check Output", check whether it is now possible to output on this CCB; if so, process the Send Data (EX_SD) event; if not, check for other conditions e.g. all of a command's data has been ACKed (EX_RACK), a window update is needed (EX_SWU), output is available but it is not possible to send (EX_WE0);
4) If there is any event, process it against the CCB's FSM.

Figure 20:
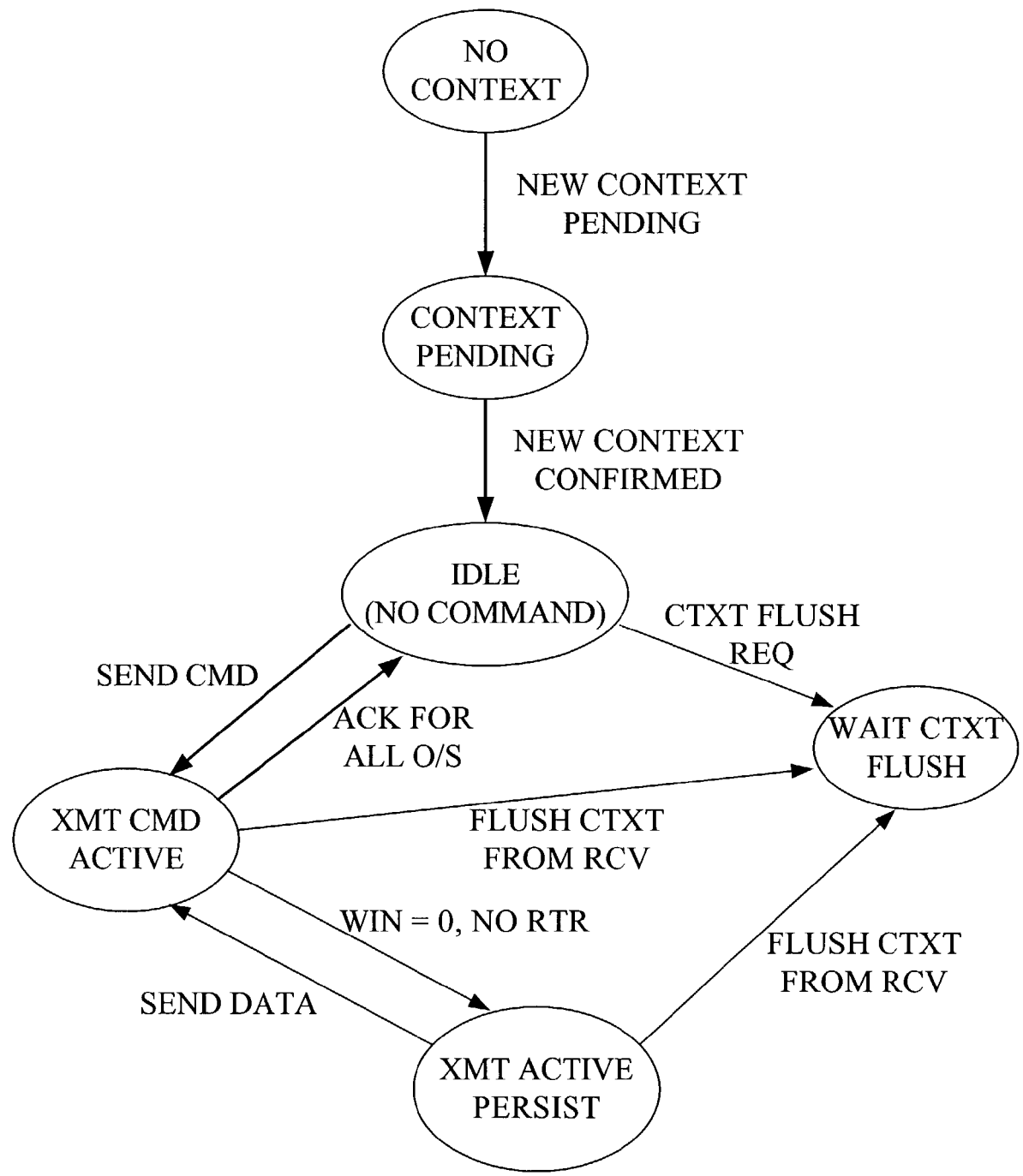
FIG. 20 is a state diagram summary of a transmit finite state machine showing the main events and transitions.

FIG. 20 provides a state diagram summary of the Transmit FSM states and the main events and transitions. The state involved is the state of the transmit path of the CCB connection. Events are generated from the sources of events detailed above, and they are applied against the FSM giving an action to execute and a new state. The following diagram provides a summary of the Transmit FSM states and the main events and transitions.

Several Transmit details should be noted. First, regarding the slow-start algorithm that is now a part of the TCP standard will be handled on the INIC. It seems unreasonable to wait until the connection is sending at full-rate before passing it to the INIC.

Also, the congestion algorithm will not be handled on the card. To reach congested state, the connection will have dropped frames, so it will have flushed. The host will NOT hand out a CCB in congestion state—it will wait until it has gotten out of that state.

A Window Probe is sent from the sending CCB to the receiving CCB, and it means the sender has the receiver in PERSIST state. Persist state is entered when the receiver advertises a zero window. It is thus the state of the transmitting CCB. In this state, he sends periodic window probes to the receiver in case an ACK from the receiver has been lost. The receiver will return his latest window size in the ACK.

A Window Update is sent from the receiving CCB to the sending CCB, usually to tell him that the receiving window has altered. It is mostly triggered by the upper layer when it accepts some data. This probably means the sending CCB is viewing the receiving CCB as being in PERSIST state.Persist state: it is planned to handle Persist timers on the INIC. However as soon as the Persist timer completely expires, the CCB will be flushed. This means that a zero window has been advertised for a few seconds. A zero window would normally be a transient situation, and would tend to happen mostly with clients that do not support slow-start. However it should normally reopen before the timer expires.

The INIC code expects all transmit requests for which it has no CCB to not be greater than the MSS. If any request is, it will be dropped and an appropriate response status posted.

As a receiver, the INIC will do the right thing regarding Silly Window avoidance and not advertise small windows—this is easy. However it is necessary to also do things to avoid this as a sender, for the cases where a stupid client does advertise small windows. Without getting into too much detail here, the mechanism requires the INIC code to calculate the largest window advertisement ever advertised by the other end. It is an attempt to guess the size of the other end's receive buffer and assumes the other end never reduces the size of its receive buffer. See *Stevens, Vol.* 1 pp. 325-326.

The third processor (P2) of the integrated processors is termed the Utility Processor. P2 performs the reset function, manages the interface to the system, and performs the debug function. This following pages will describe these functions in the format found in the code. The first major function is reset. Second is the system interface, which is composed of the idle loop and associated routines. Last is the debug function.

Two reset functions have been implemented, a hard or cold reset, and a soft or warm reset. Power up or the occurrence of a system reset causes hard reset. Soft reset occurs as a result of the system writing 'dead' to location 0 of INIC memory. P2 distinguishes between these two resets by the condition of the write pending bit in the PCI address register. If this bit is on, a soft reset has occurred, and PCI configuration space will not be set up.

One of the functions of P2 in the reset process is to load the writeable control store (WCS) with code provided by the system. In order to bypass this sophisticated mechanism to enable the load of code for in-circuit test, a synchronous mechanism using all three processors has been designed. If bit 1 of the external options register has been set, all three processors will perform this function.

Only those functions necessary to be able to load WCS from the host are implemented in ROM. The remaining functions implemented in ROM are subroutines that can be easily rewritten in WCS if errors are discovered later. First of the ROM functions is the initialization of PCI configuration space. If the EEPROM exists and is properly formatted, the data necessary to configure PCI can be found in this device. If EEPROM does not exist, but FLASH is available and properly formatted, data to configure PCI is obtained from the FLASH memory. If neither of these options is available, PCI configuration space is set up using ROM defaults. In this case bit 0 of the external options indicates that the debug processor should be initialized. Both EEPROM and FLASH read routines are contained in ROM, as they are required for PCI configuration. The FLASH read routine is fairly straightforward. The EEPROM routines use the bit level interface of the EEPROM. Refer to the EEPROM specs to find a description of the operation of this interface.

Once PCI has been configured INIC is ready to talk to the system. At this point minimal functionality is available. The mini idle loop provides only two functions, a branch to check status, and a branch to a small command decode function. The mini idle loop shares the check status routine with the main idle loop, and uses a very small portion of its function. The check status routine will be described within the main idle loop description. The command decode function supports FLASH reads, setting the interrupt status pointer, setting the status, setting the mask, and writing control store.

Control store writes are done in three consecutive instructions. The first transfer is the address to be written. This transfer also includes two control bits, one to indicate that this is a compare rather than a write, and one to indicate that at the completion of this operation we should jump to the start address in writeable control store. The second transfer is the low half of the control store instruction, and the third transfer is the high half.

At the completion of the load of control store P2 branches to the newly downloaded code. Once this occurs, DRAM is initialized, and then its size is computed. This is done by first determining its configuration. By setting the addressing structure to maximum and writing to address 1c00, the memory configuration can be computed. If this write aliases to 0c00 address bit 12 is missing. If the write also aliases to 0400 bit 11 is missing. Once this has been determined the proper addressing structure can be initialized. Once the proper addressing configuration has been set, the size of DRAM can be determined using the same alias technique to determine missing high order address bits.

The final major reset function that is performed is queue initialization. Each queue uses 128 bytes of SRAM, and a configurable amount of DRAM, from a minimum of 1K bytes to a maximum of 128K. First the queues are initialized to the DRAM size defined by control store constants. Each queue begins its use of DRAM on the 128K boundary following the beginning of the previous queue, so after the queues are initialized, a mechanism for recovering the free space between queues that have not been initialized to maximum size is initiated.

Two queues are allocated for use as an aid to managing local DRAM. One queue contains addresses of 256 byte blocks, and one contains addresses of 2K blocks. The 2K queue size is determined by DRAM size, rather than a control store constant. After all queues have been initialized the process of allocating DRAM not used by the queues is begun. First blocks at the end of the first queue are added to the 256 byte queue until a 2K boundary is found, at which point 2K blocks are added to the 2K queue until the beginning of the next queue is reached. This process is repeated until the DRAM located between the last and next to last queue has been recovered. At this point the 2K queue is filled with the remaining DRAM until the bottom address of the CCB storage area is reached. At this point, entries are removed from the 2K queue in order to be split down and added to the 256-byte queue until it is close to full. In order to avoid partial tail full issues, this queue is not completely filled.

At the conclusion of queue initialization P0 and P1 are started, and P2 enters the idle loop. The idle loop is the code executed by P2 when it is waiting for the next task. The purpose of the loop is to check all of the conditions that could initiate an operation. At the highest level, these are:

P0 or P1 hit a debug processor installed breakpoint;
A system request has occurred over PCI;
A DMA channel has changed state;
A network interface has changed state;
A process has requested status be sent to the system;
A transmitter or receiver has stored statistics.

These functions are checked in this order. If service is required at any check, it is provided and the loop is begun at the beginning. Thus if the system becomes very busy, the most likely thing to find itself being serviced less is the statistics function. Service of processor halts due to break points will be discussed in conjunction with the description of the debug processor. Service of system requests can be broken into two major subsets. The first is system requests from the functional device driver, and second is system requests from the debug driver.

The Functional Command Decode performs the requests described in the INIC Utility Processor description. Most requests are interface dependent. A request is made for a specific interface to perform a specific function. As an example, PCI addresses 10, 14, 18 and IC are used to store the pointer to the system memory location where interrupt status should be stored for network interfaces 0, 1, 2, and 3 respectively. A limited number of commands are not interface dependent, and are generally intended to be used on interface 0. These are queue a receive buffer, write control store, read eeprom, and the flash read and write commands.

Most of these commands simply cause a value to be stored, after which P2 returns to the idle loop. If a DMA operation is requested, at the end of the operation, status indicating the successful or unsuccessful completion of the request will be sent to the system. Those that initiate a DMA and generate a later status presentation are read statistics, read PHY status, write configuration, and read configuration. In addition, the four transmit command buffer requests, along with the receive command buffer request cause a DMA to be performed, but no status is required by the system after the completion of these DMA operations. The function of these operations will be covered under the idle loop DMA service discussion.

As with the functional processor, the INIC Debug Interface description covers the basic function of this code. The halt, run, step, dump and load commands are all fairly straightforward and are documented in the above referenced spec. Although break is functionally described, further explanation of the operation of this code is contained in this document. The functions of the debug processor that are covered in the Utility Processor document do not require status presentation. All of the commands, triggered by storing a pointer in the command location, do require ending status to be presented.

The break function requires twelve bytes of storage for each break point that is stored. Each break point can cause either one or both processors to halt, or can simply trigger an indication that the instruction at that location has been executed. Each break point can be executed a specified n times prior to halting the processor under test. When a break instruction is issued to P2, it checks to see if this is already a break point for the other processor, and if so simply turns on the bit to indicate both processors are using this break point. If the address is not presently a break point, P2 finds the next available storage location in SRAM for this break point information. It then stores the address of the break point, and the contents of the instruction at that address in the SRAM storage location. It then stores a jump instruction to the break point execution code at the location of the break point.

Each break point has a unique location that it jumps to in order to quickly determine the address of the location where the replaced instruction can be found. It also allows the processor to determine if this break is for it or the other potential processor under test. The break point jump instruction, in addition to jumping to the break point code, saves the hardware status of the system. When the processor takes this jump, it saves the remaining state required to allow it to operate independently, and then determines if the break was intended for itself. If it was not, it builds the instruction that was replaced, restores the state, executes the instruction and returns to the normal code. If however it determines that the break instruction was for it, it sets a flag for P2 and halts.

When P2 discovers in the idle loop that a halted processor has set a flag, it steps the processor through the same code described above that it would have otherwise executed in real time. It then leaves the processor under test stopped in the instruction after the break instruction, and sends status to the system that the processor has encountered a break point. Resetting a break point causes the instruction to be restored to its original condition in control store and the storage location in SRAM to be cleared.

P2 can also perform a DMA channel State Change. For the four transmit command buffer and the receive buffer functions, P2 will DMA the command buffer into local memory, modify the pointer for use by the transmit or receive processors, and add the pointer to the proper queue. This task is split into three separate functions in order to keep this function operating concurrently with all other operations.

The first part of the process is the actual command decode. A single queue (Q_HOSTIF) is used to store requests for the four separate transmit functions and the receive function. At command decode time two entries are stored on Q_HOSTIF: the address of the queue that will ultimately be the destination of the buffer, and the pointer to the location in system memory where the buffer resides.

The second part of this operation occurs when the idle loop detects that Q_HOSTIF is not empty. A non-empty condition indicates a request to initiate the DMA of the buffer to INIC local DRAM. When this occurs P2 first determines if a DMA channel is available. Channels 23-26 are used for this purpose. If a channel is available, a buffer is obtained from the free queue and a DMA operation is initiated to this buffer. The final destination queue address and the address of the end of the buffer are stored in an SRAM location linked to this DMA channel, and P2 returns to the idle loop.

The final part of this operation occurs when it is determined in the idle loop that the DMA operation has completed. The SRAM location linked to this channel contains the queue address and the data pointer to be queued. P2 obtains this data and queues the pointer, completing the operation.

In addition to the SRAM locations used to store a description of the active DMA operation, four bits are used in the dma_status register. These bits are used to indicate that there has been a DMA operation initiated on their respective channel. During part two of the above process the bit is used to determine channel availability, and is set once a channel is acquired. During part three the bit is reset.

For tracking network interface changes, a register (link_stat) is maintained with the current status of each of the network interfaces. When one or more of the interfaces changes status (as defined by this register) status is set up to notify the system of this change.

The function of the check status routine is to check to see if any functions have requested status to be sent to the system, and to send it if such a request has been made. The first step in this process is to reset any DMA channels that have completed a transfer. Once this has been accomplished, P2 checks to see if there are any requests to send new status. If there are not, P2 returns to the idle loop. If there are requests outstanding, P2 checks to make sure that there is not another request being serviced for that interface, or that a previously sent status has not yet been reset by the system. If there is a request for service outstanding and neither of these conditions exists, an operation to send status to the system is initiated.

The first step in this operation is to insure that if there are multiple requests ready to be serviced they are served in a round robin fashion. Once an interface has been selected using this method P2 determines if interrupts are being aggregated. If they are, the time is checked, and if we are still within the aggregation window P2 returns to the idle loop. If the timer has expired, P2 first checks that the host has not sent back the status register with the status bits we want to set already set. Although this is an unlikely occurrence, if the host prefers to not see certain status from the INIC, this is a possible mechanism for insuring that outcome. If this does occur, P2 returns to the idle loop.

If this is indeed new status that has not been returned to INIC, P2 sends this status to the system. At the conclusion of this operation P2 checks to see if interrupts are masked, and returns to the idle loop if they are. If they are not, an interrupt is generated and then P2 returns to the idle loop.

The flag register serves to interlock the status areas with the system. When status is sent to the system, a bit in the flag register corresponding to the DMA channel used is set. This bit is not reset until after the system writes status back to us. Each functional sub-processor, utility and network 0-3, has its own status area and flag register interlock. The status areas are located sequentially in SRAM, and the bits in the flag register, for convenience, correspond to the DMA channel that is allocated to the sub-processor. The utility processor uses channel 31, and the four network processors use channels 30-27. Because there are only four available interrupts, network processors 0 and 1 share interrupt A.

For maintaining statistics, when either a transmit or receive processor completes a transfer, it posts completion status information in the Q_STATS queue. P2 recovers these entries, analyzes them, and updates the local statistics counters. This function is performed only when no more pressing requests for P2 are outstanding.

An outbound DMA transfer generated by the INIC (a system read) can not pass a system pci write through either a host/pci or pci/pci bridge. We must, therefore, insure that we disconnect on all outbound DMA transfers so that if the system tries to write to us we won't deadlock. All outbound DMA operations are short, containing control data. When one of these operations occurs, the idle loop is shortened to check only pci writes and the completion of the DMA of control data. However, because a pathological worst case could have the system write to all five devices (the four network processors and the debug processor) context is stored for the return path and the operation outstanding. The flags register contains five bits, one for each process, indicating that this disconnected DMA operation is in progress, and five registers contain the return addresses for each of the processes.

The remainder of this document will describe the INIC hardware specification. This features an INIC peripheral component interconnect (PCI) interface which supports both 5.0V and 3.3V signaling environments, both 32-bit and 64 bit PCI interface, and PCI clock frequencies from 15 MHz to 66 MHz. Other features of this interface include a high performance bus mastering architecture, host memory based communications that reduce register accesses, host memory based interrupt status word which reduces register reads, Plug and Play compatibility, PCI specification revision 2.1 compliance, PCI bursts of up to 512 bytes, supports of cache line operations up to 128 bytes, supports both big-endian and little-endian byte alignments, and supports Expansion ROM.

The INIC Network Interface includes four internal 802.3 and ethernet compliant Macs, a Media Independent Interface (MII) connectable to external PHYs and supporting 10BASE-T, 100BASE-TX/FX and 100BASE-T4 in full and half-duplex modes. Automatic PHY status polling notifies the system of status changes. SNMP statistics counters are provided, broadcast and multicast packets are handled with a promiscuous mode provided for network monitoring or multiple unicast address detection. The interface supports huge packets of 32 KB, Mac-layer loop-back test mode, and auto-negotiating Phys.

The INIC memory features include external Dram buffering of transmit and receive packets, buffering configurable as 4 MB, 8 MB, 16 MB or 32 MB, with a 32-bit interface that supports throughput of 224 MB/s. External FLASH ROM up to 4 MB is provided, for diskless boot applications, as well as external serial EEPROM for custom configuration and Mac addresses.

The INIC Protocol Processor includes a high speed, custom, 32-bit processor executing 66 million instructions per second, and processing various protocols with focus on IP, TCP and NETBIOS. Up to 256 resident TCP/IP contexts can be cached on the INIC for fast-path processing. A writeable control store (WCS) allows field updates for feature enhancements.

The INIC Power includes a 3.3V chip operation and PCI controlled 5.0V/3.3V I/O cell operation. Initial packaging includes 272-pin plastic ball grid array, with 91 PCI signals, 68 MII signals, 58 external memory signals, 1 clock signal and 54 signals split between power and ground.

The microprocessor is a 32-bit, full-duplex, four channel, 10/100-Megabit per second (Mbps), Intelligent Network Interface Controller, designed to provide high-speed protocol processing for server applications. It combines the functions of a standard network interface controller and a protocol processor within a single chip. Although designed specifically for server applications, the microprocessor can be used by PCs, workstations and routers or anywhere that TCP/IP protocols are being utilized.

When combined with four 802.3/MII compliant Phys and Synchronous Dram (SDRAM), the microprocessor provides four complete ethernet nodes. It contains four 802.3/ethernet compliant Macs, a PCI Bus Interface Unit (BIU), a memory controller, transmit FIFOs, receive FIFOs and a custom TCP/IP/NETBIOS protocol processor. The microprocessor supports 10Base-T, 100Base-TX, 100Base-FX and 100Base-T4 via the MII interface attachment of appropriate Phys.

The microprocessor Macs provide statistical information that may be used for SNMP. The Macs operate in promiscuous mode allowing the microprocessor to function as a network monitor, receive broadcast and multicast packets and implement multiple Mac addresses for each node.

Any 802.3/MII compliant PHY can be utilized, allowing the microprocessor to support 10BASE-T, 10BASE-T2, 100BASE-TX, 100Base-FX and 100BASE-T4 as well as future interface standards. PHY identification and initialization is accomplished through host driver initialization routines. PHY status registers can be polled continuously by the microprocessor and detected PHY status changes reported to the host driver. The Mac can be configured to support a maximum frame size of 1518 bytes or 32768 bytes.

The 64-bit, multiplexed BIU provides a direct interface to the PCI bus for both slave and master functions. The microprocessor is capable of operating in either a 64-bit or 32-bit PCI environment, while supporting 64-bit addressing in either configuration. PCI bus frequencies up to 66 MHz. are supported yielding instantaneous bus transfer rates of 533 MB/s. Both 5.0V and 3.3V signaling environments can be utilized by the microprocessor. Configurable cache-line size up to 256B will accommodate future architectures, and Expansion ROM/Flash support will allow for diskless system booting. Non-PC applications are supported via programmable big and little endian modes. Host based communication has been utilized to provide the best system performance possible.

The microprocessor supports Plug-N-Play auto-configuration through the PCI configuration space. External pull-up and pull-down resistors, on the memory I/O pins, allow selection of various features during chip reset. Support of an external eeprom allows for local storage of configuration information such as Mac addresses.

External SDRAM provides frame buffering, which is configurable as 4 MB, 8 MB, 16 MB or 32 MB using the appropriate SIMMs. Use of −10 speed grades yields an external buffer bandwidth of 224 MB/s. The buffer provides temporary storage of both incoming and outgoing frames. The protocol processor accesses the frames within the buffer in order to implement TCP/IP and NETBIOS. Incoming frames are processed, assembled then transferred to host memory under the control of the protocol processor. For transmit, data is moved from host memory to buffers where various headers are created before being transmitted out via the Mac.

Figure 21:
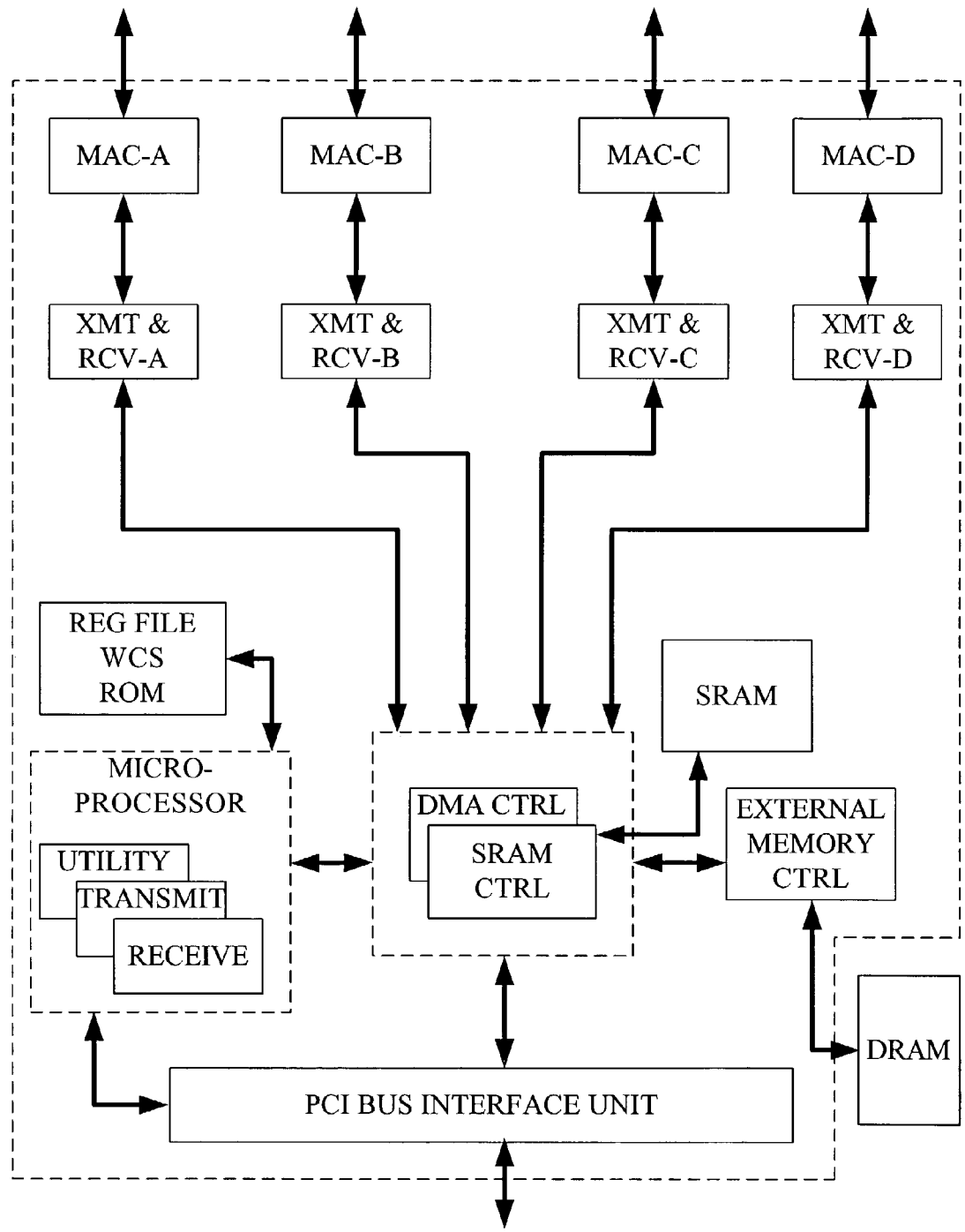
FIG. 21 is a diagram of the INIC hardware.

FIG. 21 provides an overview of the INIC hardware.

The following Cores/Cells form the INIC: LSI Logic Ethernet-110 Core, 100Base & 10Base Mac with MII interface, LSI Logic single port SRAM, triple port SRAM and ROM available, LSI Logic PCI 66 MHz, 5V compatible I/O cell, and LSI Logic PLL.

Table 4 outlines the INIC Die Size using an LSI Logic G10 process.

TABLE 4

| MODULE | DESCR | SPEED | AREA |
|---|---|---|---|
| Scratch RAM, | 1Kx128 sport, | 4.37 ns nom., | 06.77 mm$^2$ |
| WCS, | 8Kx49 sport, | 6.40 ns nom., | 18.29 mm$^2$ |
| MAP, | 128x7 sport, | 3.50 ns nom., | 00.24 mm$^2$ |
| ROM, | 1Kx49 32col, | 5.00 ns nom., | 00.45 mm$^2$ |
| REGs, | 512x32 tport, | 6.10 ns nom., | 03.49 mm$^2$ |
| Macs, | .75 mm$^2$ × 4 = | | 03.30 mm$^2$ |
| PLL, | .5 mm$^2$ = | | 00.55 mm$^2$ |
| Misc. Logic | 117,260 gates at 5035 gates/mm$^{2)}$ = | | 23.29 mm$^2$ |
| TOTAL CORE | | | 56.22 mm$^2$ |

Table 5 outlines the INIC Pin Count, from table 4 above.

TABLE 5

| (Core side)$^2$ = | 56.22 mm$^2$ |
|---|---|
| Core side = | 07.50 mm |

TABLE 5-continued

| | | |
|---|---|---|
| Die side = core side + 1.0 mm (I/O cells) = | 08.50 | mm |
| Die area = 8.5 mm × 8.5 mm = | 72.25 | mm² |
| Pads needed = 220 signals × 1.25 (vss, vdd) = | 275 | pins |
| LSI PBGA = | 272 | pins |

Table 6 outlines the INIC Datapath Bandwidth

TABLE 6

| | | |
|---|---|---|
| (12 MB/s/100Base) × 2 (full duplex) × 4 connections = | 100 | MB/s |
| Average frame size = | 512 | B |
| Frame rate = 100 MB/s/512 B = | 195,312 | frames/s |
| Cpu overhead/frame = (256 B context read) + (64 B header read) + (128 B context write) + (128 B misc.) = | 512 | B/frame |
| Total bandwidth = (512 B in) + (512 B out) + (512 B Cpu) = | 1536 | B/frame |
| Dram Bandwidth required = 1536 B/frame × 195,312 frames/s = | 300 | MB/s |
| Dram Bandwidth @ 60 MHz = (32 bytes/167 ns) = | 202 | MB/s |
| Dram Bandwidth @ 66 MHz = (32 bytes/150 ns) = | 224 | MB/s |
| PCI Bandwidth required = | 100 | MB/s |
| PCI Bandwidth available @ 30 MHz, 32b, average = | 46 | MB/s |
| PCI Bandwidth available @ 33 MHz, 32b, average = | 50 | MB/s |
| PCI Bandwidth available @ 60 MHz, 32b, average = | 92 | MB/s |
| PCI Bandwidth available @ 66 MHz, 32b, average = | 100 | MB/s |
| PCI Bandwidth available @ 30 MHz, 64b, average = | 92 | MB/s |
| PCI Bandwidth available @ 33 MHz, 64b, average = | 100 | MB/s |
| PCI Bandwidth available @ 60 MHz, 64b, average = | 184 | MB/s |
| PCI Bandwidth available @ 66 MHz, 64b, average = | 200 | MB/s |

Table 7 outlines the INIC Cpu Bandwidth

TABLE 7

| | |
|---|---|
| Receive frame interval = 512 B/40 MB/s = | 10.24 us |
| Instructions/frame @ 60 MHz = (10.24 us/frame)/(50 ns/instruction) = | 205 |
| Instructions/frame @ 66 MHz = (10.24 us/frame)/(45 ns/instruction) = | 228 |
| Required instructions/frame = | 250 |

The following hardware features enhance INIC performance: 512 registers afford reduced scratch ram accesses and reduced instructions, register windowing eliminates context-switching overhead, separate instruction and data paths eliminate memory contention, resident control store eliminates stalling during instruction fetch, multiple logical processors eliminate context switching and improve real-time response, pipelined architecture increases operating frequency, shared register and scratch ram improve inter-processor communication, fly-by state-machine assists address compare and checksum calculation, TCP/IP-context caching reduces latency, hardware implemented queues reduce CPU overhead and latency, horizontal microcode greatly improves instruction efficiency, automatic frame DMA and status between MAC and DRAM buffer, deterministic architecture coupled with context switching eliminates processor stalls.

The INIC processor is a convenient means to provide a programmable state-machine which is capable of processing incoming frames, processing host commands, directing network traffic and directing PCI bus traffic. Three processors are implemented using shared hardware in a three-level pipelined architecture which launches and completes a single instruction for every clock cycle. The instructions are executed in three distinct phases corresponding to each of the pipeline stages where each phase is responsible for a different function.

The first instruction phase writes the instruction results of the last instruction to the destination operand, modifies the program counter (Pc), selects the address source for the instruction to fetch, then fetches the instruction from the control store. The fetched instruction is then stored in the instruction register at the end of the clock cycle.

The processor instructions reside in the on-chip control-store, which is implemented as a mixture of ROM and SRAM. The ROM contains 1K instructions starting at address 0x0000 and aliases each 0x0400 locations throughout the first 0x8000 of instruction space. The SRAM (WCS) will hold up to 0x2000 instructions starting at address 0x8000 and aliasing each 0x2000 locations throughout the last 0x8000 of instruction space. The ROM and SRAM are both 49-bits wide accounting for bits [48:0] of the instruction microword. A separate mapping ram provides bits [55:49] of the microword (MapAddr) to allow replacement of faulty ROM based instructions. The mapping ram has a configuration of 128×7 which is insufficient to allow a separate map address for each of the 1K ROM locations. To allow re-mapping of the entire 1K ROM space, the map ram address lines are connected to the address bits Fetch[9:3]. The result is that the ROM is re-mapped in blocks of 8 contiguous locations.

The second instruction phase decodes the instruction which was stored in the instruction register. It is at this point that the map address is checked for a non-zero value which will cause the decoder to force a Jmp instruction to the map address. If a non-zero value is detected then the decoder selects the source operands for the Alu operation based on the values of the OpdASel, OpdBSel and AluOp fields. These operands are then stored in the decode register at the end of the clock cycle. Operands may originate from File, SRAM, or flip-flop based registers. The second instruction phase is also where the results of the previous instruction are written to the SRAM.

The third instruction phase is when the actual Alu operation is performed, the test condition is selected and the Stack push and pop are implemented. Results of the Alu operation are stored in the results register at the end of the clock cycle.

Figure 22:
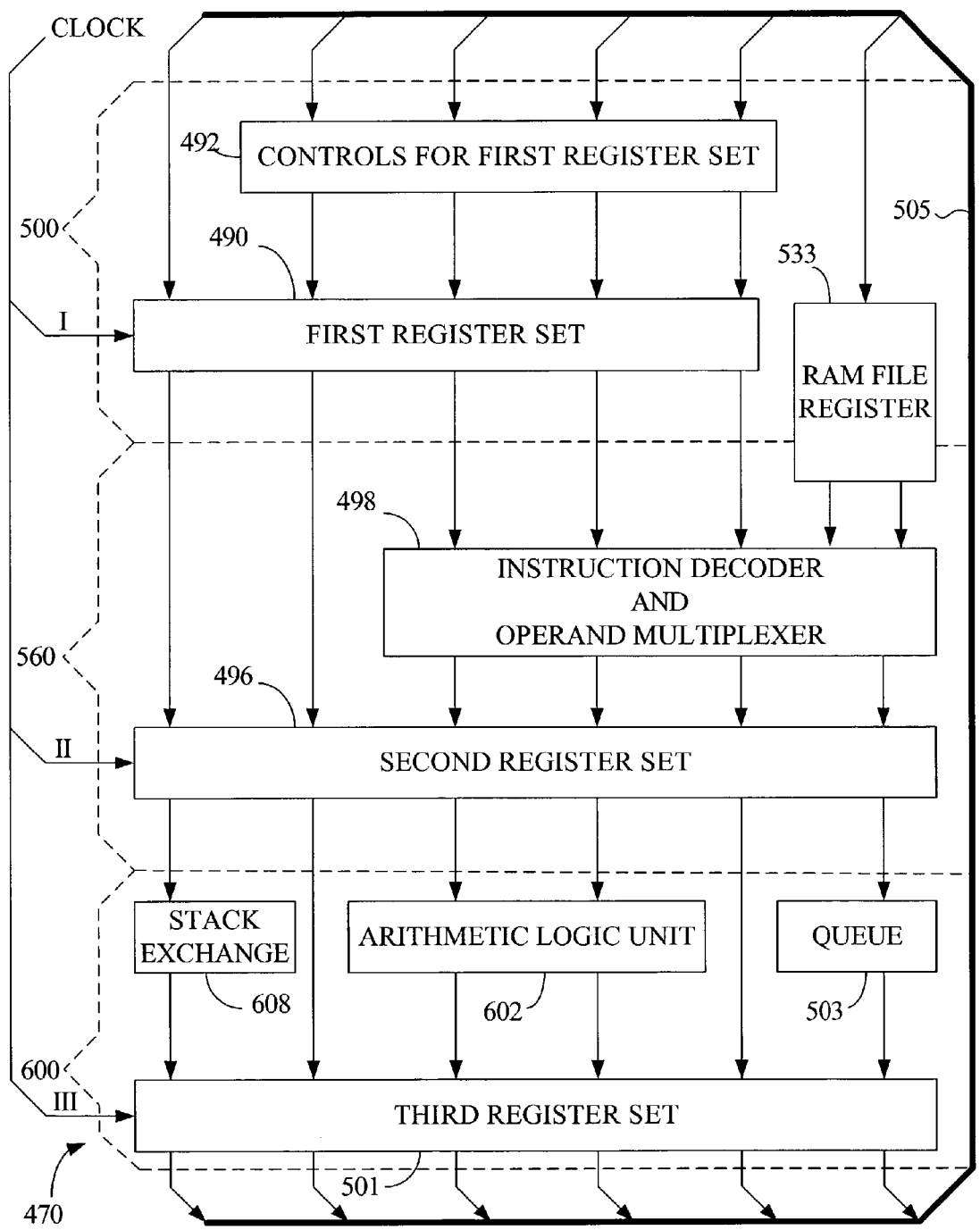
FIG. 22 is a diagram of a communications microprocessor included in the INIC, showing functions associated with a plurality of instruction phases.

FIG. 22 shows an overview of the pipelined microprocessor 470, in which instructions for the receive, transmit and utility processors are executed in three alternating phases according to Clock increments I, II and III, the phases corresponding to each of the pipeline stages. Each phase is responsible for different functions, and each of the three processors occupies a different phase during each Clock increment. Each processor usually operates upon a different instruction stream from the control store 480, and each carries its own program counter and status through each of the phases.

In general, a first instruction phase 500 of the pipelined microprocessors completes an instruction and stores the result in a destination operand, fetches the next instruction, and stores that next instruction in an instruction register. A first register set 490 provides a number of registers including the instruction register, and a set of controls 492 for first register set provides the controls for storage to the first register set 490. Some items pass through the first phase without modification by the controls 492, and instead are simply copied into the first register set 490 or a RAM file register 533. A second instruction phase 560 has an instruction decoder and operand multiplexer 498 that generally decodes the instruction that was stored in the instruction register of the first register set 490 and gathers any operands which have been generated, which are then stored in a decode register of a second register set 496. The first register set 490, second register set 496 and a third register set 501, which is employed in a third instruction phase 600, include many of the same registers, as will be seen in the more detailed views of FIGS. 15A-C. The instruction decoder and operand multiplexer 498 can read from two address and data ports of the RAM file register 533, which operates in both the first phase 500 and second phase 560. A third phase 600 of the processor 470 has an arithmetic logic unit (ALU) 602 which generally performs any ALU operations on the operands from the second register set, storing the results in a results register included in the third register set 501. A stack exchange 608 can reorder register stacks, and a queue manager 503 can arrange queues for the processor 470, the results of which are stored in the third register set.

The instructions continue with the first phase then following the third phase, as depicted by a circular pipeline 505. Note that various functions have been distributed across the three phases of the instruction execution in order to minimize the combinatorial delays within any given phase. With a frequency in this embodiment of 66 MHz, each Clock increment takes 15 nanoseconds to complete, for a total of 45 nanoseconds to complete one instruction for each of the three processors. The rotating instruction phases are depicted in more detail in FIGS. 15A-C, in which each phase is shown in a different figure.

Figure 23A:
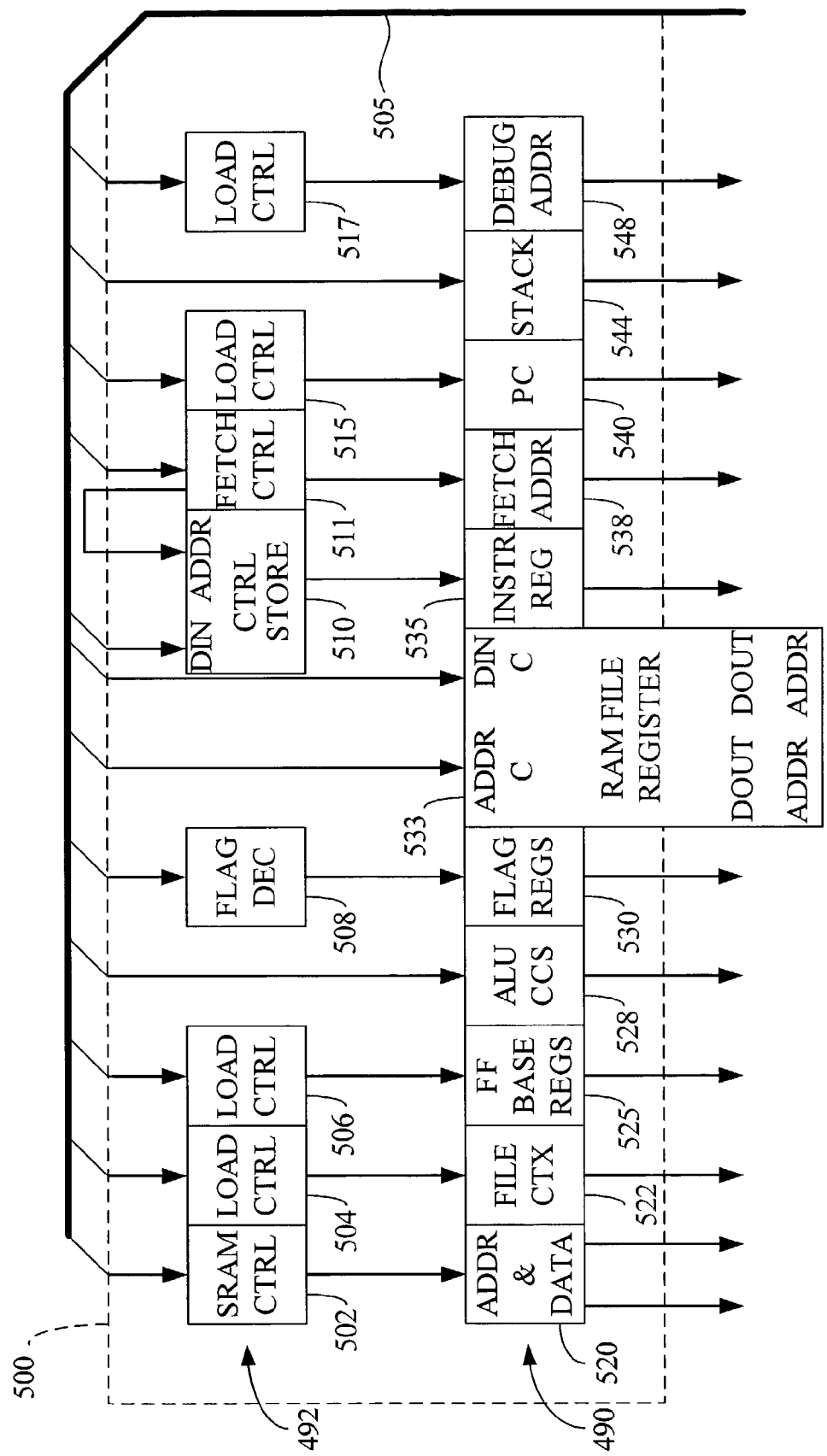
FIG. 23A is a diagram of a first phase of the microprocessor of FIG. 22, including the first register set and related controls.

More particularly, FIG. 23A shows some specific hardware functions of the first phase 500, which generally includes the first register set 490 and related controls 492. The controls for the first register set 492 includes an SRAM control 502, which is a logical control for loading address and write data into SRAM address and data registers 520. Thus the output of the ALU 602 from the third phase 600 may be placed by SRAM control 502 into an address register or data register of SRAM address and data registers 520. A load control 504 similarly provides controls for writing a context for a file to file context register 522, and another load control 506 provides controls for storing a variety of miscellaneous data to flip-flop registers 525. ALU condition codes, such as whether a carried bit is set, get clocked into ALU condition codes register 528 without an operation performed in the first phase 500. Flag decodes 508 can perform various functions, such as setting locks, that get stored in flag registers 530.

The RAM file register 533 has a single write port for addresses and data and two read ports for addresses and data, so that more than one register can be read from at one time. As noted above, the RAM file register 533 essentially straddles the first and second phases, as it is written in the first phase 500 and read from in the second phase 560. A control store instruction 510 allows the reprogramming of the processors due to new data in from the control store 480, not shown in this figure, the instructions stored in an instruction register 535. The address for this is generated in a fetch control register 511, which determines which address to fetch, the address stored in fetch address register 538. Load control 515 provides instructions for a program counter 540, which operates much like the fetch address for the control store. A last-in first-out stack 544 of three registers is copied to the first register set without undergoing other operations in this phase. Finally, a load control 517 for a debug address 548 is optionally included, which allows correction of errors that may occur.

Figure 23B:
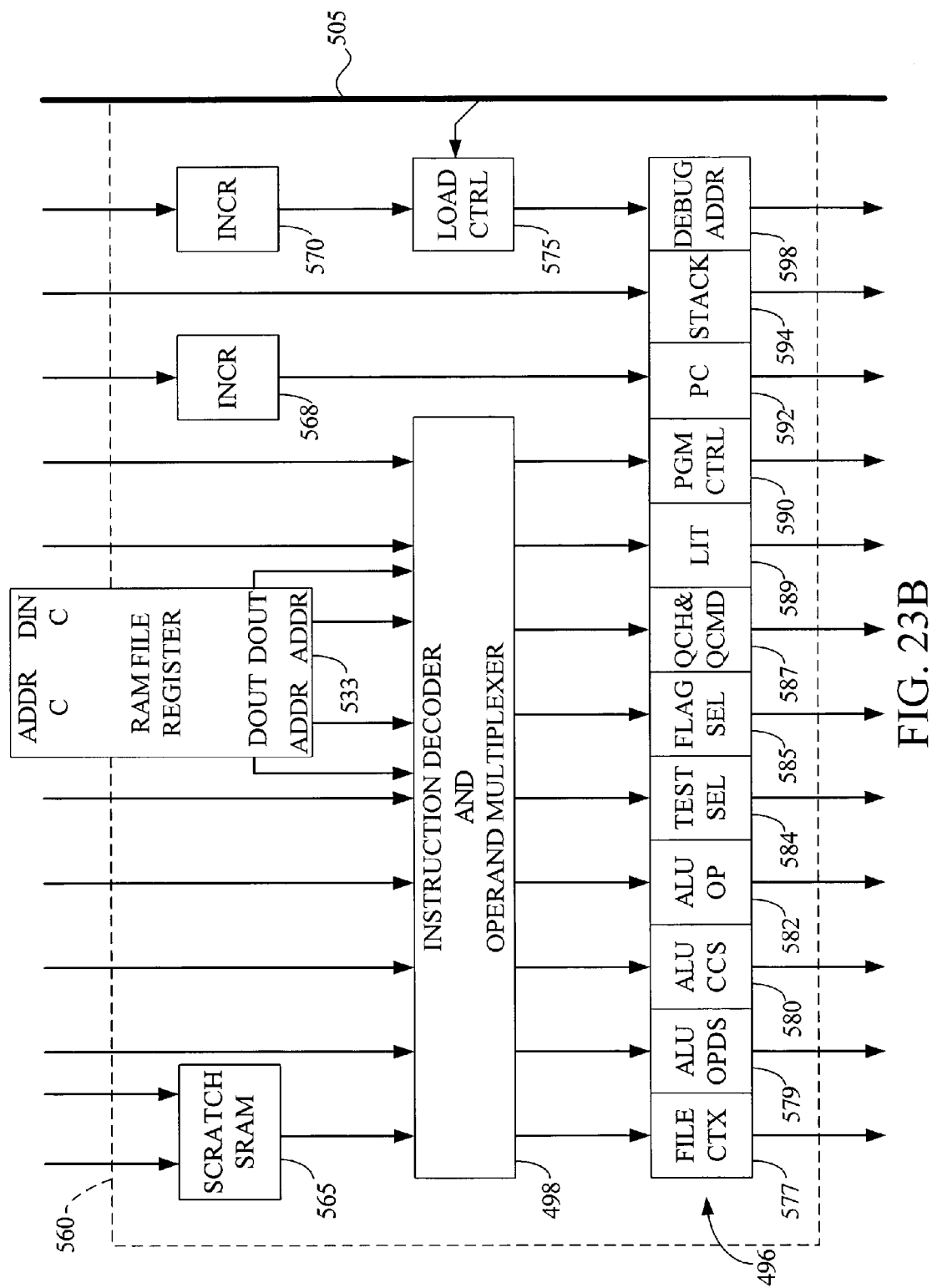
FIG. 23B is a diagram of a second microprocessor phase, including reading addresses and data out of a RAM file register.

FIG. 23B depicts the second microprocessor phase 560, which includes reading addresses and data out of the RAM file register 533. A scratch SRAM 565 is written from SRAM address and data register 520 of the first register set, which includes a register that passes through the first two phases to be incremented in the third. The scratch SRAM 565 is read by the instruction decoder and operand multiplexer 498, as are most of the registers from the first register set, with the exception of the stack 544, debug address 548 and SRAM address and data register mentioned above. The instruction decoder and operand multiplexer 498 looks at the various registers of set 490 and SRAM 565, decodes the instructions and gathers the operands for operation in the next phase, in particular determining the operands to provide to the ALU 602 below. The outcome of the instruction decoder and operand multiplexer 498 is stored to a number of registers in the second register set 496, including ALU operands 579 and 582, ALU condition code register 580, and a queue channel and command 587 register, which in this embodiment can control thirty-two queues. Several of the registers in set 496 are loaded fairly directly from the instruction register 535 above without substantial decoding by the decoder 498, including a program control 590, a literal field 589, a test select 584 and a flag select 585. Other registers such as the file context 522 of the first phase 500 are always stored in a file context 577 of the second phase 560, but may also be treated as an operand that is gathered by the multiplexer 572. The stack registers 544 are simply copied in stack register 594. The program counter 540 is incremented 568 in this phase and stored in register 592. Also incremented 570 is the optional debug address 548, and a load control 575 may be fed from the pipeline 505 at this point in order to allow error control in each phase, the result stored in debug address 598.

Figure 23C:
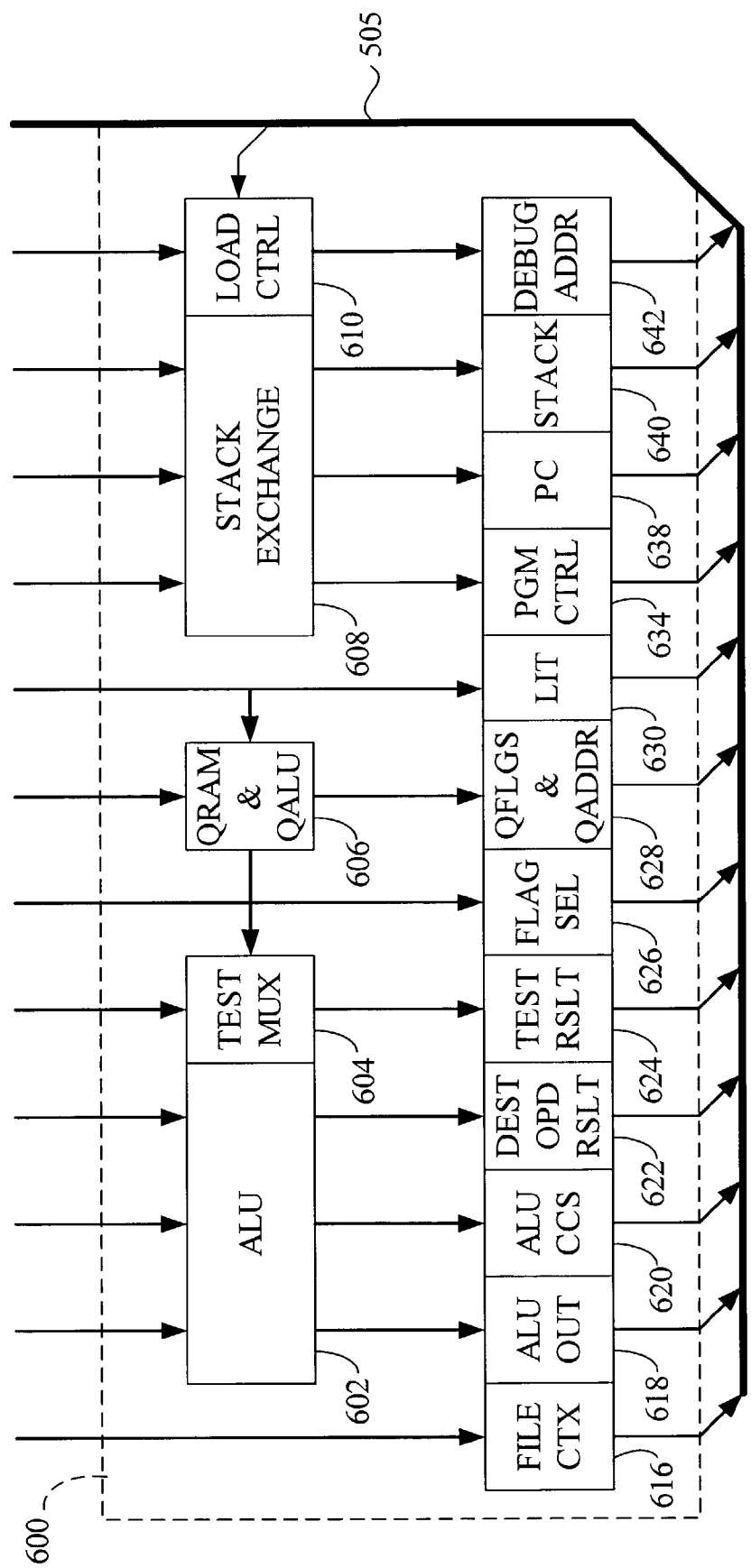
FIG. 23C is a diagram of a third microprocessor phase, including ALU and queue operations.

FIG. 23C depicts the third microprocessor phase 600, which includes ALU and queue operations. The ALU 602 includes an adder, priority encoders and other standard logic functions. Results of the ALU are stored in registers ALU output 618, ALU condition codes 620 and destination operand results 622. A file context register 616, flag select register 626 and literal field register 630 are simply copied from the previous phase 560. A test multiplexer 604 is provided to determine whether a conditional jump results in a jump, with the results stored in a test results register 624. The test multiplexer 604 may instead be performed in the first phase 500 along with similar decisions such as fetch control 511. A stack exchange 608 shifts a stack up or down by fetching a program counter from stack 594 or putting a program counter onto that stack, results of which are stored in program control 634, program counter 638 and stack 640 registers. The SRAM address may optionally be incremented in this phase 600. Another load control 610 for another debug address 642 may be forced from the pipeline 505 at this point in order to allow error control in this phase also. A QRAM & QALU 606, shown together in this figure, read from the queue channel and command register 587, store in SRAM and rearrange queues, adding or removing data and pointers as needed to manage the queues of data, sending results to the test multiplexer 604 and a queue flags and queue address register 628. Thus the QRAM & QALU 606 assume the duties of managing queues for the three processors, a task conventionally performed sequentially by software on a CPU, the queue manager 606 instead providing accelerated and substantially parallel hardware queuing.

The micro-instructions are divided into six types according to the program control directive. The micro-instruction is further divided into sub-fields for which the definitions are dependent upon the instruction type. The word format for the six instruction types are listed in Table 8 below.

TABLE 8

| TYPE | [55:49] | [48:47] | [46:42] | [41:33] | [32:24] | [23:16] | [15:00] |
|---|---|---|---|---|---|---|---|
| Jcc | 0b0000000 | 0b00, | AluOp, | OpdASel, | OpdBSel, | TstSel, | Literal |
| Jmp | 0b0000000 | 0b01, | AluOp, | OpdASel, | OpdBSel, | FlgSel, | Literal |
| Jsr | 0b0000000 | 0b10, | AluOp, | OpdASel, | OpdBSel, | FlgSel, | Literal |
| Rts | 0b0000000 | 0b11, | AluOp, | OpdASel, | OpdBSel, | 0hff, | Literal |
| Nxt | 0b0000000 | 0b11, | AluOp, | OpdASel, | OpdBSel, | FlgSel, | Literal |
| Map | MapAddr | 0bXX, | 0bXXXXX, | 0bXXXXXXXXX, | 0bXXXXXXXXX, | 0hXX, | 0hXXXX |

All instructions include the Alu operation (AluOp), operand "A" select (OpdASel), operand "B" select (OpdBSel) and Literal fields. Other field usage depends upon the instruction type.

The "jump condition code" (Jcc) instruction causes the program counter to be altered if the condition selected by the "test select" (TstSel) field is asserted. The new program counter (Pc) value is loaded from either the Literal field or the AluOut as described in the following section and the Literal field may be used as a source for the Alu or the ram address if the new Pc value is sourced by the Alu.

The "jump" (Jmp) instruction causes the program counter to be altered unconditionally. The new program counter (Pc) value is loaded from either the Literal field or the AluOut as described in the following section. The format allows instruction bits 23:16 to be used to perform a flag operation and the Literal field may be used as a source for the Alu or the ram address if the new Pc value is sourced by the Alu.

The "jump subroutine" (Jsr) instruction causes the program counter to be altered unconditionally. The new program counter (Pc) value is loaded from either the Literal field or the AluOut as described in the following section. The old program counter value is stored on the top location of the PcStack which is implemented as a LIFO memory. The format allows instruction bits 23:16 to be used to perform a flag operation and the Literal field may be used as a source for the Alu or the ram address if the new Pc value is sourced by the Alu.

The "Nxt" (Nxt) instruction causes the program counter to increment. The format allows instruction bits 23:16 to be used to perform a flag operation and the Literal field may be used as a source for the Alu or the ram address.

The "return from subroutine" (Rts) instruction is a special form of the Nxt instruction in which the "flag operation" (FlgSel) field is set to a value of 0hff. The current Pc value is replaced with the last value stored in the stack. The Literal field may be used as a source for the Alu or the ram address.

The Map instruction is provided to allow replacement of instructions which have been stored in ROM and is implemented any time the "map enable" (MapEn) bit has been set and the content of the "map address" (MapAddr) field is non-zero. The instruction decoder forces a jump instruction with the Alu operation and destination fields set to pass the MapAddr field to the program control block.

The program control is determined by a combination of PgmCtrl, DstOpd, FlgSel and TstSel. The behavior of the program control is illustrated in the "C-like" description contained in CD Appendix A.

Hardware will detect certain program errors. Any sequencer generating a program error will be forced to continue executing from location 0004. The program errors detected are:

1. Stack Overflow—A JSR is attempted and the stack registers are full.
2. Stack Underflow—An RTS is attempted and the stack registers are empty.
3. Incompatible SRAM Size & SRAM Alignment—An SRAM Operation is attempted where the size and the SRAM address would cause the operation to extend beyond the size of the word, e.g. Size=4 Address=401 or Size=2 Address=563
4. A SRAM read is attempted immediately following an SRAM write. Because an SRAM write is actually done in the clock cycle of the following instruction, the SRAM interface will be busy during that phase, and an SRAM read is illegal at this time. Sequencer behavior is described with in CD Appendix A.

Figure 24:
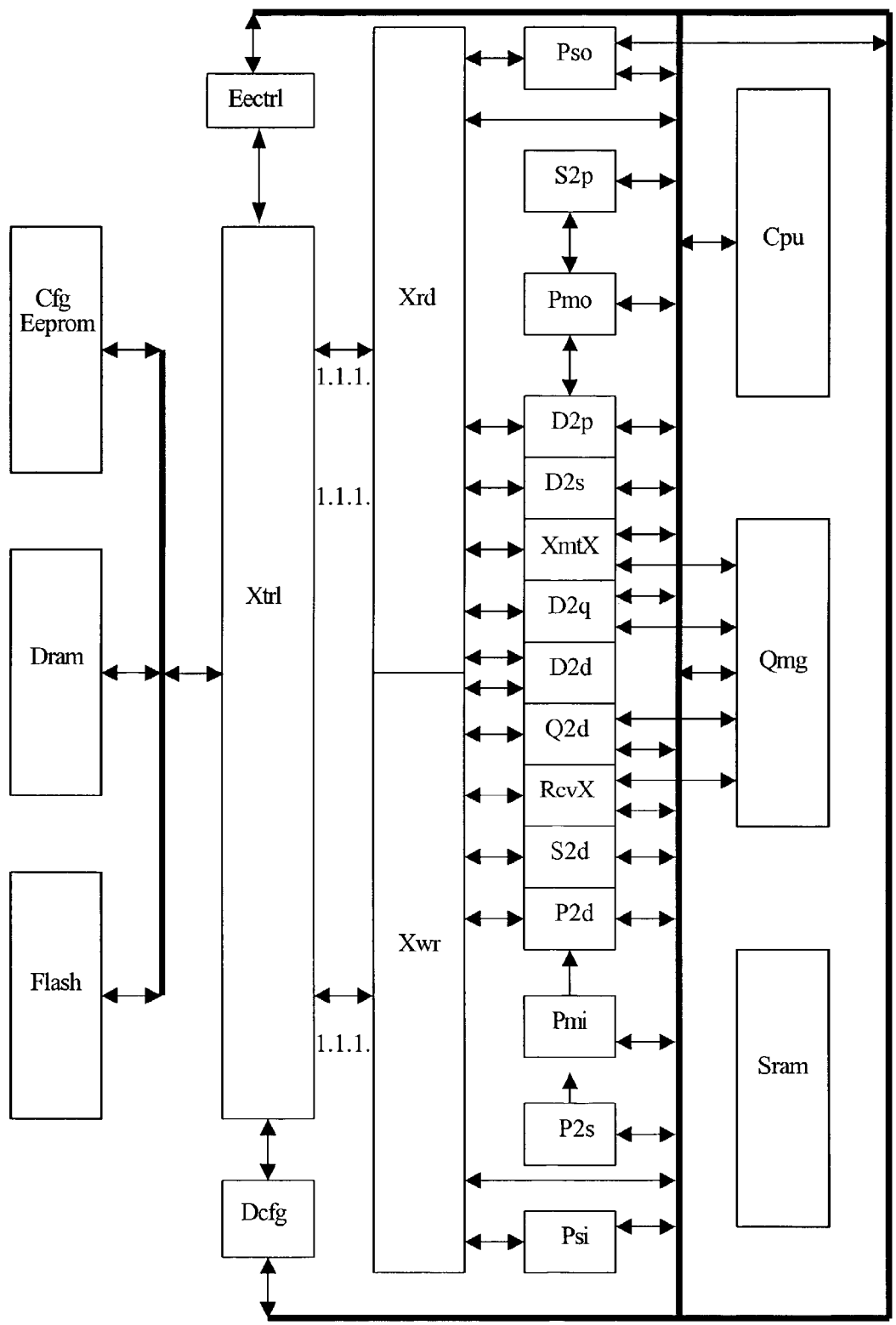
FIG. 24 is a diagram of various sequencers contained in the INIC.

FIG. 24 is a diagram of various sequencers contained in the INIC with arrows representing the flow of data therebetween. Request information such as r/w, address, size, endian and alignment are represented by each request line. Acknowledge information to master sequencers include only the size of the transfer being acknowledged.

Figure 25:
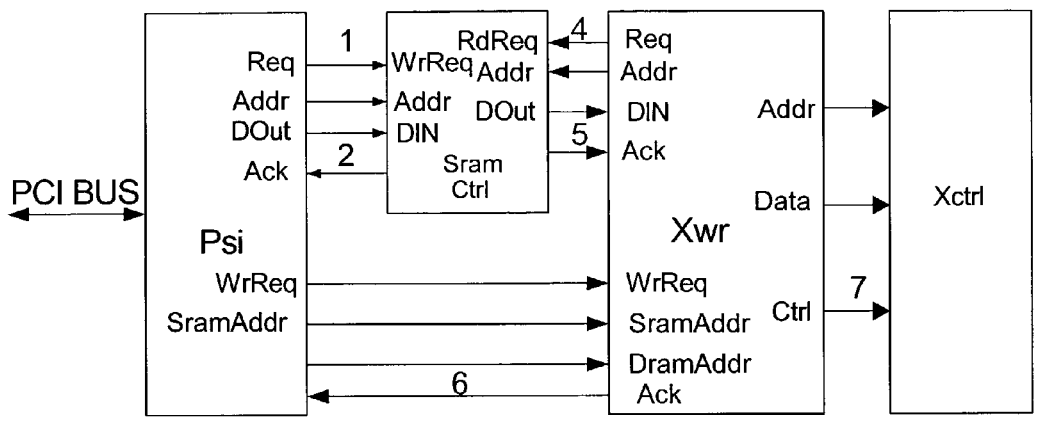
FIG. 25 is a diagram of data movement for a Pci slave write to DRAM.

FIG. 25 illustrates how data movement is accomplished for a Pci slave write to Dram. Note that the Psi (Pci slave in) module functions as both a master sequencer. Psi sends a write request to the SramCtrl module. Psi requests Xwr to move data from SRAM to dram. Xwr subsequently sends a read request to the SRAMCtrl module then writes the data to the dram via the Xctrl module. As each piece of data is moved from the SRAM to Xwr, Xwr sends an acknowledge to the Psi module.

Figure 26:
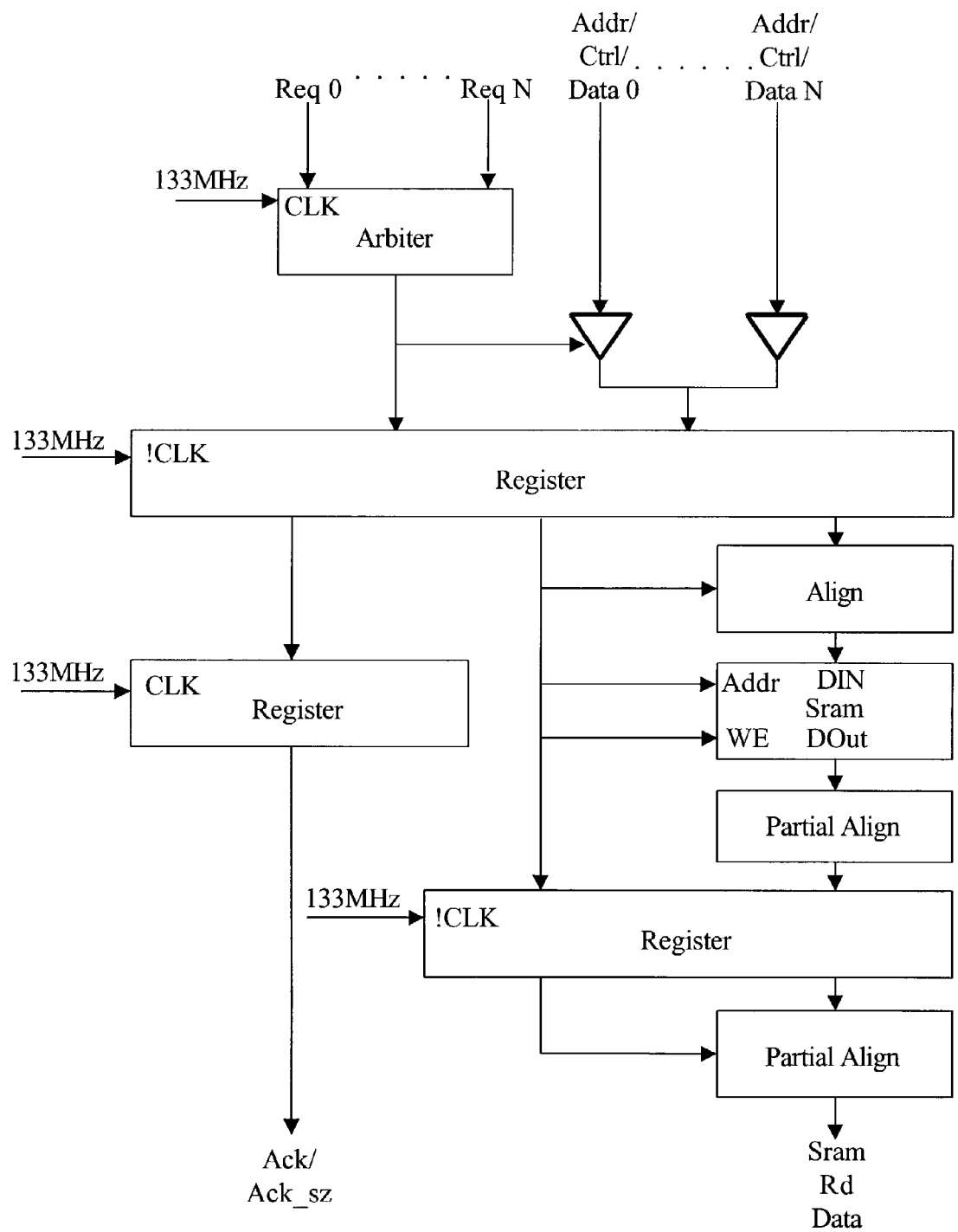
FIG. 26 is a diagram of an SRAM Control Sequencer contained in the INIC.

FIG. 26 is a diagram of an SRAM CONTROL SEQUENCER (SramCtrl). SRAM is the nexus for data movement within the microprocessor. A hierarchy of sequencers, working in concert, accomplish the movement of data between DRAM, SRAM, Cpu, ethernet and the Pci bus. Slave sequencers, provided with stimulus from master sequencers, request data movement operations by way of the SRAM, Pci bus, DRAM and Flash. The slave sequencers prioritize, service and acknowledge the requests.

The SRAM control sequencer services requests to store to, or retrieve data from an SRAM organized as 1024 locations by 128 bits (16 KB). The sequencer operates at a frequency of 133 MHz, allowing both a Cpu access and a DMA access to occur during a standard 66 MHz Cpu cycle. One 133 MHz cycle is reserved for Cpu accesses during each 66 MHz cycle while the remaining 133 MHz cycle is reserved for DMA accesses on a prioritized basis.

Figure 27:
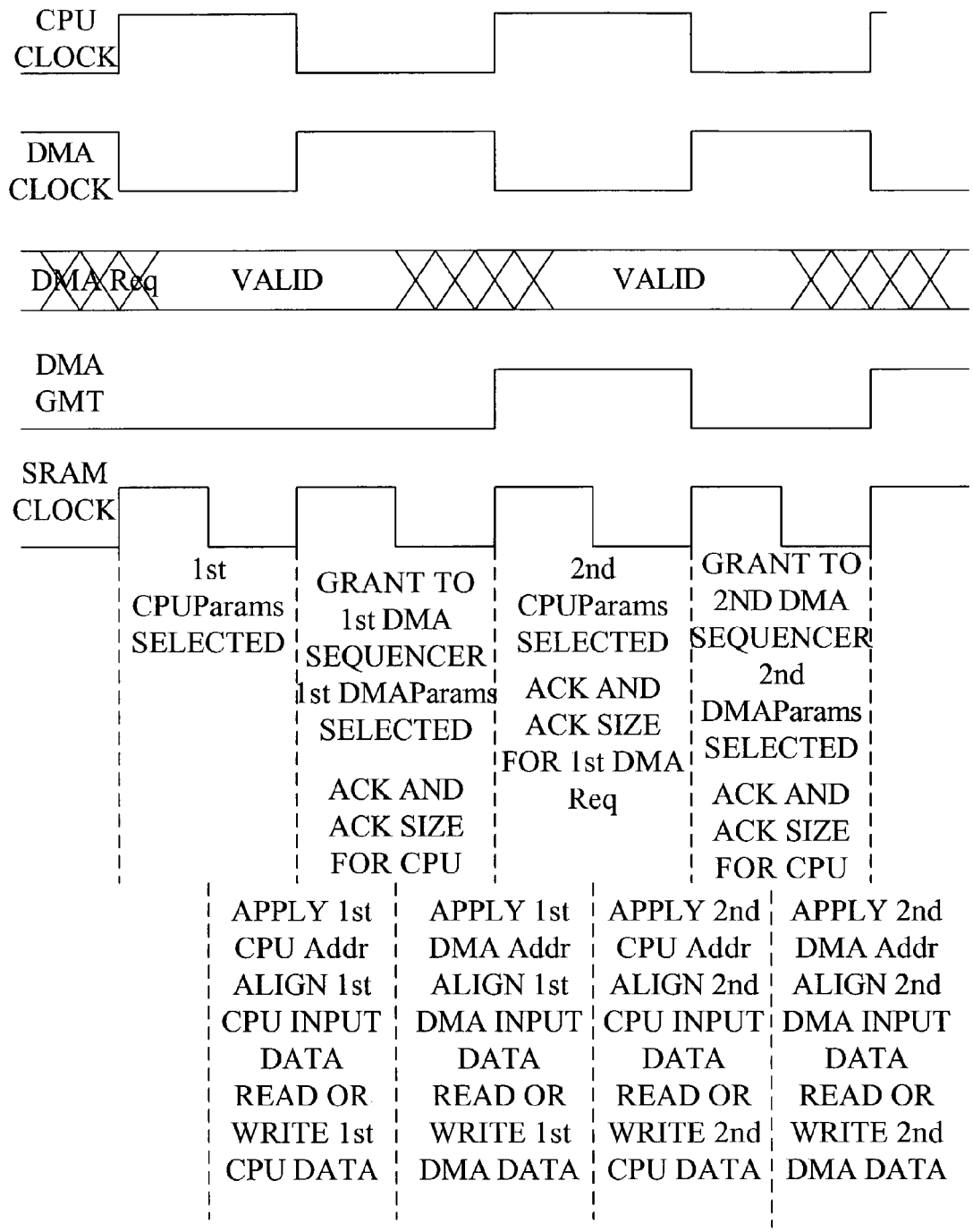
FIG. 27 is a timing diagram for the SRAM Control Sequencer.

FIG. 26 shows the major functions of the SRAM control sequencer. A slave sequencer begins by asserting a request along with r/w, ram address, endian, data path size, data path alignment and request size. SramCtrl prioritizes the requests. The request parameters are then selected by a multiplexer which feeds the parameters to the SRAM via a register. The requestor provides the SRAM address which when coupled with the other parameters controls the input and output alignment. SRAM outputs are fed to the output aligner via a register. Requests are acknowledged in parallel with the returned data. FIG. 27 is a timing diagram depicting two ram accesses during a single 66 MHz clock cycle.

Figure 28:
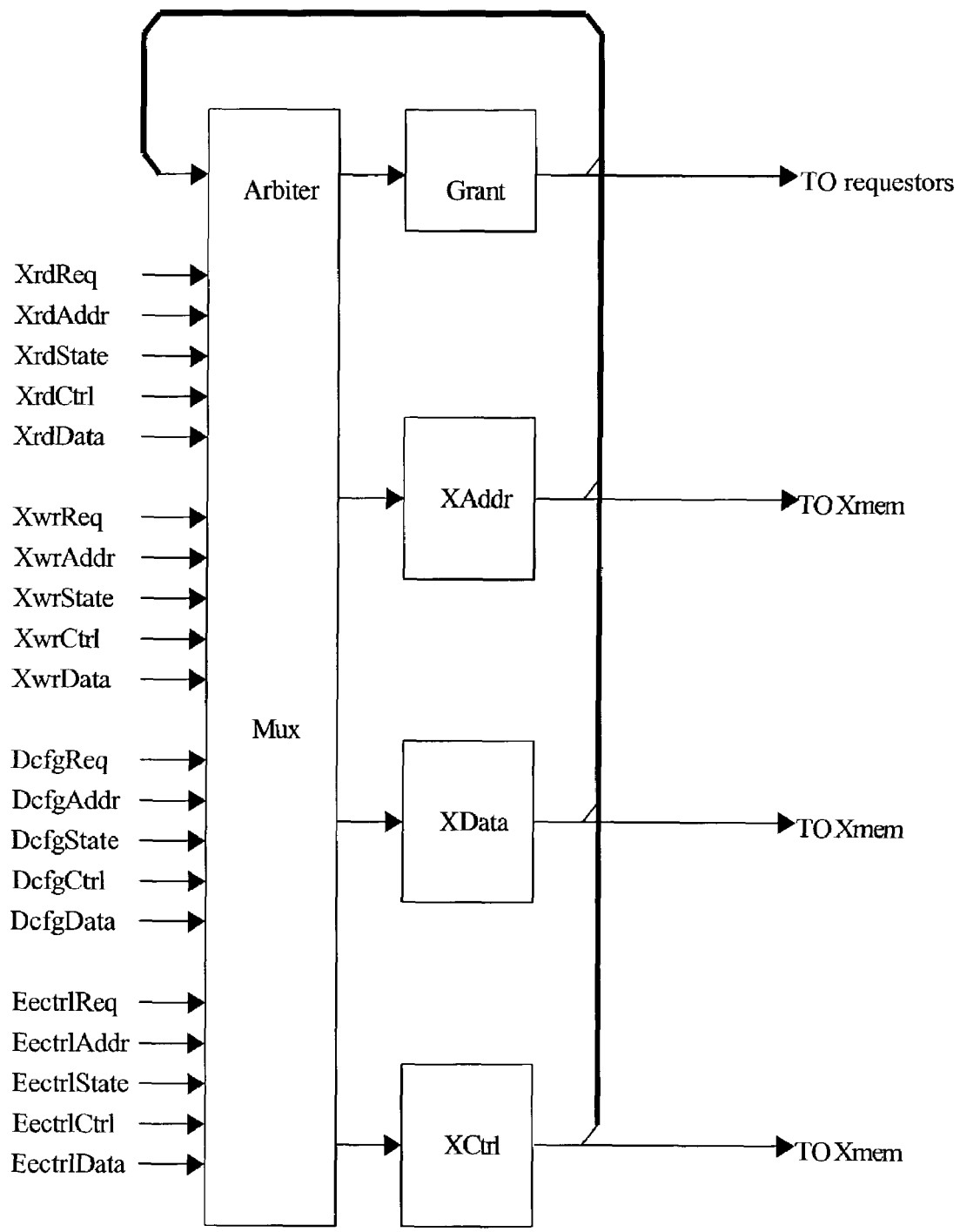
FIG. 28 is a block diagram of an External Memory Control.

FIG. 28 is a diagram of an EXTERNAL MEMORY CONTROL (Xctrl). Xctrl provides the facility whereby Xwr, Xrd, Dcfg and Eectrl access external Flash and DRAM. Xctrl includes an arbiter, i/o registers, data multiplexers, address multiplexers and control multiplexers. Ownership of the external memory interface is requested by each block and granted to each of the requesters by the arbiter function. Once ownership has been granted the multiplexers select the address, data and control signals from owner, allowing access to external memory.

Figure 30:
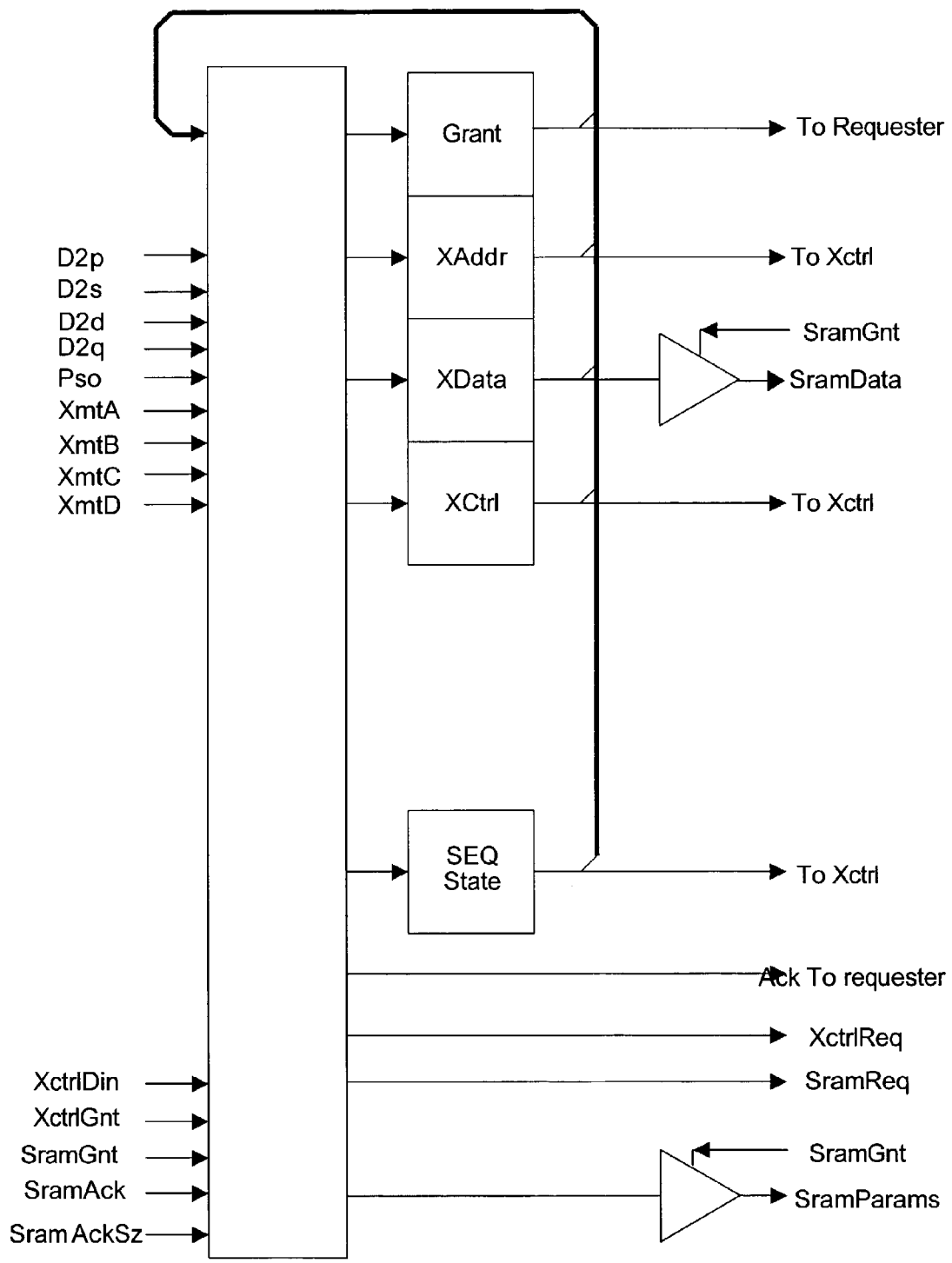
FIG. 30 is a block diagram of an External Memory Read Sequencer.

FIG. 30 is a diagram of an EXTERNAL MEMORY READ SEQUENCER (Xrd). The Xrd sequencer acts only as a slave sequencer. Servicing requests issued by master sequencers, the Xrd sequencer moves data from external SDRAM or flash to the SRAM, via the Xctrl module, in blocks of 32 bytes or less. The nature of the SDRAM requires fixed burst sizes for each of it's internal banks with ras precharge intervals between each access. By selecting a burst size of 32 bytes for SDRAM reads and interleaving bank accesses on a 16 byte boundary, we can ensure that the ras precharge interval for the first bank is satisfied before burst completion for the second bank, allowing us to re-instruct the first bank and continue with uninterrupted DRAM access. SDRAMs require a consistent burst size be utilized each and every time the SDRAM is accessed. For this reason, if an SDRAM access does not begin or end on a 32 byte boundary, SDRAM bandwidth will be reduced due to less than 32 bytes of data being transferred during the burst cycle.

A first step in servicing a request to move data from SDRAM to SRAM is the prioritization of the master sequencer requests. Next the Xrd sequencer takes a snapshot of the DRAM read address and applies configuration information to determine the correct bank, row and column address to apply. Once sufficient data has been read, the Xrd sequencer issues a write request to the SramCtrl sequencer which in turn sends an acknowledge to the Xrd sequencer. The Xrd sequencer passes the acknowledge along to the level two master with a size code indicating how much data was written during the SRAM cycle allowing the update of pointers and counters. The DRAM read and SRAM write cycles repeat until the original burst request has been completed at which point the Xrd sequencer prioritizes any remaining requests in preparation for the next burst cycle.

Contiguous DRAM burst cycles are not guaranteed to the Xrd sequencer as an algorithm is implemented which ensures highest priority to refresh cycles followed by flash accesses, DRAM writes then DRAM reads.

Figure 29:
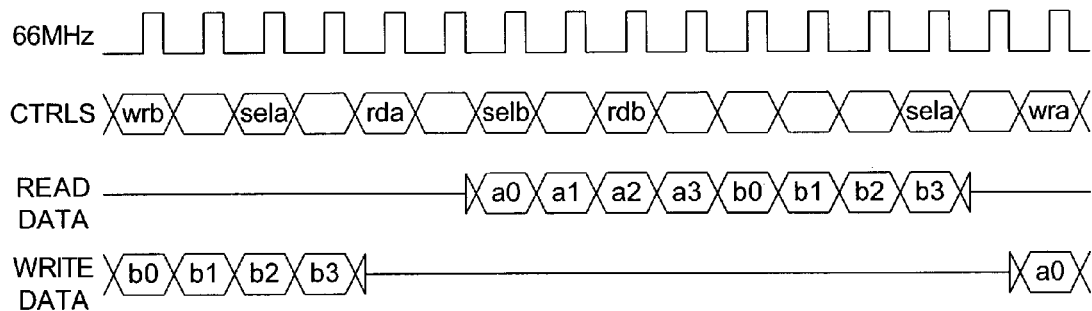
FIG. 29 is a timing diagram illustrating a data read from SDRAM.

FIG. 29 is a timing diagram illustrating how data is read from SDRAM. The DRAM has been configured for a burst of four with a latency of two clock cycles. Bank A is first selected/activated followed by a read command two clock cycles later. The bank select/activate for bank B is next issued as read data begins returning two clocks after the read command was issued to bank A. Two clock cycles before we need to receive data from bank B we issue the read command. Once all 16 bytes have been received from bank A we begin receiving data from bank B.

Figure 32:
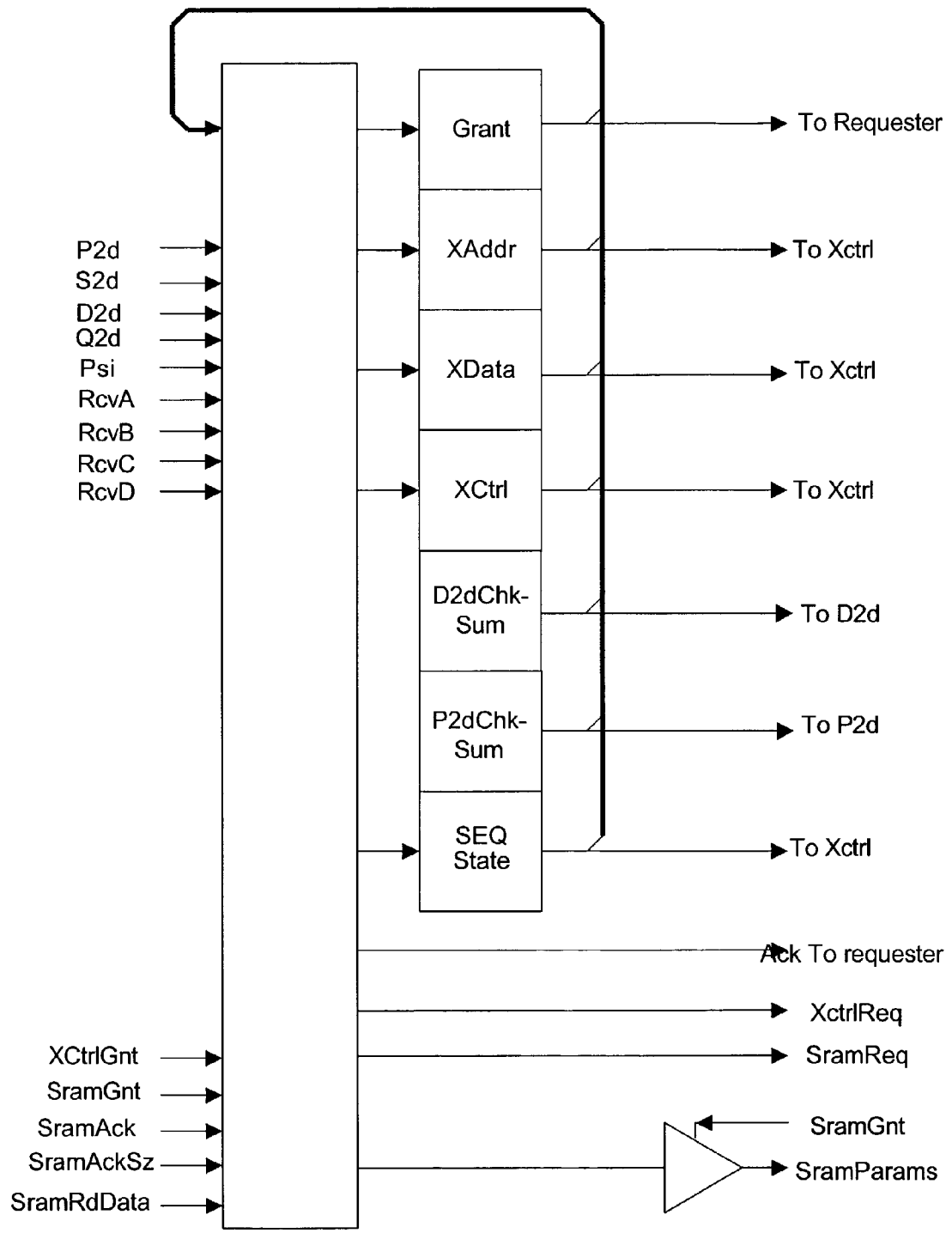
FIG. 32 is a diagram of an External Memory Write Sequencer.

FIG. 32 depicts the major functional blocks of the EXTERNAL MEMORY WRITE SEQUENCER (Xwr). The Xwr sequencer is a slave sequencer. Servicing requests issued by master sequencers, the Xwr sequencer moves data from SRAM to the external SDRAM or flash, via the Xctrl module, in blocks of 32 bytes or less while accumulating a checksum of the data moved. The nature of the SDRAM requires fixed burst sizes for each of its internal banks with ras precharge intervals between each access. By selecting a burst size of 32 bytes for SDRAM writes and interleaving bank accesses on a 16 byte boundary, we can ensure that the ras precharge interval for the first bank is satisfied before burst completion for the second bank, allowing us to re-instruct the first bank and continue with uninterrupted DRAM access. SDRAMs require a consistent burst size be utilized each and every time the SDRAM is accessed. For this reason, if an SDRAM access does not begin or end on a 32-byte boundary, SDRAM bandwidth will be reduced due to less than 32 bytes of data being transferred during the burst cycle.

The first step in servicing a request to move data from SRAM to SDRAM is the prioritization of the level two master requests. Next the Xwr sequencer takes a Snapshot of the DRAM write address and applies configuration information to determine the correct DRAM, bank, row and column address to apply. The Xwr sequencer immediately issues a read command to the SRAM to which the SRAM responds with both data and an acknowledge. The Xwr sequencer passes the acknowledge to the level two master along with a size code indicating how much data was read during the SRAM cycle allowing the update of pointers and counters. Once sufficient data has been read from SRAM, the Xwr sequencer issues a write command to the DRAM starting the burst cycle and computing a checksum as the data flies by. The SRAM read cycle repeats until the original burst request has been completed at which point the Xwr sequencer prioritizes any remaining requests in preparation for the next burst cycle.

Contiguous DRAM burst cycles are not guaranteed to the Xwr sequencer as an algorithm is implemented which ensures highest priority to refresh cycles followed by flash accesses then DRAM writes.

Figure 31:
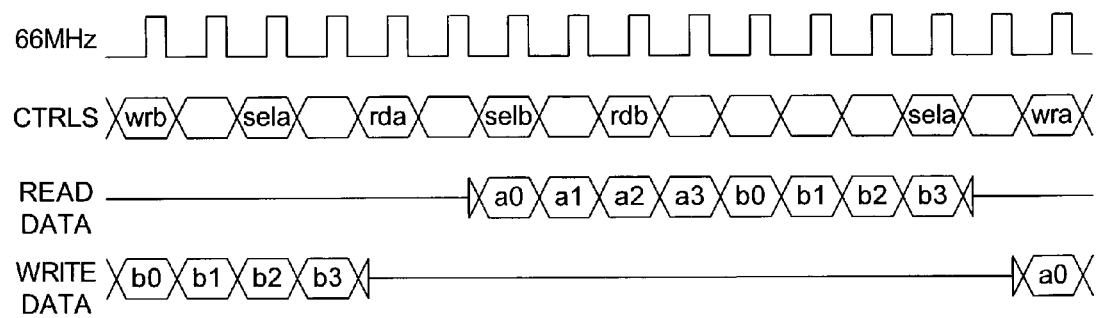
FIG. 31 is a timing diagram illustrating a data write to SDRAM.

FIG. 31 is a timing diagram illustrating how data is written to SDRAM. The DRAM has been configured for a burst of four with a latency of two clock cycles. Bank A is first selected/activated followed by a write command two clock cycles later. The bank select/activate for bank B is next issued in preparation for issuing the second write command. As soon as the first 16 byte burst to bank A completes we issue the write command for bank B and begin supplying data.

Figure 33:
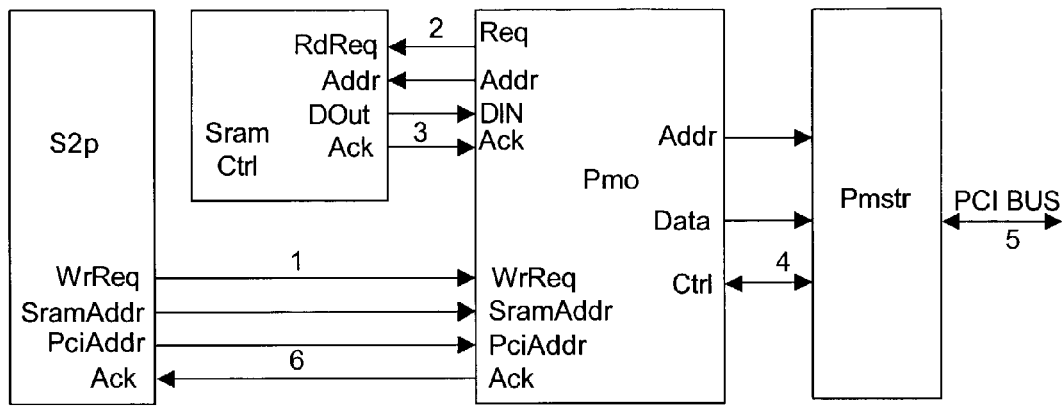
FIG. 33 is a diagram of a PCI Master-Out Sequencer.

A PCI MASTER-OUT SEQUENCER (Pmo) is shown in FIG. 33. The Pmo sequencer acts only as a slave sequencer. Servicing requests issued by master sequencers, the Pmo sequencer moves data from an SRAM based FIFO to a PCI target, via the PciMstrIO module, in bursts of up to 256 bytes. The nature of the PCI bus dictates the use of the write line command to ensure optimal system performance. The write line command requires that the Pmo sequencer be capable of transferring a whole multiple (1×, 2×, 3×, . . . ) of cache lines of which the size is set through the PCI configuration registers. To accomplish this end, Pmo will automatically perform partial bursts until it has aligned the transfers on a cache line boundary at which time it will begin usage of the write line command. The SRAM FIFO depth, of 256 bytes, has been chosen in order to allow Pmo to accommodate cache line sizes up to 128 bytes. Provided the cache line size is less than 128 bytes, Pmo will perform multiple, contiguous cache line bursts until it has exhausted the supply of data.

Pmo receives requests from two separate sources; the DRAM to PCI (D2p) module and the SRAM to PCI (S2p) module. An operation first begins with prioritization of the requests where the S2p module is given highest priority. Next, the Pmo module takes a Snapshot of the SRAM FIFO address and uses this to generate read requests for the SramCtrl sequencer. The Pmo module then proceeds to arbitrate for ownership of the PCI bus via the PciMstrIO module. Once the Pmo holding registers have sufficient data and PCI bus mastership has been granted, the Pmo module begins transferring data to the PCI target. For each successful transfer, Pmo sends an acknowledge and encoded size to the master sequencer, allow it to update it's internal pointers, counters and status. Once the PCI burst transaction has terminated, Pmo parks on the PCI bus unless another initiator has requested ownership. Pmo again prioritizes the incoming requests and repeats the process.

Figure 34:
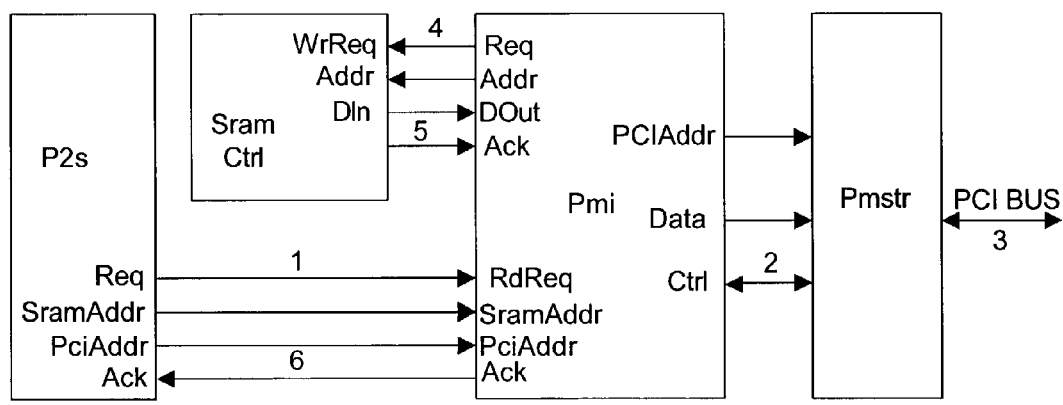
FIG. 34 is a diagram of a PCI Master-In Sequencer.

FIG. 34 is a diagram of a PCI MASTER-IN SEQUENCER (Pmi). The Pmi sequencer acts only as a slave sequencer. Servicing requests issued by master sequencers, the Pmi sequencer moves data from a PCI target to an SRAM based FIFO, via the PciMstrIO module, in bursts of up to 256 bytes. The nature of the PCI bus dictates the use of the read multiple command to ensure optimal system performance. The read multiple command requires that the Pmi sequencer be capable of transferring a cache line or more of data. To accomplish this end, Pmi will automatically perform partial cache line bursts until it has aligned the transfers on a cache line boundary at which time it will begin usage of the read multiple command. The SRAM FIFO depth, of 256 bytes, has been chosen in order to allow Pmi to accommodate cache line sizes up to 128 bytes. Provided the cache line size is less than 128 bytes, Pmi will perform multiple, contiguous cache line bursts until it has filled the FIFO.

Pmi receive requests from two separate sources; the PCI to DRAM (P2d) module and the PCI to SRAM (P2s) module. An operation first begins with prioritization of the requests where the P2s module is given highest priority. The Pmi module then proceeds to arbitrate for ownership of the PCI bus via the PciMstrIO module. Once the PCI bus mastership has been granted and the Pmi holding registers have sufficient data, the Pmi module begins transferring data to the SRAM FIFO. For each successful transfer, Pmi sends an acknowledge and encoded size to the master sequencer, allowing it to update it's internal pointers, counters and status. Once the PCI burst transaction has terminated, Pmi parks on the PCI bus unless another initiator has requested ownership. Pmi again prioritizes the incoming requests and repeats the process.

Figure 36:
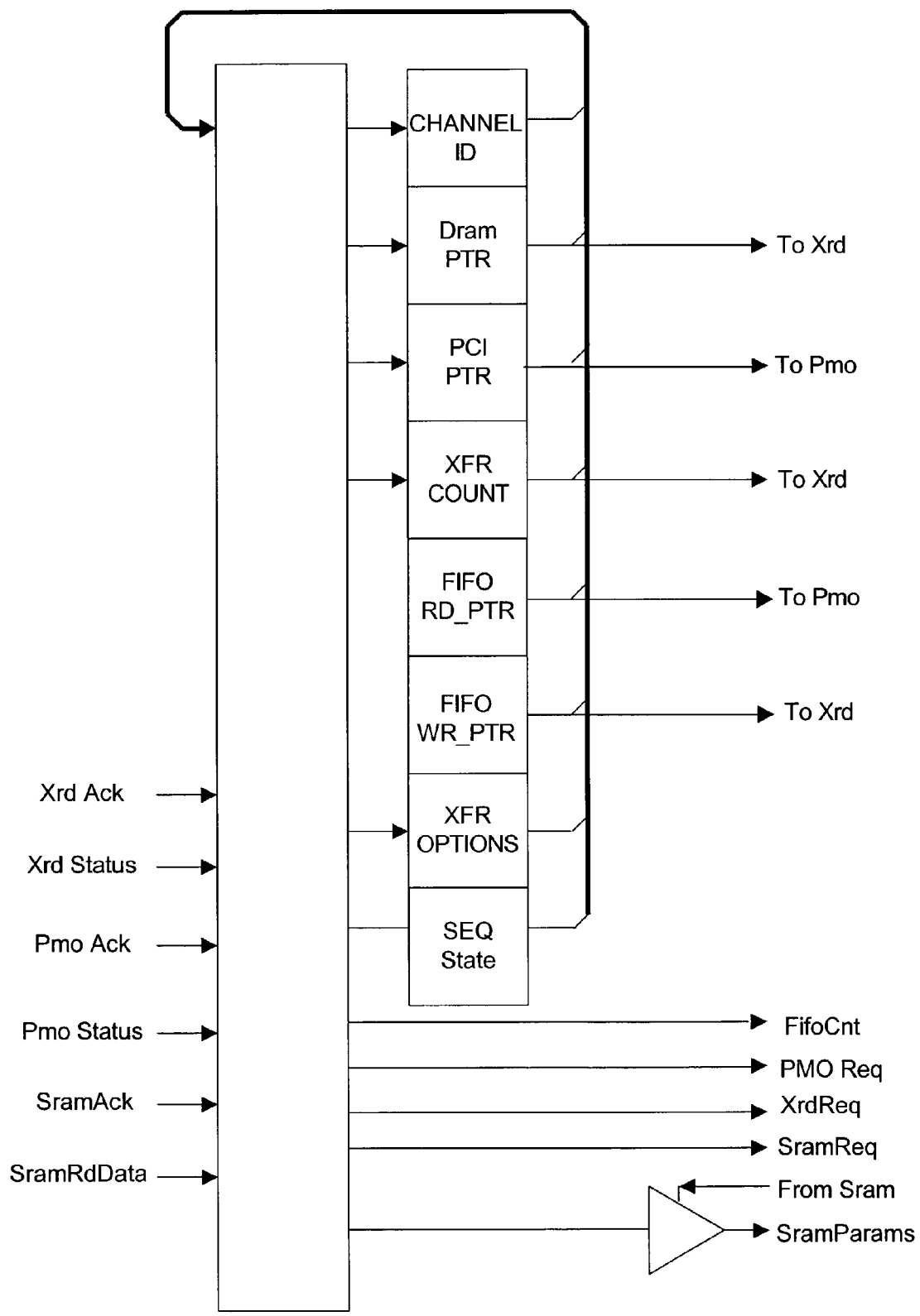
FIG. 36 is a diagram of a DRAM to PCI Sequencer.

FIG. 36 is a diagram of a DRAM TO PCI SEQUENCER (D2p). The D2p sequencer acts as a master sequencer. Servicing channel requests issued by the Cpu, the D2p sequencer manages movement of data from DRAM to the PCI bus by issuing requests to both the Xrd sequencer and the Pmo sequencer. Data transfer is accomplished using an SRAM based FIFO through which data is staged.

D2p can receive requests from any of the processor's thirty-two DMA channels. Once a command request has been detected, D2p fetches a DMA descriptor from an SRAM location dedicated to the requesting channel which includes the DRAM address, PCI address, PCI endian and request size. D2p then issues a request to the D2s sequencer causing the SRAM based FIFO to fill with DRAM data. Once the FIFO contains sufficient data for a PCI transaction, D2s issues a request to Pmo which in turn moves data from the FIFO to a PCI target. The process repeats until the entire request has been satisfied at which time D2p writes ending status in to the SRAM DMA descriptor area and sets the channel done bit associated with that channel. D2p then monitors the DMA channels for additional requests.

Figure 35:
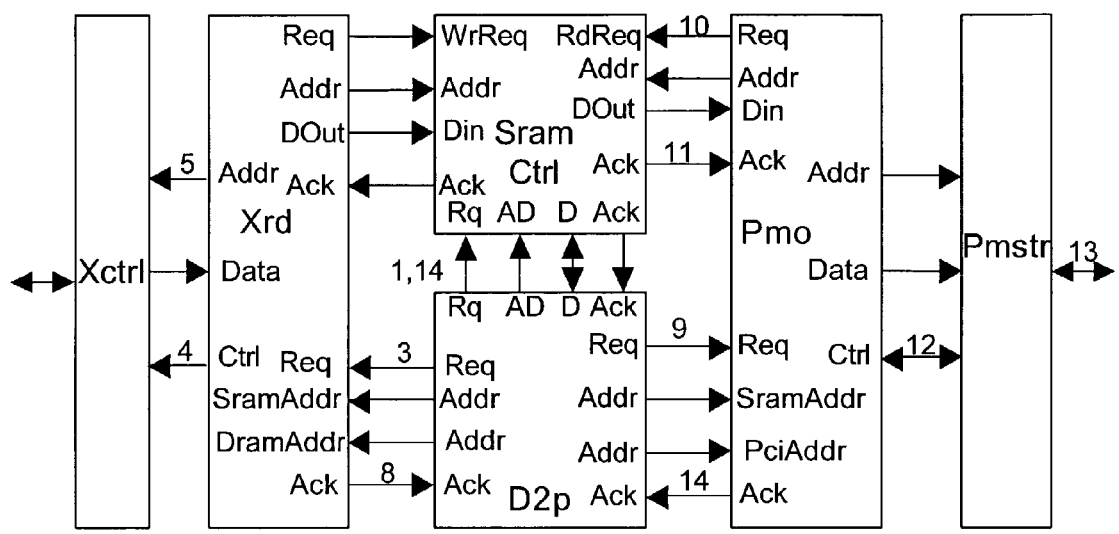
FIG. 35 is a diagram illustrating data movement from DRAM to Pci target.

FIG. 35 is an illustration showing the major blocks involved in the movement of data from DRAM to PCI target.

Figure 38:
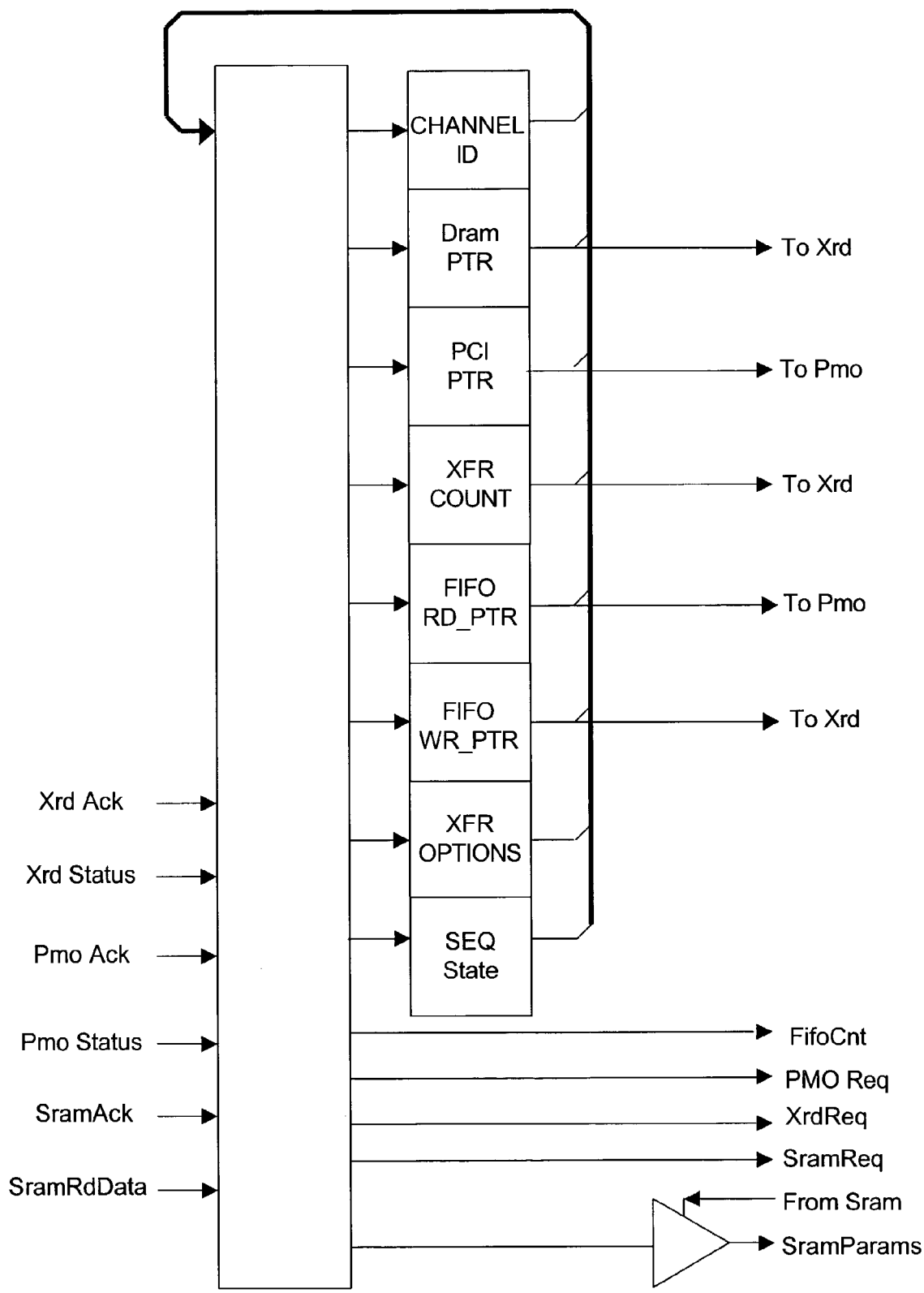
FIG. 38 is a diagram of a PCI to DRAM Sequencer.

FIG. 38 is a diagram of a PCI TO DRAM SEQUENCER (P2d). The P2d sequencer acts as both a slave sequencer and a master sequencer. Servicing channel requests issued by the Cpu, the P2d sequencer manages movement of data from PCI bus to DRAM by issuing requests to both the Xwr sequencer and the Pmi sequencer. Data transfer is accomplished using an SRAM based FIFO through which data is staged.

P2d can receive requests from any of the processor's thirty-two DMA channels. Once a command request has been detected, P2d, operating as a slave sequencer, fetches a DMA descriptor from an SRAM location dedicated to the requesting channel which includes the DRAM address, PCI address, PCI endian and request size. P2d then issues a request to Pmo which in turn moves data from the PCI target to the SRAM FIFO. Next, P2d issues a request to the Xwr sequencer causing the SRAM based FIFO contents to be written to the DRAM. The process repeats until the entire request has been satisfied at which time P2d writes ending status in to the SRAM DMA descriptor area and sets the channel done bit associated with that channel. P2d then monitors the DMA channels for additional requests.

Figure 37:
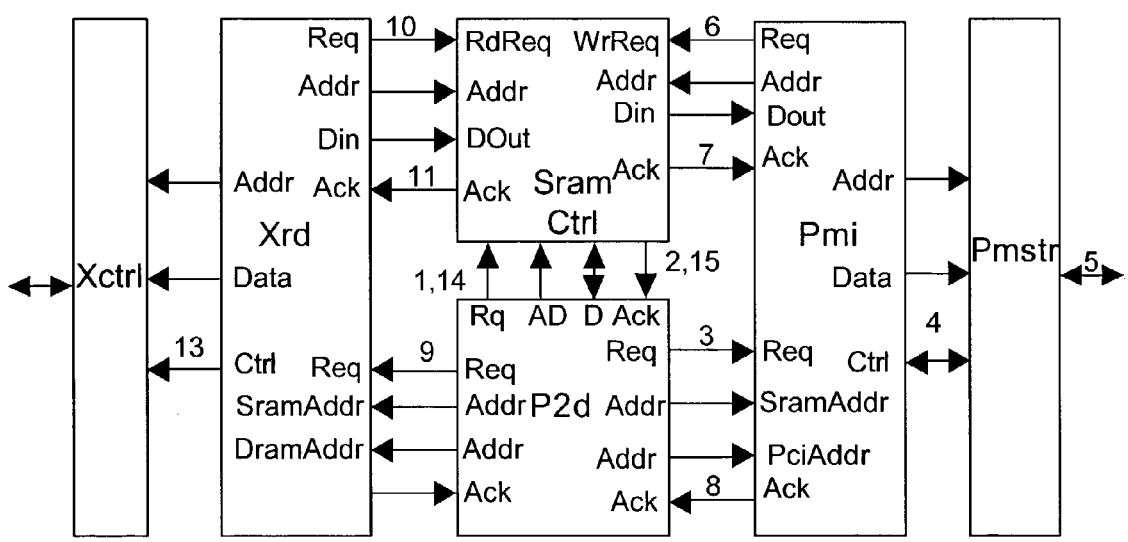
FIG. 37 is a diagram illustrating data movement from a PCI target to DRAM.

FIG. 37 is an illustration showing the major blocks involved in the movement of data from a PCI target to DRAM.

Figure 40:
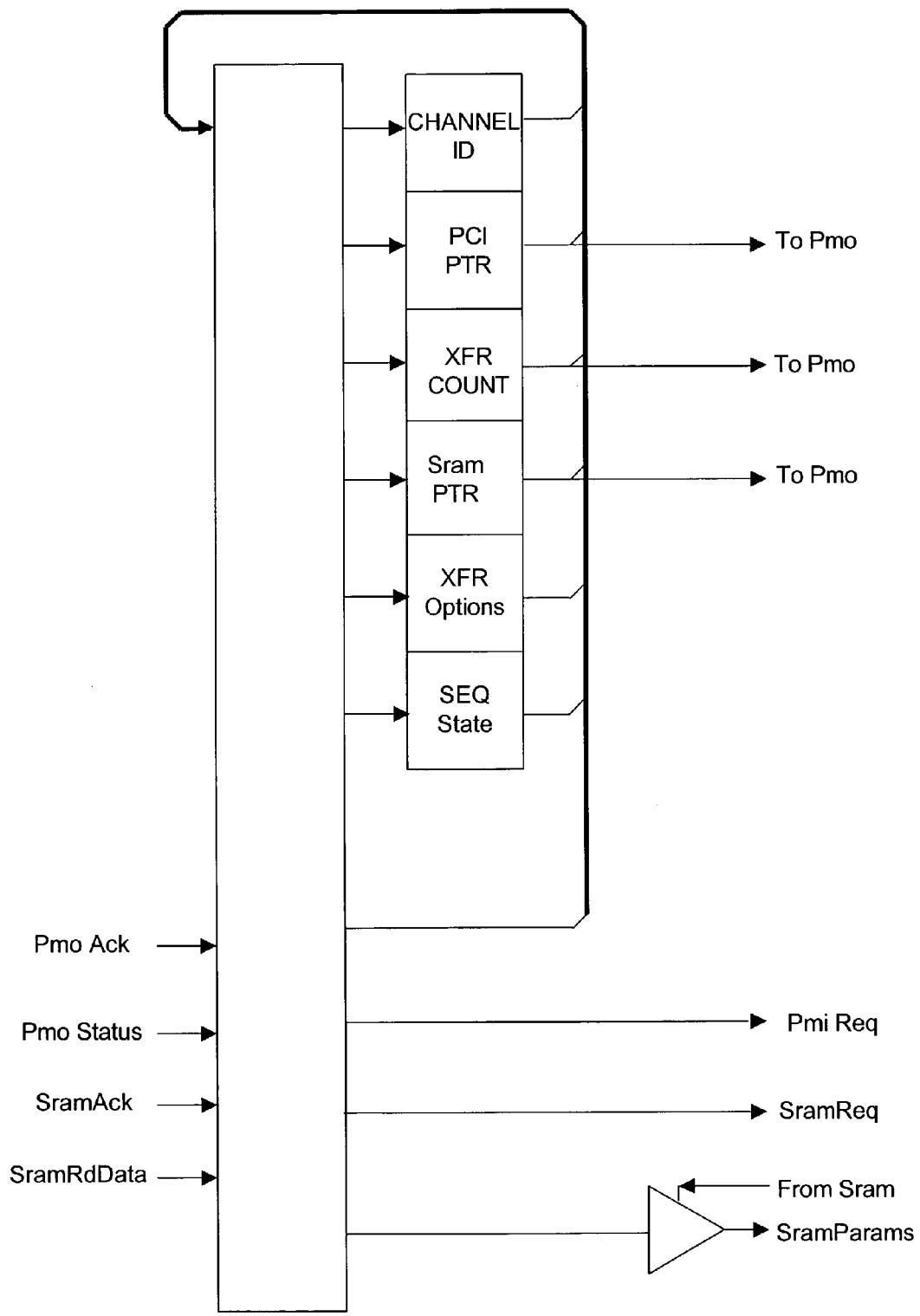
FIG. 40 is a diagram of a SRAM to PCI Sequencer.

FIG. 40 is a diagram of a SRAM TO PCI SEQUENCER (S2p). The S2p sequencer acts as both a slave sequencer and a master sequencer. Servicing channel requests issued by the Cpu, the S2p sequencer manages movement of data from SRAM to the PCI bus by issuing requests to the Pmo sequencer.

S2p can receive requests from any of the processor's thirty-two DMA channels. Once a command request has been detected, S2p, operating as a slave sequencer, fetches a DMA descriptor from an SRAM location dedicated to the requesting channel which includes the SRAM address, PCI address, PCI endian and request size. S2p then issues a request to Pmo which in turn moves data from the SRAM to a PCI target. The process repeats until the entire request has been satisfied at which time S2p writes ending status in to the SRAM DMA descriptor area and sets the channel done bit associated with that channel. S2p then monitors the DMA channels for additional requests.

Figure 39:
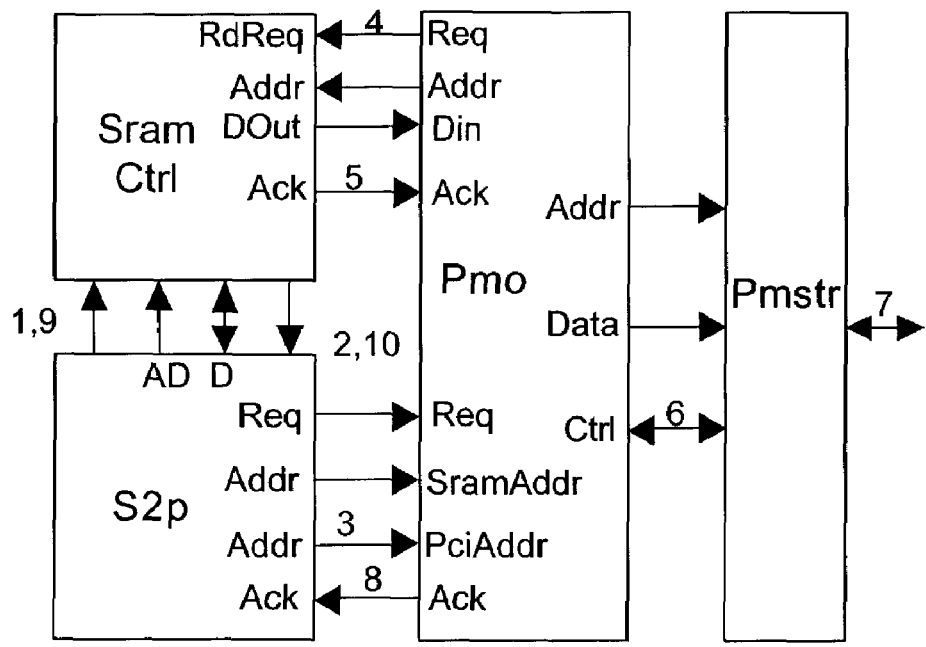
FIG. 39 is a diagram illustrating data movement from SRAM to Pci target.

FIG. 39 is an illustration showing the major blocks involved in the movement of data from SRAM to PCI target.

Figure 42:
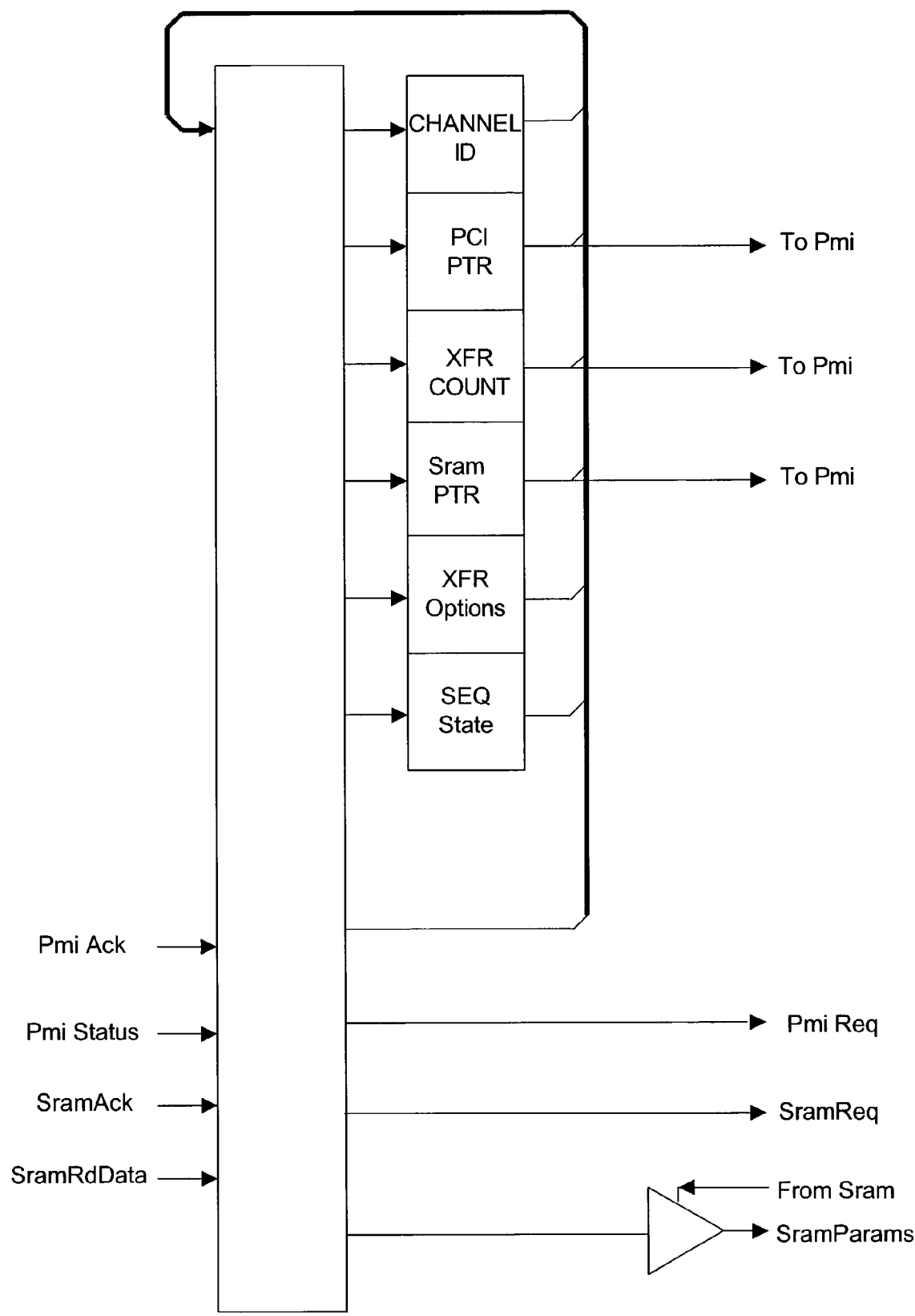
FIG. 42 is a diagram of a PCI to SRAM Sequencer.

FIG. 42 is a diagram of a PCI TO SRAM SEQUENCER (P2s). The P2s sequencer acts as both a slave sequencer and a master sequencer. Servicing channel requests issued by the Cpu, the P2s sequencer manages movement of data from PCI bus to SRAM by issuing requests to the Pmi sequencer.

P2s can receive requests from any of the processor's thirty-two DMA channels. Once a command request has been detected, P2s, operating as a slave sequencer, fetches a DMA descriptor from an SRAM location dedicated to the requesting channel which includes the SRAM address, PCI address, PCI endian and request size. P2s then issues a request to Pmo which in turn moves data from the PCI target to the SRAM. The process repeats until the entire request has been satisfied at which time P2s writes ending status in to the DMA descriptor area of SRAM and sets the channel done bit associated with that channel. P2s then monitors the DMA channels for additional requests.

Figure 41:
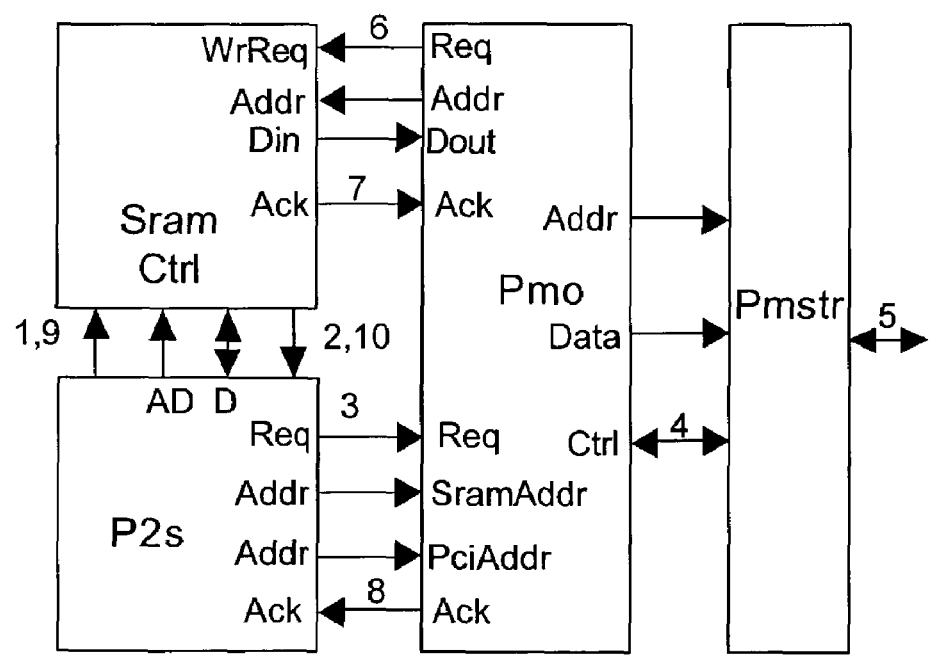
FIG. 41 is a diagram illustrating data movement from a Pci target to DRAM.

FIG. 41 is an illustration showing the major blocks involved in the movement of data from a PCI target to DRAM.

Figure 44:
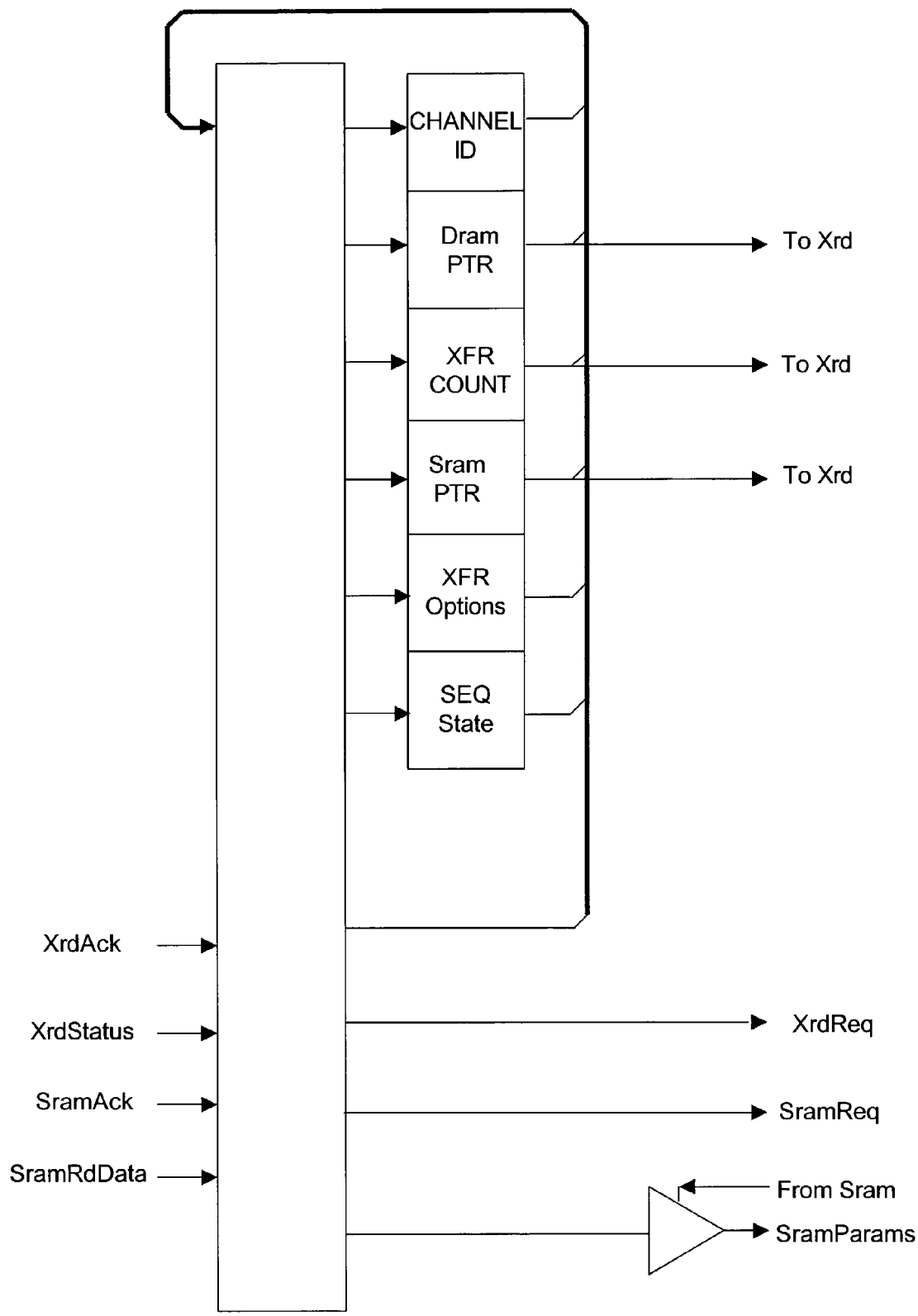
FIG. 44 is a diagram of a DRAM to SRAM Sequencer.

FIG. 44 is a diagram of a DRAM TO SRAM SEQUENCER (D2s). The D2s sequencer acts as both a slave sequencer and a master sequencer. Servicing channel requests issued by the Cpu, the D2s sequencer manages movement of data from DRAM to SRAM by issuing requests to the Xrd sequencer.

D2s can receive requests from any of the processor's thirty-two DMA channels. Once a command request has been detected, D2s, operating as a slave sequencer, fetches a DMA descriptor from an SRAM location dedicated to the requesting channel which includes the DRAM address, SRAM address and request size. D2s then issues a request to the Xrd sequencer causing the transfer of data to the SRAM. The process repeats until the entire request has been satisfied at which time D2s writes ending status in to the SRAM DMA descriptor area and sets the channel done bit associated with that channel. D2s then monitors the DMA channels for additional requests.

Figure 43:
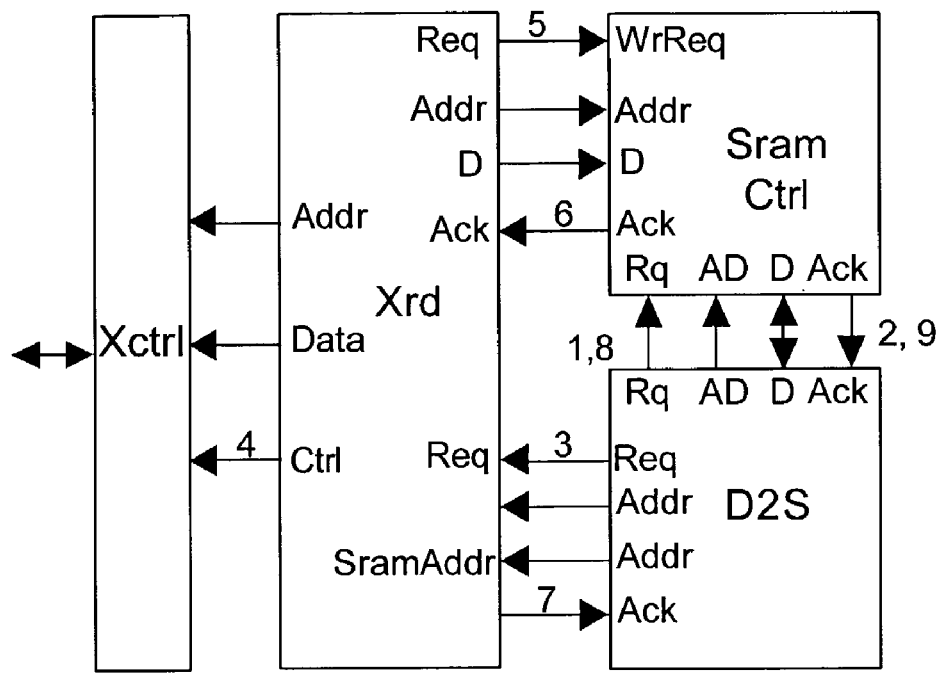
FIG. 43 is a diagram illustrating data movement from DRAM to SRAM.

FIG. 43 is an illustration showing the major blocks involved in the movement of data from DRAM to SRAM.

Figure 46:
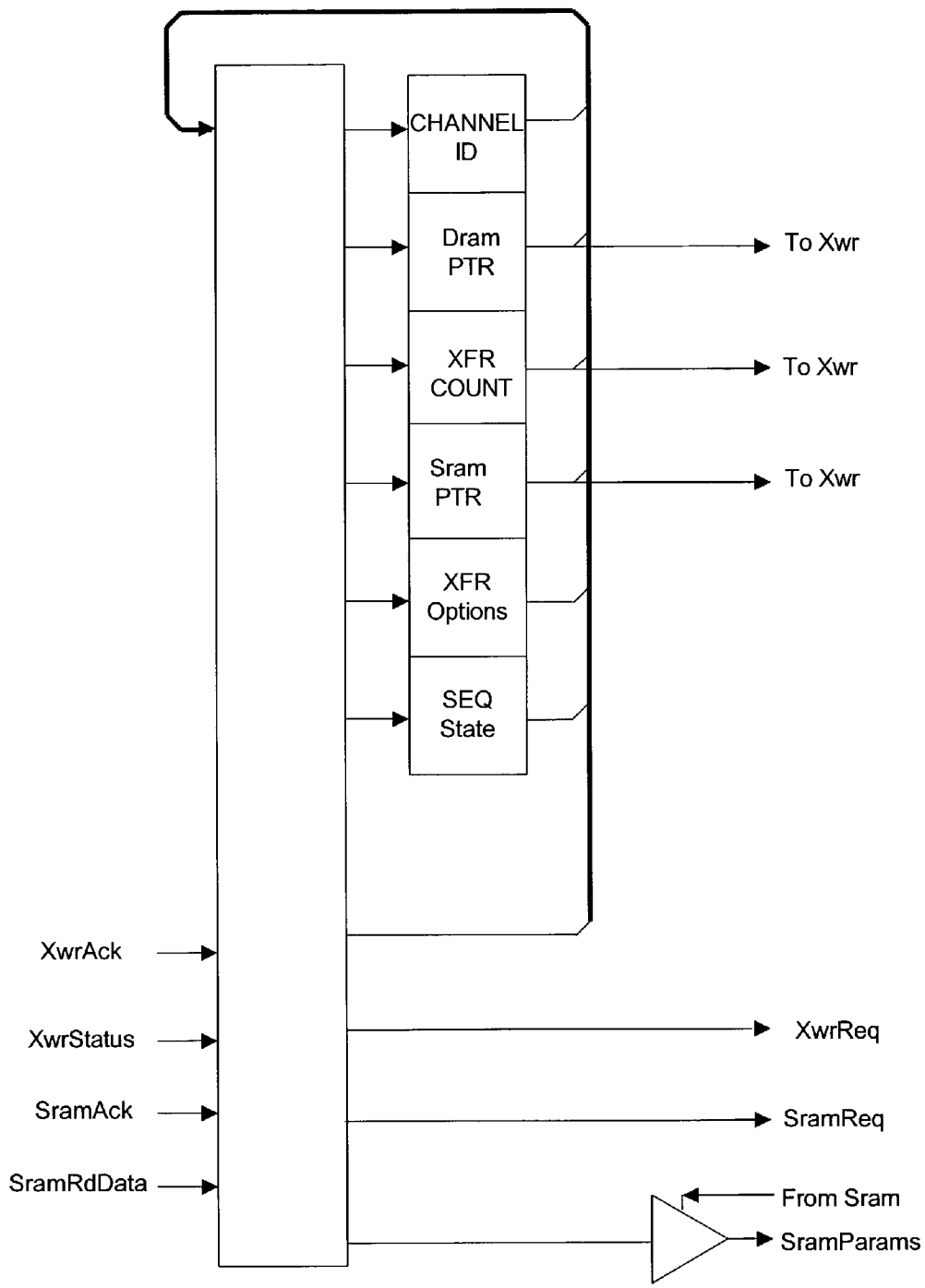
FIG. 46 is a diagram of a SRAM to DRAM Sequencer.

FIG. 46 is a diagram of a SRAM TO DRAM SEQUENCER (S2d). The S2d sequencer acts as both a slave sequencer and a master sequencer. Servicing channel requests issued by the Cpu, the S2d sequencer manages movement of data from SRAM to DRAM by issuing requests to the Xwr sequencer.

S2d can receive requests from any of the processor's thirty-two DMA channels. Once a command request has been detected, S2d, operating as a slave sequencer, fetches a DMA descriptor from an SRAM location dedicated to the requesting channel which includes the DRAM address, SRAM address, checksum reset and request size. S2d then issues a request to the Xwr sequencer causing the transfer of data to the DRAM. The process repeats until the entire request has been satisfied at which time S2d writes ending status in to the SRAM DMA descriptor area and sets the channel done bit associated with that channel. S2d then monitors the DMA channels for additional requests.

Figure 45:
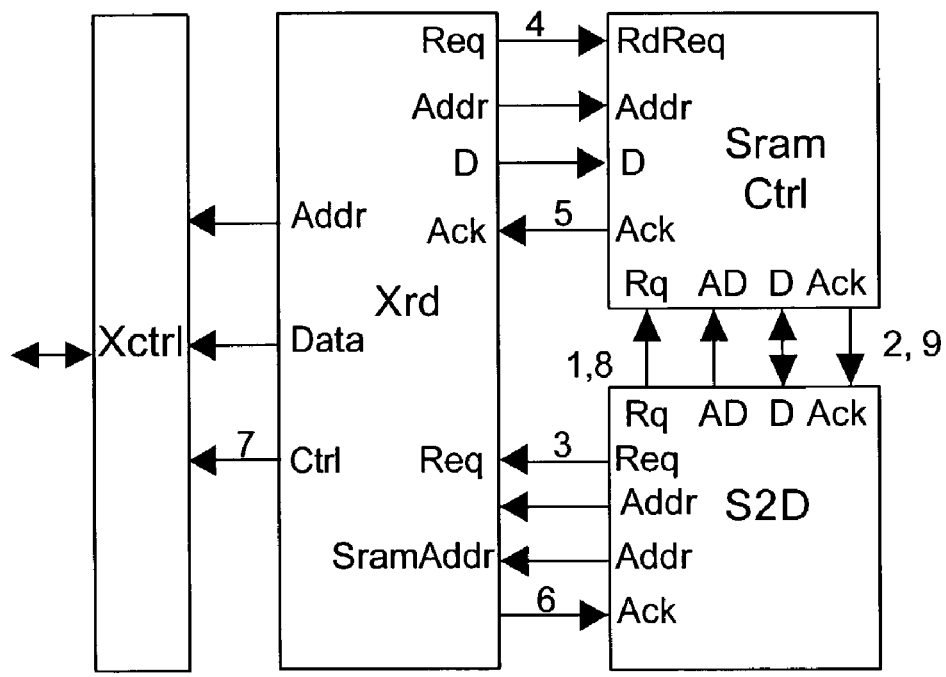
FIG. 45 is a diagram illustrating data movement from SRAM to DRAM.

FIG. 45 is an illustration showing the major blocks involved in the movement of data from SRAM to DRAM.

Figure 47:
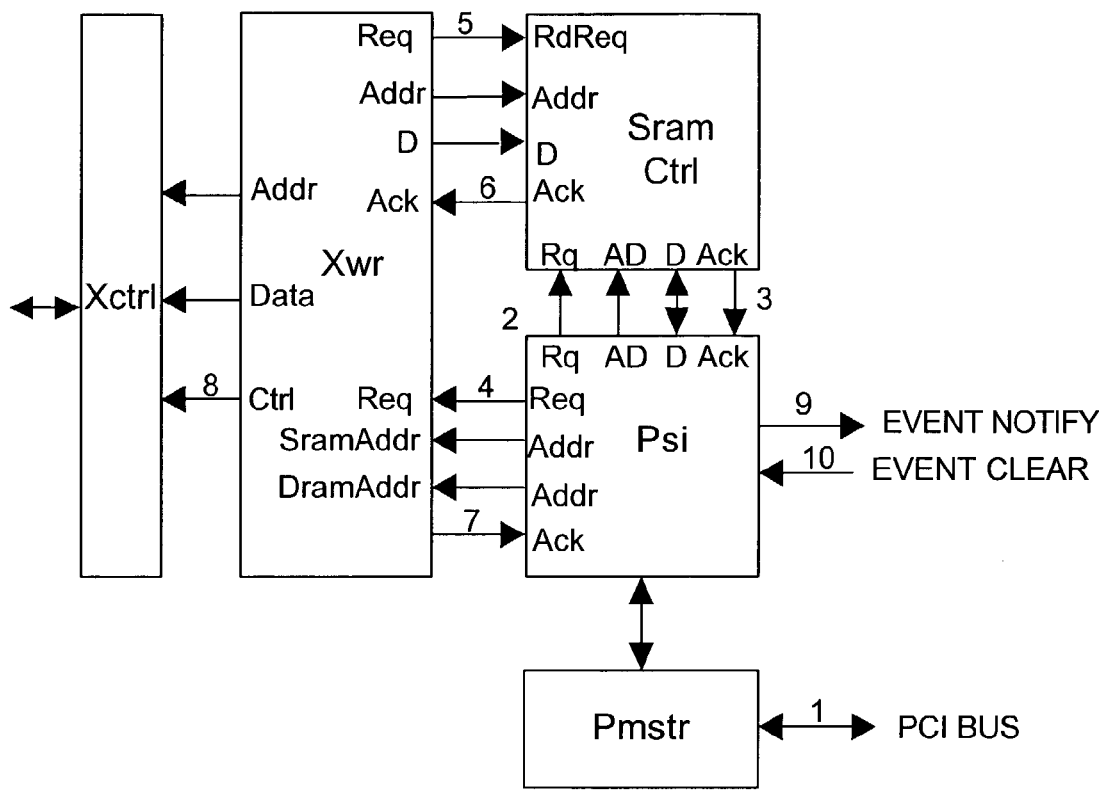
FIG. 47 is a diagram of a sequence of events when a PCI Slave Input Sequencer is the target of a Pci write operation.

FIG. 47 depicts a sequence of events when a PCI SLAVE INPUT SEQUENCER (Psi) is the target of a PCI write operation. The Psi sequencer acts as both a slave sequencer and a master sequencer. Servicing requests issued by a PCI master, the Psi sequencer manages movement of data from PCI bus to SRAM and PCI bus to DRAM via SRAM by issuing requests to the SramCtrl and Xwr sequencers.

Psi manages write requests to configuration space, expansion rom, DRAM, SRAM and memory mapped registers. Psi separates these PCI bus operations in to two categories with different action taken for each. DRAM accesses result in Psi generating write request to an SRAM buffer followed with a write request to the Xwr sequencer. Subsequent write or read DRAM operations are retry terminated until the buffer has been emptied. An event notification is set for the processor allowing message passing to occur through DRAM space.

All other PCI write transactions result in Psi posting the write information including PCI address, PCI byte marks and PCI data to a reserved location in SRAM, then setting an event flag which the event processor monitors. Subsequent writes or reads of configuration, expansion rom, SRAM or registers are terminated with retry until the processor clears the event flag. This allows SiMBa to keep pipelining levels to a minimum for the posted write and give the processor ample time to modify data for subsequent PCI read operations. Note that events 4 through 7 occur only when the write operation targets the DRAM.

Figure 48:
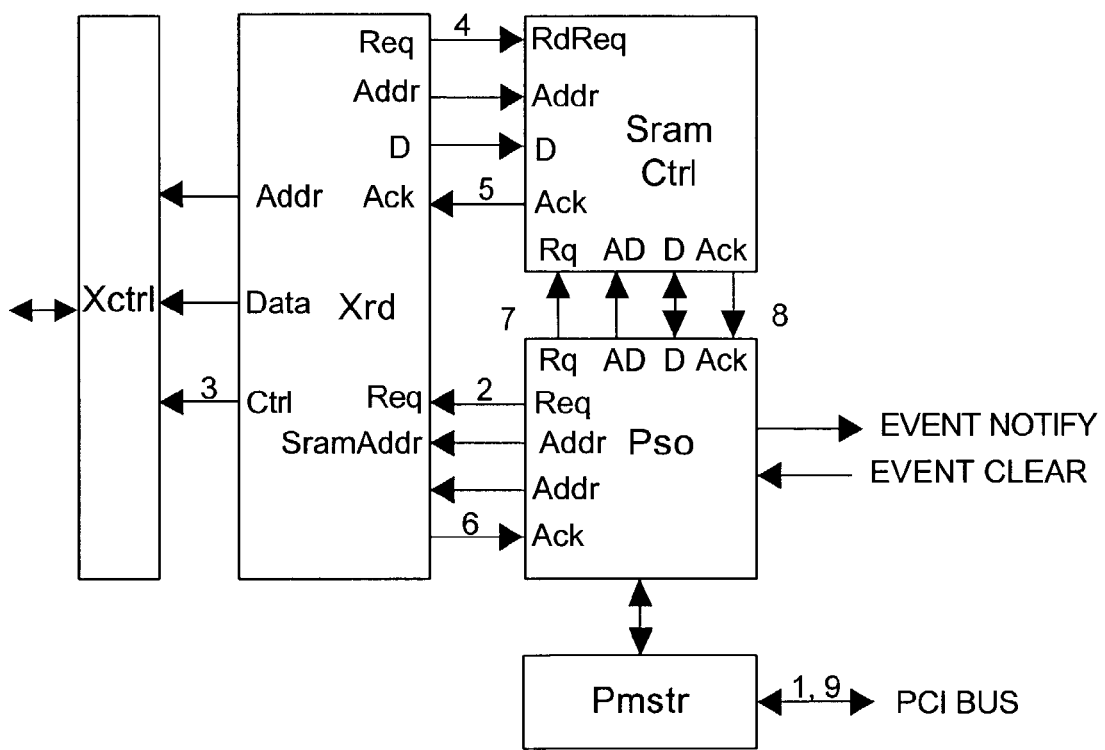
FIG. 48 is a diagram of a sequence of events when a PCI Slave Output Sequencer is the target of a Pci read operation.

FIG. 48 depicts the sequence of events when a PCI SLAVE OUTPUT SEQUENCER (Pso) is the target of a PCI read operation. The Pso sequencer acts as both a slave sequencer and a master sequencer. Servicing requests issued by a PCI master, the Pso sequencer manages movement of data to PCI bus form SRAM and to PCI bus from DRAM via SRAM by issuing requests to the SramCtrl and Xrd sequencers.

Pso manages read requests to configuration space, expansion rom, DRAM, SRAM and memory mapped registers. Pso separates these PCI bus operations in to two categories with different action taken for each. DRAM accesses result in Pso generating read request to the Xrd sequencer followed with a read request to SRAM buffer. Subsequent write or read DRAM operations are retry terminated until the buffer has been emptied.

All other PCI read transactions result in Pso posting the read request information including PCI address and PCI byte marks to a reserved location in SRAM, then setting an event flag which the event processor monitors. Subsequent writes or reads of configuration, expansion rom, SRAM or registers are terminated with retry until the processor clears the event flag. This allows SiMBa to use a microcoded response mechanism to return data for the request. The processor decodes the request information, formulates or fetches the requested data and stores it in SRAM then clears the event flag allowing Pso to fetch the data and return it on the PCI bus.

Figure 50:
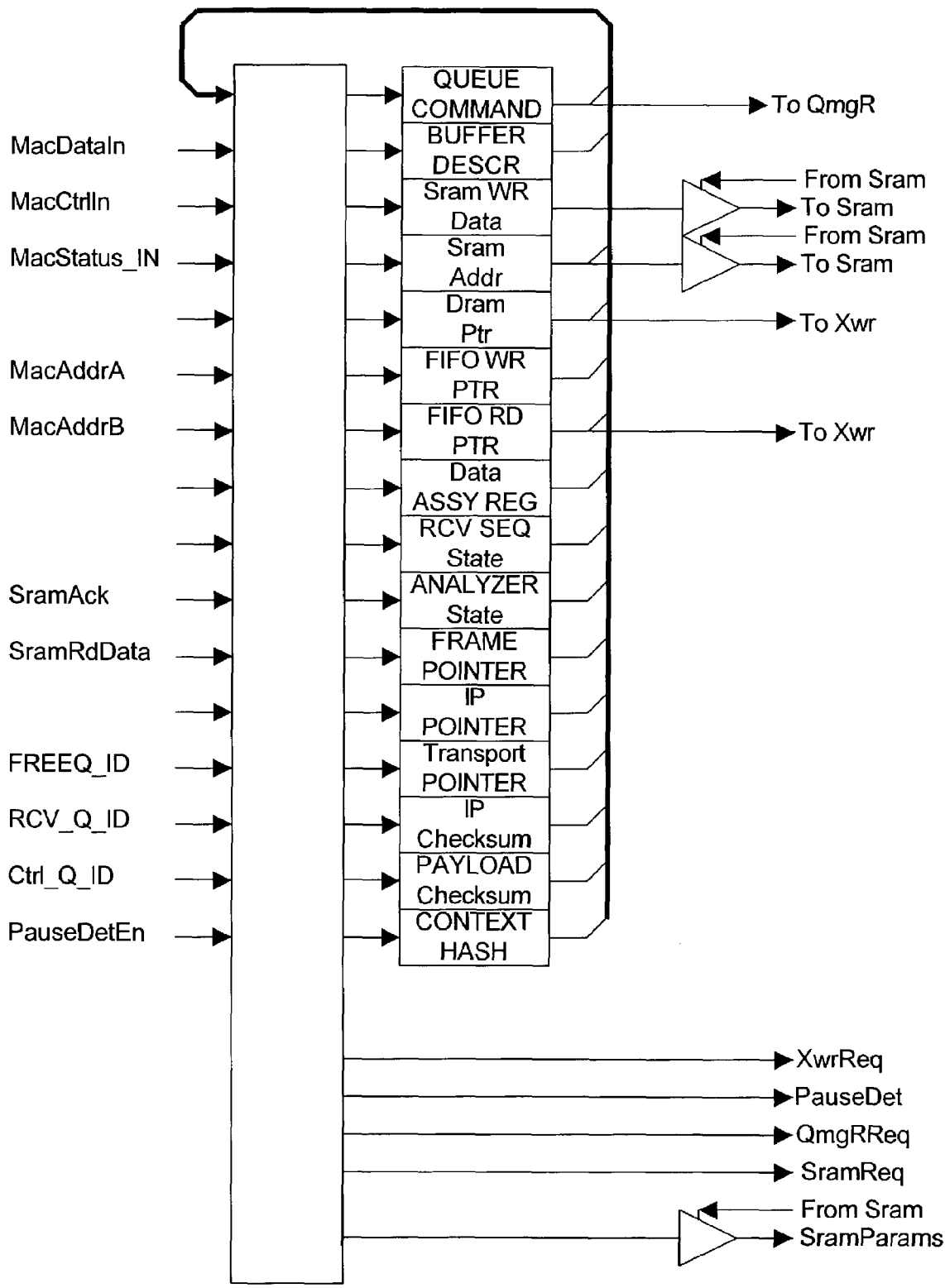
FIG. 50 is a diagram of a Frame Receive Sequencer.

FIG. 50 is a diagram of a FRAME RECEIVE SEQUENCER (RcvX). The receive sequencer (RcvSeq) analyzes and manages incoming packets, stores the result in DRAM buffers, then notifies the processor through the receive queue (RcvQ) mechanism. The process begins when a buffer descriptor is available at the output of the FreeQ. RcvSeq issues a request to the Qmg which responds by supplying the buffer descriptor to RcvSeq. RcvSeq then waits for a receive packet. The Mac, network, transport and session information is analyzed as each byte is received and stored in the assembly register (AssyReg). When four bytes of information is available, RcvSeq requests a write of the data to the SRAM. When sufficient data has been stored in the SRAM based receive FIFO, a DRAM write request is issued to Xwr. The process continues until the entire packet has been received at which point RcvSeq stores the results of the packet analysis in the beginning of the DRAM buffer. Once the buffer and status have both been stored, RcvSeq issues a write-queue request to Qmg. Qmg responds by storing a buffer descriptor and a status vector provided by RcvSeq. The process then repeats. If RcvSeq detects the arrival of a packet before a free buffer is available, it ignores the packet and sets the FrameLost status bit for the next received packet.

Figure 49:
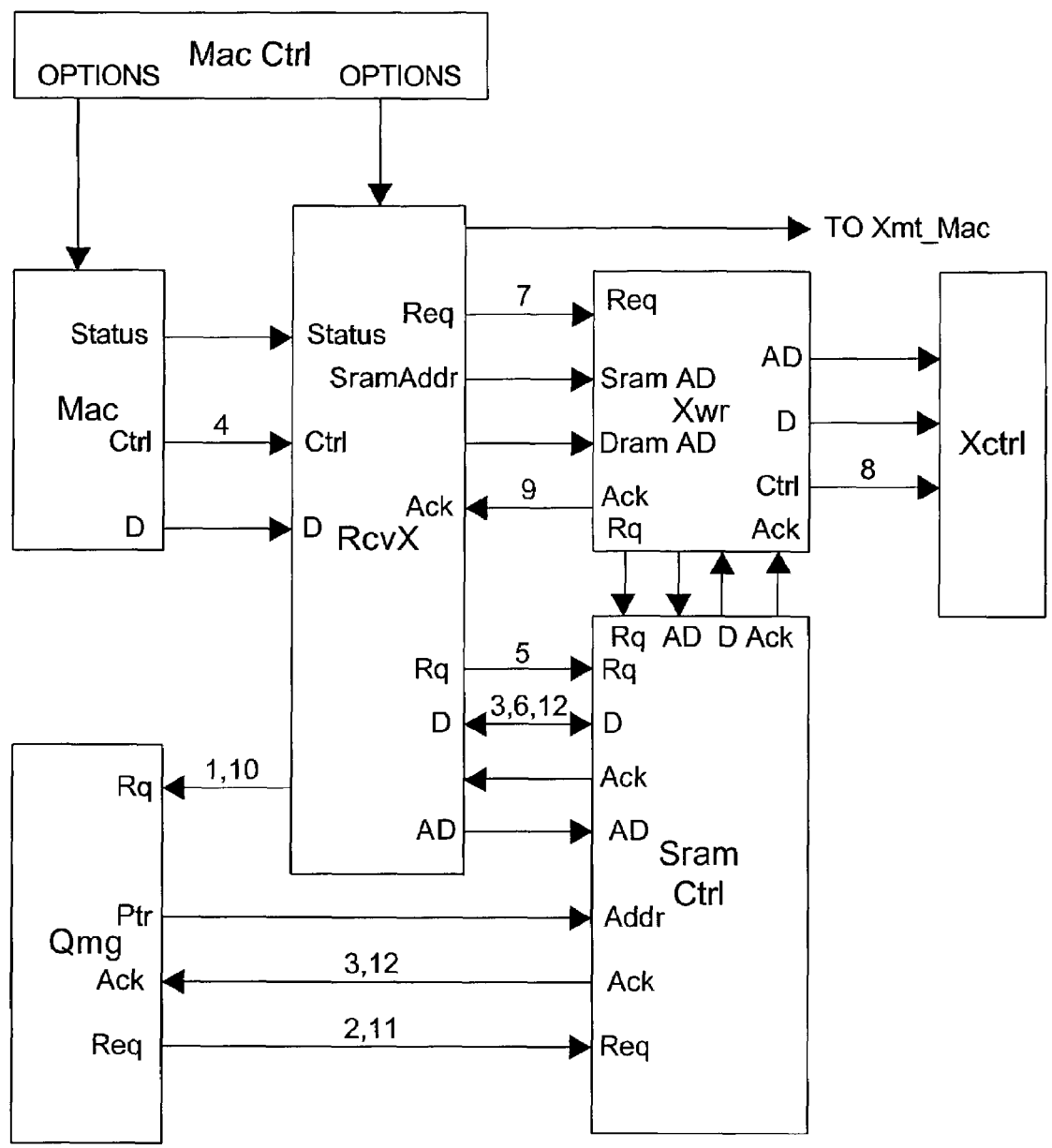
FIG. 49 is a diagram of a sequence of events for reception of a packet.

FIG. 49 depicts a sequence of events for successful reception of a packet followed by a definition of the receive buffer and the buffer descriptor as stored on the RcvQ.

CD Appendix B defines various bits of control information relating to receive packets.

Figure 52:
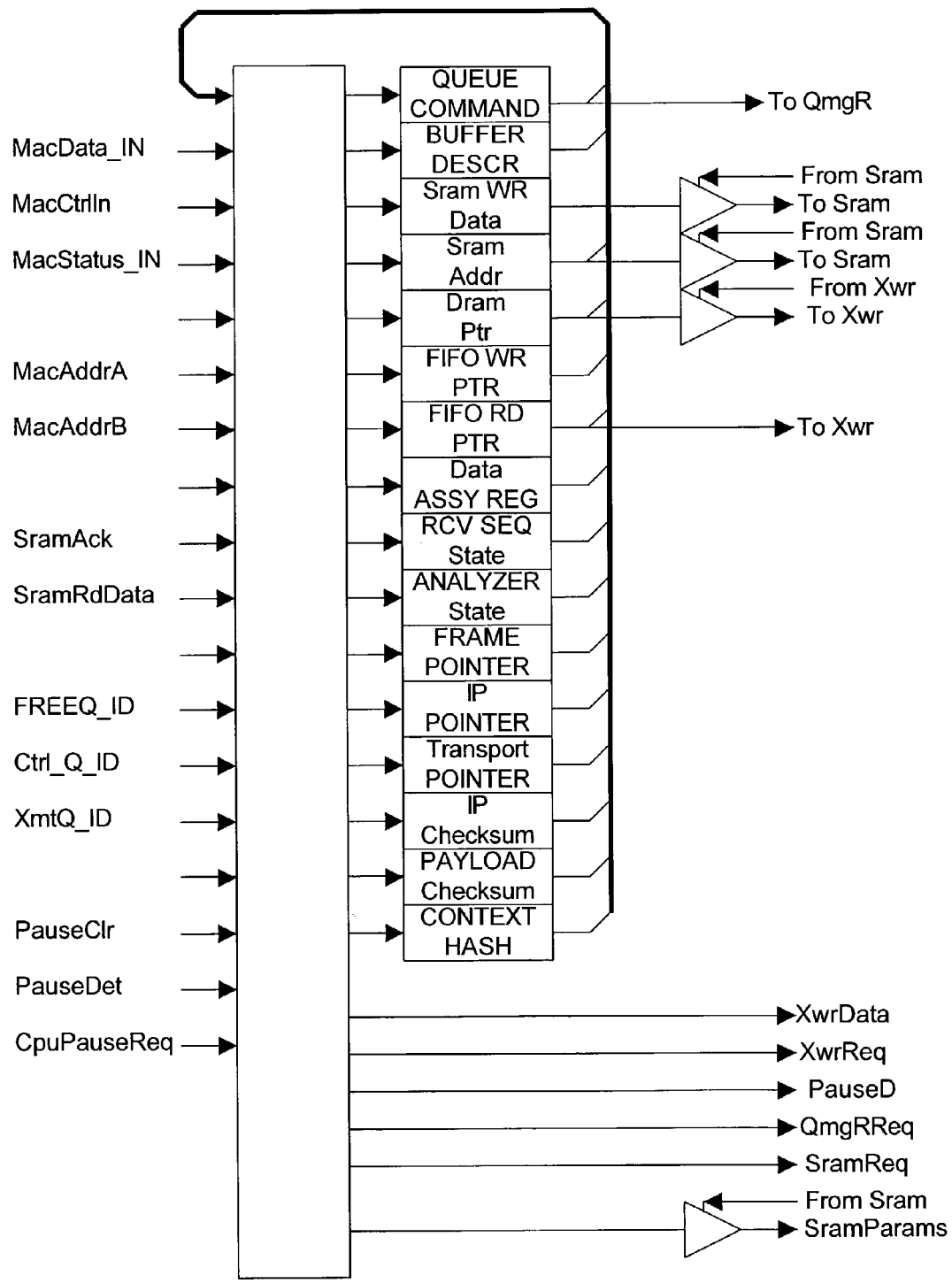
FIG. 52 is a diagram of a Frame Transmit Sequencer.

FIG. 52 is a diagram of a FRAME TRANSMIT SEQUENCER (XmtX). The transmit sequencer (XmtSeq) analyzes and manages outgoing packets, using buffer descriptors retrieved from the transmit queue (XmtQ) then storing the descriptor for the freed buffer in the free buffer queue (FreeQ). The process begins when a buffer descriptor is available at the output of the XmtQ. XmtSeq issues a request to the Qmg which responds by supplying the buffer descriptor to XmtSeq. XmtSeq then issues a read request to the Xrd sequencer. Next, XmtSeq issues a read request to SramCtrl then instructs the Mac to begin frame transmission. Once the frame transmission has completed, XmtSeq stores the buffer descriptor on the FreeQ thereby recycling the buffer.

Figure 51:
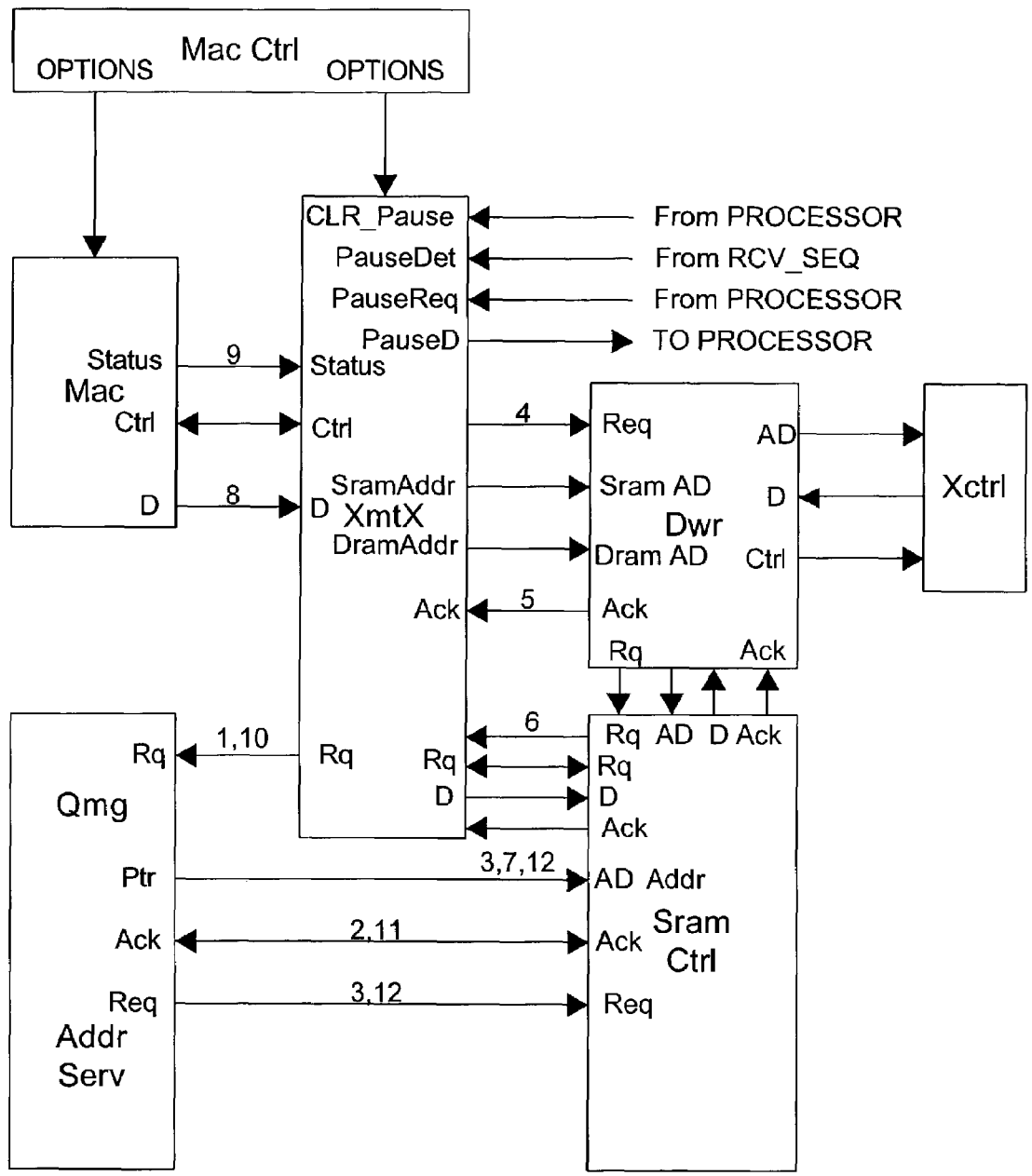
FIG. 51 is a diagram of a sequence of events for transmission of a packet.

FIG. 51 depicts a sequence of events for successful transmission of a packet followed by a definition of the receive buffer and the buffer descriptor as stored on the XmtQ.

CD Appendix C defines various bits of control information relating to transmit packets.

Figure 54:
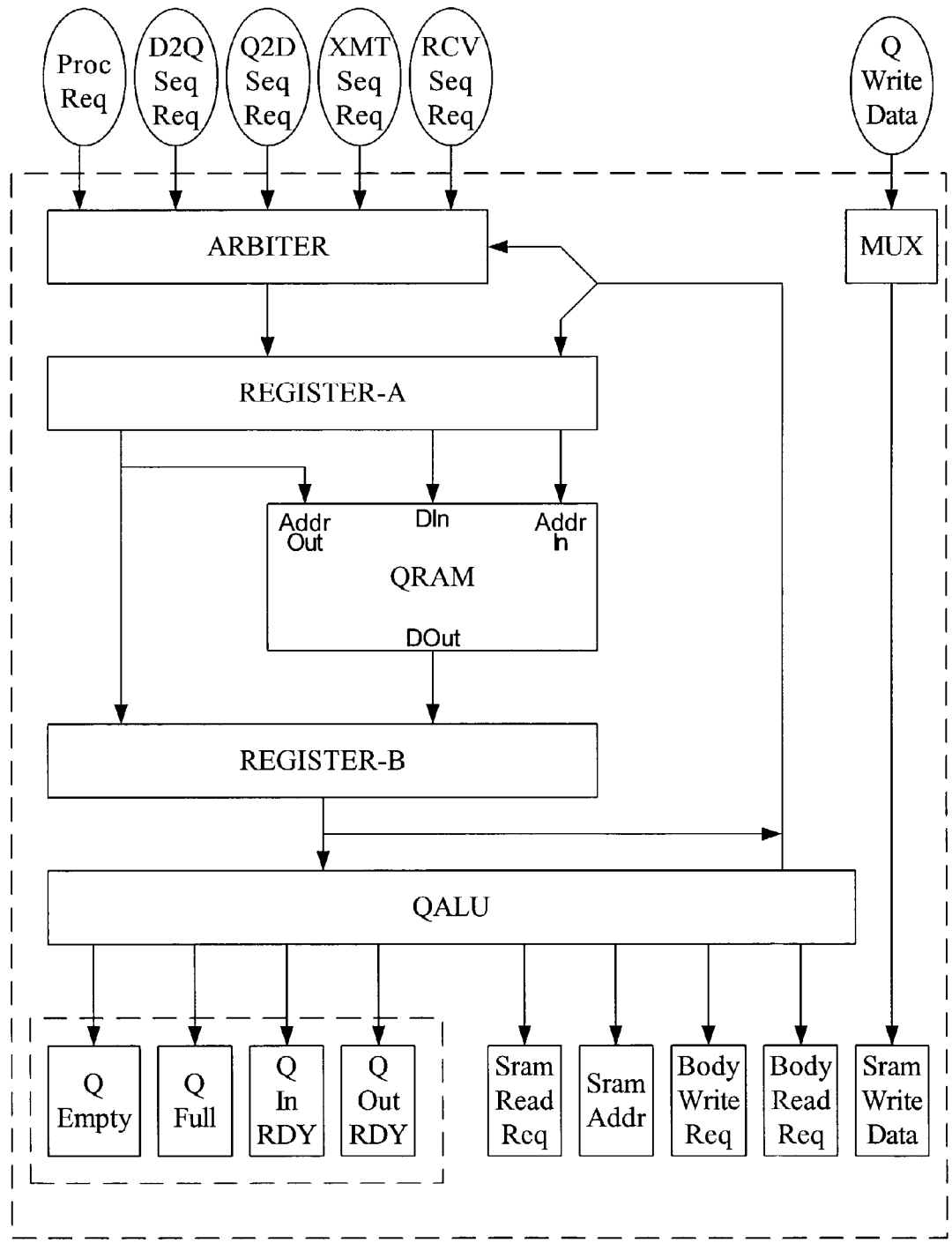
FIG. 54 is a diagram of the Queue Manager.

FIG. 54 is a diagram of a QUEUE MANAGER (Qmg). The INIC includes special hardware assist for the implementation of message and pointer queues. The hardware assist is called the queue manager (Qmg) and manages the movement of queue entries between Cpu and SRAM, between DMA sequencers and SRAM as well as between SRAM and DRAM. Queues comprise three distinct entities; the queue head (QHd), the queue tail (QTl) and the queue body (QBdy). QHd resides in 64 bytes of scratch ram and provides the area to which entries will be written (pushed). QTl resides in 64 bytes of scratch ram and contains queue locations from which entries will be read (popped). QBdy resides in DRAM and contains locations for expansion of the queue in order to minimize the SRAM space requirements. The QBdy size depends upon the queue being accessed and the initialization parameters presented during queue initialization.

Figure 53:
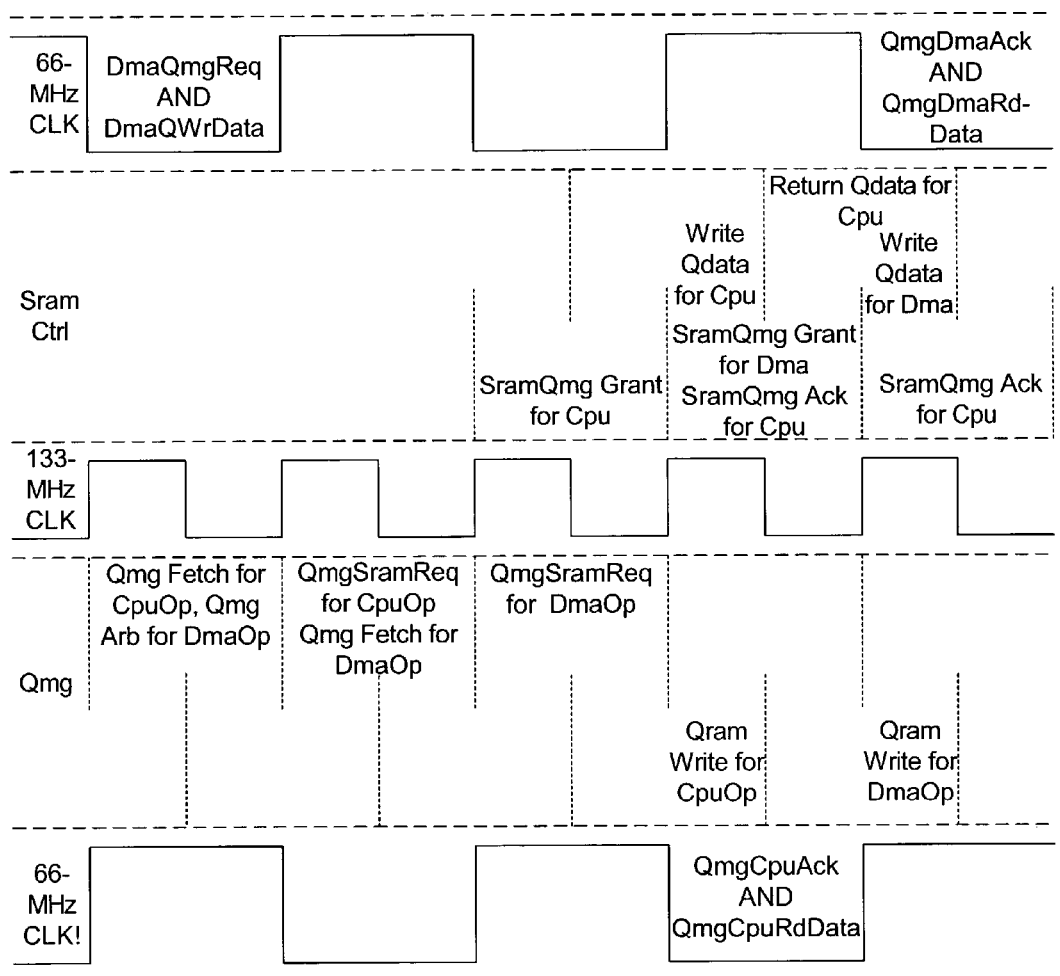
FIG. 53 is a timing diagram for a Queue Manager.

FIG. 53 is a timing diagram for the Qmg, which accepts operations from both Cpu and DMA sources. Executing these operations at a frequency of 133 MHz, Qmg reserves even cycles for DMA requests and reserves odd cycles for Cpu requests. Valid Cpu operations include initialize queue (InitQ), write queue (WrQ) and read queue (RdQ). Valid DMA requests include read body (RdBdy) and write body (WrBdy). Qmg working in unison with Q2d and D2q generate requests to the Xwr and Xrd sequencers to control the movement of data between the QHd, QTl and QBdy.

The arbiter selects the next operation to be performed. The dual-ported SRAM holds the queue variables HdWrAddr, HdRdAddr, TlWrAddr, TlRdAddr, BdyWrAddr, BdyRdAddr and QSz. Qmg accepts an operation request, fetches the queue variables from the queue ram (Qram), modifies the variables based on the current state and the requested operation then updates the variables and issues a read or write request to the SRAM controller. The SRAM controller services the requests by writing the tail or reading the head and returning an acknowledge.

DMA operations are accomplished through a combination of thirty two DMA channels (DmaCh) and seven DMA sequencers (DmaSeq). Each DMA channel provides a mechanism whereby a Cpu can issue a command to any of the seven DMA sequencers. Whereas the DMA channels are multi-purpose, the DMA sequencers they command are single purpose as follows.

Table 9 lists functions of the DMA sequencers.

TABLE 9

| DMA SEQ # | NAME | DESCRIPTION |
| --- | --- | --- |
| 0 | none | This is a no operation address. |
| 1 | D2dSeq | Moves data from ExtMem to ExtMem. |
| 2 | D2sSeq | Moves data from ExtMem bus to SRAM. |
| 3 | D2pSeq | Moves data from ExtMem bus to PCI bus. |
| 4 | S2dSeq | Moves data from SRAM to ExtMem. |
| 5 | S2pSeq | Moves data from SRAM to PCI bus. |
| 6 | P2dSeq | Moves data from PCI bus to ExtMem. |
| 7 | P2sSeq | Moves data from PCI bus to SRAM. |

The processors manage DMA in the following way. The processor writes a DMA descriptor to an SRAM location reserved for the DMA channel. The format of the DMA descriptor is dependent upon the targeted DMA sequencer. The processor then writes the DMA sequencer number to the channel command register.

Each of the DMA sequencers polls all thirty two DMA channels in search of commands to execute. Once a command request has been detected, the DMA sequencer fetches a DMA descriptor from a fixed location in SRAM. The SRAM location is fixed and is determined by the DMA channel number. The DMA sequencer loads the DMA descriptor into its own registers, executes the command, then overwrites the DMA descriptor with ending status. Once the command has halted, due to completion or error, and the ending status has been written, the DMA sequencer sets the done bit for the current DMA channel.

The done bit appears in a DMA event register which the Cpu can examine. The Cpu fetches ending status from SRAM, then clears the done bit by writing zeroes to the channel command (ChCmd) register. The channel is now ready to accept another command.

CD Appendix D defines various bits of control information relating to DMA operations.

The invention claimed is:

1. A method for data communication by a computer that is coupled to a network by a device, the method comprising:
   controlling a Transport Control Protocol (TCP) connection by the computer;
   sending a first signal from the computer to the device, the first signal indicating an intention to transfer control of the TCP connection from the computer to the device;
   responding to the first signal by the device, including sending a second signal from the device to the computer, the second signal indicating that the device is able to receive control of the TCP connection; and
   sending a third signal from the computer to the device, the third signal responsive to the second signal and transferring control of the TCP connection from the computer to the device.

2. The method of claim 1, further comprising delaying the transfer of information corresponding to the TCP connection from the device to the computer, subsequent to sending the first signal, until the third signal has been received by the device.

3. The method of claim 1, further comprising delaying the transfer of information corresponding to the TCP connection from the computer to the device, subsequent to sending the first signal, until the third signal has been sent from the computer to the device.

4. The method of claim 1, wherein sending the first signal from the computer to the device includes sending a context number corresponding to the TCP connection.

5. The method of claim 1, wherein sending the first signal from the computer to the device includes sending an Internet Protocol (IP) address and TCP ports corresponding to the TCP connection.

6. The method of claim 1, wherein responding to the first signal by the device includes establishing a provisional context corresponding to the TCP connection and controlled by the device.

7. The method of claim 1, wherein sending the first signal from the computer to the device includes sending a command from the computer to the device, including identifying the TCP connection in the command.

8. The method of claim 1, further comprising transferring control of the TCP connection from the device to the computer.

9. The method of claim 1, wherein controlling a TCP connection includes maintaining a context for the TCP connection.

10. The method of claim 1, further comprising establishing the TCP connection by the computer, prior to sending the first signal from the computer to the device.

11. The method of claim 1, further comprising:
    TCP processing a first packet corresponding to the TCP connection by the computer, prior to sending the first signal from the computer to the device; and
    TCP processing a second packet corresponding to the TCP connection by the device, subsequent to sending the third signal from the computer to the device.

12. The method of claim 11, further comprising:
delaying the TCP processing of the second packet by the device until receiving the third signal at the device.

13. A method for data communication by a computer that is coupled to a network by an interface device, the method comprising:
establishing a Transport Control Protocol (TCP) connection by the computer;
sending a first command from the computer to the device, including indicating an intention to transfer control of the TCP connection from the computer to the device;
sending a response to the first command from the device to the computer, including identifying the TCP connection in the response; and
sending a second command from the computer to the device in reply to the response and completing the transfer of control of the TCP connection from the computer to the device.

14. The method of claim 13, further comprising delaying the transfer of information corresponding to the TCP connection from the device to the computer, subsequent to sending the first command, until the second command has been received by the device.

15. The method of claim 13, further comprising delaying the transfer of information corresponding to the TCP connection from the computer to the device, subsequent to sending the first command, until the second command has been sent from the computer to the device.

16. The method of claim 13, wherein sending the first command from the computer to the device includes sending a context number corresponding to the TCP connection.

17. The method of claim 13, wherein sending the first command from the computer to the device includes sending an Internet Protocol (IP) address and TCP ports corresponding to the TCP connection.

18. The method of claim 13, further comprising establishing a provisional context corresponding to the TCP connection and controlled by the device responsive to the first command.

19. The method of claim 13, wherein sending the first signal from the computer to the device includes sending a command from the computer to the device, including identifying the TCP connection in the command.

20. The method of claim 13, further comprising transferring control of the TCP connection from the device to the computer.

21. The method of claim 13, wherein controlling a TCP connection includes maintaining a context for the TCP connection.

22. The method of claim 13, wherein sending the response includes indicating that the device is prepared to receive control of the TCP connection.

23. The method of claim 13, further comprising:
TCP processing a first packet corresponding to the TCP connection by the computer, prior to sending the first command from the computer to the device; and
TCP processing a second packet corresponding to the TCP connection by the device, subsequent to sending the second command from the device to the computer.

24. The method of claim 13, further comprising:
delaying the TCP processing of the second packet by the device until receiving the second command at the device.

25. A method for data communication by first and second devices that are coupled to a network, the method comprising:
controlling a Transport Control Protocol (TCP) connection by the first device;
sending a first signal from the first device to the second device, the first signal indicating an intention to transfer control of the TCP connection from the first device to the second device;
responding to the first signal by the second device, including sending a second signal from the second device to the first device, the second signal identifying the TCP connection; and
responding to the second signal by the first device, including sending a third signal from the first device to the second device to complete the transfer of control of the TCP connection from the first device to the second device.

26. The method of claim 25, further comprising indicating, by the second signal, that the second device is prepared to receive control of the TCP connection.

27. The method of claim 25, further comprising delaying the transfer of information corresponding to the TCP connection from the second device to the first device, subsequent to sending the first signal, until the third signal has been received by the second device.

28. The method of claim 25, further comprising delaying the transfer of information corresponding to the TCP connection from the first device to the second device, subsequent to sending the first signal, until the third signal has been sent from the first device to the second device.

29. The method of claim 25, wherein sending the first signal from the first device to the second device includes sending a context number corresponding to the TCP connection.

30. The method of claim 25, wherein sending the first signal from the first device to the second device includes sending an Internet Protocol (IP) address and TCP ports corresponding to the TCP connection.

31. The method of claim 25, wherein responding to the first signal by the second device includes establishing a provisional context corresponding to the TCP connection and controlled by the second device.

32. The method of claim 25, wherein sending the first signal from the first device to the second device includes sending a command from the first device to the second device, including identifying the TCP connection in the command.

33. The method of claim 25, further comprising transferring control of the TCP connection from the second device to the first device.

34. The method of claim 25, wherein controlling a TCP connection includes maintaining a context for the TCP connection.

35. The method of claim 25, further comprising establishing the TCP connection by the first device, prior to sending the first signal from the first device to the second device.

36. The method of claim 25, further comprising:
TCP processing a first packet corresponding to the TCP connection by the first device, prior to sending the first signal from the first device to the second device; and
TCP processing a second packet corresponding to the TCP connection by the second device, subsequent to sending the third signal from the first device to the second device.

37. The method of claim 25, further comprising:
delaying the TCP processing of the second packet by the second device until receiving the third signal at the second device.

38. A system for network communication, the system comprising:
a device coupled between a computer and a network to receive from the computer a Transport Control Protocol (TCP) connection, to receive from the network at least one packet associated with the TCP connection and to process a TCP header for the at least one packet, the computer having a memory storing instructions to pass the TCP connection to the device in first and second commands, the second command responsive to an indication from the device that the device is prepared to receive the TCP connection.

* * * * *